(12) United States Patent
Tamassia et al.

(10) Patent No.: US 9,886,706 B2
(45) Date of Patent: *Feb. 6, 2018

(54) SYSTEMS AND METHODS FOR MOBILE ORDERING AND PAYMENT

(71) Applicant: JPMorgan Chase Bank, N.A., New York, NY (US)

(72) Inventors: Hugh Robert Tamassia, Landenberg, PA (US); Peter Franklin Stransky, Wilmington, DE (US); Ravi Acharya, Philadelphia, PA (US); Satyan Avatara, Landenberg, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 594 days.

This patent is subject to a terminal disclaimer.

(21) Appl. No.: 14/149,363

(22) Filed: Jan. 7, 2014

(65) Prior Publication Data

US 2014/0122301 A1    May 1, 2014

Related U.S. Application Data

(63) Continuation of application No. 13/163,153, filed on Jun. 17, 2011, now Pat. No. 8,645,222, which is a (Continued)

(51) Int. Cl.
*G06Q 30/06*    (2012.01)
*G06Q 30/02*    (2012.01)
(Continued)

(52) U.S. Cl.
CPC ............. *G06Q 30/06* (2013.01); *G06Q 10/06* (2013.01); *G06Q 10/063* (2013.01); *G06Q 20/12* (2013.01);
(Continued)

(58) Field of Classification Search
CPC ........ G06Q 20/04; G06Q 20/10; G06Q 20/12; G06Q 20/20; G06Q 20/40
(Continued)

(56) References Cited

U.S. PATENT DOCUMENTS

| 3,999,050 A | 12/1976 | Pitroda |
| 4,012,720 A | 3/1977 | Call et al. |

(Continued)

FOREIGN PATENT DOCUMENTS

| EP | 0917119 | 5/1999 |
| WO | WO 1998/006214 | 2/1998 |

(Continued)

OTHER PUBLICATIONS

Co-pending U.S. Appl. No. 12/489,066, filed Jun. 22, 2009.
(Continued)

*Primary Examiner* — Yogesh C Garg
(74) *Attorney, Agent, or Firm* — Hunton & Williams LLP

(57) ABSTRACT

Computer implemented methods and systems for fulfilling a customer request for a requested item purchased from a merchant is provided. The method may be performed by a tangibly embodied processing machine disposed in a customer device. The method may include (1) observing, through the input of information, an observed event that is associated with a customer; (2) associating the observed event with a corresponding order record; (3) retrieving order information from the corresponding order record, the order information including at least customer financial entity account information; (4) generating a merchant request based at least in part on the order information in the corresponding order record, the merchant request including at least customer identification information and customer financial entity account information; and (5) outputting the merchant request to the designated merchant, so as to (Continued)

provide the designated merchant with information to fulfill the customer request.

16 Claims, 105 Drawing Sheets

Related U.S. Application Data continuation of application No. 12/776,961, filed on May 10, 2010, now Pat. No. 9,230,259, which is a continuation-in-part of application No. 12/489,066, filed on Jun. 22, 2009, now abandoned.

(60) Provisional application No. 61/288,029, filed on Dec. 18, 2009, provisional application No. 61/180,218, filed on May 21, 2009, provisional application No. 61/162,169, filed on Mar. 20, 2009.

(51) Int. Cl.
   *G06Q 40/02* (2012.01)
   *G06Q 20/12* (2012.01)
   *G06Q 10/06* (2012.01)

(52) U.S. Cl.
   CPC ......... *G06Q 30/02* (2013.01); *G06Q 30/0635* (2013.01); *G06Q 40/02* (2013.01)

(58) Field of Classification Search
   USPC ............................................ 705/26.1, 26.41
   See application file for complete search history.

(56) References Cited

U.S. PATENT DOCUMENTS

| | | |
|---|---|---|
| 4,338,587 A | 7/1982 | Chiappetti |
| 4,554,418 A | 11/1985 | Toy |
| 4,868,376 A | 9/1989 | Lessin et al. |
| 5,220,501 A | 6/1993 | Lawlor et al. |
| 5,258,855 A | 11/1993 | Lech et al. |
| 5,266,925 A | 11/1993 | Vercellotti et al. |
| 5,336,870 A | 8/1994 | Hughes et al. |
| 5,351,296 A | 9/1994 | Sullivan |
| 5,369,508 A | 11/1994 | Lech et al. |
| 5,412,730 A | 5/1995 | Jones |
| 5,446,740 A | 8/1995 | Yien et al. |
| 5,467,269 A | 11/1995 | Flaten |
| 5,482,139 A | 1/1996 | Rivalto |
| 5,500,650 A | 3/1996 | Snodgrass et al. |
| 5,506,981 A | 4/1996 | Madter |
| 5,550,358 A | 8/1996 | Tait et al. |
| 5,560,008 A | 9/1996 | Johnson et al. |
| 5,583,850 A | 12/1996 | Snodgrass et al. |
| 5,590,038 A | 12/1996 | Pitroda |
| 5,602,919 A | 2/1997 | Hurta et al. |
| 5,615,159 A | 3/1997 | Roohparvar |
| 5,617,474 A | 4/1997 | Ditzig et al. |
| 5,625,465 A | 4/1997 | Lech et al. |
| 5,627,544 A | 5/1997 | Snodgrass et al. |
| 5,640,002 A | 6/1997 | Ruppert et al. |
| 5,682,345 A | 10/1997 | Roohparvar et al. |
| 5,708,422 A | 1/1998 | Blonder et al. |
| 5,715,431 A | 2/1998 | Everett et al. |
| 5,742,845 A | 4/1998 | Wagner |
| 5,748,737 A | 5/1998 | Daggar |
| 5,754,938 A | 5/1998 | Herz et al. |
| 5,761,648 A | 6/1998 | Golden et al. |
| 5,767,896 A | 6/1998 | Nemirofsky |
| 5,768,416 A | 6/1998 | Lech et al. |
| 5,778,067 A | 7/1998 | Jones et al. |
| 5,787,174 A | 7/1998 | Tuttle |
| 5,796,827 A | 8/1998 | Coppersmith et al. |
| 5,796,832 A | 8/1998 | Kawan |
| 5,801,985 A | 9/1998 | Roohparvar et al. |
| 5,802,502 A | 9/1998 | Gell et al. |
| 5,805,702 A | 9/1998 | Curry et al. |
| 5,819,234 A | 10/1998 | Slavin et al. |
| 5,857,152 A | 1/1999 | Everett |
| 5,878,337 A | 3/1999 | Joao et al. |
| 5,880,769 A | 3/1999 | Nemirofsky et al. |
| 5,880,996 A | 3/1999 | Roohparvar |
| 5,884,271 A | 3/1999 | Pitroda |
| 5,889,863 A | 3/1999 | Weber |
| 5,895,454 A | 4/1999 | Harrington |
| 5,897,625 A | 4/1999 | Gustin et al. |
| 5,903,830 A | 5/1999 | Joao et al. |
| 5,938,764 A | 8/1999 | Klein |
| 5,940,510 A | 8/1999 | Curry et al. |
| 5,943,423 A | 8/1999 | Muftic |
| 5,949,880 A | 9/1999 | Curry et al. |
| 5,960,411 A | 9/1999 | Hartman et al. |
| 5,974,078 A | 10/1999 | Tuttle et al. |
| 5,982,293 A | 11/1999 | Everett et al. |
| 5,986,570 A | 11/1999 | Black et al. |
| 5,987,500 A | 11/1999 | Arunachalam |
| 5,991,749 A | 11/1999 | Morrill, Jr. |
| 5,991,843 A | 11/1999 | Porterfield et al. |
| 5,999,624 A | 12/1999 | Hopkins |
| 6,000,608 A | 12/1999 | Dorf |
| 6,002,613 A | 12/1999 | Cloud et al. |
| 6,003,770 A | 12/1999 | Schilling |
| 6,010,067 A | 1/2000 | Elbaum |
| 6,016,464 A | 1/2000 | Williams et al. |
| 6,016,963 A | 1/2000 | Ezawa et al. |
| 6,018,761 A | 1/2000 | Uomini |
| 6,047,269 A | 4/2000 | Biffar |
| 6,047,270 A | 4/2000 | Joao et al. |
| 6,055,513 A | 4/2000 | Katz et al. |
| 6,061,344 A | 5/2000 | Wood, Jr. |
| 6,065,053 A | 5/2000 | Nouri et al. |
| 6,070,067 A | 5/2000 | Nguyen et al. |
| 6,072,801 A | 6/2000 | Wood, Jr. et al. |
| 6,088,683 A | 7/2000 | Jalili |
| 6,088,816 A | 7/2000 | Nouri et al. |
| 6,091,956 A | 7/2000 | Hollenberg |
| 6,105,006 A | 8/2000 | Davis et al. |
| 6,105,013 A | 8/2000 | Curry et al. |
| 6,112,984 A | 9/2000 | Snavely |
| 6,118,789 A | 9/2000 | Wood, Jr. |
| 6,119,106 A | 9/2000 | Mersky et al. |
| 6,134,563 A | 10/2000 | Clancey et al. |
| 6,144,848 A | 11/2000 | Walsh et al. |
| 6,145,098 A | 11/2000 | Nouri et al. |
| 6,151,584 A | 11/2000 | Papierniak et al. |
| 6,164,549 A | 12/2000 | Richards |
| 6,170,067 B1 | 1/2001 | Liu et al. |
| 6,170,745 B1 | 1/2001 | Schilling |
| 6,189,787 B1 | 2/2001 | Dorf |
| 6,199,173 B1 | 3/2001 | Johnson et al. |
| 6,202,054 B1 | 3/2001 | Lawlor et al. |
| 6,220,510 B1 | 4/2001 | Everett et al. |
| 6,226,300 B1 | 5/2001 | Hush et al. |
| 6,230,267 B1 | 5/2001 | Richards et al. |
| 6,237,095 B1 | 5/2001 | Curry et al. |
| 6,237,848 B1 | 5/2001 | Everett |
| 6,243,838 B1 | 6/2001 | Liu et al. |
| 6,266,721 B1 | 7/2001 | Sheikh et al. |
| 6,272,586 B1 | 8/2001 | Roohparvar et al. |
| 6,301,567 B1 | 10/2001 | Leong et al. |
| 6,304,849 B1 | 10/2001 | Uecker et al. |
| 6,317,832 B1 | 11/2001 | Everett et al. |
| 6,328,217 B1 | 12/2001 | Everett et al. |
| 6,330,543 B1 | 12/2001 | Kepecs |
| 6,330,544 B1 | 12/2001 | Walker et al. |
| 6,349,971 B2 | 2/2002 | McCarthy |
| 6,357,665 B1 | 3/2002 | Peachman et al. |
| 6,366,893 B2 | 4/2002 | Hannula et al. |
| 6,366,894 B1 | 4/2002 | Everett et al. |
| 6,385,723 B1 | 5/2002 | Richards |
| 6,425,006 B1 | 7/2002 | Chari et al. |
| 6,439,455 B1 | 8/2002 | Everett et al. |
| 6,446,111 B1 | 9/2002 | Lowery |
| 6,459,726 B1 | 10/2002 | Ovard et al. |
| 6,466,862 B1 | 10/2002 | DeKock et al. |

(56) References Cited

U.S. PATENT DOCUMENTS

| | | |
|---|---|---|
| 6,488,211 B1 | 12/2002 | Everett et al. |
| 6,529,725 B1 | 3/2003 | Joao et al. |
| 6,535,855 B1 | 3/2003 | Cahill et al. |
| 6,553,416 B1 | 4/2003 | Chari et al. |
| 6,575,372 B1 | 6/2003 | Everett et al. |
| 6,601,040 B1 | 7/2003 | Kolls |
| 6,601,169 B2 | 7/2003 | Wallace, Jr. et al. |
| 6,625,444 B1 | 9/2003 | Fleming, III et al. |
| 6,631,849 B2 | 10/2003 | Blossom |
| 6,659,354 B2 | 12/2003 | Everett et al. |
| 6,681,328 B1 | 1/2004 | Harris et al. |
| 6,705,520 B1 | 1/2004 | Johnson et al. |
| 6,704,714 B1 | 3/2004 | O'Leary et al. |
| 6,736,322 B2 | 5/2004 | Gobburu et al. |
| 6,736,325 B1 | 5/2004 | Peacham |
| 6,742,120 B1 | 5/2004 | Markakis et al. |
| 6,742,715 B2 | 6/2004 | Everett et al. |
| 6,754,833 B1 | 6/2004 | Black et al. |
| 6,761,319 B2 | 7/2004 | Peachman et al. |
| 6,769,607 B1 | 8/2004 | Pitroda et al. |
| 6,819,219 B1 | 11/2004 | Bolle et al. |
| 6,857,566 B2 | 2/2005 | Wankmueller |
| 6,868,391 B1 | 3/2005 | Hultgren |
| 6,873,974 B1 | 3/2005 | Schutzer |
| 6,891,811 B1 | 5/2005 | Smith et al. |
| 6,892,052 B2 | 5/2005 | Kotola et al. |
| 6,925,439 B1 | 8/2005 | Pitroda |
| 6,950,881 B1 | 9/2005 | Ndili |
| 6,963,850 B1 | 11/2005 | Bezos et al. |
| 6,996,579 B2 | 2/2006 | Leung et al. |
| 7,005,985 B1 | 2/2006 | Steeves |
| 7,039,809 B1 | 5/2006 | Wankmueller |
| 7,058,611 B2 | 6/2006 | Kranzley et al. |
| 7,068,832 B1 | 6/2006 | Price et al. |
| 7,093,767 B2 | 8/2006 | Faenza, Jr. et al. |
| 7,096,003 B2 | 8/2006 | Joao et al. |
| 7,119,659 B2 | 10/2006 | Bonalle et al. |
| 7,139,729 B2 | 11/2006 | Nault |
| 7,146,344 B2 | 12/2006 | Wankmueller |
| 7,155,411 B1 | 12/2006 | Blinn et al. |
| 7,156,301 B1 | 1/2007 | Bonalle et al. |
| 7,200,566 B1 | 4/2007 | Moore et al. |
| 7,210,620 B2 | 5/2007 | Jones |
| 7,228,155 B2 | 6/2007 | Saunders |
| 7,239,226 B2 | 7/2007 | Berardi et al. |
| 7,249,112 B2 | 7/2007 | Berardi et al. |
| 7,259,887 B2 | 8/2007 | Lech et al. |
| 7,268,667 B2 | 9/2007 | Beenau et al. |
| 7,287,695 B2 | 10/2007 | Wankmueller |
| 7,308,426 B1 | 12/2007 | Pitroda |
| 7,312,707 B1 | 12/2007 | Bishop et al. |
| 7,349,866 B2 | 3/2008 | Schwarz, Jr. |
| 7,349,885 B2 | 3/2008 | Gangi |
| 7,355,990 B2 | 4/2008 | Smith et al. |
| 7,357,310 B2 | 4/2008 | Calabrese et al. |
| 7,357,331 B2 | 4/2008 | Blossom |
| 7,360,694 B2 | 4/2008 | Wankmueller |
| 7,366,990 B2 | 4/2008 | Pitroda |
| 7,376,431 B2 | 5/2008 | Niedermeyer |
| 7,392,222 B1 | 6/2008 | Hamilton et al. |
| 7,401,032 B1 | 7/2008 | Golden et al. |
| 7,413,113 B1 | 8/2008 | Zhu |
| 7,421,410 B1 | 9/2008 | Schechtman et al. |
| 7,428,507 B2 | 9/2008 | Villaret et al. |
| 7,469,151 B2 | 12/2008 | Khan et al. |
| 7,471,818 B1 | 12/2008 | Price et al. |
| 7,474,434 B2 | 1/2009 | Lech et al. |
| 7,483,334 B2 | 1/2009 | Ha |
| 7,493,288 B2 | 2/2009 | Biship et al. |
| 7,496,527 B2 | 2/2009 | Silverstein et al. |
| RE40,686 E | 3/2009 | Wood, Jr. |
| 7,526,449 B1 | 4/2009 | Blossom |
| 7,527,208 B2 | 5/2009 | Hammad et al. |
| 7,529,563 B1 | 5/2009 | Pitroda |
| 7,533,047 B2 | 5/2009 | Hagale et al. |
| 7,546,254 B2 | 6/2009 | Bednarek |
| 7,555,444 B1 | 6/2009 | Wilson et al. |
| 7,562,818 B1 | 7/2009 | Bierbaum et al. |
| 7,587,363 B2 | 9/2009 | Cataline et al. |
| 7,591,416 B2 | 9/2009 | Blossom |
| 7,603,311 B1 | 10/2009 | Yadav-Ranjan |
| 7,606,741 B2 | 10/2009 | King et al. |
| 7,627,310 B2 | 12/2009 | Starr et al. |
| 7,631,810 B2 | 12/2009 | Liu et al. |
| 7,636,694 B1 | 12/2009 | Wankmueller et al. |
| 7,637,425 B2 | 12/2009 | Mock et al. |
| 7,644,859 B1 | 1/2010 | Zhu |
| 7,653,600 B2 | 1/2010 | Gustin et al. |
| 7,657,489 B2 | 2/2010 | Stambaugh |
| 7,668,363 B2 | 2/2010 | Price et al. |
| 7,669,759 B1 | 3/2010 | Zettner |
| 7,689,504 B2 | 3/2010 | Warren et al. |
| 7,693,752 B2 | 4/2010 | Jaramillo |
| 7,702,538 B2 | 4/2010 | Rau et al. |
| 7,706,838 B2 | 4/2010 | Atsmon et al. |
| 7,708,191 B2 | 5/2010 | Vega |
| 7,708,194 B2 | 5/2010 | Vawter |
| 7,708,202 B2 | 5/2010 | Hawkins |
| 7,716,194 B2 | 5/2010 | Williams et al. |
| 7,720,707 B1 | 5/2010 | Mowry |
| 7,734,621 B2 | 6/2010 | Weitzman et al. |
| 7,747,522 B1 | 6/2010 | Walker et al. |
| RE41,531 E | 8/2010 | Wood, Jr. |
| RE41,562 E | 8/2010 | Dando et al. |
| 7,768,395 B2 | 8/2010 | Gold |
| 7,774,231 B2 | 8/2010 | Pond et al. |
| 7,806,321 B1 | 10/2010 | Segura |
| 7,813,955 B2 | 10/2010 | Ariff et al. |
| 7,814,005 B2 | 10/2010 | Imrey et al. |
| 7,818,229 B2 | 10/2010 | Imrey et al. |
| 7,818,246 B2 | 10/2010 | Cushing et al. |
| 7,822,688 B2 | 10/2010 | Labrou et al. |
| 7,822,816 B2 | 10/2010 | Payne |
| 7,835,960 B2 | 11/2010 | Breck et al. |
| 7,848,978 B2 | 12/2010 | Imrey et al. |
| 7,850,855 B2 | 12/2010 | Pomerleau et al. |
| 7,853,600 B2 | 12/2010 | Herz et al. |
| 7,856,377 B2 | 12/2010 | Cohagan et al. |
| 7,860,450 B2 | 12/2010 | Rissanen |
| 7,870,021 B2 | 1/2011 | Mankoff |
| 7,886,964 B2 | 2/2011 | Steinecker et al. |
| RE42,254 E | 3/2011 | Wood, Jr. |
| 7,899,234 B1 | 3/2011 | Abed |
| 7,899,706 B1 | 3/2011 | Stone et al. |
| 7,906,896 B2 | 3/2011 | Seo et al. |
| 7,908,170 B2 | 3/2011 | Asmar et al. |
| 7,922,077 B2 | 4/2011 | Humphrey et al. |
| 7,926,714 B1 | 4/2011 | Zhu |
| 7,933,800 B2 | 4/2011 | Main et al. |
| 7,941,197 B2 | 5/2011 | Jain et al. |
| 7,942,337 B2 | 5/2011 | Jain |
| 7,945,479 B2 | 5/2011 | Asher et al. |
| 7,954,717 B2 | 6/2011 | Narendra et al. |
| 7,967,215 B2 | 6/2011 | Kumar et al. |
| 7,974,889 B2 | 7/2011 | Raimbeault |
| 7,983,616 B2 | 7/2011 | Wang et al. |
| RE42,599 E | 8/2011 | Wood, Jr. |
| RE42,900 E | 8/2011 | Wood, Jr. |
| 7,988,058 B2 | 8/2011 | Englebardt et al. |
| 7,991,694 B2 | 8/2011 | Takayama |
| 7,991,696 B2 | 8/2011 | Gustin et al. |
| 7,992,779 B2 | 8/2011 | Phillips et al. |
| 7,992,781 B2 | 8/2011 | Hammad |
| 7,996,252 B2 | 8/2011 | Shahrabi et al. |
| 7,996,324 B2 | 8/2011 | Bishop et al. |
| 8,000,749 B1 | 8/2011 | McConnell et al. |
| 8,014,720 B2 | 9/2011 | Lortz |
| 8,014,755 B2 | 9/2011 | Sun et al. |
| 8,019,365 B2 | 9/2011 | Fisher |
| 8,020,766 B2 | 9/2011 | Hammad |
| 8,024,220 B2 | 9/2011 | Ariff et al. |
| 8,027,891 B2 | 9/2011 | Preston et al. |
| 8,032,410 B2 | 10/2011 | Main et al. |
| 8,037,158 B2 | 10/2011 | Arunachalam |

(56) References Cited

U.S. PATENT DOCUMENTS

| | | |
|---|---|---|
| 8,041,099 B2 | 10/2011 | Abed |
| 8,041,338 B2 | 10/2011 | Chen et al. |
| 8,045,784 B2 | 10/2011 | Price et al. |
| 8,046,257 B2 | 10/2011 | Wane et al. |
| 8,078,528 B1 | 12/2011 | Vicente et al. |
| 8,086,488 B2 | 12/2011 | Liu |
| 8,106,766 B2 | 1/2012 | Gold |
| 8,108,492 B2 | 1/2012 | Arunachalam |
| 8,121,948 B2 | 2/2012 | Gustin et al. |
| 8,145,522 B2 | 3/2012 | Warren et al. |
| 8,150,767 B2 | 4/2012 | Wankmueller |
| 8,151,335 B2 | 4/2012 | Wankmueller et al. |
| 8,190,522 B1 | 5/2012 | Vicente et al. |
| 8,190,893 B2 | 5/2012 | Benson et al. |
| 8,396,809 B1 | 3/2013 | Raff et al. |
| 8,417,633 B1 | 4/2013 | Chmara et al. |
| 8,442,869 B2 * | 5/2013 | Chowdhary .......... G06Q 10/083 705/26.1 |
| 8,666,904 B2 | 3/2014 | Pravetz et al. |
| 2001/0016835 A1 | 8/2001 | Hansmann et al. |
| 2001/0044762 A1 | 11/2001 | Nault |
| 2001/0050875 A1 | 12/2001 | Kahn et al. |
| 2001/0051920 A1 | 12/2001 | Joao et al. |
| 2001/0056402 A1 | 12/2001 | Ahuja et al. |
| 2002/0025797 A1 | 2/2002 | Joao et al. |
| 2002/0038424 A1 | 3/2002 | Joao et al. |
| 2002/0050528 A1 | 5/2002 | Everett et al. |
| 2002/0052842 A1 | 5/2002 | Schuba et al. |
| 2002/0054111 A1 | 5/2002 | Knight |
| 2002/0099826 A1 | 7/2002 | Summers et al. |
| 2002/0116331 A1 | 8/2002 | Cataline et al. |
| 2002/0152123 A1 | 10/2002 | Giordano et al. |
| 2002/0152179 A1 | 10/2002 | Racov |
| 2003/0009374 A1 | 1/2003 | Moodie et al. |
| 2003/0024980 A1 | 2/2003 | Everett et al. |
| 2003/0055675 A1 | 3/2003 | Twennaar et al. |
| 2003/0055983 A1 | 3/2003 | Callegari |
| 2003/0115126 A1 | 6/2003 | Pitroda |
| 2003/0120615 A1 * | 6/2003 | Kuo ....................... G06Q 20/02 705/78 |
| 2003/0169881 A1 | 9/2003 | Niedermeyer |
| 2003/0177072 A1 | 9/2003 | Bared |
| 2003/0233306 A1 | 12/2003 | Madhavan et al. |
| 2004/0002902 A1 | 1/2004 | Muehlhaeuser |
| 2004/0093281 A1 | 5/2004 | Silverstein et al. |
| 2004/0128197 A1 | 7/2004 | Bam et al. |
| 2004/0185830 A1 | 9/2004 | Joao et al. |
| 2004/0200898 A1 | 10/2004 | Kepecs |
| 2004/0230483 A1 | 11/2004 | Kepecs |
| 2004/0243478 A1 * | 12/2004 | Walker ................. G06Q 10/087 705/26.1 |
| 2004/0254848 A1 | 12/2004 | Golan et al. |
| 2005/0060233 A1 | 3/2005 | Bonalle et al. |
| 2005/0071231 A1 | 3/2005 | Beenau et al. |
| 2005/0097046 A1 | 5/2005 | Singfield |
| 2005/0102212 A1 | 5/2005 | Roy |
| 2005/0102220 A1 | 5/2005 | Stackpole |
| 2005/0116810 A1 | 6/2005 | Beenau et al. |
| 2005/0131761 A1 | 6/2005 | Trika et al. |
| 2005/0160003 A1 | 7/2005 | Berardi et al. |
| 2005/0165695 A1 | 7/2005 | Berardi et al. |
| 2005/0170814 A1 | 8/2005 | Joao et al. |
| 2005/0187851 A1 | 8/2005 | Sant |
| 2005/0199709 A1 | 9/2005 | Linlor |
| 2005/0256802 A1 | 11/2005 | Ammermann et al. |
| 2006/0012473 A1 | 1/2006 | Bishop et al. |
| 2006/0022048 A1 | 2/2006 | Johnson |
| 2006/0074698 A1 | 4/2006 | Bishop et al. |
| 2006/0074813 A1 | 4/2006 | Saunders |
| 2006/0085330 A1 | 4/2006 | Imrey et al. |
| 2006/0085331 A1 | 4/2006 | Imrey et al. |
| 2006/0085332 A1 | 4/2006 | Imrey |
| 2006/0155569 A1 | 7/2006 | Lord et al. |
| 2006/0165060 A1 | 7/2006 | Dua |
| 2006/0178986 A1 | 8/2006 | Giordano et al. |
| 2006/0219776 A1 | 10/2006 | Finn |
| 2006/0224470 A1 | 10/2006 | Garcia et al. |
| 2006/0282389 A1 | 12/2006 | Gupte |
| 2007/0005498 A1 | 1/2007 | Cataline et al. |
| 2007/0088624 A1 | 4/2007 | Vaughn et al. |
| 2007/0124673 A1 | 5/2007 | Trotto et al. |
| 2007/0125840 A1 | 6/2007 | Law et al. |
| 2007/0175978 A1 | 8/2007 | Stambaugh |
| 2007/0192245 A1 | 8/2007 | Fisher et al. |
| 2007/0198432 A1 | 8/2007 | Pitroda |
| 2007/0295803 A1 | 12/2007 | Levine et al. |
| 2008/0029607 A1 | 2/2008 | Mullen |
| 2008/0035738 A1 | 2/2008 | Mullen |
| 2008/0042423 A1 | 2/2008 | Roberts et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065555 A1 | 3/2008 | Mullen |
| 2008/0120190 A1 | 5/2008 | Joao et al. |
| 2008/0121696 A1 | 5/2008 | Mock et al. |
| 2008/0140577 A1 | 6/2008 | Rahman et al. |
| 2008/0162338 A1 | 7/2008 | Samuels et al. |
| 2008/0177659 A1 | 7/2008 | Lacey et al. |
| 2008/0262969 A1 | 10/2008 | Samid |
| 2008/0275779 A1 | 11/2008 | Lakshminarayanan |
| 2008/0275820 A1 | 11/2008 | Joao et al. |
| 2008/0302869 A1 | 12/2008 | Mullen |
| 2008/0302876 A1 | 12/2008 | Mullen |
| 2008/0304431 A1 | 12/2008 | Karaoguz |
| 2009/0043623 A1 | 2/2009 | Blades et al. |
| 2009/0065571 A1 | 3/2009 | Jain |
| 2009/0065572 A1 | 3/2009 | Jain |
| 2009/0069049 A1 | 3/2009 | Jain |
| 2009/0069050 A1 | 3/2009 | Jain et al. |
| 2009/0069051 A1 | 3/2009 | Jain et al. |
| 2009/0069052 A1 | 3/2009 | Jain et al. |
| 2009/0070272 A1 | 3/2009 | Jain |
| 2009/0070691 A1 | 3/2009 | Jain |
| 2009/0070861 A1 | 3/2009 | Jain |
| 2009/0089183 A1 | 4/2009 | Afram et al. |
| 2009/0108064 A1 | 4/2009 | Fernandes et al. |
| 2009/0119226 A1 | 5/2009 | Kurczek et al. |
| 2009/0132813 A1 | 5/2009 | Schibuk |
| 2009/0132941 A1 | 5/2009 | Pilskalns et al. |
| 2009/0164322 A1 | 6/2009 | Khan et al. |
| 2009/0192906 A1 | 7/2009 | Rau et al. |
| 2009/0198547 A1 | 8/2009 | Sudak |
| 2009/0199283 A1 | 8/2009 | Jain |
| 2009/0240626 A1 | 9/2009 | Hasson et al. |
| 2009/0265245 A1 | 10/2009 | Wright |
| 2009/0287603 A1 | 11/2009 | Lamar, III et al. |
| 2009/0307142 A1 | 12/2009 | Mardikar |
| 2010/0012721 A1 | 1/2010 | Jain et al. |
| 2010/0044444 A1 | 2/2010 | Jain et al. |
| 2010/0078471 A1 | 4/2010 | Lin et al. |
| 2010/0078472 A1 | 4/2010 | Lin et al. |
| 2010/0082481 A1 | 4/2010 | Lin et al. |
| 2010/0088148 A1 | 4/2010 | Presswala et al. |
| 2010/0142447 A1 | 6/2010 | Schlicht et al. |
| 2010/0264211 A1 | 10/2010 | Jain et al. |
| 2010/0293065 A1 | 11/2010 | Brody et al. |
| 2010/0299212 A1 | 11/2010 | Graylin et al. |
| 2010/0323681 A1 | 12/2010 | Corda et al. |
| 2010/0332650 A1 | 12/2010 | Aisen et al. |
| 2011/0004551 A1 | 1/2011 | Armes et al. |
| 2011/0082772 A1 | 4/2011 | Hirson |
| 2011/0087595 A1 | 4/2011 | Sabella |
| 2011/0098023 A1 | 4/2011 | Hammad |
| 2011/0106635 A1 | 5/2011 | Khan et al. |
| 2011/0112866 A1 | 5/2011 | Gerrans |
| 2011/0112898 A1 | 5/2011 | White |
| 2011/0112968 A1 | 5/2011 | Florek et al. |
| 2011/0119155 A1 | 5/2011 | Hammad et al. |
| 2011/0153403 A1 | 6/2011 | Postrel |
| 2011/0191252 A1 | 8/2011 | Dai |
| 2011/0208589 A1 | 8/2011 | Garg |
| 2011/0208656 A1 | 8/2011 | Alba et al. |
| 2011/0218839 A1 | 9/2011 | Shamaiengar |
| 2011/0218911 A1 | 9/2011 | Spodak |

(56) References Cited

U.S. PATENT DOCUMENTS

| | | |
|---|---|---|
| 2011/0238471 A1 | 9/2011 | Trzcinski |
| 2012/0042080 A1 | 2/2012 | Aisen et al. |
| 2012/0239417 A1 | 9/2012 | Pourfallah et al. |
| 2012/0259781 A1 | 10/2012 | Fote et al. |
| 2012/0272158 A1* | 10/2012 | Weskamp ............. H04W 4/023 715/748 |
| 2015/0188777 A1* | 7/2015 | Frost ....................... H04L 67/34 709/223 |

FOREIGN PATENT DOCUMENTS

| | | |
|---|---|---|
| WO | WO 2006/045060 | 4/2006 |
| WO | WO 2007/103574 | 9/2007 |
| WO | WO 2007/103575 | 9/2007 |
| WO | WO 2007/103576 | 9/2007 |

OTHER PUBLICATIONS

"U.S. Bank Tests Mastercard Mobile-Phone Payments In Spokane," CardLine, Jan. 28, 2009.
"Fiserv Markets Mobile-Deposit Capability," CardLine, Jul. 2 2009.
"Amazon Launches Mobile Payments Service," CardLine, Oct. 6, 2009.
"Photo Deposits," Cardflash, Jul. 28, 2009.
"Aliaswire," Cardflash, Mar. 30, 2010.
"Chase Said to be Reviewing Contactless-Stickers," CardLine, Jun. 16, 2009.
Kahn, G., "'Charge It,' Says Your Cellphone," Wall Street Journal Online, Aug. 13, 2003.
"Citi Sees Weak Demand for Mobile P2P Transfers—For Now," American Banker, Mar. 18, 2010.
"Bankcorp Issue Obopay Card That Links to Mobile Account," Cardline, Sep. 11, 2008.
"Mobile Operators Announce Global Payment Initiative," CardLine, Feb. 14, 2007.
"Cell Phone Software Formats Checks for Online Banking," Information Week, Jan. 24, 2008.
Malykhina, "Cell Phone Software Formats Checks for Online Banking," Information Week, Jan. 24, 2008.
Kilian-Kehr, R. "Mobile Security with Smartcards," Dissertation, Mar. 6, 2002.
"Electronic purse can free you from ATM drag," Business Times, Feb. 23, 2001.
"Vivotech ® Quicker than cash, Safer than checks$^{SM}$ : RF-Based Contactless Payment: A More Convenient Way to Pay," White Paper—Version 2.0, Apr. 2004.
U.S. Appl. No. 12/372,554, filed Feb. 17, 2009.
U.S. Appl. No. 12/372,617, filed Feb. 17, 2009.
U.S. Appl. No. 12/372,710, filed Feb. 17, 2009.
U.S. Appl. No. 12/372,716, filed Feb. 17, 2009.
U.S. Appl. No. 09/630,535, filed Aug. 1, 2000.
U.S. Appl. No. 12/559,756, filed Sep. 15, 2009.

* cited by examiner

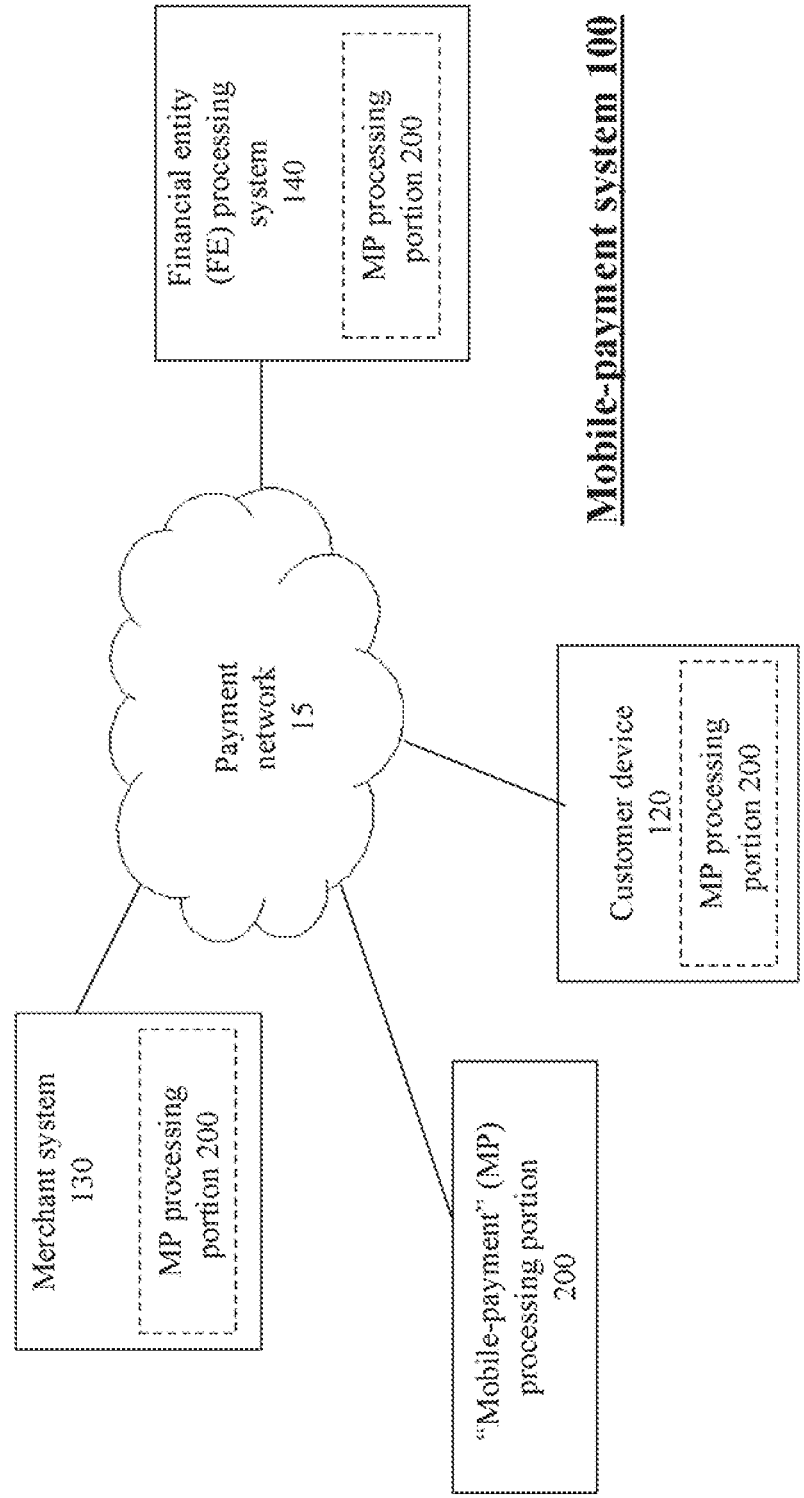

Fig. 8

Customer Record Table 252

| Primary customer identification (input) | Secondary Identification (device) (input) | Observed Event (input) | Order record (retrieved) |
|---|---|---|---|
| Customer ID (C1111) | Device 1 (D111) | Key sequence 1234 entered into Device 1 → | Record MP111 |
| | OR | Key sequence 1234 entered into Device 2 → | Record MP111 |
| | Device 2 (D112) | Device 1 (D123) in location L10 → | Record MP111 |
| | | Key sequence 3333 entered into Device 1 → | Record MP112 |
| Customer ID (C2222) | Device 1 (D221) | Key sequence 7777 entered into Device 1 → | Record MP221 |
| | OR | Key sequence 7777 entered into Device 2 → | Record MP222 |
| | Device 2 (D222) | Mobile-payment communication from merchant → | Record MP223 |
| | OR | | |
| | Merchant | | | dictating parameters 253 (customer record)

255

"Order Record" Table 254

> Order record table 254 may further include other preference information, such as favorites

| Customer mobile-payment record | Financial Account Identification (billing) | Merchant ID | Time Parameters | Promotion Information | Requested item Information | Delivery Instructions |
|---|---|---|---|---|---|---|
| MP111 | Account 7777-7777 | Merchant ID 7775 | Wait 5 minutes after trigger and send merchant request | none | Vanilla latte/ large | Counter pick-up and display picture on merchant system |
| MP112 | Account 7777-7777 | Merchant ID 7776 | Send merchant request upon trigger | Customer bonus card | Ice coffee/ large | Counter pick-up – wait for customer request |
| ... | | | | | | |
| MP221 | Account 2212-3333 | Merchant ID 7775 | Wait 5 minutes after trigger and send merchant request | none | Caramel latte/ small/ half caf | Counter pick-up and call out name |
| MP222 | Account 2212-3333 | Merchant ID 7775 | Send merchant request upon trigger | none | Cappuccino | Counter pick-up and call out name |
| MP223 | Account 2212-3333 | None (merchant information provided from merchant communication) | Upon receipt, send request for approval to customer device | none | Requested item is received from the merchant system | None (customer at physical place of business, or making other arrangements) |
| ... | | | | | | |

Merchant ID associated with further record/data e.g. contact information

Each order record corresponds to particular pre-set instructions 255 (order record)

Fig. 9

| Customer ID (C1111) | Account 777-7777 | Merchant ID 7775 | Cost debited $4.27 |

Transaction request 222
(sent to FE processing portion 140)

Fig. 10

| Customer ID (C1111) with customer name | Merchant ID 7775 | Promotion information: none | Vanilla latte/ large | Counter pick-up and call out name | Payment authorization information |

Merchant request 232 (sent to merchant system)

Fig. 11

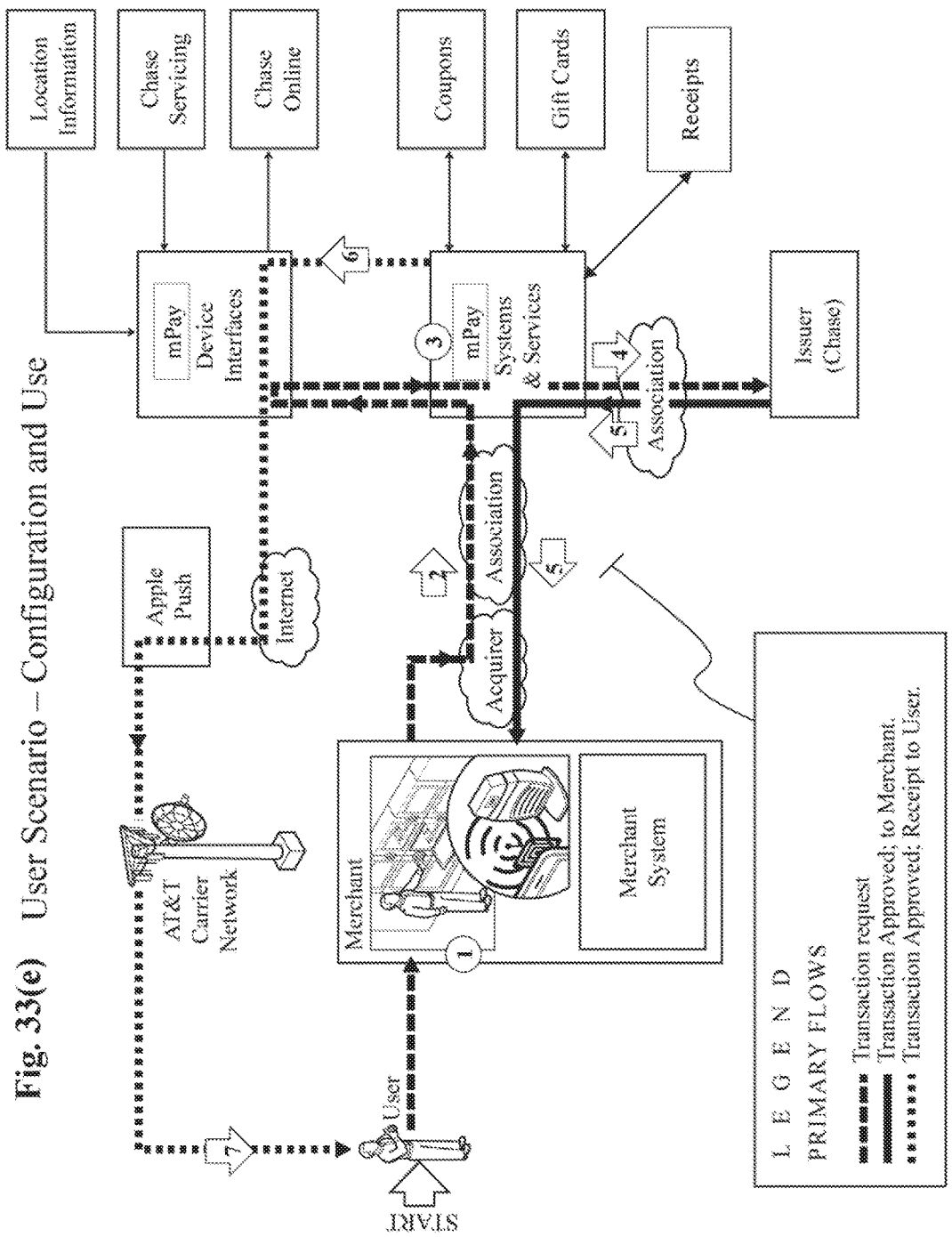
Fig. 33(e) User Scenario – Configuration and Use

User Scenario – Configuration and Use

1. The user uses existing POS (Point of Sale) technology and taps his mobile device against the contactless card reader to initiate the transaction.

2. mPay transactions use a unique Visa / MasterCard Bin to route across the association network to the mPay systems and Card Issuers.

3. mPay systems are positioned within the authorization transaction flow and evaluate the transaction against the user's configuration.

4. Based on the user's configuration, mPay converts the mPay account number to the users Chase Freedom Card and routes the authorization to the issuer for approval.

5. The transaction is processed by the issuer and results are transmitted back across the Visa / MasterCard network to the Merchant.

6. mPay creates a content rich digital receipt for the transaction, including merchant specific content such as a Merchant logo's, location map, etc.

7. The digital receipt is sent to the user's mPay device via Apple Push interfaces.

Fig. 33(f)

User Case – Configuration and Use

1. Using the mPay Advanced Payment Workspace, the user configures the components of his future purchase, such as choice of payment account coupons, discounts, and financing options.

2. The user initiates the transaction via RFID (wireless) or card swipe, which based on Bin routes across the Visa/MC association network to mPay systems.

3. The Coupon for 10% off is processed against the purchase (and later settled with the merchant coupon system).

4. mPay submits the discounted amount to the issuer for approval.

5. Approval is routed back to the Merchant.

6. Based on mPay Systems & services, mPay detects that the customer qualifies for a $10.00 gift card.

7. The Gift Card and Digital Receipt are pushed to the users mPay via Apple Push and the user is notified via real time mPay prompts.

8. Via interfaces between mPay and Blueprint, the purchase is set up on a fixed payment option that was configured at the point of sale.

Fig. 34 (g)

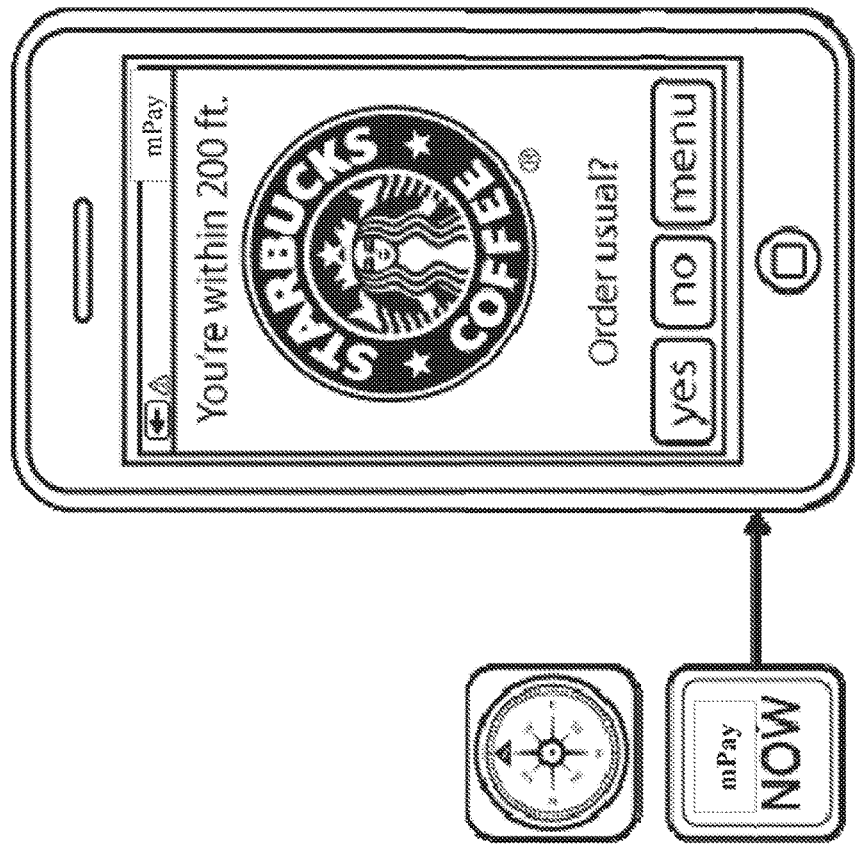
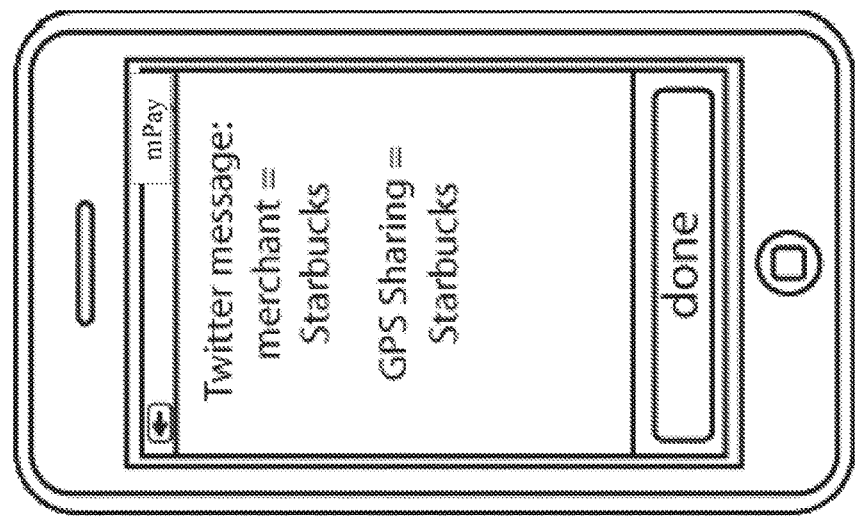

Experiencing Location Based Ordering and Payment
Post Transaction
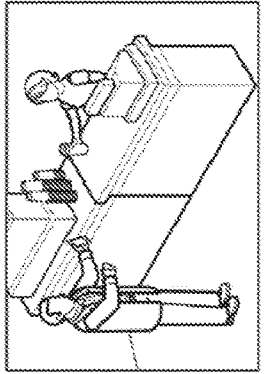
(6) Hugh enters Starbucks and shows the Barista his receipt with his order number. The Barista matches Hugh's receipt to the Starbucks order number.
(see Fig. 35 (i))
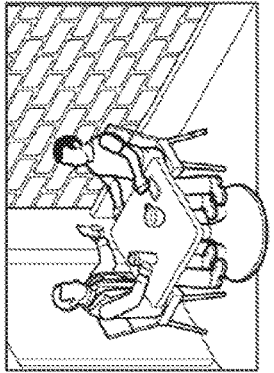
(7) Hugh sits down to enjoy his coffee just as Peter arrives.
Fig. 35 (h)

Experiencing Location Based Ordering and Payment

1. Based on the GPS location of the mPay device and user preferences, an alert is pushed to the user's mPay.
2. The user responds to the alert, triggering mPay to place an order to the Merchant's system.
3. Based on the users mPay preferences, mPay also posts a tweet to the users Twitter page.
4. The Merchant submits a payment authorization transaction.
5. mPay recognizes the merchant transaction, matching it to the mPay user's pending order request.
6. Based on the users preferences mPay submits the transaction to the issuer, in this case using rewards points as the currency.
7. The payment authorization approval is sent back to the merchant.
8. With payment verified, the Merchant prepares the order.
9. mPay creates and sends the user a digital receipt which includes information the merchant will use to identify the user for purchase pick up (i.e. a barcode or order number)

mPay and the Web

Transaction

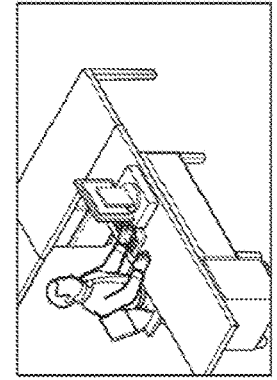

③ Upon checkout, Hugh selects mPay as his payment type.

(see Fig. 36 (e))

④ The BestBuy.com checkout page displays a special mPay barcode.

(see Fig. 36 (f))

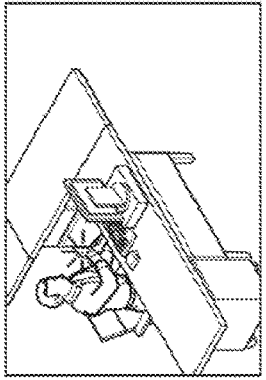

⑤ Using the payment workspace Hugh adds the $10.00 gift card he received through mPay when he purchased his flat screen TV from Best Buy.

⑥ Hugh Scans the barcode with mPay. Upon submitting the barcode scan, the web page moves to the next step in the merchant's checkout process.

(see Fig. 36 (g))

Fig. 36 (d)

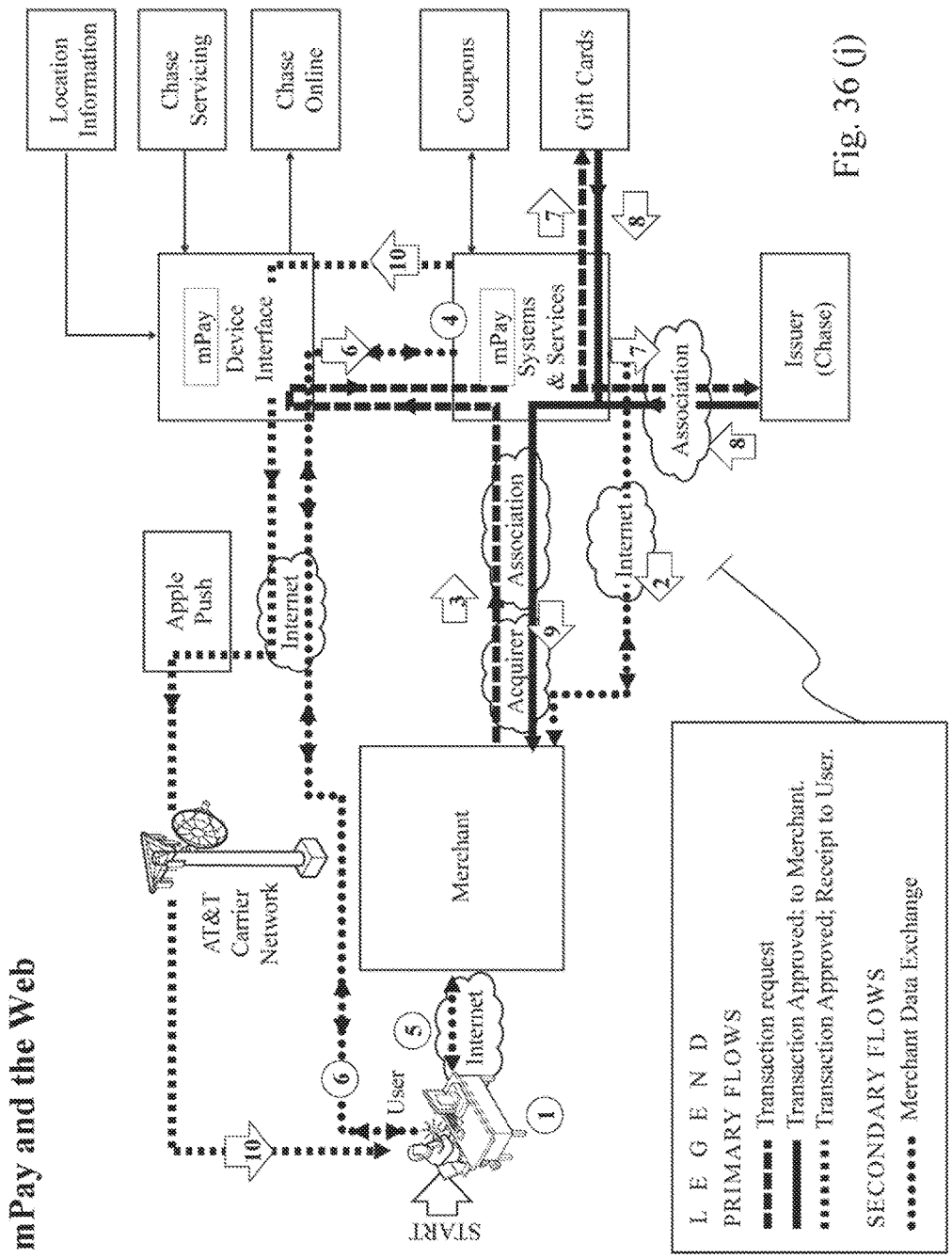

mPay and the Web

1. Upon check out, the user chooses the mPay tender type as his payment option, initiating a "two key" mPay payment transaction.
2. mPay generates and supplies to the website the corresponding barcode.
3. KEY 1: The Merchant system sends a payment authorization transaction, which is held by mPay.
4. mPay holds the transaction pending user acceptance of the bill.
5. The check out page displays a merchant generated barcode to be used by mPay as a unique transaction identifier.
6. KEY 2: The user scans the barcode on the website with the mPay device initiating the mPay side of a two key the payment transaction.
7. Having matched the two keys, mPay submits a "card present" payment authorization transaction to both the gift card system and the issuer.
8. mPay combines the approvals from both authorization requests into a single response.
9. mPay returns the response to the merchant system.
10. mPay creates and sends a digital receipt.

Fig. 36 (k)

mPay and Restaurant Payments

Pre-Transaction

① Hugh previously set up his mPay with special processing when he dines at mPay participating restaurants.
(see Fig. 37 (b))

② Hugh enters P. F. Chang's and selects the restaurant from the list of payment locations. He takes his seat and informs his waiter that he'll be using mPay.

(see Fig. 37 (c))

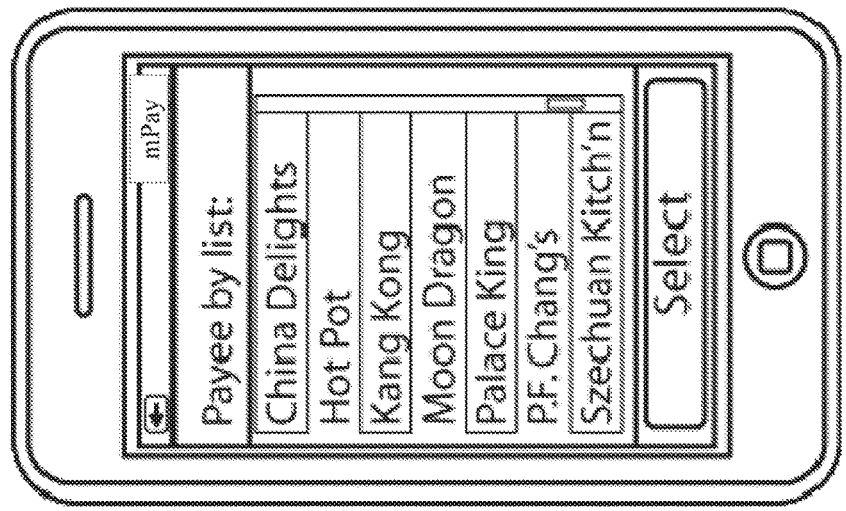
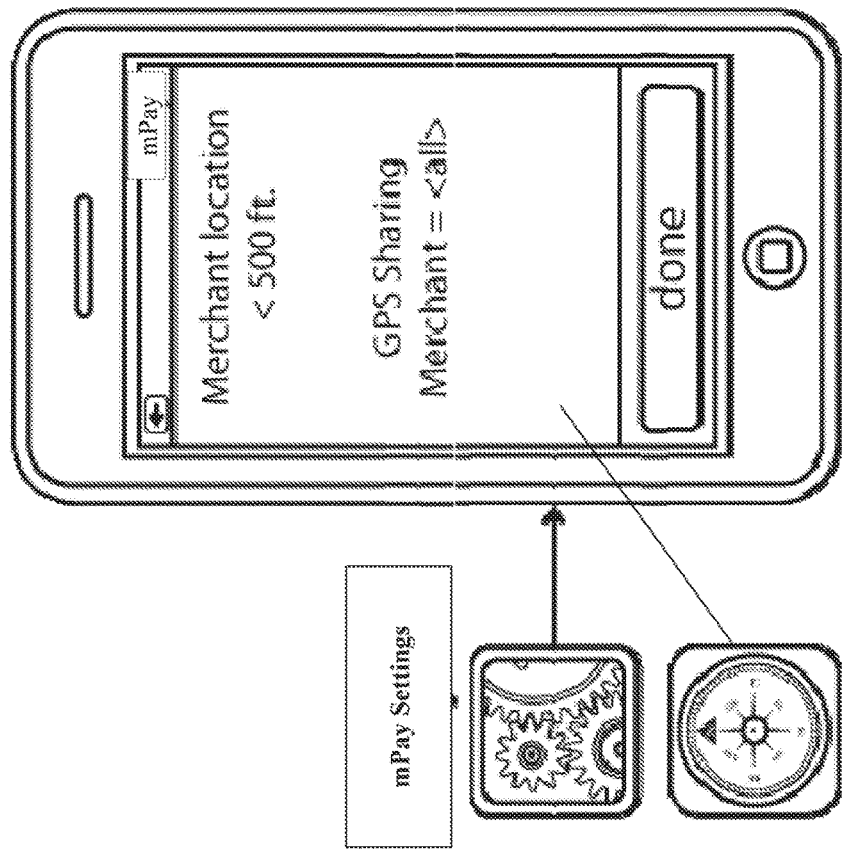

mPay and Restaurant Payments

1. The user has enabled GPS location based identification of mPay at participating merchants.
2. An mPay Location Alert is pushed to the user's mPay device identifying an mPay participating merchant.
3. The mPay system pairs the Merchant and the mPay device ID's to set up a "two key" purchase transaction scenario.
4. KEY 1: When ready to close the check, the waiter submits a payment authorization using the mPay tender type. mPay holds the transaction pending user acceptance
5. mPay pushes the bill to the users mPay device via Apple Push.
6. KEY 2: The user accepts the payment request, which is returned mPay systems where it is matched with the Merchant transaction (KEY 1).
7. Once the Keys are matched, an authorization transaction is routed to the issuer for approval.
8. The response is sent to Merchant, closing the check.
9. A merchant loyalty program coupon and digital receipt is pushed to the mPay Device.

Fig. 37 (k)

Setting Rules for Fraud Alerts

1. The user configures mPay to prompt for approval of any on-line purchase against his mPay accounts.

2. An online merchant submits a payment authorization request.

3. Based on the user's notifications rules, mPay creates and pushes a transaction verification notice to the user's mPay device.

4. mPay holds the payment authorization request pending the mPay users response.

5. The user denies the transaction, and marks the transaction as potential fraud.

6. mPay returns a decline response to the merchant (6), and immediately sets a temporary block on the cardholder account (7).

7.

8. A service alert is routed by mPay to the Chase Customer Security group whom contact Hugh to resolve the possible fraud issue.

Fig. 38 (f)

mPay and an Open Bar Tab

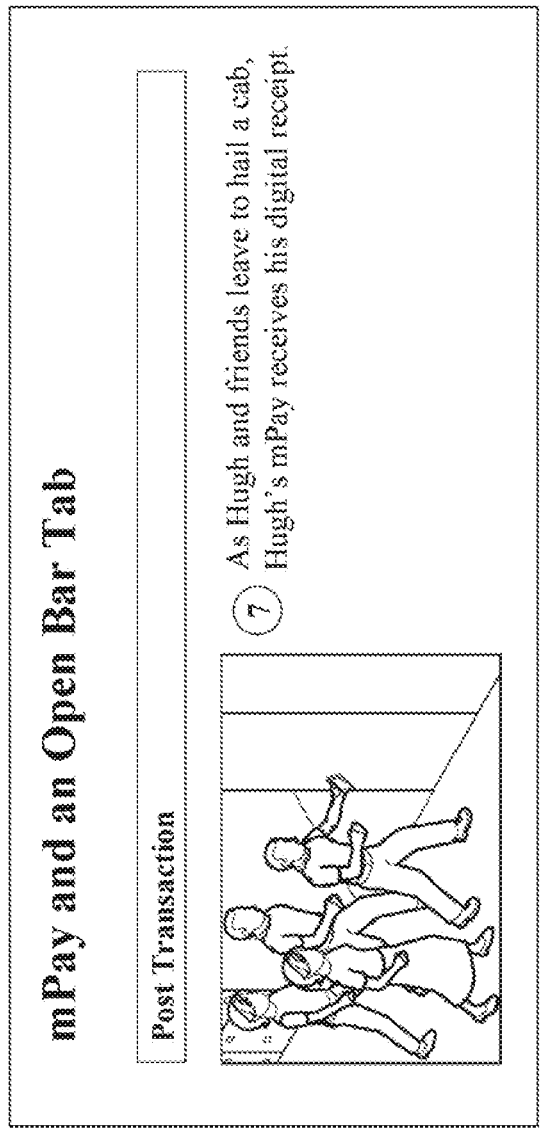

mPay and an Open Bar Tab

1. The user sets up an mPay Open Tab on their mPay device, and provides a unique key to the merchant.
2. Using the unique key, the server sets up an mPay Open Tab on the merchant system.
3. The mPay system then brokers an event driven communication session between the merchant system and the mPay device.
4. As the tab accumulates, the Merchant System sends updates to the mPay device via the mPay system.
5. KEY1: The customer decides to close the tab.
6. KEY 2: A payment authorization request is submitted by the Merchant.
7. The mPay systems match the Merchant and mPay device transactions and route a payment authorization request to the issuer.
9. mPay routes the issuer response back to the merchant.
10. mPay pushes a digital receipt to the user's mPay device.

Fig. 39 (k)

mPay and Bill Sharing mPay and Bill Sharing mPay and Bill Sharing mPay and Bill Sharing mPay and Bill Sharing

1. The primary user has enabled GPS location based identification at mPay participating merchants.
2. An mPay Location Alert is pushed to the user identifying an mPay participating merchant. The user accepts the prompt.
3. KEY 1: When ready to close the check, the waiter submits the payment authorization request using the mPay tender type.
4. mPay holds the transaction pending user acceptance of the bill.
5. mPay pushes the bill to the User. The user chooses to set up a Share Pay.
6. KEY 1: The other participants link through mPay Share Pay to contribute their portion. (All users receive updates on how much of the bill remains to be paid.)
7. For each individual's contribution, mPay's backend systems, not the merchant system,
7a. submits a payment authorization transaction to the issuer, communicating the response back to the participant via separate Apple Push events.
8. Once the full amount of the bill is covered with approved payments, mPay sends a single authorization response back to the merchant.
9. Each of the Share Pay participants receive a digital receipt for their portion of the check.

Fig. 40 (I)

mPay and P2P (Person to Person)

Pre-Transaction

① Both Peter and Hugh carry mPay devices and have them configured for Person to Person payments.

(see Fig. 41 (b))

② Hugh's friend Peter paid for lunch yesterday because Hugh left his mPay at the office. Hugh owes Peter $14.56, and decides to pay him back using mPay.

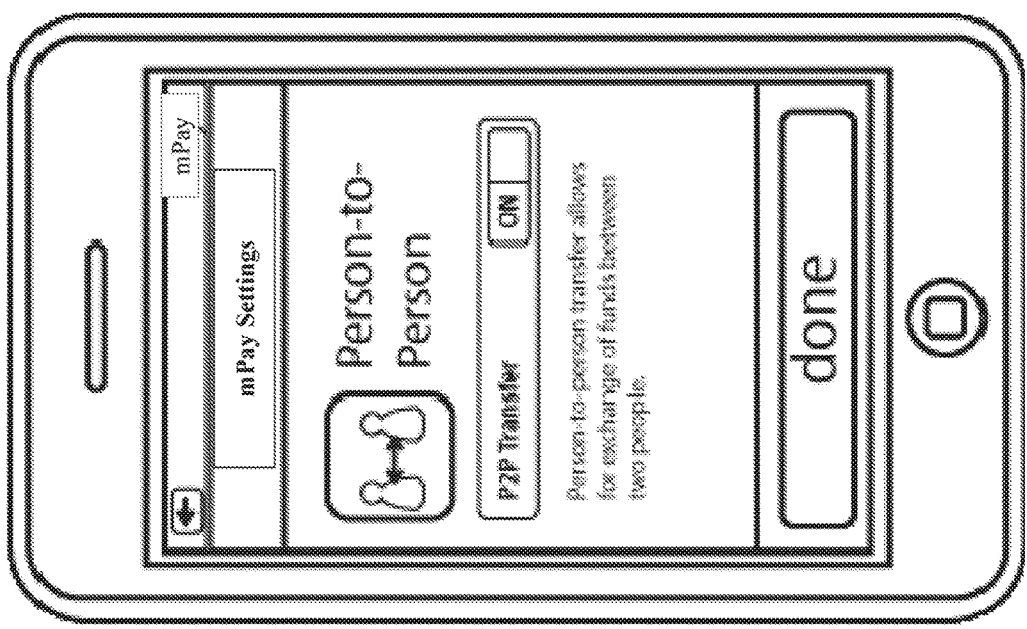

mPay and P2P

1. The user uses mPay P2P to select, define, and initiate a funds transfer to pay another person.
2. The P2P transaction request travels via the Web to the Chase Network to initiate the P2P transaction.
3. mPay checks against its notification rules to determine if a user prompt is required. It is required and is sent to the receiving user for approval
4. The payee accepts the payment and notification is sent back to the payer.
5. mPay initiates the funds transfers via the Chase Network
6. The funds transfer is processed.
7. mPay creates and pushes to each user a digital transaction advice.

Fig. 41 (i)

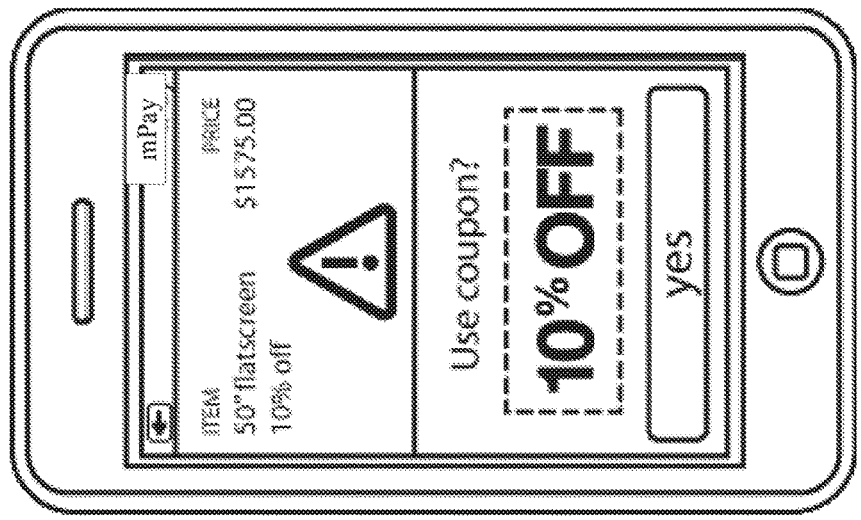
Fig. 42 (c)
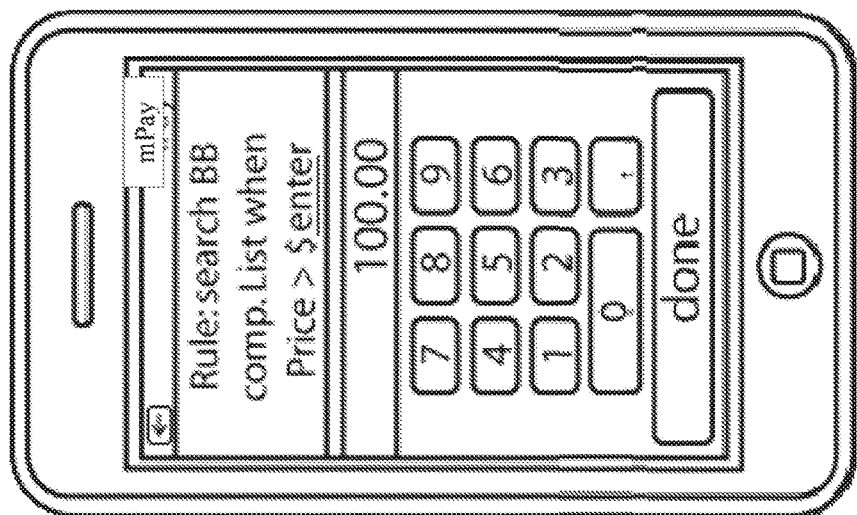
Fig. 42 (b)
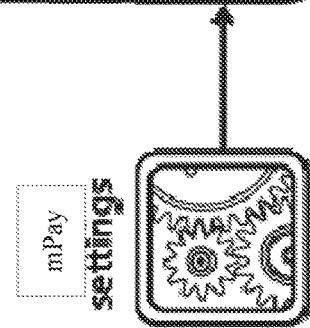

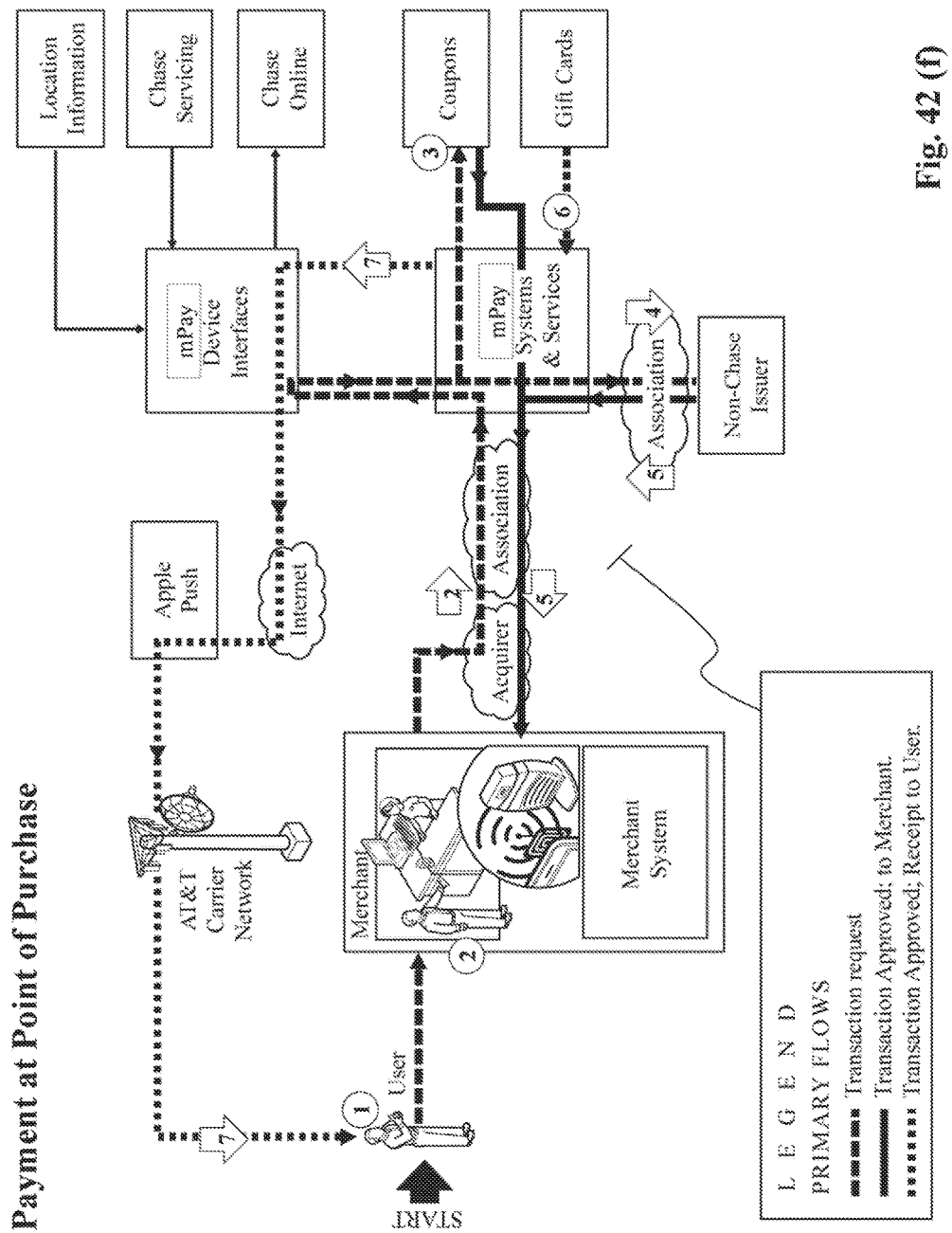

Payment at Point of Purchase

1. Using the mPay Workspace, the user configures the components of a future purchase, such as choice of payment account coupons, and discounts.
2. The user initiates the transaction via contactless terminal or mPay card swipe, which based on Bin routes across the Visa/MC association network to mPay systems.
3. The Coupon for 10% off is processed against the purchase (and later settled with the merchant coupon system).
4. mPay submits the discounted amount to the issuer for approval.
5. Results are routed back to the Merchant.
6. Based on mPay, Merchant, or loyalty programs set up in mPay, mPay detects that the customer qualifies for a $10.00 gift card.
7. The Gift Card and Digital Receipt are pushed to the users mPay via Apple Push and the user is notified via real time mPay prompts.

Fig. 42 (g)

SYSTEMS AND METHODS FOR MOBILE ORDERING AND PAYMENT

RELATED APPLICATIONS

This application is a continuation of U.S. application Ser. No. 13/163,153 filed Jun. 17, 2011, which is a continuation of U.S. application Ser. No. 12/776,961 filed May 10, 2010, which claims priority to U.S. Provisional Patent Application 61/288,029 filed Dec. 18, 2009, the content of which is incorporated herein by reference in its entirety, and also claims priority to U.S. Provisional Patent Application 61/180,218 filed May 21, 2009, the content of which is incorporated herein by reference in its entirety. U.S. application Ser. Nos. 12/776,961 and 13/163,153 are incorporated herein by reference in their entirety.

U.S. application Ser. No. 12/776,961 is a continuation-in-part of U.S. application Ser. No. 12/489,066 filed Jun. 22, 2009, which claims priority to U.S. Provisional Patent Application 61/162,169 filed Mar. 20, 2009. The content of both incorporated herein by reference in their entirety.

BACKGROUND OF THE INVENTION

In the present fast paced environment, people make a variety of purchases using traditional payment methods. To support such payment methods, an extensive financial infrastructure is utilized. For example, the credit card, and financial system associated therewith, is widely used. However, the current financial infrastructure is insufficient in some respects to provide desired convenience for people. For example, the ease and efficiency of performing routine transactions is lacking using various of today's commonplace technologies. Also, the tracking and recording of travel records, cost records, and similar records may be difficult and inefficient, especially for corporate travelers, who often maintain separate records for personal purchases and business purchases. Therefore, improvements to the current financial infrastructure is needed to accommodate the evolving needs of people in their busy and complex lives.

BRIEF SUMMARY Of THE INVENTION

Computer implemented methods and systems for fulfilling a customer request for a requested item purchased from a merchant is provided. The method may be performed by a tangibly embodied processing machine disposed in a customer device. The method may include (1) observing, through the input of information, an observed event that is associated with a customer; (2) associating the observed event with a corresponding order record; (3) retrieving order information from the corresponding order record, the order information including at least customer financial entity account information; (4) generating a merchant request based at least in part on the order information in the corresponding order record, the merchant request including at least customer identification information and customer financial entity account information; and (5) outputting the merchant request to the designated merchant, so as to provide the designated merchant with information to fulfill the customer request.

A wide variety of other features, and embodiments are disclosed.

BRIEF DESCRIPTION OF THE DRAWINGS

The present invention can be more fully understood by reading the following detailed description together with the accompanying drawings, in which like reference indicators are used to designate like elements, and in which:

FIG. 1 is a block diagram showing a mobile-payment system in accordance with one embodiment of the invention;

FIG. 8 is a diagram showing a customer record table in accordance with one embodiment of the invention;

FIG. 9 is a diagram showing an order record table in accordance with one embodiment of the invention;

FIG. 10 is a diagram showing a transaction request in accordance with one embodiment of the invention;

FIG. 11 is a diagram showing a merchant request in accordance with one embodiment of the invention;

FIGS. 33(a)-33(f) are figures showing a user scenario in which a mobile-payment device is configured and used to perform mobile-payment (mPay) processing, in accordance with one embodiment of the invention.

DETAILED DESCRIPTION OF THE INVENTION

Figure 1B:
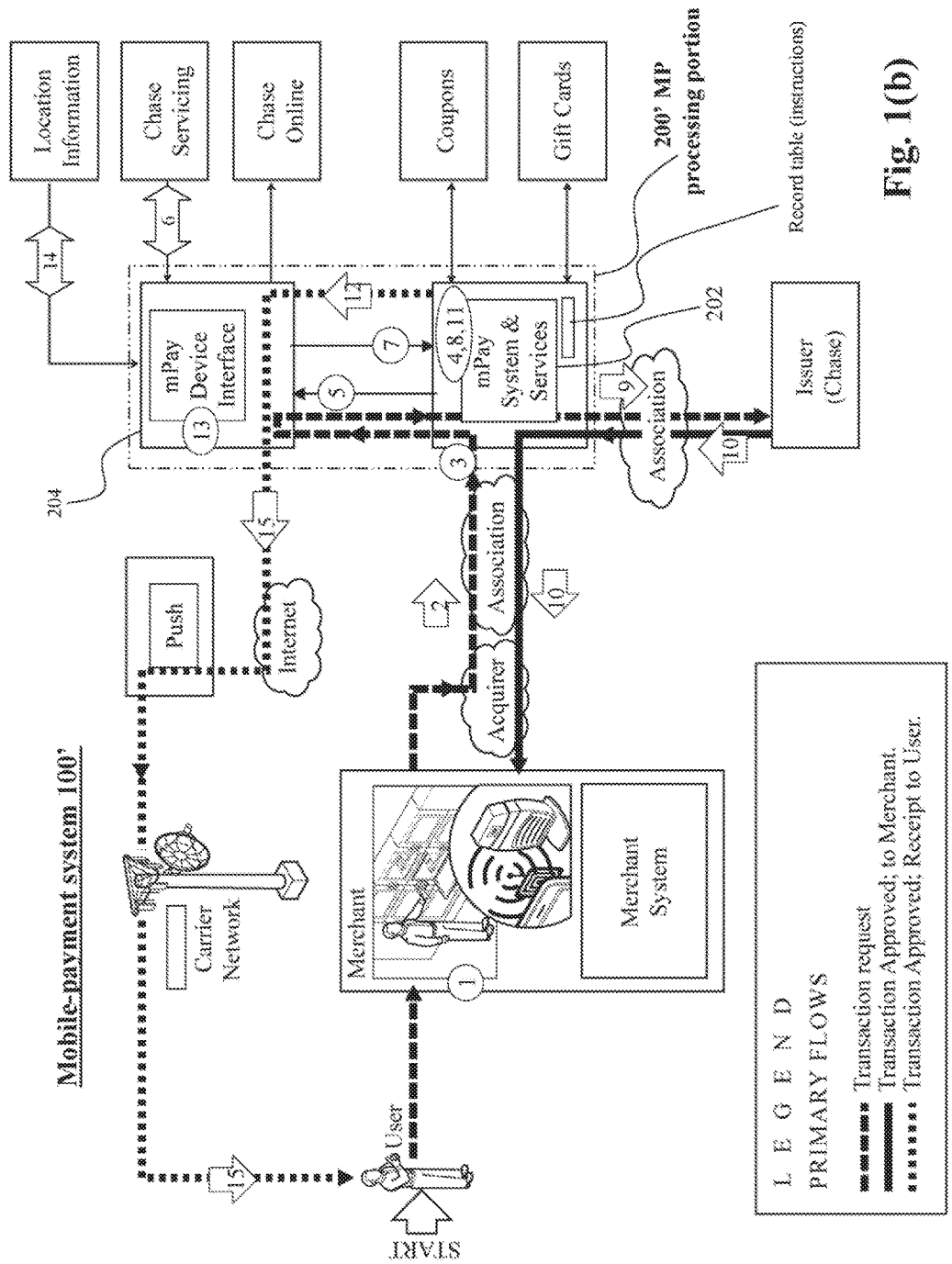
FIG. 1(b) is a block diagram showing a mobile-payment system 100' in accordance with an embodiment of the invention.

Hereinafter, aspects of the inventive mobile-payment system in accordance with various embodiments of the invention will be described. As used herein, any term in the singular may be interpreted to be in the plural, and alternatively, any term in the plural may be interpreted to be in the singular.

The invention provides for a mobile-payment system and related processing of transactions, with enhanced convenience and record keeping capabilities, as well as various other features. For example, in accordance with some embodiments of the invention, a customer, i.e., a user, is enabled to identify an item to purchase, effect an event to trigger a transaction to purchase the item from a merchant, settle the transaction with the merchant and a financial entity-over a payment network using a customer device without having to deal with any physical handling of a funds transfer, and secure the item. Various other processing is described.

The "customer device" or similar term as used herein may include any mobile device, cell phone, land phone, smart phone, car phone, computer terminal, texting device, RFID (Radio-frequency identification) device, GPS (Global positioning Satellite) enabled device, PDA (personal digital assistant), satellite radio device, voice over IP device, and/or any other device that is adapted to perform processing as described herein.

A customer may interface with a customer device using any of a wide variety of ways depending in particular on the capabilities of the customer device and/or what applications are utilized by the customer device to interface with the customer. Accordingly, for any of the features described herein the customer device might interface with the customer using any of key sequence, key strokes, presentation and selection of icons or other graphical representation, touch screen, voice recognition, a device utilizing textile features, LED (light-emitting diode) enabled device, push notification enabled features, media message enabled features, and/or any other type of interface that allows the customer to communicate information to and from the customer device.

Further, any communication channel or communication protocol that is associated with such a customer device may be utilized. Such customer device may effect the communications, as described herein, using any suitable data, such as numbers, characters, transmission and/or signal, for example. Any "number" as described herein may include any characters including in particular alphanumerics.

The "payment network" or similar term as used herein may include a telecommunication payment network, a telecommunication network, a payment network, Internet, extranet, intranet and/or some other network or part of a network that provides for communications to effect a transaction, for example. Relatedly, the use of a VISA or MASTERCARD network is described herein, for example. However, it is appreciated that other payment networks may well be used that have none or only some relationship to VISA or MASTERCARD, or with AMERICAN EXPRESS or DISCOVER, for example. For example, a particular bank or other financial entity may well utilize a network maintained by such particular bank or other financial entity.

A transaction as described herein may be funded by an available "payment mechanism." A "payment mechanism" (i.e., a payment method) or similar term as used herein may include any of a credit card, debit card, gift-card, stored value card, rewards card, stored benefit card, store card, club card, prepaid card, points card, some other type of card, some other account (e.g., checking or saving), PAYPAL account, food stamps, tab, and/or any other arrangement which results in a debit being accorded to an account associated with such arrangement, i.e., such debit being in the form of monetary funds, points, or some other accounting mechanism, for example.

A transaction might be initiated by any methodology as desired such as the customer running a card through a magnetic reader, some other type of card swipe, physical entry of a sequence (e.g. a PIN (personal identification number) at the POS), the customer tapping his customer device against a contactless card reader, interfacing with a reader in some other manner either wirelessly (e.g. BLUETOOTH) or by physical contact, an observed position or orientation of the customer device, any other manner as described herein, and/or in any other manner such that an event may be observed so as to initiate a desired transaction.

A "financial entity" or similar term as used herein means any financial institution that maintains or is associated with a payment mechanism of a customer from which funds or points are drawn to fund the activity as described herein. Accordingly, a financial entity may include a traditional bank such as JPMorgan Chase and/or a payment entity such as PAYPAL, for example.

As described herein, it is appreciated that the mobile-payment system, may be used with a wide variety of merchants. A "merchant" or similar term as used herein means any entity that offers an item for purchase. The merchant might include any restaurant, coffee shop, or quick service related merchant, for example. The item for purchase may be any product, service, widget, or any other output that is available for purchase, for example, The particular processing described herein in connection with the purchase of one item of course may be used with any other item. For example, while various processing is described herein in connection with the purchase of coffee related items, such described processing may be used for the purchase of any other item.

As used herein, data, information, and similar terms have been used interchangeably.

As used herein, "communicates", "interfaces", "transmits", inputs/outputs and similar terms have been used interchangeably.

As used herein, mobile-payment, mobile-pay, mPay and similar terms have been used interchangeably.

It is appreciated that any feature described herein may be used in conjunction with any other feature described herein.

As described in detail below, a merchant, such as a restaurant, may be provided with processing capability to perform the processing described herein so as to be a "mobile eligible restaurant", i.e., a mobile-payment eligible or mobile-payment restaurant, for example. In accordance with one illustrative embodiment of the invention, a customer might first confirm that the restaurant (at which they are planning to dine) is such a "mobile eligible restaurant". This might be performed, for example, by sending an "alert" to the customer as they walk into the particular restaurant.

In this example, in conjunction with placing an order with a waitress, the customer indicates that they participate in mobile-payments, i.e. a "mobile-payment" program, and agreement is reached between the customer and the waitress that the mobile-payment program will be used to effect the transaction, i.e., to pay for lunch. The customer proceeds with ordering, i.e., they order their lunch by verbally conveying the requested lunch items to the waitress.

The waitress then goes back to interface with the restaurant's collection/order system (e.g. a physical kiosk or other tangibly embodied system) and enters in the requested order. In addition, the waitress enters information that conveys that the order is in the mobile-payment program, as well as information to convey the identify of the customer. For example, such information might include a "mobile-payment program number" of the customer or some other number or identification of the customer.

At a point (or in an ongoing manner) the purchase information (i.e., the data regarding the items purchased at lunch) is transmitted from the restaurant's system to the payment network. Thereafter, data is transmitted from the payment network, and a financial entity such as a card issuer bank, to the customer device, such that the customer can review/confirm the purchase information. That is, the customer can review and verify that the merchant has entered the correct products or services into their collection/order system. Upon completion of ordering items at the restaurant, the customer can close out the purchase—completing the transaction. With the transaction thus being completed using the "mobile-payment" program, no further action is needed by the customer, i.e., prior to the customer leaving the restaurant.

In an exemplary embodiment, the customer may have one or more payment mechanisms, i.e., payment methods, associated with the "mobile-payment" program from which the customer may provide funds needed for a purchase. Other allocations/selections may be presented to the customer, i.e., such as whether to allocate a particular purchase to their personal recordkeeping log or business recordkeeping log, for example.

In order for merchants and customers to participate in the "mobile-payment" program, the merchant/customer may be required to initially register with the mobile-payment program, i.e., at some time prior to performing a transaction. In conjunction with the registration, or at some time after registration, the customer may download (or in some way activate) an application programming interface (API) of the payment network on the customer device. Merchants may also secure a suitable API. The API may thus provide the various features and customer experiences as described herein.

The customer device may transmit one or more authorization messages to the payment network to authorize the patient network to pay the merchant. Also, the customer device may directly provide the authorization messages to the collection/order system of the merchant and allow the merchant to provide the authorization messages to the payment network to collect the payment. Various other features are provided. For example, variations of the data transmitted between the customer device, restaurant, payment network, and financial entities i.e., the customer's card issuer/financial entity for example, are provided.

Accordingly, the systems and methods of the invention relate to a variety of processing, in particular in conjunction with a customer device. In accordance with one aspect of the invention such processing generally deals with the initiation of a payment event at a point of sale, identifying that the payment event is happening, and being able to intercept and hold the payment event at particular stage(s), at which point desired processing is performed. In summary, the invention might be characterized as a type of "enhanced transaction processing layer," which supports the various offered functionality.

Such functionally may relate to customer ordering and related processing, customer payment related processing, use of rules in payment scenarios, the use of coupons (including URL and decay processing), the sharing of information (e.g. tell your friends you're at the local coffee house), GPS and other location related processing, use of photo/imaging technology, various authentication processing (including two key authentication), offer matching, integration of multiple customer devices, and various other experiences/processing, for example.

In short, aspects of the invention relate to an extensive set of integrated customer experiences that the financial entity, for example, can drive, i.e., when able to accurately initiate an experience using a payment event, inclusive of the various steps involved in such payment event.

FIG. 1 is a block diagram showing a mobile-payment system 100, in accordance with one embodiment of the invention. As shown, the mobile-payment system 100 includes a "mobile-payment" (MP) processing portion 200. The mobile-payment system 100 further includes the customer device 120, the merchant system 130, as well as the financial entity processing portion 140. The various components of the mobile-payment system 100 may perform the various processing as described herein. The various components of the mobile-payment system 100 may communicate in any suitable manner, such as via the payment network 15, as shown, such as the Internet, for example.

FIG. 1(b) is a block diagram showing a mobile-payment system 100' in accordance with an embodiment of the invention. As shown, the mobile-payment system 100' includes an MP processing portion 200'. The MP processing portion 200' includes an mPay system and services portion 202 and an mPay device interlace portion 204.

The mPay system and services portion 202 and the mPay device interface portion 204 may be characterized to constitute a front-end system, and a back-end system, respectively. The processing performed by the MP processing portion 200' may be allocated to the mPay system and services portion 202 (front-end system) and the mPay device interface portion 204 (back-end system) in a variety of ways—to provide efficient and effective processing. For example, the mPay system and services portion 202 may be disposed in the authorization transaction flow to input a requested transaction, perform initial processing, and interface with an issuer of a card used in the transaction. On the other hand, the mPay device interface portion 204 may be provided to, based on the transaction information it receives from the mPay system and services portion 202, interface with a variety of back-end systems to secure information to satisfy the controlling instructions of the customer. That is, a set of instructions, to use in processing the requested transaction, may be provided by the mPay system and services portion 202 and/or the mPay device interface portion 204, i.e., by the front-end system and/or at the back-end system. In general, the mPay system and services portion 202 and the mPay device interface portion 204 may interface to exchange a variety of information, in conjunction with processing a transaction.

In the embodiments described below, various architectures are set forth to provide mobile-payment processing. Some embodiments include the architecture of a front-end system and a back-end system, i.e., akin to FIG. 1(b). Alternatively, some embodiments include an architecture in which the front-end system and the back-end system are essentially integrated into a single processing portion.

However, many embodiments provide one core architecture pattern of the invention. That is, a basic architecture pattern of the invention includes inputting a purchase event with an amount of money associated with it, referencing a set of instructions that the customer wants to perform in conjunction with that purchase event, and going ahead and performing those instructions for the purchase event, through interfacing with a series of back-end systems.

Within this basic architecture pattern, differences in the processing of various types of transactions relate to the manner in how the particular transaction comes in to the mobile-payment processing portion. That is, sometimes a transaction may come in though a traditional point of sale cash register type device at a merchant, for example. Alternatively, sometimes a transaction may come in from two different areas, i.e., information for the transaction comes in from two or more sources (one of which might be the merchant). This information from multiple sources then is matched up in processing the transaction. Different embodiments also relate to the manner in which the processing is allocated between respective processing portions, e.g. allocated between a front-end system 202 and/or a back-end system 204 as depicted in FIG. 1(b) for example.

In accordance with one embodiment of the invention, FIG. 1(b) shows processing effected by the MP processing portion 200' in an illustrative transaction. Such processing is generally delineated by the numerical progression of steps (1) through (15).

In accordance with one embodiment of the invention, as shown at (1), the processing is initiated when the customer, i.e., the user, uses existing POS (Point of Sale) technology to initiate the transaction, such as by tapping his customer device against the contactless card reader to initiate the transaction.

At (2), the mPay transaction (i.e., the mobile-payment system 100')uses a Visa/MasterCard Bin to route across the particular association network (i.e., the payment network) to the mPay system 200. As delineated at (3), the mPay system and services portion 202 is positioned within the authorization transaction flow to input the transaction.

At (4), the mPay system and services portion 202 evaluates the transaction against the customer's configuration. Such customer's configuration may be stored in a "record table" in a "customer record," in accordance with one embodiment of the invention, as described in detail below. In turn, the "customer record" includes "order records," as also described below with reference to FIGS. 8-9, in particular. Thus, the record table is used by the transaction server 200' to associate an input transaction with a set of instructions that the customer wants to perform in conjunction with that purchase event. In the example of FIG. 1(b), based on the customer's configuration (i.e., the record table), the mPay system and services portion 202 determines that card information is needed from an external system, e.g. from Chase servicing.

At (5) The mPay system and services portion 202 sends a communication to the mPay device interface portion 204 requesting such card information.

At (6) The mPay device interface portion 204 communicates with Chase servicing to secure the needed information. The information indicates that the card to use in the particular time window (i.e., the time of day that the transaction was effected) is the customer's CHASE FREEDOM CARD.

At (7) The mPay device interface portion 204 communicates the needed information back to the mPay system and services portion 202.

At (8), based on the customer's configuration information, the mPay system and services portion 202 converts the mPay account number to the customer's identified Chase Freedom Card and (9) routes the authorization to the issuer, or other designated entity, for approval.

At (10) the transaction is processed by the issuer of the customer's CHASE FREEDOM CARD and results are transmitted back across the payment network (such as a Visa/MasterCard network) via the mPay system and services portion 202 to the merchant.

At (11) the mPay system and services portion 202 creates a content rich digital receipt for the transaction, including merchant specific content such as a Merchant logo's, for example.

At (12), the mPay system and services portion 202 forwards the receipt to the mPay device interface portion 204 to append further information At (13) The mPay device interface portion 204 appends further information to the receipt, including at (14) pulling contact information from a "location information" external source. Such location information relates to the location particulars of the merchant, for example At (15) in FIG. 1(b), the mPay device interface portion 204 sends the content rich digital receipt to the customer device. In sending the receipt, push interfaces, carrier networks, and/or other communication processing may be utilized.

As described in detail herein, there are numerous variations to the above processing. In accordance with one embodiment of the invention, the mPay system and services portion 202 and/or the mPay device interface portion 204 may be used so as to provide a desired processing speed in responding to transaction requests. To explain, a response time may be desired that approaches real-time response. As used herein, "real-time" means a range from fractions of a second to a few seconds after a prior event has occurred. In order to provide such real-time capability, it may not be workable for the mPay system and services portion 202 to input the transaction request; then communicate with the mPay device interface portion 204 to retrieve information to process the transaction request. Also, there may not be processing time to provide for the mPay device interface portion 204 to communicate with external systems to secure further needed information. In order to provide such real-time processing, the mPay system and services portion 202 may handle the transaction request on its own, without interfacing with the mPay device interface portion 204 or external systems. Relatedly, certain tradeoffs may be imposed. For example, in order to provide real-time processing, the functionality provided by the MP processing portion 200' may be limited in some manner.

In accordance with other embodiments of the invention, either the mPay system and services portion 202, the mPay device interface portion 204, and/or other processing portions in the MP processing portion 200' may hold transaction information (relating to a requested transaction) until such processing portion receives further information from another processing portion. In other words, a first processing portion may sit waiting for information from a second processing portion. Illustratively, in FIG. 1(b), prior to the mPay system and services portion 202 outputting authorization for the transaction to the merchant, the mPay system and services portion 202 may communicate with the customer, via the mPay device interface portion 204, in order to secure approval from the customer. Accordingly, the mPay system and services portion 202 sits waiting for the approval to come back from the customer. Once the approval is received, then the mPay device interface portion 204 proceeds with outputting the authorization to the merchant.

In the embodiment of FIG. 1(b), as well as other embodiments described herein, an aspect of the processing may include that, to effect the transaction, the customer interfaces with the merchant in a limited manner, or indeed that the customer does not interface with the merchant at all. That is, for example, in accordance with one embodiment of the invention, the MP processing portion 200', respectively, interfaces with the merchant and interfaces with the customer, without there ever being a linkage between the merchant and the customer.

A wide variety of embodiments of the invention are described below.

Figure 2:
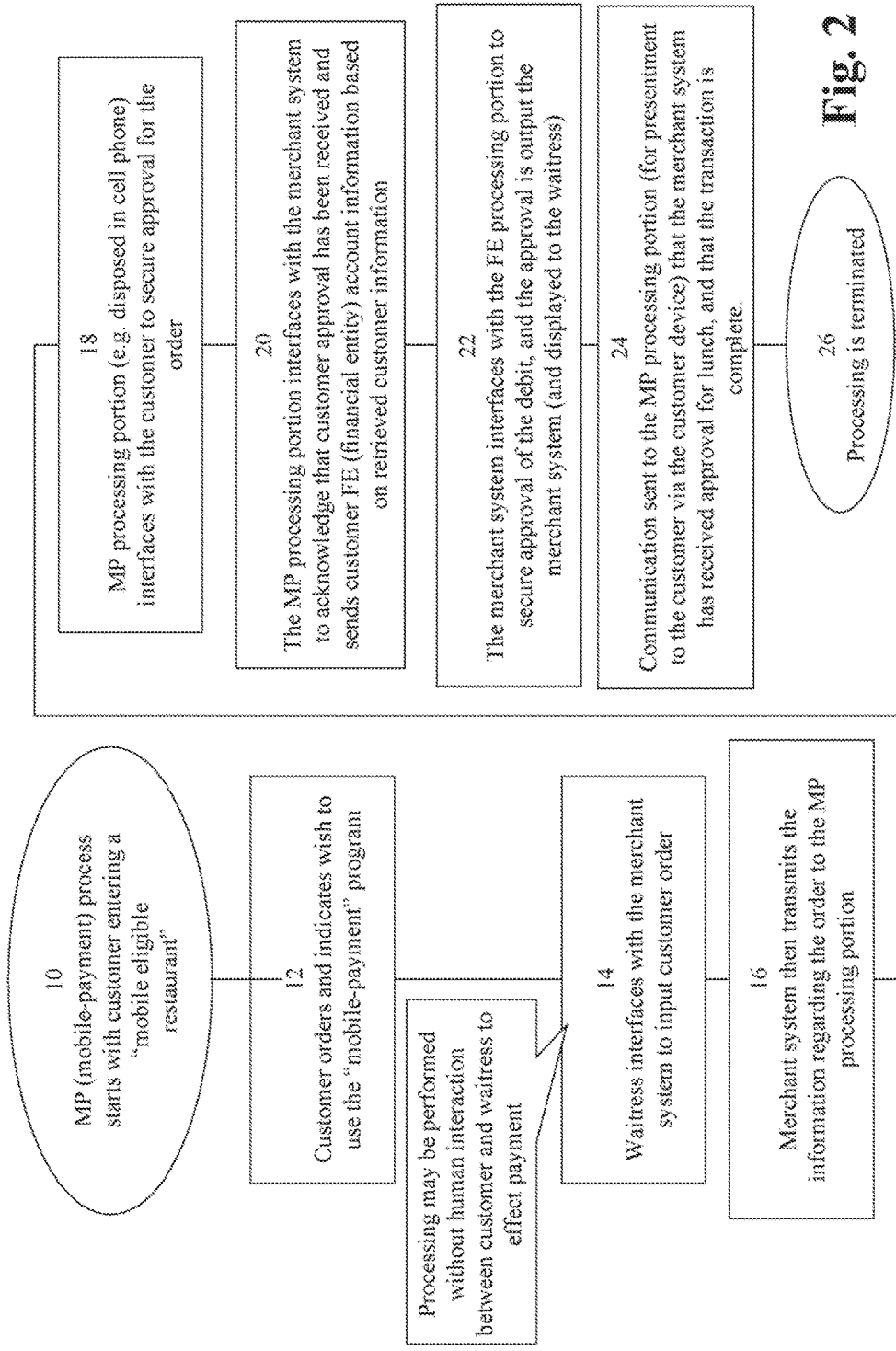
FIG. 2 is a high level flowchart showing mobile-payment pressing in accordance with one embodiment of the invention.

With further reference to the processing of the embodiment of FIG. 1, FIG. 2 is a high level flow chart showing a mobile ordering process in accordance with one embodiment of the invention. As shown, the process first starts in step 10 with the customer physically entering a mobile (that is "mobile-payment") eligible restaurant, i.e., a merchant that participates in a mobile-payment program so as to utilize the various features described herein.

In accordance with one embodiment of the invention, after being seated, the customer first verbally orders lunch by talking with a waitress, and the customer conveys to the waitress that they would like to use the "mobile-payment" program, as shown in step 12 of FIG. 2. In step 14, the waitress then interlaces with the merchant system 130. That is, the waitress enters into the merchant system 130 the particulars of the ordered lunch, i.e., items ordered and the price of those items (or the price comes up automatically).

Then, in step 16, in accordance with one embodiment of the invention, the merchant system 130 transmits the information regarding the order to the MP processing portion 200 (which in this embodiment is in the customer's cell, phone (customer device 120), for example). As reflected in step 18 of FIG. 2, the MP processing portion 200 (using the cell phone interface) presents the particulars of the order to the customer for approval, and in turn, the customer interfaces with the customer device 120 to indicate their approval. Upon receiving the customer's approval (such as by the customer tapping a displayed icon displayed on the customer device 120), in step 20, the MP processing portion 200 interfaces with the merchant system 130 to acknowledge that approval has been received. Also, in step 20, the MP processing portion 200 retrieves customer account information that contains the customer billing information. This might be performed by retrieving a particular record associated with the customer, as discussed further below. Other information in a record associated with the particular customer may also be retrieved, in particular other information relating to how the transaction is to be processed. The MP processing portion 200 then sends the billing information along with the communication to the merchant system 130. Such communication may be sent in conjunction with data reflecting that the customer has a financial account that may be debited for the requested transaction, i.e., confirmation that the customer is "good for the funds."

Thereafter, in step 22, the merchant system 130 interfaces with the financial entity processing portion 140 to secure approval of the debit (of the user's account) associated with the transaction, i.e., based on the billing information that was input from the MP processing portion 200.

Also in step 22, the merchant system 130 presents confirmation to the waitress that the transaction has been approved. Also, as shown in step 24, a communication may be sent to the MP processing portion 200 (for presentment to the customer via the customer device 120) that the merchant system has received approval for lunch, and that the transaction is complete.

Such described processing, including presenting the customer with the details of the order and securing authorization from the financial entity processing portion 140 may be done once at the conclusion of a lunch, for example, or might be done in an ongoing or periodic manner, e.g. as further items are ordered.

In step 26 of FIG. 2, the processing is terminated, i.e., for that particular transaction.

In accordance with a further embodiment of the invention, it is appreciated that processing similar to that shown in FIG. 2 may be performed without human interaction to effect payment. For example, in the scenario of FIG. 2, instead of the customer interfacing with the waitress regarding use of the mobile-payment system, the customer device 120 might talk directly with a MP processing portion 200 to effect payment. For example, the particular merchant, such as a restaurant, may provide a MP processing portion 200 at some appropriate location to interface with the customer upon the customer entering the merchant's place of business. Such MP processing portion 200 might be located adjacent the entrance or at a host's stand, for example. Upon the customer entering the restaurant and approaching the MP processing portion 200, the customer might take some action to initiate communications between the MP processing portion 200 and the customer device 120. Such action might be the flick of the customer device 120, the tap of a button (generated upon the customer device 120 and the MP processing portion 200 sensing one another), or in some other manner. Thereafter, the waitress would be alerted that the customer was using mobile-payment and would interface with the customer to provide the requested services, such as the ordered food items. However, the waitress, in this embodiment, would not interact with the customer regarding payment, but might rather simply confirm in some manner that the provided items were included in the mobile-payment transaction.

At the termination of the customer experience at the particular merchant, the customer would take some action to indicate such. Such action might include interfacing with their customer device 120 to indicate that the experience was to terminate and that the amount due should be settled. Thereafter, processing would be performed to complete the transaction, including communications between the customer device 120, the merchant system 130, the MP processing portion 200 and the financial entity processing portion 140.

It is appreciated that the described or similar functionality might be utilized in a variety of environments. In accordance with one embodiment of the invention, a movie theater may be provided with a MP processing portion 200 at a particular entrance to the theater, labeled as such. Upon the customer's approach to the entrance, the MP processing portion 200 would sense the customer device 120, and communications would be initiated between the customer device 120 and the MP processing portion 200. Once adjacent the MP processing portion 200, the customer might be prompted to take some action with the customer device 120 vis-à-vis the MP processing portion 200 so as to pass into the theater. For example, such action might be a flick of the customer device 120 or a tap on an icon displayed by the customer device 120. Such processing could be performed on a number of persons basis, i.e., by indicating how many persons should be admitted and the corresponding amount charged. Alternatively, the customer might perform the designated action for each person, i.e., to allow payment (by the customer) of persons amongst persons who the customer is not paying. In other words, the processing would allow: the customer to pass with flick/payment, friend 1 to pass with flick/payment, stranger to pass without payment, and friend 2 to pass with flick/payment. Such processing might be used in a wide variety of environments such as in a transit authority/metro environment in passing through a turnstile, in an entertainment venue such as an art gallery or theme park, and/or in conjunction with interface with a vending machine (such as to purchase a ticket, candy, drink, rent a movie and/or any other item), for example.

As reflected in FIG. 1, the mobile-payment processing portion 200 may be in various forms. For example, the mobile-payment processing portion 200 may be a discreet processing portion, i.e., vis-à-vis the other components of the mobile-payment system 100. Such a discreet processing portion might be constituted by a specialized mobile computing device, and customer computer or a kiosk, for example. On the other hand, the mobile-payment processing portion 200 might be integrated into one or more of the portions (120, 130 and 140), either physically or from a processing perspective. For example, in accordance with one embodiment of the invention, as described herein, the mobile-payment processing portion 200 may be integrated into the customer device 120, such that the above described communications (to the merchant system 130 and financial entity processing portion 140) are indeed sent from the customer device 120, i.e., having been generated by the mobile-payment processing portion 200 in response to receiving the particular keystrokes from the user.

Figure 3:
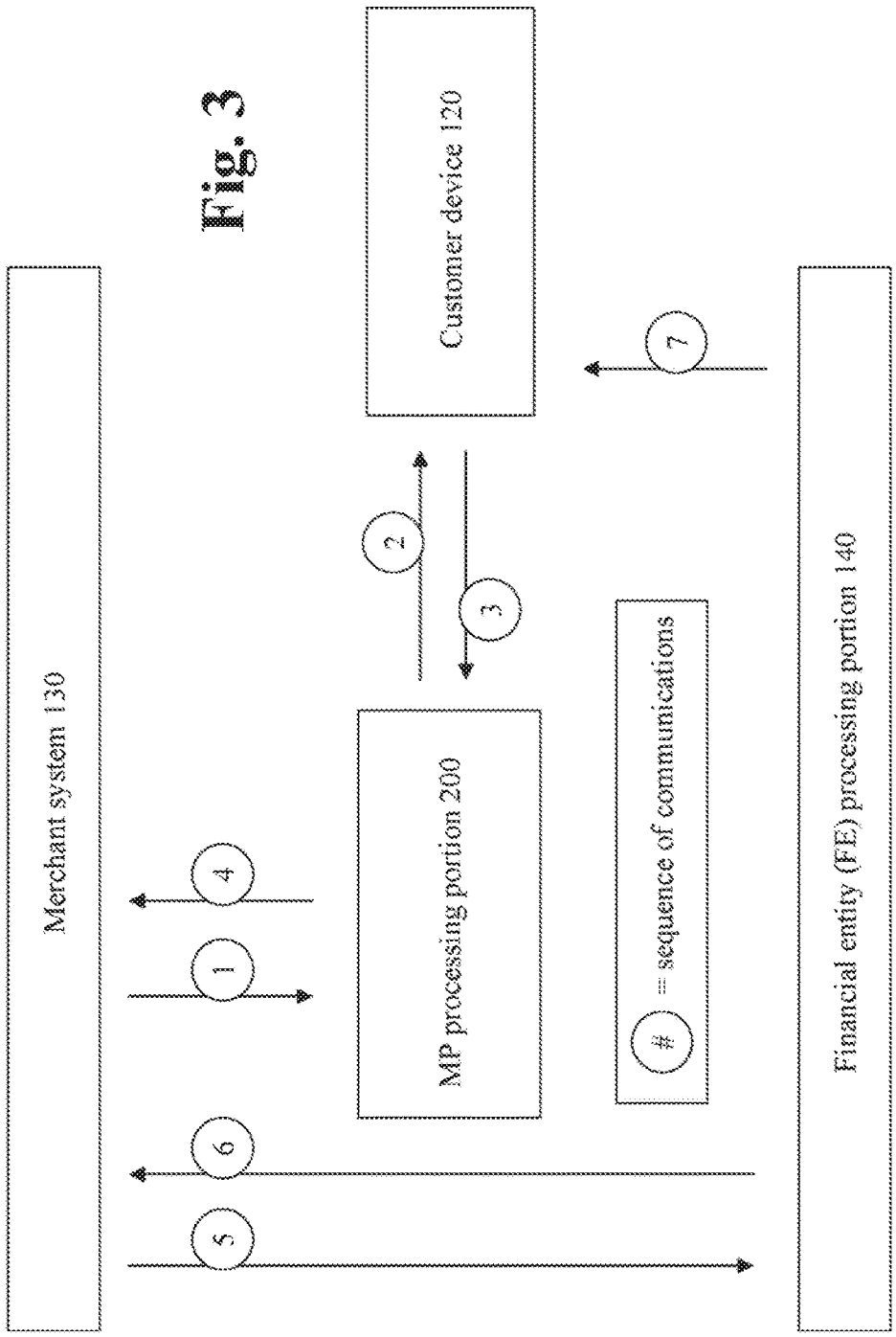
FIG. 3 is a diagram showing the flow of communications in a merchant initialed transaction in accordance with one embodiment or the invention.

FIG. 3 is a diagram indicating the sequential flow of communication of the process of the FIG. 2, in accordance with one embodiment of the invention. In the processing described above with reference to FIG. 2, the processing was initiated by the waitress interfacing with the merchant system 130. Thereafter, the merchant system 130 interfaces, i.e., communicates, with the MP processing portion 200 in communication (1) of FIG. 3. The MP processing portion 200 then sends the requested transaction information to the customer device 120 in communication (2). At such point, the customer device 120 interfaces with the human user. Assuming the human user approves the transaction (and interfaces with the customer device 120 to show such approval), the customer device 120 then sends such approval back to the MP processing portion 200 in communication (3). In communication (4), the MP processing portion 200 transmits the approval back to the merchant system 130.

Thereafter, as shown in FIG. 3, in communication 5, the merchant system 130 sends a communication to the financial entity processing portion 140 to secure authorization for the transaction. In one embodiment of the invention, communication 5 is akin to the known, commonly used, request for approval that a merchant system sends to a financial entity authentication entity. Thus, such one aspect of the processing might utilize known processing using the existing infrastructure in a payment network. Thus, the financial entity processing portion 140, in accordance with one embodiment of the invention, sends approval to the merchant system 130 in communication (6), such communication 6 utilizing known processing using the existing infrastructure. In accordance with one embodiment of the invention, the financial entity processing portion 140, based on predetermined indicia (i.e., parameters) associated with the transaction request, may identify that the transaction is indeed a mobile-payment transaction, and as a result, send confirmation to the customer device 120 in communication (7) of FIG. 3.

However, the processing as shown in FIG. 2 and the substantially parallel processing of FIG. 3 is one progression, i.e., sequence, of communications that may be used in an embodiment of the invention. To explain, one aspect of the invention is to provide a wide variety of user experiences that are performed effectively and efficiently. The experience of FIGS. 2 and 3 is driven initially by the merchant system 130. That is, subsequent to the human customer interfacing with the human waitress, the human waitress interfaces with the merchant system 130. From an automated processing perspective, the merchant system 130 initiates processing of the transaction by first interfacing with the waitress and then sending a communication to the MP processing portion 200.

Figure 4:
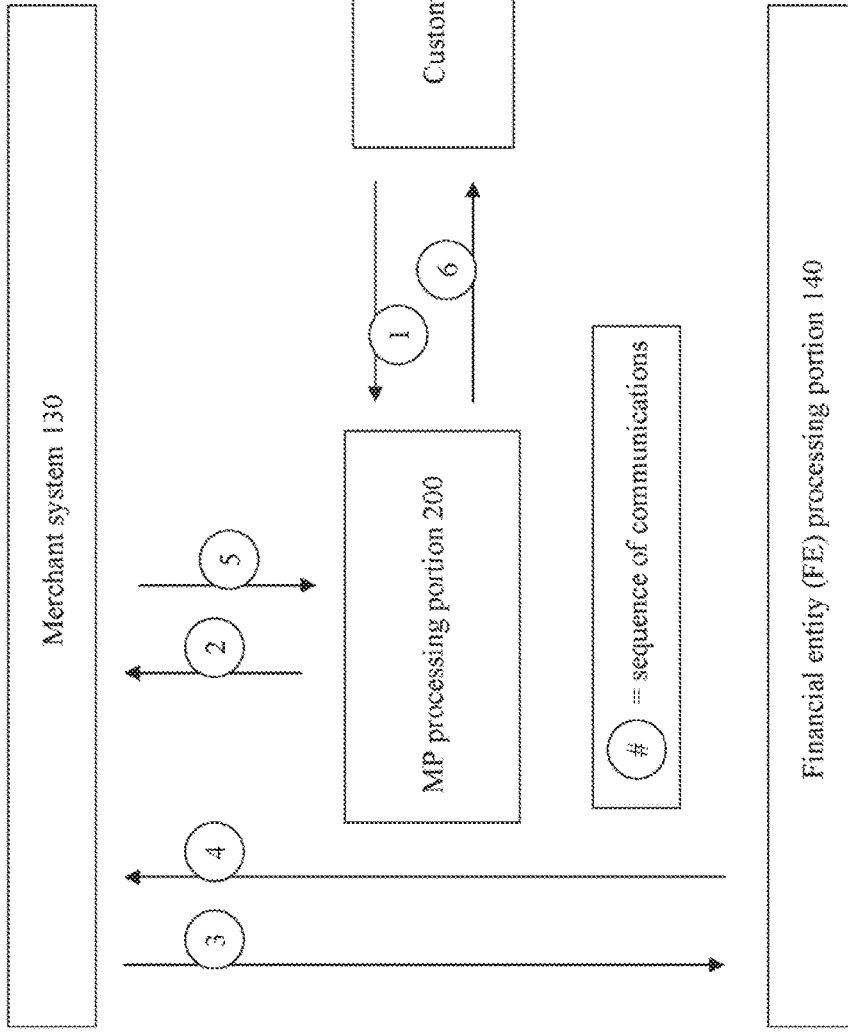
FIG. 4 is a diagram showing the flow of communications in a customer device initiated transaction in accordance with one embodiment of the invention.

In accordance with other embodiments of the invention, and different user experiences, other sequences of communications may be utilized. FIG. 4 illustrates such a different user experience.

That is, FIG. 4 is a diagram indicating the sequential flow of communication of a transaction process, in accordance with a further embodiment of the invention. The processing of FIG. 4 might be characterized as a "customer device" initiated transaction. In the process of FIG. 4, the processing is initiated by some trigger event that is experienced, i.e., sensed, by the customer device 120. For example, the trigger event might be input by the customer (interfacing with their customer device 120), a time metric being attained (e.g. at 8 pm a coffee order is initiated), and/or a location metric being attained (e.g. a GPS trigger). Thus, FIG. 4 illustrates a different sequence of communications vis-à-vis FIG. 3.

As shown in FIG. 4, after the customer device 120 experiences the trigger event, the customer device 120 sends a communication (1) to the MP processing portion 200. Based on such communication and parameters associated with the particular customer, the MP processing portion 200 sends a communication (2) to the merchant system 130. Such communication (2) provides details of the requested item, e.g. the coffee drink that the customer has requested, as well as the financial information, i.e., financial entity account information of the customer.

Thereafter, as shown in FIG. 4, the merchant system 130 sends an authorization request, communication (3), to the financial entity processing portion 140. The financial entity processing portion 140 responds with the transaction approval (4), or a decline if the transaction is not authorized. Assuming an approval, after receiving the approval, the merchant system 130 generates an indication that the transaction has been approved, and thus that the merchant workers should work to satisfy the requested item. In accordance with one embodiment of the invention, the merchant system 130 then sends an indication (5) that the requested item is being prepared (or is ready for pickup) to the MP processing portion 200. The MP processing portion 200 then transmits this information to the customer device 120 as communication (6).

Figure 5:
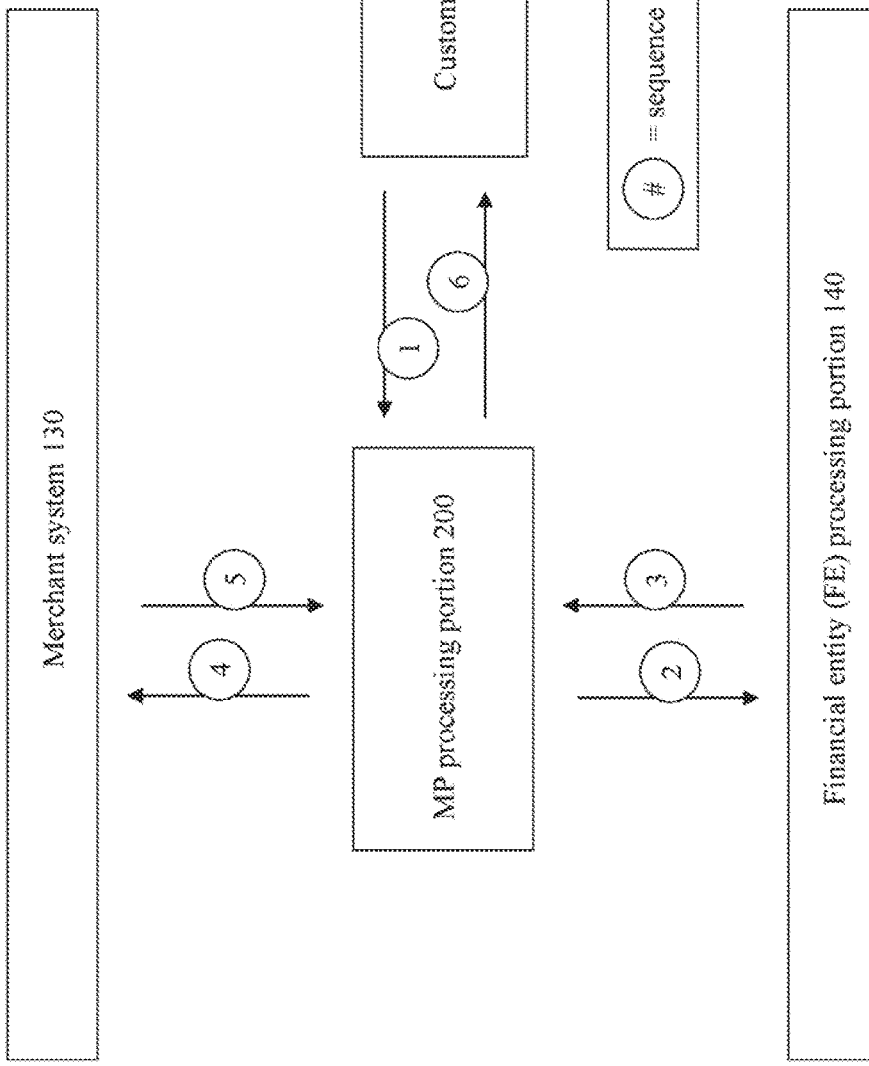
FIG. 5 is a diagram showing the flow of communications in a customer device initiated transaction, in which the mobile-payment processing portion secures authorization from the customer's financial entity for the requested transaction, in accordance with one embodiment of the invention.

FIG. 5 is a diagram indicating the sequential flow of communication of a transaction process, in accordance with a yet further embodiment of the invention. The processing of FIG. 5 might be characterized as a "customer device" initiated transaction similar to the process of FIG. 4. However, in the process of FIG. 5, the MP processing portion 200 secures approval of the transaction from the financial entity processing portion 140 prior to communicating with the merchant system 130. After receiving such approval from the financial entity processing portion 140, the MP processing portion 200 forwards such approval to the merchant system 130.

That is, in the process of FIG. 5, after the customer device 120 experiences a trigger event, the customer device 120 sends a communication (1) to the MP processing portion 200. Based on such communication (1) and parameters associated with the particular customer, the MP processing portion 200 sends a communication (2) to the financial entity processing portion 140. Such communication (2) might be characterized as a transaction request. The financial entity processing portion 140 responds with the transaction approval (3), or a decline if the transaction is not authorized.

In accordance with one embodiment of the invention, the customer device 120 may be provided with functionality to interface the customer with particular administrative persons or systems. For example, if the customer device 120 receives a communication indicating that a transaction has been denied, then functionality may be provided to generate a button to contact a customer service person, i.e., the customer might tap the button on their mobile device and a call is put through to customer service. In general, such processing may utilize a rule set that is responsive to particular observed criteria. When such particular criteria is observed, the customer device 120 responds by initiating a communication to a particular person or system. Such initiating might be performed by generating a tap button, a prepared text message or in some other manner. For example, a message displayed with the button ought read: "You have been declined—tap here to find out why." In response to tapping such button, the customer might be connected with a live representative, a chat room, or be sent an automated message, for example. In such manner, the customer may be connected to a financial entity involved in the transaction, the particular merchant and/or some other third party entity. Assuming the financial entity processing portion 140 approved the transaction, after receiving the approval, the MP processing portion 200 generates a communication (4) that is sent to the merchant system 130. The communication (4) might be characterized as a merchant request. The merchant request (4) conveys information to the merchant system 130 including that the requested transaction has been funded, i.e., that an account of the customer has been debited for the requested item, as well as the particulars of the requested item. For example, the particulars may be the particular coffee drink that the customer has requested.

In accordance with one embodiment of the invention, as shown in FIG. 5, the merchant system 130 then sends a communication (5) to the MP processing portion 200. The communication (5) indicates the requested item is being prepared (or is ready for pickup). The MP processing portion 200 then transmits this information to the customer device 120 as communication (6). Accordingly, the customer is provided such information indicating that the requested item is feeing prepared and/or is ready for pick-up.

As described further below, in accordance with embodiments of the invention, information may be captured, sorted and/or allocated in a variety of manners. In particular, transaction/receipt information may be captured, sorted and/or allocated.

In further illustration of the invention, and as described below with reference to FIG. 6, in accordance with one embodiment of the invention, a person, i.e., a customer, is enabled to order a coffee drink with a few keystrokes on their cell phone, as they are in route to the particular merchant. That is, in accordance with one embodiment of the invention, the customer registers with a mobile-payment system 100 (as described below), i.e., registers at some prior time. In conjunction with the registration, or at some time after registration, the customer selects "favorites" and particular merchants at which to purchase those favorites. The customer also selects an account to fund the purchase. For example, the favorites might include two coffee drinks that the customer routinely purchases. Once registration is completed, the customer is then ready to use the mobile-payment system as desired, e.g. in their daily routine. By selection of the favorites, the customer is enabled to select one (or more) of the favorites by keystrokes to a customer device, e.g. a cell phone.

For example, in accordance with one embodiment of the invention, the customer is in route to the particular merchant. Once the customer has passed a particular estimated time of arrival (ETA) such as ten minutes, for example, the customer enters the predetermined keystroke (into their cell phone) so as to request their desired favorite. In response, a communication is sent to the particular merchant to proceed with preparing the customer's desired item, e.g. the customer's desired coffee drink, for example. A communication is also sent to the appropriate financial entity processing system, i.e., so as to effect the transaction that is to fund the purchase of the desired item.

Once the communication is received by the financial entity processing portion, the financial entity processing portion (in response) effects the transaction to fund the purchase. For example, the financial entity processing portion debits a predetermined credit card account of the user or in some other way effects the funds transfer (to fund the desired transaction) using any of a wide variety of payment mechanisms.

On the other hand, once the communication (including requested item information and financial entity account authorization) is received by the particular merchant, the merchant knows that the customer will be arriving shortly (e.g. in the ten minutes), and prepares the desired item accordingly. Thereafter, the customer arrives, and the coffee drink is "ready and waiting" for pick-up, having been already paid for.

In accordance with one embodiment of the invention, the initial communication from the customer device is forwarded to a "mobile-payment" processing portion. Once received, based on the customer information in store (i.e., stored in a suitable database from the data input at customer registration, for example), the "mobile-payment" processing portion then forwards the appropriate communication to the financial entity, as well as the appropriate communication to the merchant processing system, as described.

Accordingly, in accordance with one embodiment of the invention, the mobile-payment processing portion 200 may secure authorization for the transaction from the financial entity processing portion prior to forwarding the communication to the merchant, i.e., as shown in FIG. 5 above.

Note that any of a wide variety of authentication techniques may be used in the systems and methods as described herein. In particular, various techniques may be used to either authenticate the user to the merchant and/or to authenticate the user to the financial entity, i.e., to process a requested transaction.

It is further appreciated that any of a variety of communication processing may be used in conjunction with the features described herein. Various such communication processing is described throughout the present disclosure. For example, the features described herein may be used in conjunction with the features described in U.S. Pat. No. 6,535,855 to Cahill issued Mar. 18, 2003 entitled "Push Banking System and Method", which is incorporated by reference herein in its entirety. In summary, in accordance with one embodiment of the invention, the mobile-payment system allows a customer, with a few simple keystrokes to a cell phone, to arrange the purchase of a desired item with minimal effort, and without having to deal with any physical handling of a funds transfer. Additionally, the systems and methods of embodiments provide for various other features.

In the example described above, the customer enters a keystroke into their cell phone to initiate the order of a desired item. However, various other arrangements may be utilized. For example, the mobile-payment system 100 might utilize Global Positioning System (GPS) technology. For example, the customer's position in their car may be monitored such then when the customer comes to within a predetermined proximity of the merchant, the customer's order is automatically initiated and processed. Relatedly, an order might be triggered when the customer enters into, or passes through, a particular geographical area, i.e., when the customer drives down a particular road. In this example, as well as in the other processing as described herein, the mobile-payment system 200 may utilize a variety of rules. For example, a rule might dictate that only when the customer is within proximity of the merchant during a certain time window (e.g. 6:30 am to 7:30 am on a weekday), will the order be put through. Alternatively, a rule might dictate a first item order (i.e., to be ordered) when the customer approaches the merchant on the weekday, and dictate a second item order when the customer approaches the merchant on the weekend. A wide variety of rules might be utilized as desired, and such rules may be dependent on various parameters as desired, such as geographical position, direction of travel, time of day, day of the week, attributes of the customer device 120, and/or other parameters. Such processing may utilize a customer record table 252 (as described further below) to map observed events into a trigger—to order a particular item. Alternatively, certain observed events might trigger an order is some other manner. In accordance with one embodiment of the invention, customer confirmation of the placement of a particular order might be required, based on customer preference.

Figure 6:
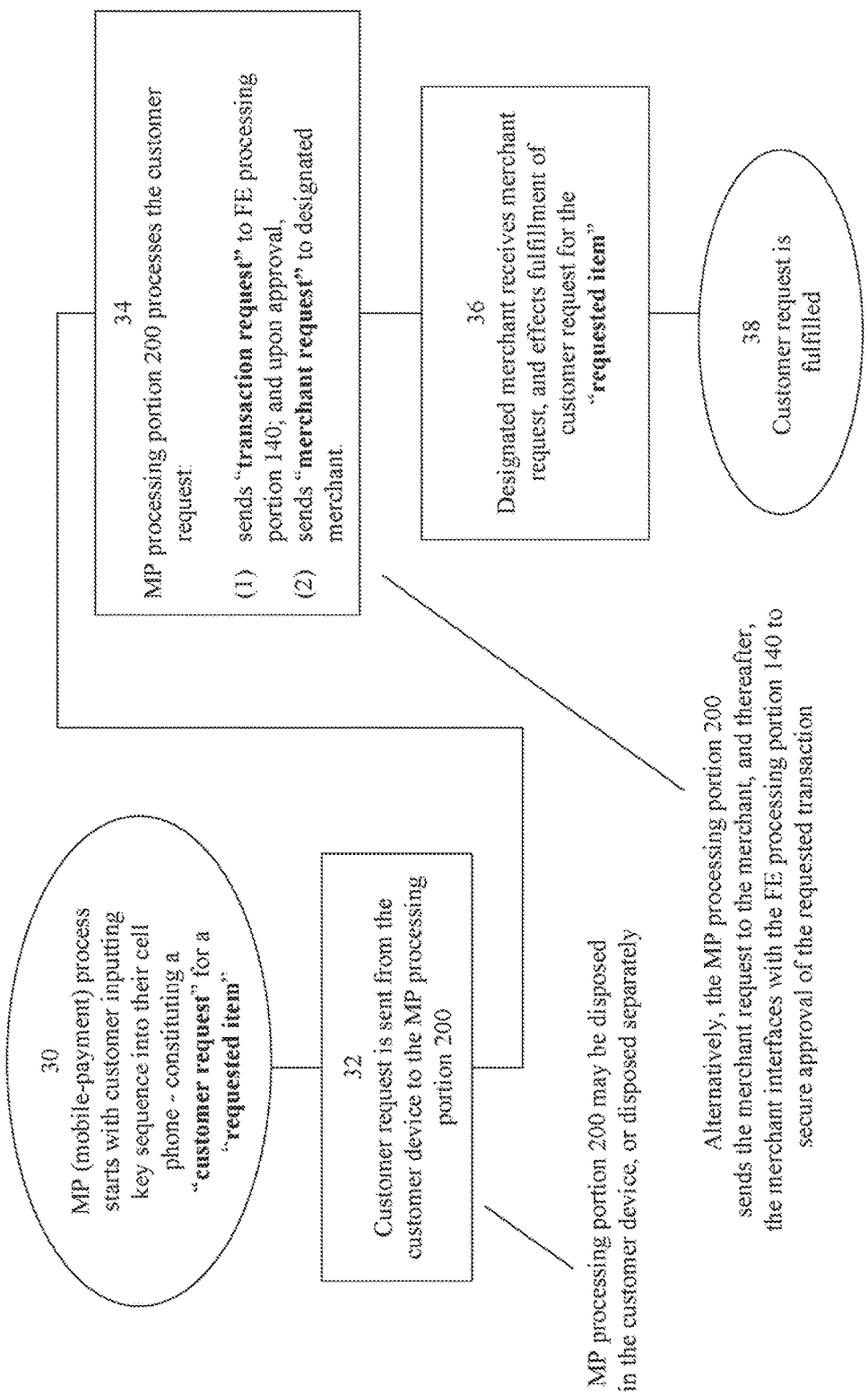
FIG. 6 is a further high level flowchart showing mobile-payment processing in accordance with a further embodiment of the invention.

In accordance with one embodiment of the invention, the merchant might receive the above described communication (as shown in FIG. 6) to prepare the order, as well as a subsequent communication indicating that the customer has indeed arrived to pick up the order. Thus, the merchant might provide curb-side service to the customer using the mobile-payment system 100. Various helpful information, might be provided to the merchant to assist the merchant in delivering the desired item to the merchant, such as the particulars of the customer's car or a picture of the customer displayed to the merchant, i.e., so the merchant can recognize the particular customer.

In further explanation, in accordance with one embodiment of the invention, the merchant system 130, upon receipt of a "mobile-payment" request may print a "tab" that is used by the merchant worker in preparing the requested item. The tab might be in any of a variety of forms such that information associated with the tab (by the merchant system 130) may be associated with the physical requested item. In one form, the tab might be a small sheet of paper with the needed information printed thereon. The sheet of paper might be provided with an adhesive surface so as to be affixable to the customer's purchased item, e.g. a "sticky tab" affixed to the customer's coffee drink. It is appreciated that any information regarding the customer's purchase that is contained on a printed tab may alternatively be simply provided on the merchant's system (e.g. on a computer display) and vice-a-versa. Further, there may be multiple tabs printed for a particular purchase. One tab may contain the order information with the customer's name, picture, and requested item, while a second tab (to be affixed to the same requested item) contains a targeted ad or some other promotional content. Other tabs containing other content may also be provided. Further, a single tab might contain multiple orders.

The tab that is affixed to the requested item may contain information such as time to begin to prepare the requested item, time that the requested item should be ready for pick-up, a nickname (i.e., an alias such as "RoadWarrior") to call the customer's order out, a picture of the customer, some other manifestation of the customer such as a caricature, and/or any other information to identify the customer. Further, the information on the tab might contain other information, such as targeted add information, a "saying of the day," information regarding the customer's account (from the financial entity processing portion 140), information regarding the customer's buying experience or history at the merchant (from the merchant system 130), and/or any other information that might be associated with the user (e.g. based on a user's profile) and/or useful/enjoyable by the user or the merchant.

Figure 17:
FIG. 17 is a screen capture including an interface that shows a queue in accordance with one embodiment of the invention.

It is also appreciated that any of such information that might be printed on the tab, might also be presented in some other manner, such as via a merchant terminal, for example, FIG. 17 shows such a merchant terminal.

Relatedly, in accordance with one embodiment of the invention, the MP processing portion 200 provides for a user to upload information, i.e., any of the herein described information that might be affixed to a tab, such that the uploaded information may be presented to the merchant as described herein. For example, the customer might upload their picture so as to be displayed to the merchant worker, or so as to be printed on the tab, as described above.

In accordance with one embodiment of the invention, the placement of an order (such that the mobile-payment system 100, i.e., the MP processing portion 200, forwards a respective communication to the merchant system 130 and financial entity processing portion 140), might be triggered by interface of the customer device 120 with a device at the merchant. For example, the customer device 120 might interface with the merchant via RFID (Radio-frequency identification) technology, such that the customer does not need to wait in line, for example. It is appreciated that known RFID technology may be used in conjunction with the features described herein. For example, the features described herein may be used in conjunction with the features described in U.S. patent application Ser. No. 09/630,595 filed Aug. 1, 2000 entitled "System and Method for Transponder-enabled Account Transactions", which is incorporated by reference herein in its entirety. As described above, to fund the desired transaction, the financial entity processing portion debits a predetermined account of the user to effect the funds transfer. It is appreciated that any of a wide variety of payment mechanisms may be used as described herein.

In conjunction with a mobile-payment transaction, it is appreciated that there may be a wide variety of communications utilized in the mobile-payment system, such as between the customer device, MP processing portion, financial entity, and the merchant, for example. As described herein, such communications may provide various information between the customer and the merchant, for example, such as that the desired item is ready for pick-up, the name or alias of the customer to call out once the item is ready for pick-up, a time that the item will be ready for pick-up, the merchant is unable to provide the item at the current time (e.g. the coffee house is out of muffins), the customer has arrived outside the merchant's business, and/or any other desired communication/information. Such communications may be utilized to resolve the disposition of an order. For example, if a customer has not picked up a prepared requested item, a communication may be sent to the customer requesting confirmation that the customer is coming, or in some other manner resolve the disposition of the order, e.g. using a set of rules/protocols. Further, such rules/protocols may vary based on particular parameters such as the customer location, device that the customer is using, nature of the product (e.g. shelf life of the product), time of day/week, and/or customer preference, for example. Once a given number of reminders are sent, a final communication may be sent to cancel a pending order. In general, in the various embodiments described herein, rules may be implemented to enhance the customer experience and avoid disconnects and/or shortcomings between a placed order, a paid for item that is not picked up, a customer's anticipation of an order that is not ready and/or other expectations of the customer or merchant.

The systems and methods of embodiments may be provided with functionality to prevent fraud. If fraud is suspected, suitable communications may be sent to the customer or other entity for investigation.

Figure 7:
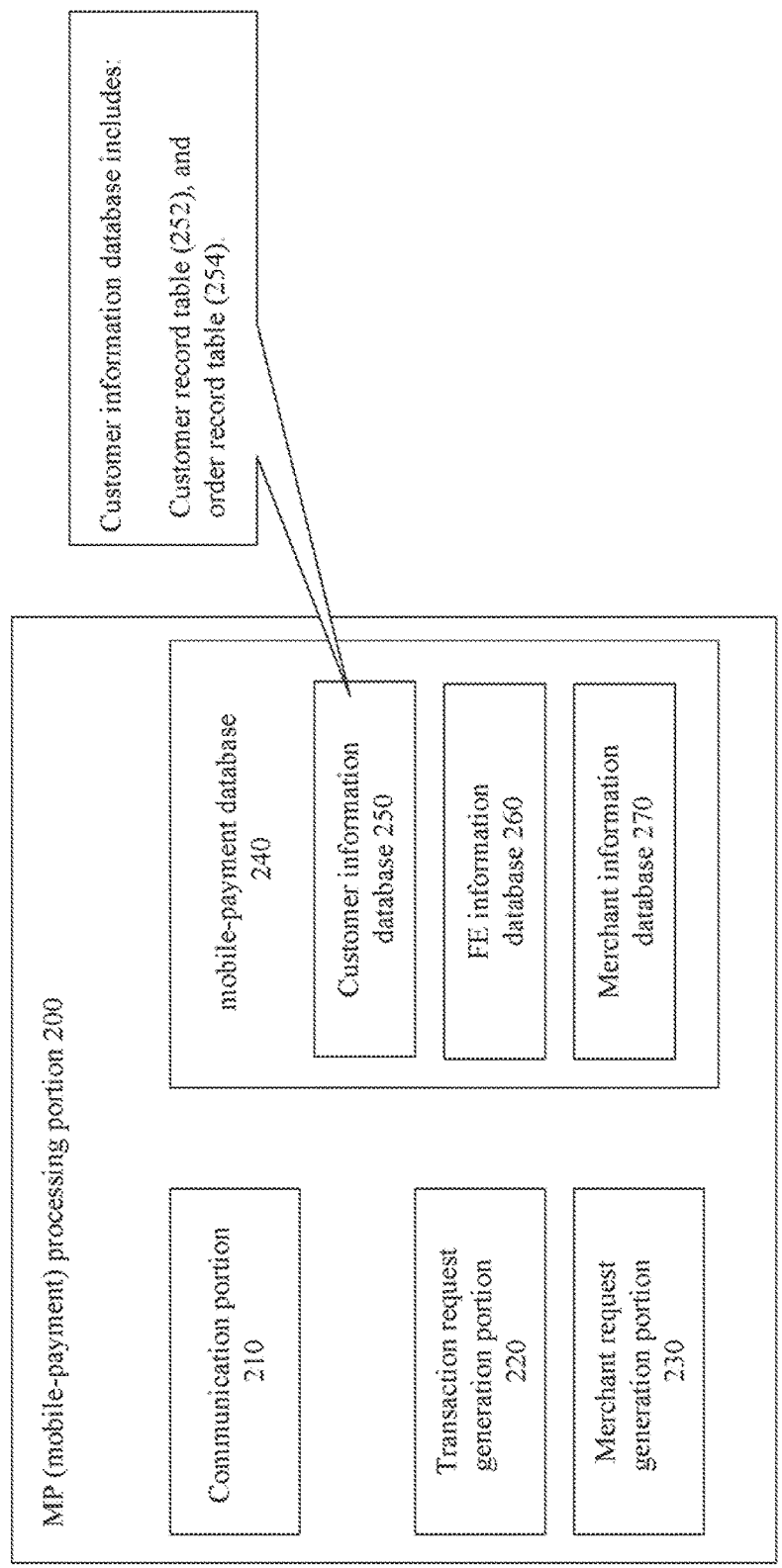
FIG. 7 is a block diagram showing the MP processing portion in further detail, in accordance with one embodiment of the invention.

Further, FIG. 7 is a block diagram showing the MP processing portion 200 in further detail, in accordance with one embodiment of the invention. The MP processing portion 200 may be in the form of a tangibly embodied computer processing device, i.e., a physical machine, for example.

As shown in FIG. 7, the components of the MP processing portion 200 perform the various processing described herein. In addition to the processing performed by the MP processing portion 200 in general, inclusive in the MP processing portion 200 are specialized processing portions that perform particular mobile-payment processing. These specialized processing portions include the communication portion 210, the transaction request generation portion 220, the merchant request generation portion 230 and the mobile-payment database 240.

The communication portion 210 performs various processing to provide communications between the MP processing portion 110 and other processing portions, such as the customer device 120, the merchant system 130, the financial entity processing portion 140, and any other system and/or resource, such as a data resource disposed on the Internet. In accordance with embodiments of the invention, the transaction request generation portion 220 generates a "transaction request" to be sent to the financial entity processing portion 140, in conjunction with a mobile-payment request. The merchant request generation portion 230 prepares a "merchant request" to be sent to a merchant, in conjunction with a mobile-payment request.

As described herein, the MP processing portion 200 might first send a transaction request to the financial entity processing portion 140 (and secure an approval for the requested transaction) and thereafter forward the merchant request to the merchant (with both information regarding the requested item AND information indicating the financial entity approval for the transaction), i.e., see FIG. 5. Alternatively, the MP processing portion 200 might prepare a merchant request (that is sent to the merchant) that includes both customer payment/account information as well as information regarding the requested item, i.e., see FIG. 4. In this later example, the MP processing portion 200 would thus not communicate with the financial entity processing portion 140. Also, in this later example, the MP processing portion 200 would not generate a transaction request, but rather the merchant system 130 would generate the transaction request (for outputting to the financial entity) based on the information in the merchant request (received by the merchant system 130 from MP processing portion 200).

As described above, the MP processing portion 200 includes the mobile-payment database 240. The mobile-payment database 240 includes various data used and/or generated in the mobile-payment processing. In particular, the mobile-payment database 240 includes the customer information database 250, the financial entity information database 260 and the merchant information database 270, each of which are described below. In particular, the customer information database 250 includes various information about the customer including the customer profile information, i.e., customer personal information and the various customer ordering information including customer preferences. For example, customer information might include a physical description of the customer, address, phone numbers and other contact information, that they should only be contacted between 8 am and 5 pm and by e-mail, for example. The financial entity information database 260 includes various information regarding the financial entity from which the funds will be drawn to fund the mobile-payment activity of the customer. Thus, the financial entity (FE) information database 260 might contain the information needed to contact a particular financial entity in conjunction with processing a mobile-payment request.

The mobile-payment database 240 may also include various other data and/or database, as desired or needed, to contain further data used by and/or generated by the MP processing portion 200. For example, the mobile-payment database 240 may contain various data relating to: payment systems, payment associations, payment technology services, coupon related processing, receipt data, VISA, MASTERCARD, AMERICAN EXPRESS, DISCOVER, particular point of sales, and particular point of sale devices including attributes/capabilities of a particular type of phone for example. Such data may be in the form of tables, a relational database or some other arrangement such that the MP processing portion 200 can retrieve and use such data as needed.

As described above, it is appreciated that the mobile-payment system 100 may be used with a wide variety of merchants. For example, the mobile-payment system 100 might be used with any merchant including any restaurant, coffee shop related merchants, and any other quick service related merchants, for example. However, various other merchants may support the mobile-payment system 100 as is desired.

It is appreciated that the mobile-payment database 240 may use a wide variety of database structures and arrangements, such as relational database arrangements. Such database structures and arrangements may be used by the MP processing portion 200 to associate various information and to selectively parse out and use information, as needed, for example. Relatedly, in accordance with one embodiment of the invention, the customer Information database 250 utilizes what is herein characterized as a "customer record table" 252 and an "order record table" 254. Various further details of the tables 252, 254 are described below.

The database 240 further includes the merchant information database 270. The merchant information database 270 includes various information regarding the merchants that participate in the mobile-payment program, such as contact information, menu information (i.e., what items are available through the mobile-payment program), settlement information (e.g. such as particulars relating to ACH and wire transfers), merchant blackouts, and promotion information, for example.

As described above, FIG. 6 is a high level flowchart showing the mobile-payment processing in accordance with one embodiment of the invention. As shown in FIG. 6, the process starts in step 10, with a customer inputting a key sequence into their cell phone. This input sequence constitutes a "customer request" for a "requested, item." Then, after step 30, in step 32, the customer request is sent from the customer device to the MP processing portion 200. The MP processing portion 200 might be disposed in the customer's cell phone. Thus, step 32 would be constituted by the input key sequence (i.e., the data collected them from) being transferred from the cell phone interface portion to the MP processing portion 200, i.e., an internal transfer of data within the cell phone. Then, the process passes to step 34.

In step 34, the MP processing portion 200 processes the customer request. Such processing includes various features as described below. In particular, such processing includes the generation and output of a transaction request to the customer's financial entity, i.e., for approval of the requested transaction. Further, assuming approval of the requested transaction, the MP processing portion 200 then generates and outputs a merchant request, which is sent to the particular merchant from which the requested item is to be purchased. Then, the process passes to step 36. In step 36, the designated merchant receives the merchant request, and effects fulfillment of the customer request for the "requested item." In accordance with one embodiment of the invention, the requested item is prepared and held for pickup at the counter of the particular merchant. In other embodiments, various other arrangements may be made for delivery of the requested item to the customer, i.e., such delivery inclusive of delivery to the customer's home, to the customer's business, and/or delivery to the customer at the merchant's physical place of business, the latter inclusive of the common in-store purchase, for example.

In accordance with an alternative embodiment of the invention vis-à-vis step 34 of FIG. 6, and as described above, the MP processing portion 200 first transmits a merchant request to the merchant system 130, i.e., before communication with the financial entity processing portion 140. Thereafter, the merchant system 130 interfaces with the financial entity processing portion 140 to secure approval for the transaction, i.e., akin to the processing shown in FIG. 4.

Accordingly, in this embodiment, the interaction between the merchant system 130 and the financial, entity-processing portion 140 might be performed in the same manner as traditional transactions, and as a result utilize known and established infrastructure between the merchant system 130 and the financial entity processing portion 140 so as to secure approval from the financial entity processing portion 140 for a requested transaction. In such an embodiment, the merchant would be provided with Information it needs to satisfy the requested order, inclusive of the information needed for the merchant to secure approval of the transaction from the financial entity processing portion 140.

After step 36 of FIG. 6, the process passes to step 38. Step 38 reflects that the customer request is fulfilled. In conjunction with step 38, a communication might be sent to the customer acknowledging such fulfillment of the customer request for the requested item.

As noted above, in accordance with one embodiment of the invention, the customer information database 250 utilizes what is herein characterized as a customer record table 252 and an order record table 254.

FIG. 8 is a diagram showing a customer record table 252 in accordance with one embodiment of the invention. FIG. 9 is a diagram, showing an order record table 254 in accordance with one embodiment of the invention. The tables 252, 254 store various information that is used in processing of a customer request. In particular, the MP processing portion 200 use the tables 252, 254 to map data that is received from a customer device, e.g. a cell phone, into the customer data that is stored, so as to satisfy the customer's request and fulfill delivery of the requested item.

That is, in accordance with one embodiment of the invention, the customer record table 252 of FIG. 8 includes a plurality of customer records 253. Each customer record 253 corresponds to a particular customer. The customer records 253, as well as the records in the order record table 254 may number in the thousands or more. In accordance with one embodiment of the invention, each customer record 253 in the customer record table 252 includes a customer identification (such as a number), one or more customer device identification (such as a number), and one or more "observed events" listing. As used herein, a "number" may include any characters including alphanumeric, for example.

The customer record table 252 also includes a listing of order records 255. In accordance with one embodiment of the invention, a particular combination of customer number, device number, and/or observed event, results (upon the MP processing portion 200 inputting such data) in a particular order record 255 being retrieved for processing. In other words, a particular combination of customer number, device number, and/or observed event (hereinafter characterized as "dictating parameters") is input (by the MP processing portion 200) and the MP processing portion 200 uses such input information (dictating parameters) to map to a particular order record 255. Thereafter, the particular order record 255 is retrieved, and processed so as to fulfill the customer request.

Illustratively, assume that the MP processing portion 200 is physically disposed in a financial entity facility. A customer generates a mobile-payment "customer request" by calling into the mobile-payment portion and entering in a key sequence. In such communication between the customer device 120 and the MP processing portion 200, the MP processing portion 200 also inputs the primary customer identification (C11111), the secondary identification (i.e., the device number—D111), as well as the observed event (key sequence 1234). Using the input information, the MP processing portion 200 maps such information into a particular order record 252, i.e., the order record MP111.

Once the mapping is done, the MP processing portion 200 retrieves the particular order record 255. Thereafter, the transaction request generation portion 220 (in the MP processing portion 200) generates a transaction request 222 based on the information in the order record. The generation of the transaction request 222 includes the transaction request generation portion 220 determining the requested item from the particular retrieved order record 255 and pulling further information (e.g. from stored data) to determine the cost of such item.

As a further example, in accordance with one embodiment of the invention, the MP processing portion 200 receives a communication from a merchant, participating in the mobile-payment program, that includes a customer ID (C22222). The MP processing portion 200 identifies that the communication was indeed received from a merchant. Based on such data and the customer record table 252 for the customer C22222, the MP processing portion 200 maps to Record MP223. Thereafter, the MP processing-portion 200 retrieves such record from the order record table 254. Based on such record, the MP processing portion 200 retrieves the appropriate account number to bill, and forwards such back to the merchant system 130 (assuming that the customer approves the requested transaction, i.e., by interfacing with their customer device 120 to indicate such approval).

FIG. 10 is a diagram showing a transaction request 222 in accordance with one embodiment of the invention. The transaction request 222 includes the customer ID, the account of the customer to be debited, the merchant ID, and the cost debited. Once the transaction request 222 is generated, the transaction request generation portion 220 retrieves data (based on the account number) to forward the transaction request 222 to the appropriate financial entity processing portion 140. Once the transaction request 222 is sent to the determined financial entity processing portion 140, the transaction request generation portion 220 waits for a response. Upon receiving an approval, the transaction request generation portion 220, in accordance with one embodiment of the invention, passes the processing of the particular customer request over to the merchant request generation portion 230. On the other hand, if the transaction is not approved, then the transaction request generation portion 220 takes alternative action, i.e., such as sending a communication to the customer that their request cannot be fulfilled. Such communication might include the reason for disapproval, i.e., such as conveying that there are insufficient funds.

Assuming approval of the requested transaction, the merchant request generation portion 230 then generates a merchant request 232. The merchant request 232 is prepared to convey the needed details of the customer request to the designated merchant, i.e., the merchant that will satisfy the customer request and prepare the requested item for pick-up by the customer.

FIG. 11 is a diagram showing a merchant request 232, in accordance with one embodiment of the invention. In generation of the merchant request 232, the merchant request generation portion 230 pulls (uses) information from both the customer record table 252 and the mapped to order record 255 in the order record table 254. Illustratively, in this example, the merchant request 232 includes the customer ID with customer name, the merchant ID, any promotion information (to be documented by the merchant), the particular requested item, and the delivery instructions. The merchant request 232 might also include payment authorization information if needed, i.e., if the merchant is securing approval from the financial entity processing portion 140 and/or if the merchant is provided the payment authorization information for record keeping purposes.

Once the merchant request 232 is generated, the merchant request generation portion 230 sends the merchant request 232 to the particular merchant. For example, the merchant request generation portion 230 might pull contact information for the merchant from a database (containing such information) based on the merchant ID.

The merchant, upon receiving the merchant request 232, works to satisfy the customer request.

It is appreciated that FIG. 8 and FIG. 9, as described above, reflect one methodology that may be used to input a customer request, such as a key sequence or other event, and map that event to information so as to fulfill the customer request. However, other approaches may be used to associate data input from the customer with information—so as to fulfill the customer request that such input data reflects. In particular, other arrangements of relational databases might be utilized to map or otherwise associate information input from a customer with the information needed to satisfy a customer request.

Further, it is appreciated that different data may be used and/or needed, to map to a particular order record in the order record table 254. For example, in accordance with one embodiment of the invention, the MP processing portion 200 is physically disposed in the customer's device, e.g. in the customer's cell phone. In such embodiment, the customer might enter an initial key sequence to reflect that the customer is initiating a mobile-payment request. Thereafter, the MP processing portion 200 would be activated and looking for input of a key sequence from the customer. Once the MP processing portion 200 receives such key sequence (i.e., out of a plurality of possible key sequences), the MP processing portion 200 proceeds in processing the mobile-payment request. That is, the customer device need not transmit customer ID information or device Id information to the MP processing portion 200, since the MP processing portion 200 indeed only receives mobile-payment requests from such device, i.e., the MP processing portion 200 is dedicated to and physically resides in the customer device 120. Accordingly, the information needed to be sent between and stored within either the customer device 120 and the MP processing portion 200 may vary depending on the particular arrangement.

In accordance with one embodiment of the invention, using a suitable user interface, the parameters (or at least some of the parameters) in the order record table 254 may be changed by the customer, an administrator, a merchant, some other person/entity or changed in some automated manner, for example. For example, it is envisioned that promotion parameters might be changed in some global manner, i.e., so as to globally change all order record tables 254 affected by the change to a merchant's promotion, for example. Alternatively, promotion information, as well as pricing information, might be pulled from an associated table based on the merchant ID and the requested item, for example. The customer also would be able to change their favorites and/or the particular key sequence or other observed event that such favorite is associated with. Such change might be performed by varying mapping, pointers, or some other association in a relational database, for example.

In accordance with one embodiment of the invention, the parameters associated with a customer's profile (such as preferences) may be dynamically changed. Such profile information may be stored using the order record table 254, for example.

For example, the MP processing portion 200 may observe trends of a customer and dynamically vary the customer's profile based on such trends. Accordingly, the parameters associated with a customer's profile may be changed based on preferences of the customer and/or prior behavior of the customer. In one scenario, a customer may have designated their favorites for MCDONALDS. Based on attributes associated with the customer's chosen favorites, the MP processing portion 200 tracks those attributes into products at other restaurants. The attributes might be based on similarity between two compared products, and in particular similar values or designations of parameters representative of the properties of such compared products. Thus, for example, a low calorie salad at MCDONALDS may be tracked to a low calorie salad at BURGER KING. Accordingly, upon being prompted by the user going to BURGER KING, the MP processing portion 200 is provided with the capability to generate a list of the customer's favorites at BURGER KING. In this manner, the MP processing portion 200 essentially extrapolates preferences and/or trends observed at one merchant over to another merchant, and in particular the menu of another merchant. Such processing may include the use of corresponding dynamic icons to interface with the customer via their customer device 120. Such icons might be used to alert the customer that the favorites were generated based on their purchase at other merchants and in general guide the customer through a purchase experience using the extrapolated information.

In accordance with a further scenario, it may be the case that the customer generally super-sizes their order at MCDONALDS. Accordingly, in favorites posed to the customer when the customer goes to BURGER KING, the MP processing portion 200 may propose larger-sizing the customer's selection. In accordance with one embodiment of the invention, and as alluded to above, such analysis may be performed by assigning values to item attributes, and then comparing those values to assess similarity, such as between products from different stores. With reference to FIG. 9, as reflected in the first customer record 253, in the customer record table 252, (i.e., customer record for customer C11111), customer requests from different devices of the customer and/or customer requests based on different observed events may be mapped into the same order record. That is, illustratively, for the customer record C1111 as shown in FIG. 8, a customer request from any of: key sequence 1234 in customer device 1; key sequence 1234 in customer device 2, and customer device 1 in location L10, will all track into order record MP111. Thus, for any of such observed events, the MP processing portion 200 processes a customer request using such order record 255. In general, the MP processing portion 200 uses the dictating parameters, as input from the customer, to map to a particular order record 255.

As described above, in accordance with one embodiment of the invention, a user interfaces with the customer device 120 using a "key sequence" entered into the customer device by the user. However, it should be appreciated that the user may interface with their customer device 120 in any of a wide variety of ways, depending in particular on the capabilities of the device and/or what software applications are utilized by the customer device 120 to interface with the user. Accordingly, for any of the functionalities described herein (including those described in the context of using a key sequence), the customer device 120 might interface with the user using any of key sequence, presentation of icons or other graphical representation, touch screen, voice recognition, a device utilizing textile features, LED (light-emitting diode) enabled device, push notification enabled device, media message enabled device and/or any other type of user interface that allows the user to communicate information to and from the customer device 120. For example, in accordance with one embodiment Of the invention, the customer device 120 might present, a first icon (reflecting an option to purchase their favorite coffee at their favorite store), a second icon (reflecting an option to purchase their second favorite coffee at their favorite store), and a third icon (reflecting an option to purchase their favorite coffee at their second favorite store). The icons might be associated with the letters A, B, and C, respectively, such that the customer makes their selection by entering either A, B or C into their key pad on the customer device 120. Accordingly, "A" might designate selecting the coffee of the day at STARBUCKS, and "B" indicate selecting a latte with blueberry muffin at DUNKIN DOUGHNUTS.

FIG. 12-FIG. 17 are screen captures, i.e., screen shots, showing interfaces of mobile-payment processing (which may also be characterized as remote ordering processing and/or myorder processing) in accordance with embodiments of the invention. The information presented in the illustrated interfaces may be generated by the MP processing portion 200 and/or pulled from a further resource, so as to be displayed on the customer device 120.

Figure 12:
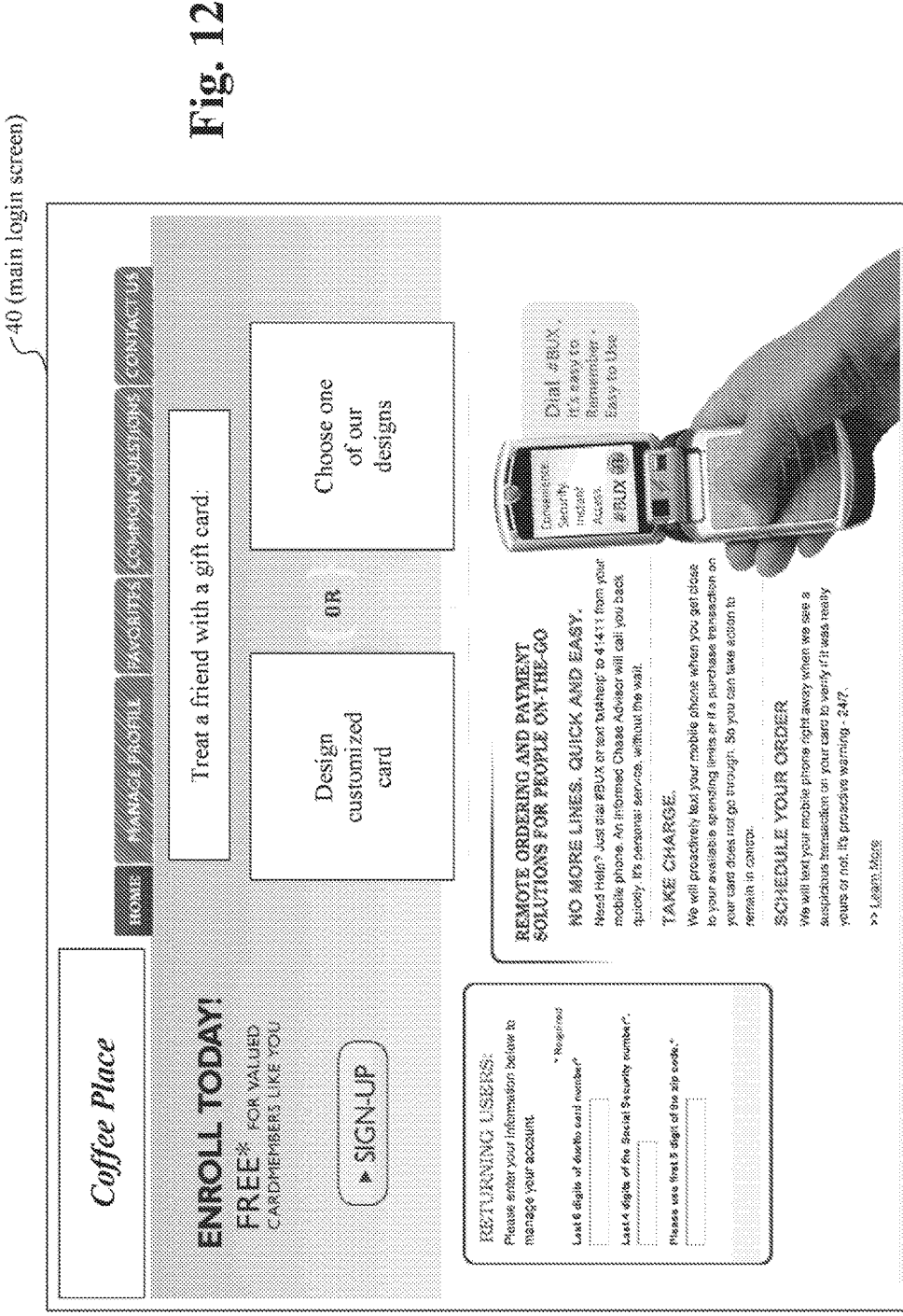
FIG. 12 is a screen capture including an interface showing introductory information to the mobile-payment processing in accordance with one embodiment of the invention.

FIG. 12 is a screen capture including an interface 40 showing introductory information to the mobile-payment, processing. In particular, FIG. 12 provides for initial sign-up of a customer, as well as a dialogue box that returning customers may use to access their account. FIG. 12 also presents introductory information regarding the mobile-payment processing.

Figure 13:
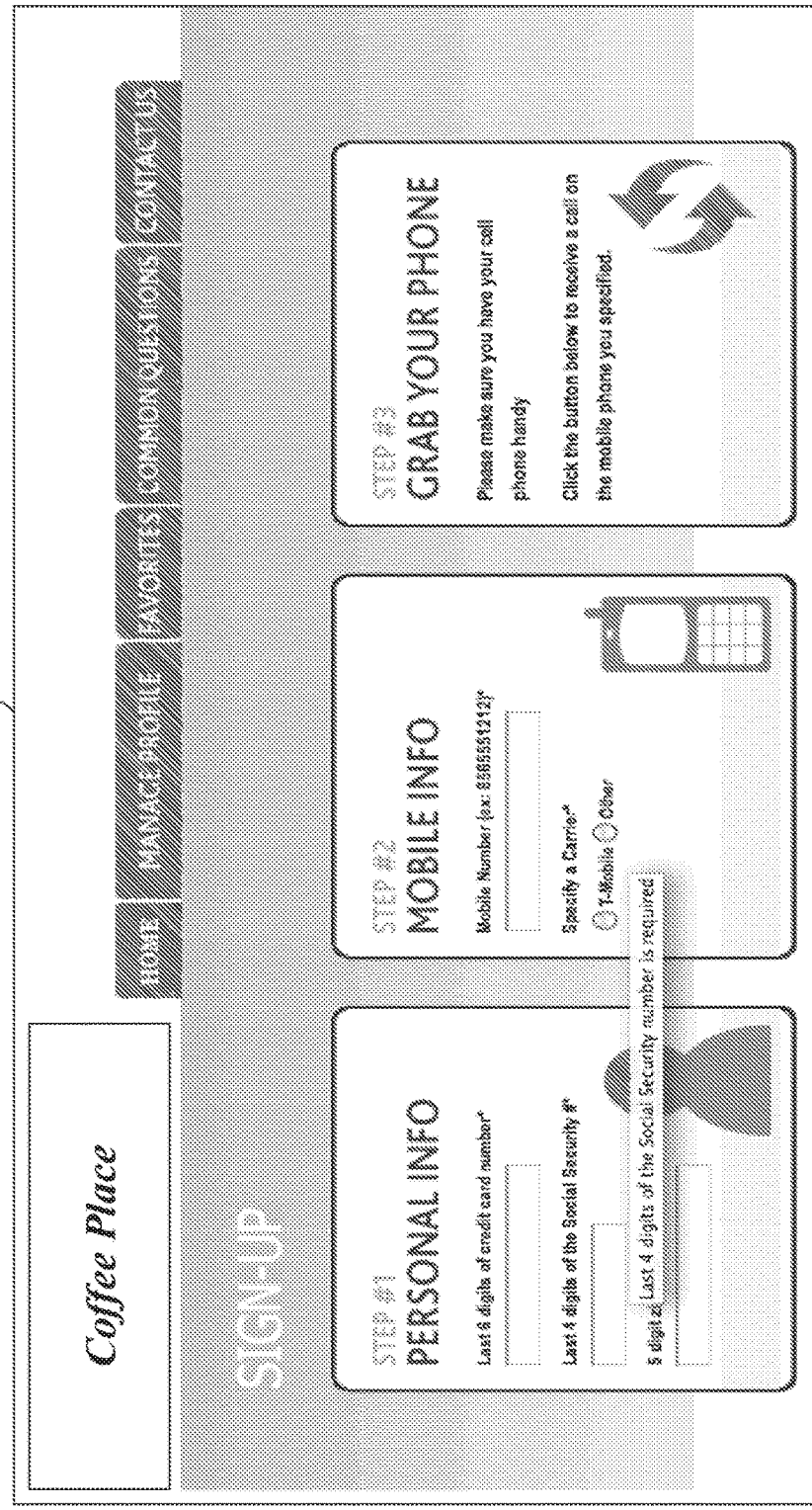
FIG. 13 is a screen capture including an interface showing an interface to sign-up a customer in accordance with one embodiment of the invention.

FIG. 13 is a screen capture including an interface 41 showing an interface to sign-up a customer. The interface gathers information from the customer including personal information and mobile information. Once the initial information is entered via the interface 41, the customer with then be prompted to enter further information.

It is appreciated that in general the information as shown in FIGS. 12-17 may be presented through a variety of user interfaces as generated by the devices described herein.

Figure 14:
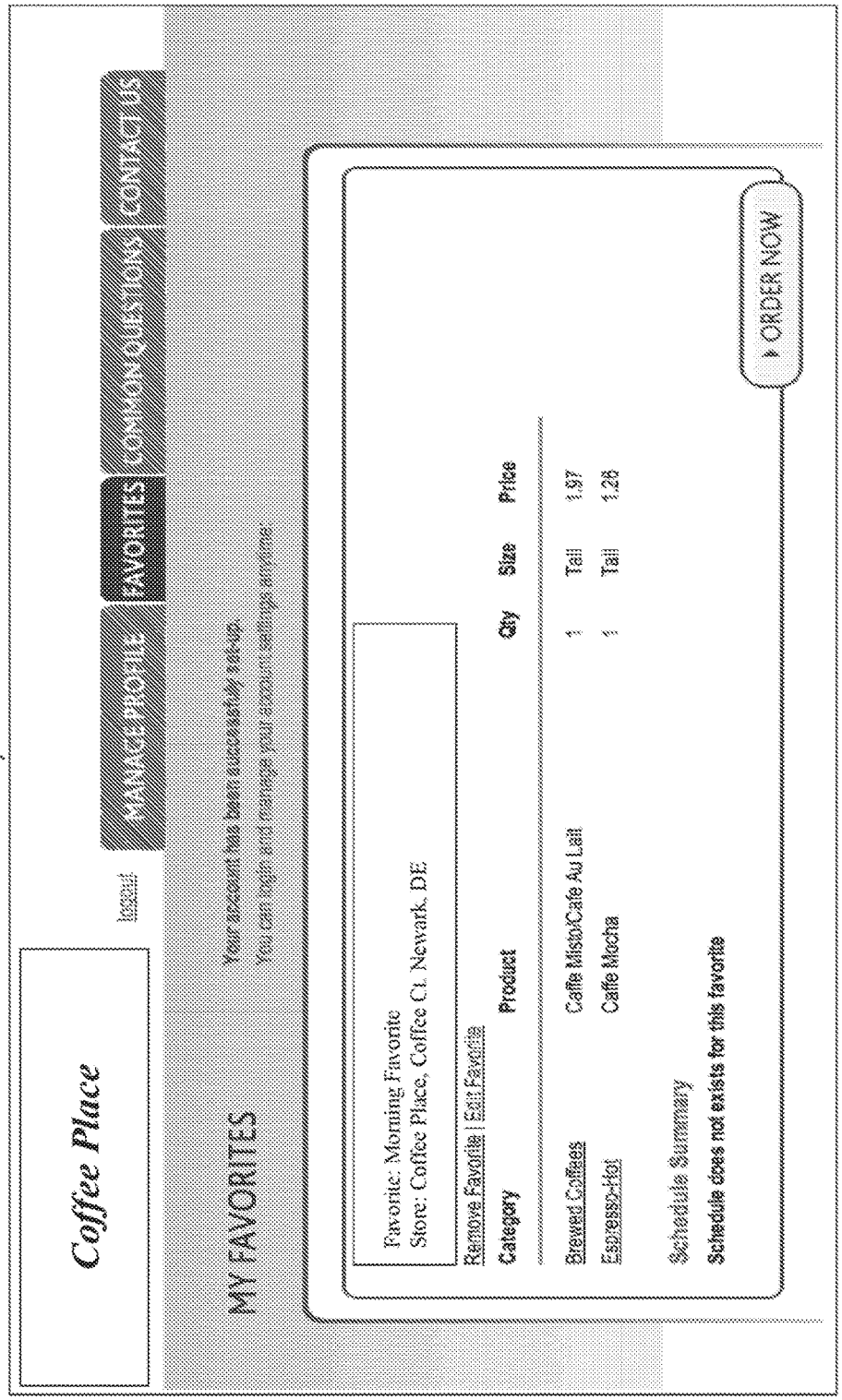
FIG. 14 is a screen capture including an interface reflecting that the customer has successfully set op their account, and showing "favorites" that the user has selected in accordance with one embodiment of the invention.

In particular, FIG. 14 is a screen capture including an interface 42 reflecting that the customer has successfully set up their account, and showing "favorites" that the user has selected. More specifically, the interface 42 allows the customer to edit their "favorite" selections and to order if the customer desires.

Figure 15:
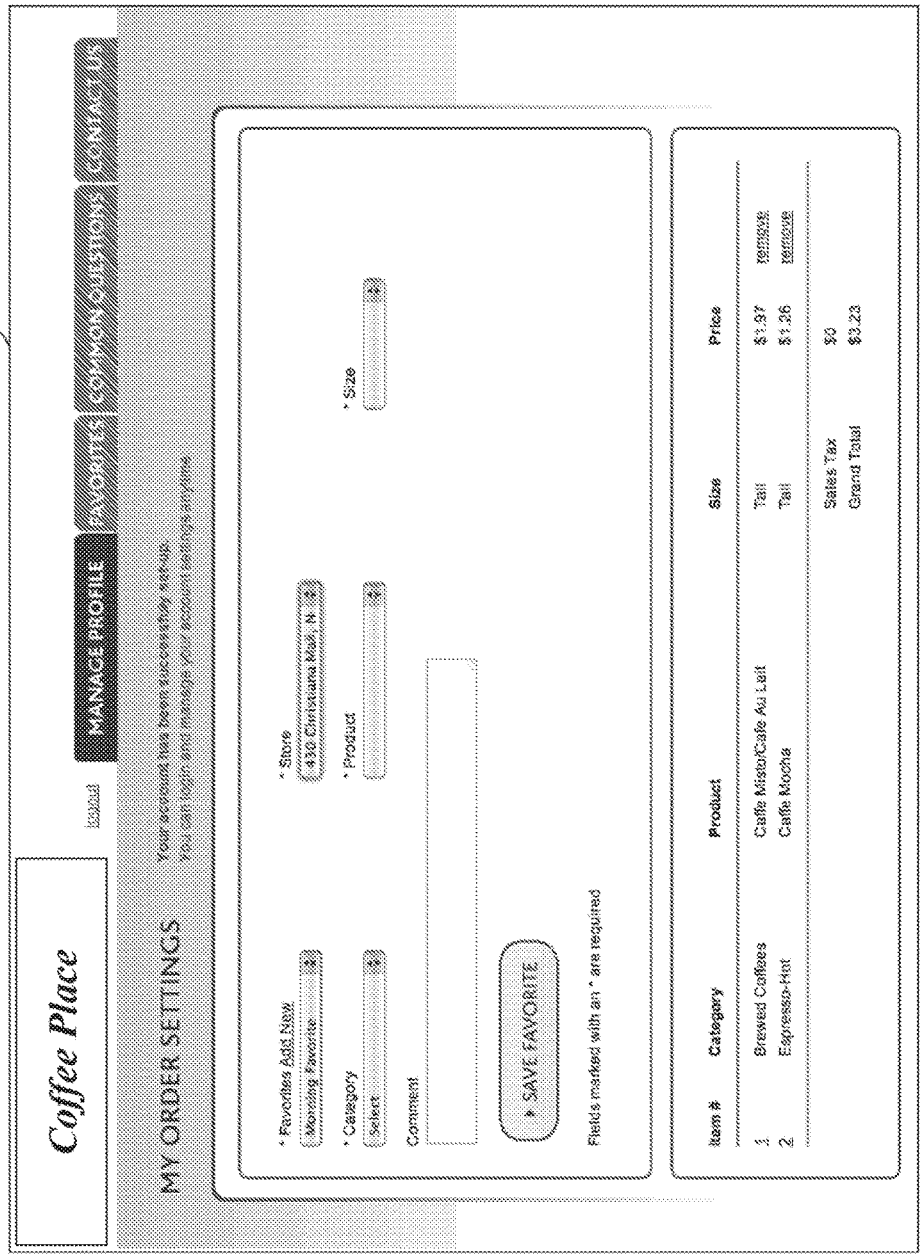
FIG. 15 is a screen capture including an interface that, provides the customer adjustment to the mobile-payment settings in accordance with one embodiment of the invention.

FIG. 15 is a screen capture including an interface 43 that provides the customer adjustment to the mobile-payment settings. The interface 43 allows a customer to add new favorites, and associated parameters, as well as to specify a particular store location. The interface 43 also presents the user with, a listing of the favorites that the user has selected.

Figure 16:
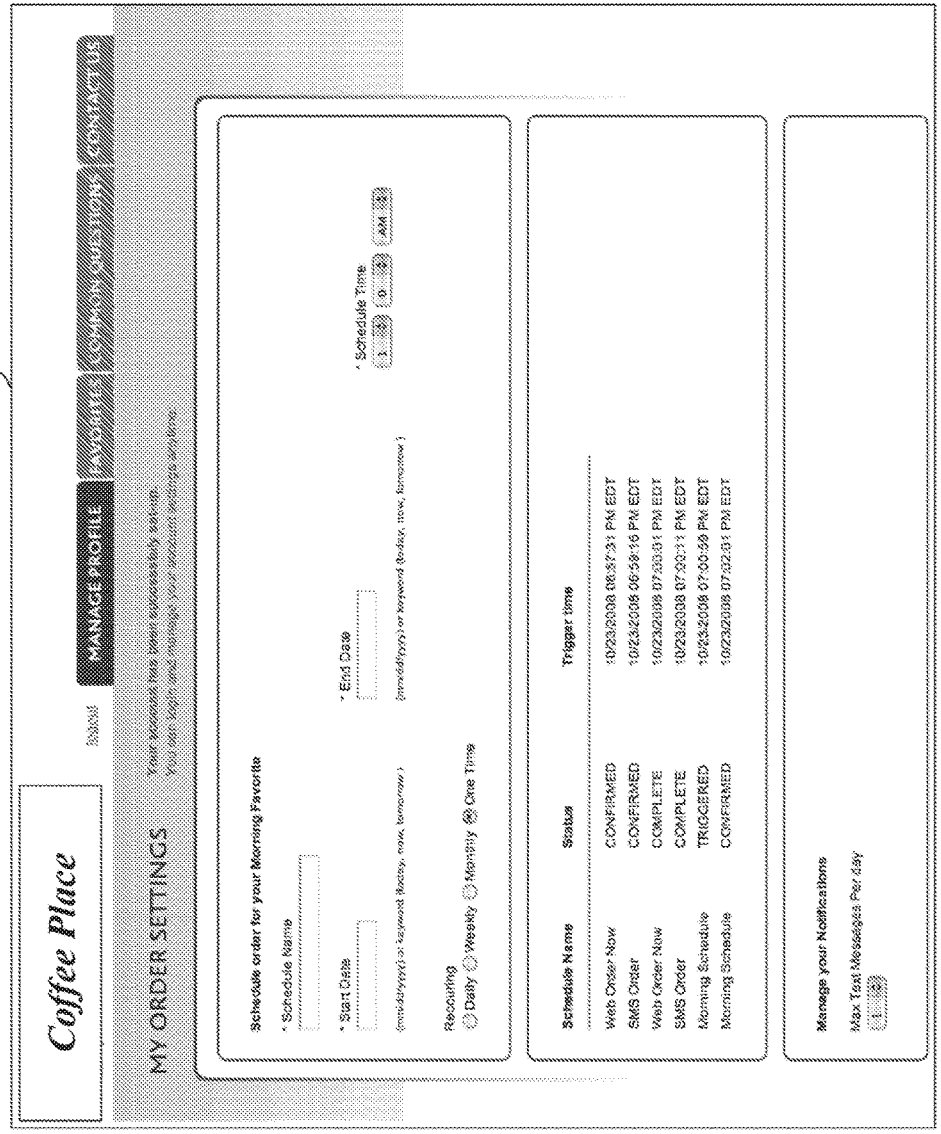
FIG. 16 is a screen capture including an interface that provides the customer with a scheduling screen in accordance with one embodiment of the invention.

FIG. 16 is a screen capture including an interface 44 that provides the customer with a scheduling screen. The interface 44 allows the customer to schedule orders and to set up trigger events. For example, in accordance with embodiments of the invention, the interface 44 might allow the customer to schedule a particular time for pick-up of a requested item, order using a particular key sequence via a cell phone or PDA, order via a web interface, select an order based on GPS position of the customer, and/or associate time parameters with such order.

In accordance with one embodiment of the invention, the mobile-payment system 100, e.g. the MP processing portion 200 may include data to present the user with template schedules. Such template schedules might include any of a wide variety of common regimes for customers, such as 8 am coffee every weekday, and 9 am coffee on Saturdays, for example. The templates might be presented to the user so as to be variable, i.e., the user could adjust the templates proposed 8 am time to 7 am, for example. The template schedules might be selected (out of a plurality of presented template schedules) via the user's selection of a radio-button, for example. The template schedules might be customized in any of a variety of ways, such as customized for open times of a particular store, customized for a particular time, for example. Further, the mobile-payment system 100 may provide for a first customer's schedule to be linked to another customer's calendar, i.e., the two customers' schedules might synch with each other or in some other manner talk with each other. Such processing might utilize GOOGLE CALENDAR technology, for example. Alternatively, a user might manually enter in their schedule using an appropriate interface. In general, it is appreciated that a customer's ordering regime may be integrated into their calendar, the merchant's calendar, or any other electronic calendar, as desired.

Further, FIG. 17 is a screen capture showing a "barista fulfillment queue" interlace 45, in accordance with one embodiment of the invention. The interface 45 is presented to the merchant in response to a mobile-payment being placed by the customer. The interface 45 presents various particulars of the placed order including the customer name, the particular item purchased and the time that the mobile-payment was received. It is appreciated that the particular content the of the interface 24 may be varied, as desired.

Further, as described above, the content shown in FIG. 17 may alternatively be printed on a tab to be attached to the customer's requested item, e.g. a sticky tab affixed to the customer's coffee drink as described above.

As shown in FIG. 17, the data presented may also include particulars of the order of the merchant for that day, i.e., "confirmed" orders meaning that customers were notified of their pending order and indicated they indeed wanted their scheduled order on that particular day; "completed" meaning that the order was indeed delivered to the customer; "canceled" meaning that the customer canceled their order; "expired" meaning that the customer never picked up their order (or never confirmed their order—where confirmation was required); and "waiting" indicating that the order is ready for pick-up by the customer. However, it is appreciated that any of a wide variety of metrics may be captured and presented to the merchant, as is desired, i.e., so as to assist the merchant in their workflow.

Various further aspects of FIG. 12-FIG. 17 are described further below.

Hereinafter, further details of the mobile-payment processing are described with reference to the flowcharts of FIGS. 18-30, in accordance with embodiments of the invention.

Figure 18:
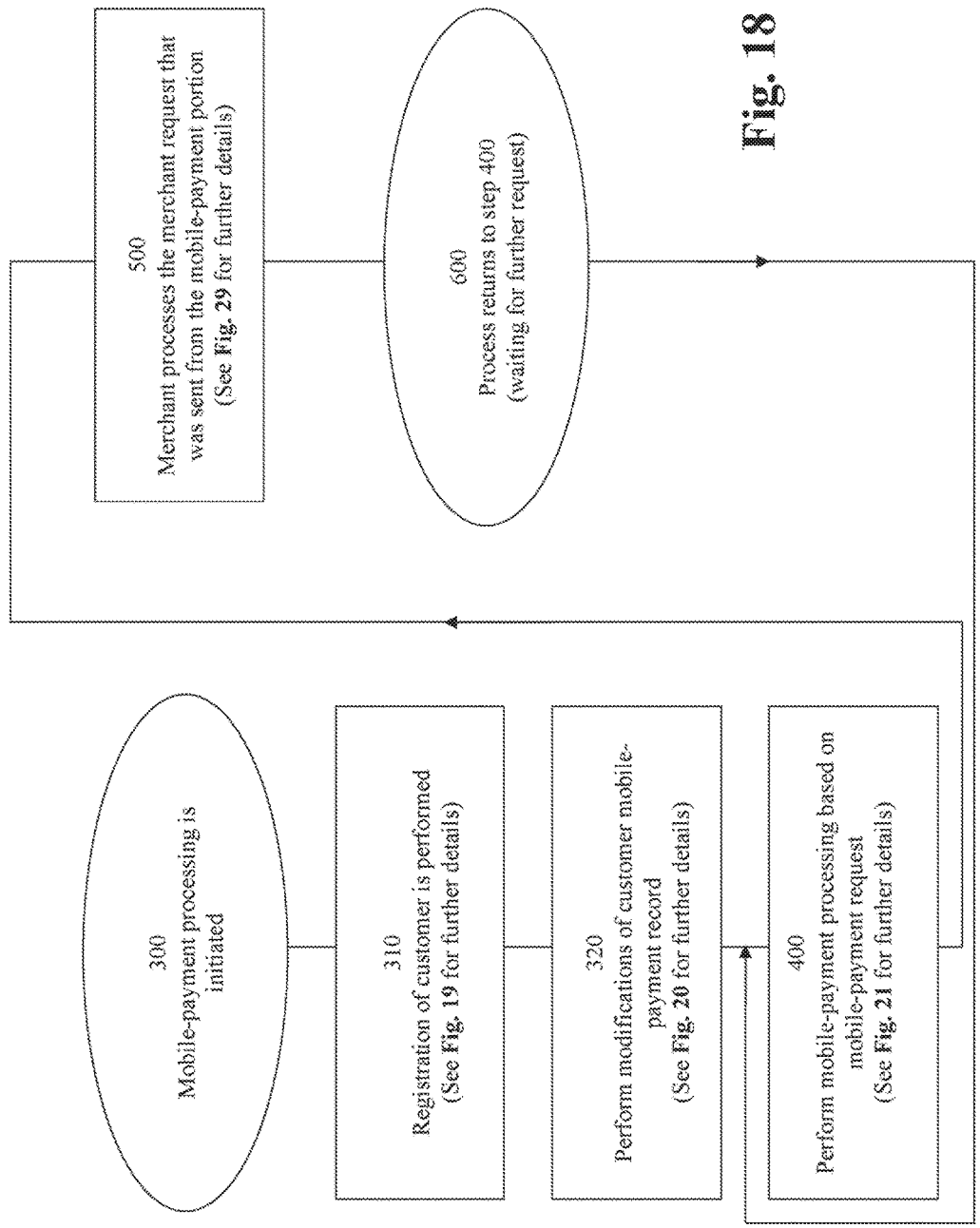
FIG. 18 is a further high level flowchart showing details of the mobile-payment processing in accordance with one embodiment of the invention.

FIG. 18 is a further high level flowchart showing details of the mobile-payment processing in accordance with one embodiment of the invention.

Illustratively, the process starts in step 300 of FIG. 18 in which mobile-payment processing is initiated. After step 300, the process passes to step 310. In step 310 registration of the customer is performed. Further details of step 310 are described below with reference to FIG. 19. Then, as shown in FIG. 18, the process passes to step 320. In step 320 modifications of the customer mobile-payment record are performed. For example, modifications of the customer mobile-payment record may be performed upon a customer request, upon an administrators request, or due to some other triggering event. Further details of the processing of step 320 are described below with reference to FIG. 20. Then, the process passes to step 400.

In step 400 of FIG. 18, mobile-payment processing is performed based on a mobile-payment request that was received from the customer. Various details of such mobile-payment processing are described below with reference to FIG. 21. After step 400, and after a merchant request is sent from the mobile-payment portion to a merchant, as described below, the process passes to step 500. In step 500, the merchant (that received the request) processes the merchant request that was sent from the mobile-payment portion. Further details of such processing are described below with reference to FIG. 29. Then, after step 500 of FIG. 18, the process passes to step 600.

In step 600, the process returns to step 400 of FIG. 18, and waits for further requests, i.e. further requests from the customer.

Figure 19:
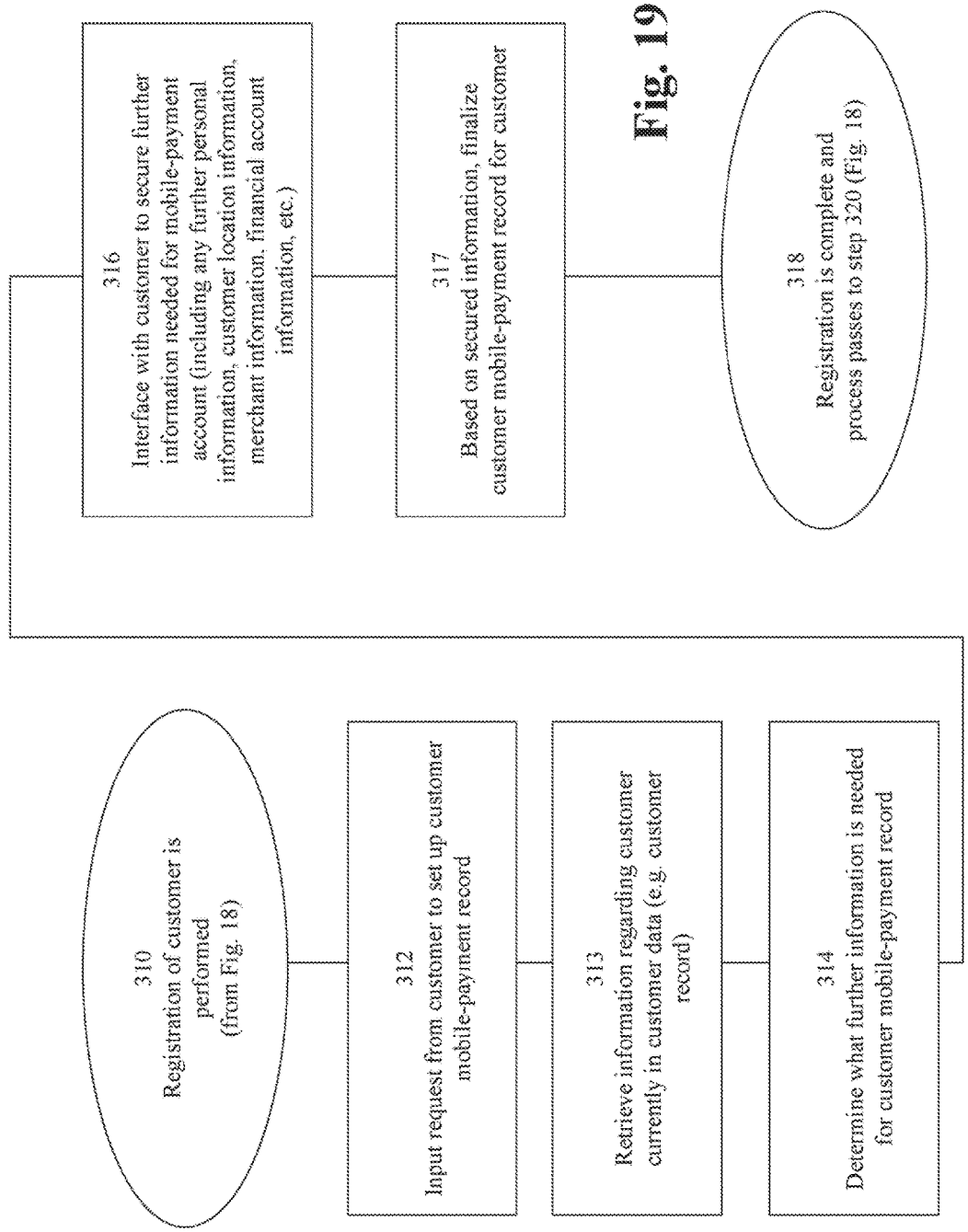
FIG. 19 is a flowchart showing details of the registration of the customer in accordance with one embodiment of the invention.

FIG. 19 is a flowchart showing details of the registration of the customer step 310, in accordance with one embodiment of the invention. As shown in FIG. 19, the process starts in step 310 and passes to step 312. In step 312, an input is requested from the customer to set up a customer mobile-payment account including a customer record. Then, in step 313, the mobile-payment portion (i.e., the MP processing portion 200) retrieves information regarding the customer that is currently in the customer data which the financial institution supporting the mobile-payment portion already possesses. That is, for a customer having a current payment account, available information that was relevant to the mobile-payment portion would be retrieved. In other words, the customer may be a current customer with some other type of payment account, such as simply a savings account, for example. The MP processing portion 200 may then retrieve customer information (associated with the prior payment account or any other account) so as to set up the new customer mobile-payment account. Then, in step 314, a determination is made what further information is needed to set up the customer mobile-payment record for the customer mobile-payment account.

Then in step 316, the system interfaces with the customer to secure such further needed information including any further personal information, customer location information, merchant information, and financial account information, as well as a wide variety of other information used in the processing of the mobile-payment processing portion. Then, the process passes to step 317, in which the mobile-payment processing portion, based on the information secured from the financial entity's database and from the customer, finalizes the customer mobile-payment record for the customer.

After step 317 of FIG. 19, the process passes to step 318. In step 318, the registration is complete and the process passes to step 320 of FIG. 18, i.e., the process returns to FIG. 18.

Figure 20:
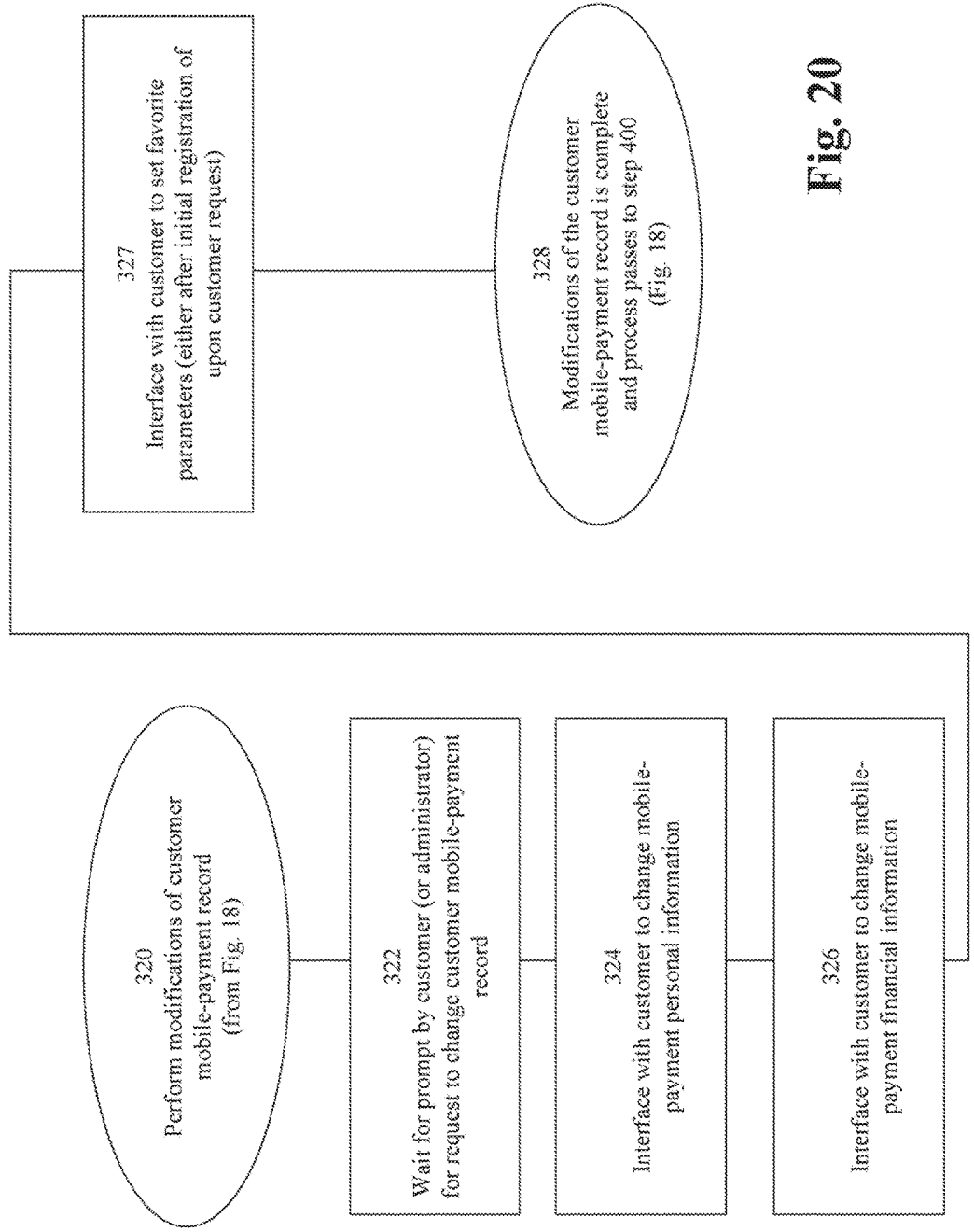
FIG. 20 is a flowchart showing in further detail the perform modifications of customer mobile-payment record step in accordance with one embodiment of the invention.

FIG. 20 is a flowchart showing in further detail the perform modifications of customer mobile-payment record step 320 (from FIG. 18) in accordance with one embodiment of the invention. The process of FIG. 20 starts in step 320 and passes to step 322. In step 322, the process waits for a prompt by the customer for a request to change the customer mobile-payment record. Alternatively, a prompt might be received from an administrator or in general a system prompt may be received to trigger a modification of the customer mobile-payment record. For example, the system might modify the customer mobile-payment record based on some observed event or criteria. After step 322 of FIG. 20, the process passes to step 324. In step 324, the system interfaces with the customer to change mobile-payment personal information. Further, the system may interface with a customer in step 326 to change the mobile-payment financial information. It should be appreciated that any a variety of information might be changed. Step 327 reflects that the customer may interface with the systems to set favorite parameters i.e. such as key sequences to represent their personal favorites. Note that this may be done, and routinely is done, after registration as well as in due course through the life of the mobile-payment account.

Step 328 of FIG. 20 reflects that modifications of the customer mobile-payment record are complete and the process passes to step 400 of FIG. 18.

Figure 21:
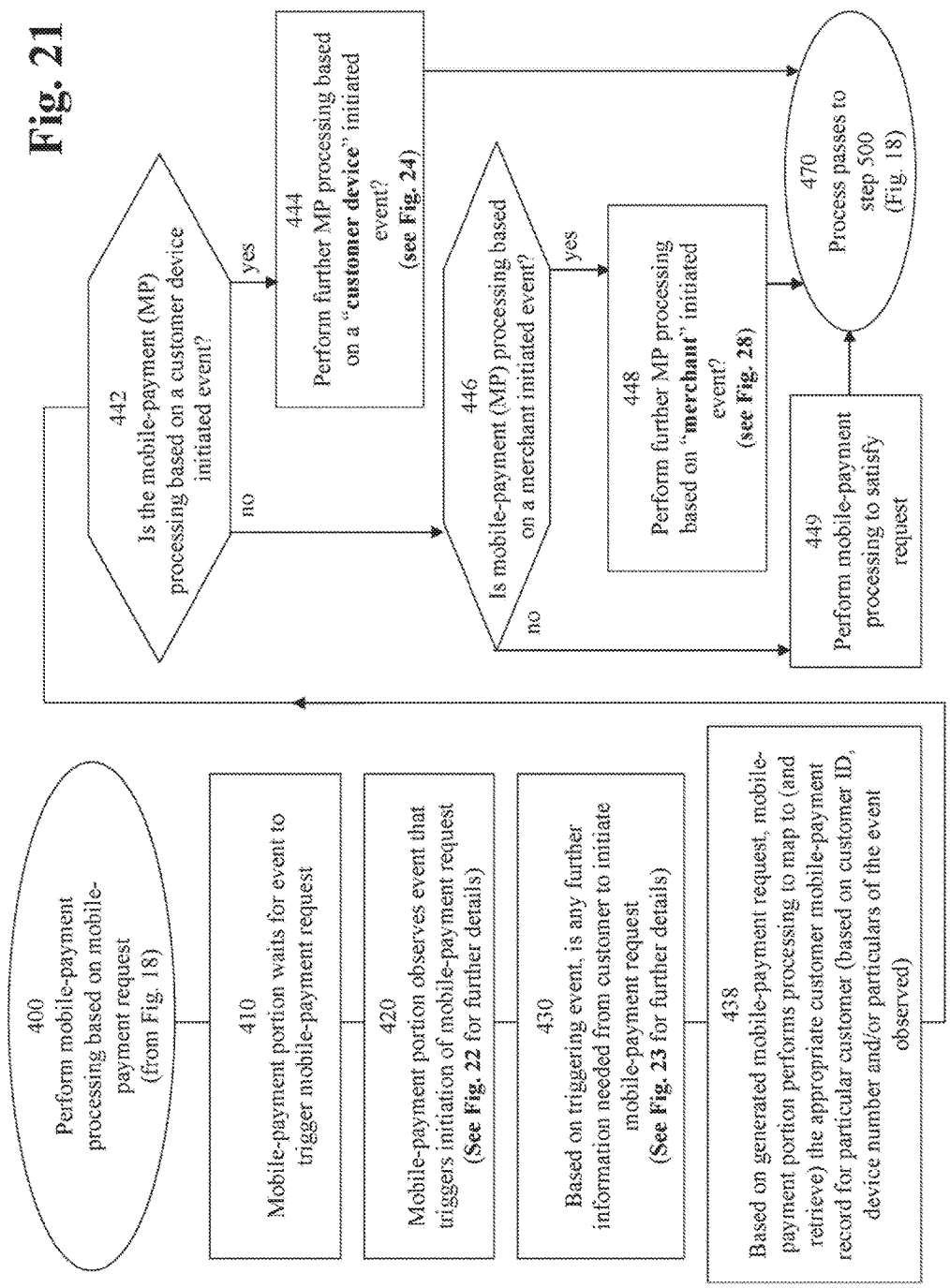
FIG. 21 is a flowchart showing further detail the perform mobile-payment processing based on mobile-payment request in accordance with one-embodiment of the invention.

FIG. 21 is a flowchart showing further detail the perform mobile-payment processing based on mobile-payment requests (from FIG. 18) in accordance with one embodiment of the invention. As shown in FIG. 21, the process starts in step 400 and passes to step 410. In step 410, the mobile-payment portion 200 waits for an event to trigger a mobile-payment request. Upon an event being observed, the process passes to step 420. In step 420, the mobile-payment portion inputs the event that triggered the initiation of a mobile-payment request. Further details of step 420 are described below. Then, in step 430 of FIG. 21, the system, based on the triggering event, determines if any further information is needed from the customer to initiate and process the mobile-payment request. Further details of step 430 are described below.

After step 430, the process passes to step 438 of FIG. 21. In step 438, the system, based on the information received in the generated mobile-payment request, performs processing to map to and retrieve the appropriate corresponding order record 254 for the particular customer. This mapping may be based on any suitable criteria as described herein, and in particular, for example, based on the customer ID, the device number that the customer is using, and/or particulars of the event observed. For example, it might be that a particular key sequence is unique to a particular customer. In accordance with one embodiment of the invention, the system maps to the particular order record 254 (as described above) based on all of the customer ID, the device number as well as the particulars of the event observed.

After step 438, of FIG. 21, the process passes to step 442. In step 442, the MP processing portion 200 determines if the mobile-payment request is based on a customer device initiated event. If yes, then the process passes to step 444. In step 444, the MP processing portion 200 performs further mobile-payment processing to satisfy the request. Further details of step 444 are described below with reference to FIG. 24.

On the other hand, if NO in step 442, i.e., the mobile-payment processing is not based on a customer device initiated event, then the process passes to step 446.

In step 446, the MP processing portion 200 determines if the mobile-payment request is based on a merchant initiated event. If yes, then the process passes to step 448. In step 448, the MP processing portion 200 performs further mobile-payment processing to satisfy the merchant initiated request. Further details of step 448 are described below with reference to FIG. 28.

On the other hand, if NO in step 446, i.e., the mobile-payment processing is not based on a merchant initiated event, then the process passes to step 449.

Step 449 of FIG. 21 reflects the situation that a mobile-payment request is not customer device initiated, nor merchant (system) initiated. That is, in accordance with some embodiments of the invention, another entity, such as financial entity or some other third party, might initiate a requested mobile-payment transaction. In such scenario, such other party, while initiating, i.e., driving, the transaction, would ultimately communicate with either the customer device 120 or the merchant system 130 to effect the transaction. At such point, in accordance with one embodiment of the invention, such might then be deemed either a customer device initiated transaction or a merchant, initiated transaction, so as to trigger either step 442 or step 446 of FIG. 21.

After any of steps 444, 448, or 449, the processing of FIG. 21 passes to step 470. In step 470, the process passes to step 500 of FIG. 18.

Figure 22:
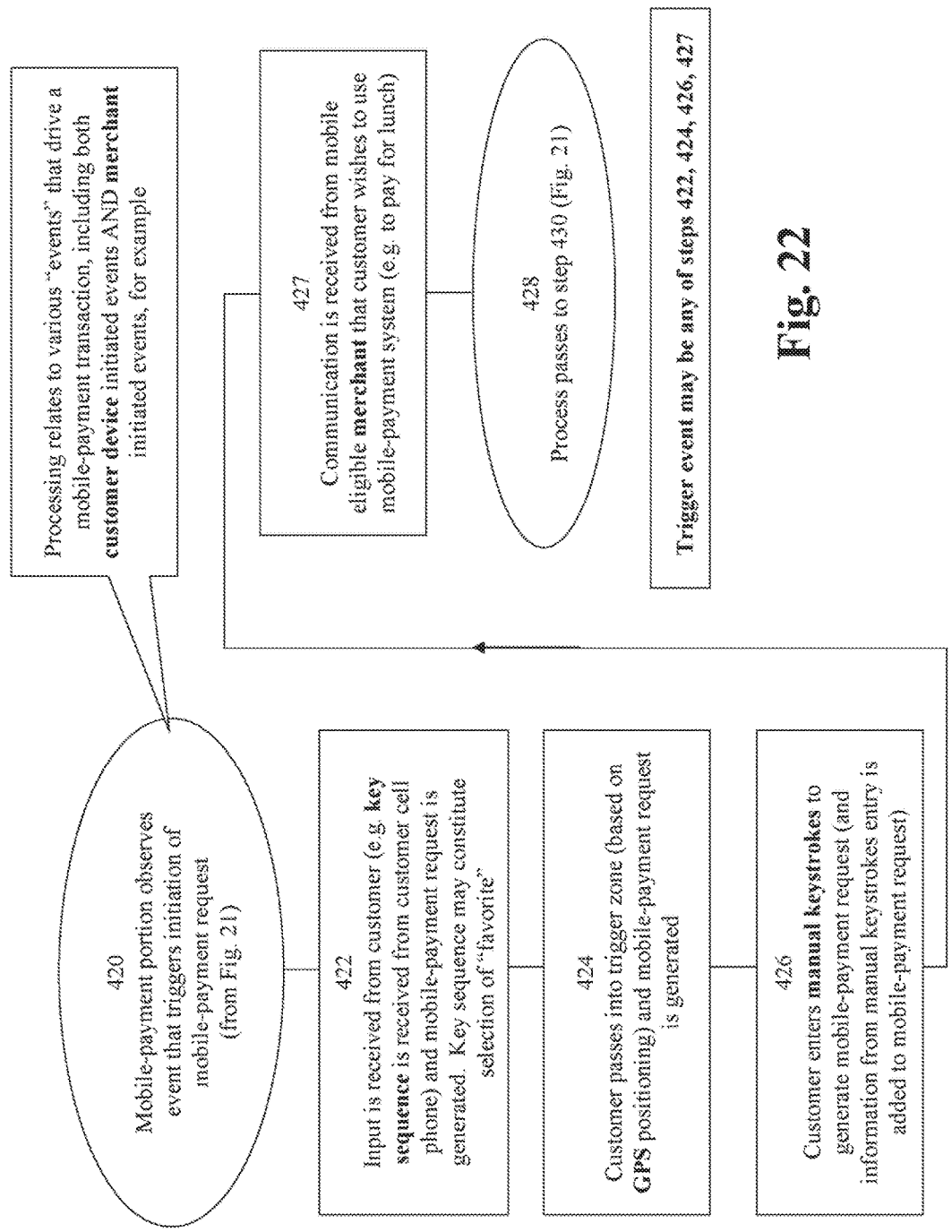
FIG. 22 is a flowchart showing in further detail the mobile-payment portion observes an event that triggers the initiation of a mobile-payment request in accordance with one embodiment of the invention.

FIG. 22 is a flowchart showing in further detail the mobile-payment portion observes an event that triggers the initiation of a mobile-payment request. As shown in FIG. 22, the process starts in step 420, and passes to step 422. In step 422, an input is received from the customer. For example, a key sequence may be received from the customer's cell phone and as a result, a mobile-payment request is generated. In accordance with one embodiment of the invention, the key sequence may constitute the selection by the customer of one of the customer favorites. For example, the key sequence 1, 2, 3, 4 may correspond to a large vanilla latte being ordered by the customer. However, FIG. 22 reflects other types of trigger events. For example, as shown in step 424, the customer may pass into a trigger zone such that the mobile-payment request is generated. For example, the location of the customer's cell phone vis-à-vis a trigger zone may utilize global positioning technology (GPS), so as to trigger a mobile-payment. Further, step 426 reflects that the customer may enter manual key strokes to generate their mobile-payment request. Any information obtained from the manual key strokes entered by the customer would be added to the mobile-payment request for subsequent processing. For example, step 426 reflects that the user might interface with a menu screen, e.g. a touch screen, so as to advance through various categories and selections of items.

After step 426 of FIG. 22, the process passes to step 427. Step 427 reflects a trigger event constituted by a communication received from, a merchant. That is, step 427 is the case that a communication is received from mobile eligible merchant—with which the customer wishes to use the mobile-payment system (e.g. to pay for lunch).

After step 427 of FIG. 22, the process passes to step 428. In step 428, the process passes to step 430 of FIG. 21. Any other trigger event may be utilized as desired, in addition to those set forth in FIG. 22.

Figure 23:
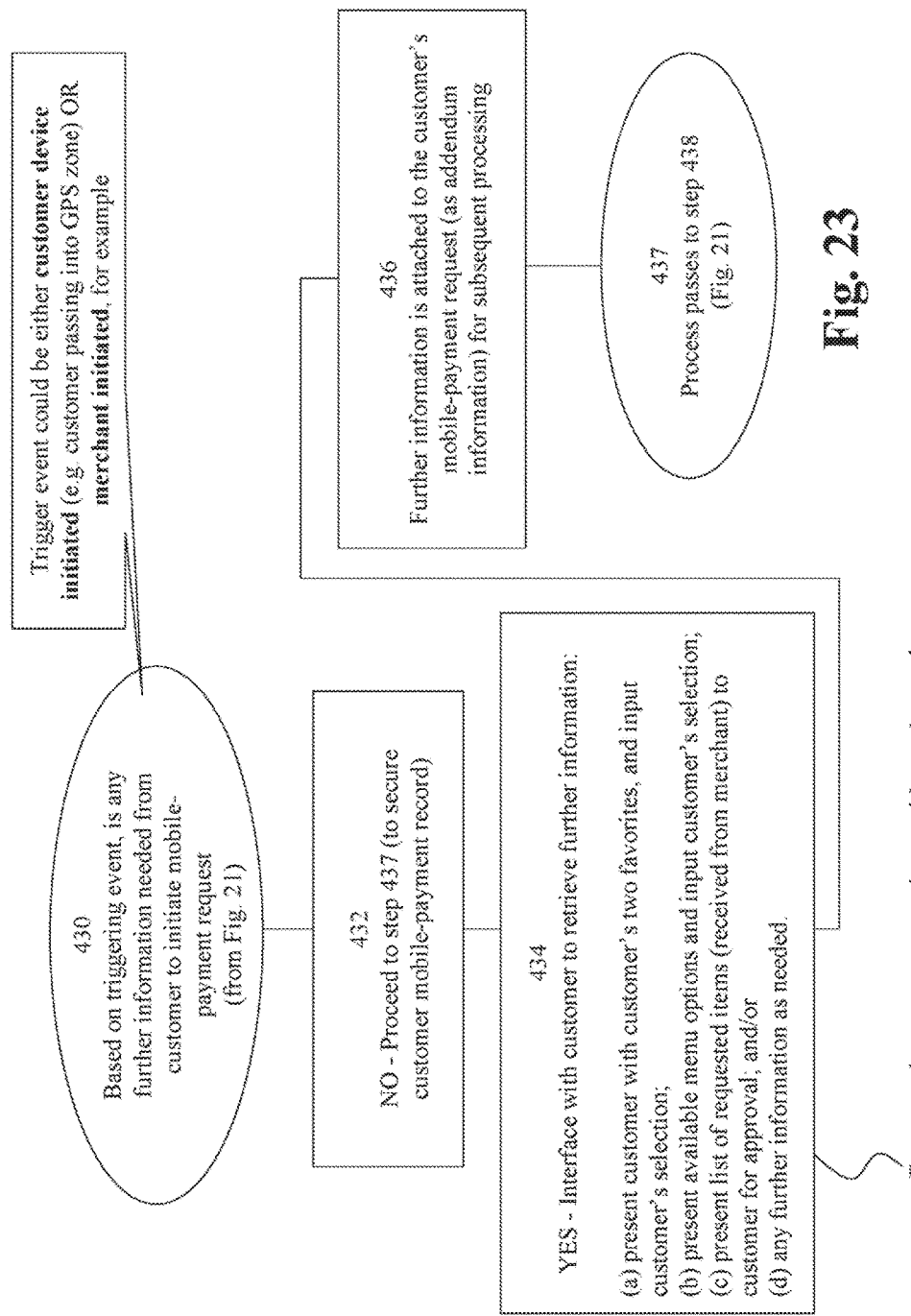
FIG. 23 is a flowchart showing in further detail the determination performed by the mobile-payment processing portion of whether, based on the triggering event, any further information is needed from the customer to initiate and process the mobile-payment request in accordance with one embodiment of the invention.

FIG. 23 is a flowchart showing in further detail the processing of FIG. 21, i.e., the determination performed by the mobile-payment processing portion of whether, based on the triggering event, any further information is needed from the customer to initiate and process the mobile-payment request. Step 432 reflects that no further information is needed, and the process passes directly to step 437 of FIG. 23. Then, in step 437, the process passes to step 433 of FIG. 21.

Alternatively, step 434 reflects that further information is needed, and the MP processing portion 200 interfaces with, the customer to secure such further information. For example, the processing to secure the further information might be constituted by any of (a) presenting the customer with the customer's two (or more) favorites, and input the customer's selection; (b) presenting available menu options and input customer's selection; (c) presenting a list of requested items (received from merchant) to the customer for approval; and/or (d) any other information as needed. Such scenario (c) may relate to the situation in which the customer is physically seated in the restaurant and is using the mobile-payment system to pay for lunch, for example.

In accordance with one embodiment of the invention, the mobile-payment processing as described herein might be used in a bar environment, i.e., where a tab is initially opened and requested items are attributed to the tab in an ongoing manner. As reflected in FIG. 23, it is appreciated that the customer experience with running a tab at the bar could utilize all of step 434(*a*), 434(*b*), and 434(*c*).

After step 434 of FIG. 23, in step 436, the further information is attached to the customer's mobile-payment request (as addendum information, e.g.) for subsequent processing. After step 436, the process passes to step 437, and passes to FIG. 21 as discussed above.

Figure 24:
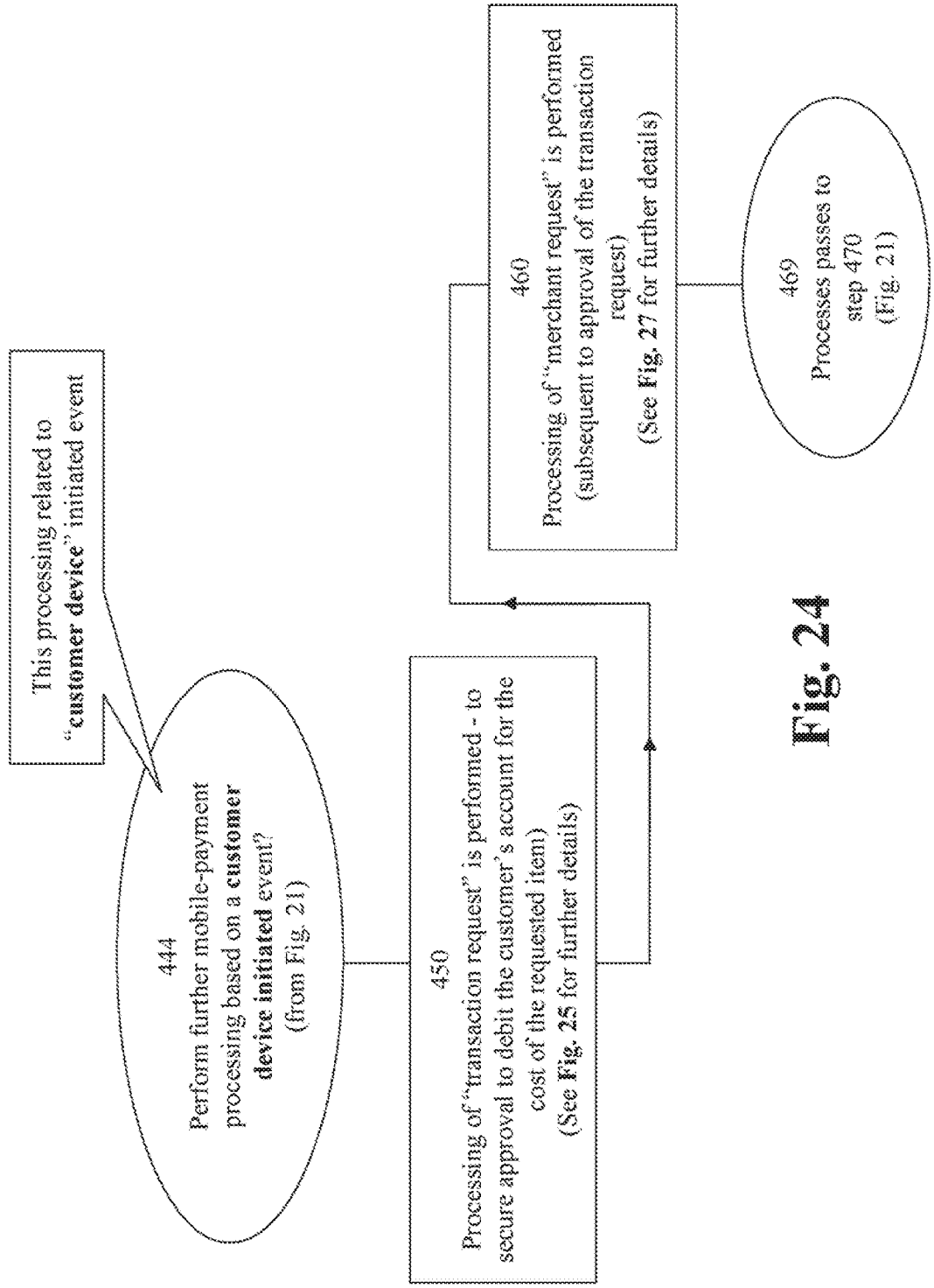
FIG. 24 is a flowchart showing details of further mobile-payment processing based on a customer device initiated event in accordance with one embodiment of the invention.

FIG. 24 is a flowchart showing the MP processing portion 200 performs further mobile-payment processing based on the customer device initiated event, in accordance with one embodiment of the invention. After starting in step 444, the process of FIG. 24 passes to step 450.

In step 450, processing of the transaction request is performed to secure approval so as to debit the customer's account for the cost of the item that the customer has requested. Further details of step 450 are described below with reference to FIG. 25. Then, in step 460, processing of the "merchant request" is performed. Further details of step 460 are described below with reference to FIG. 27. The processing of the merchant request is performed subsequent to the approval of the transaction request in this example.

After step 460 of FIG. 24, the process passes to step 469. In step 469, the process passes to step 470 of FIG. 21.

Figure 25:
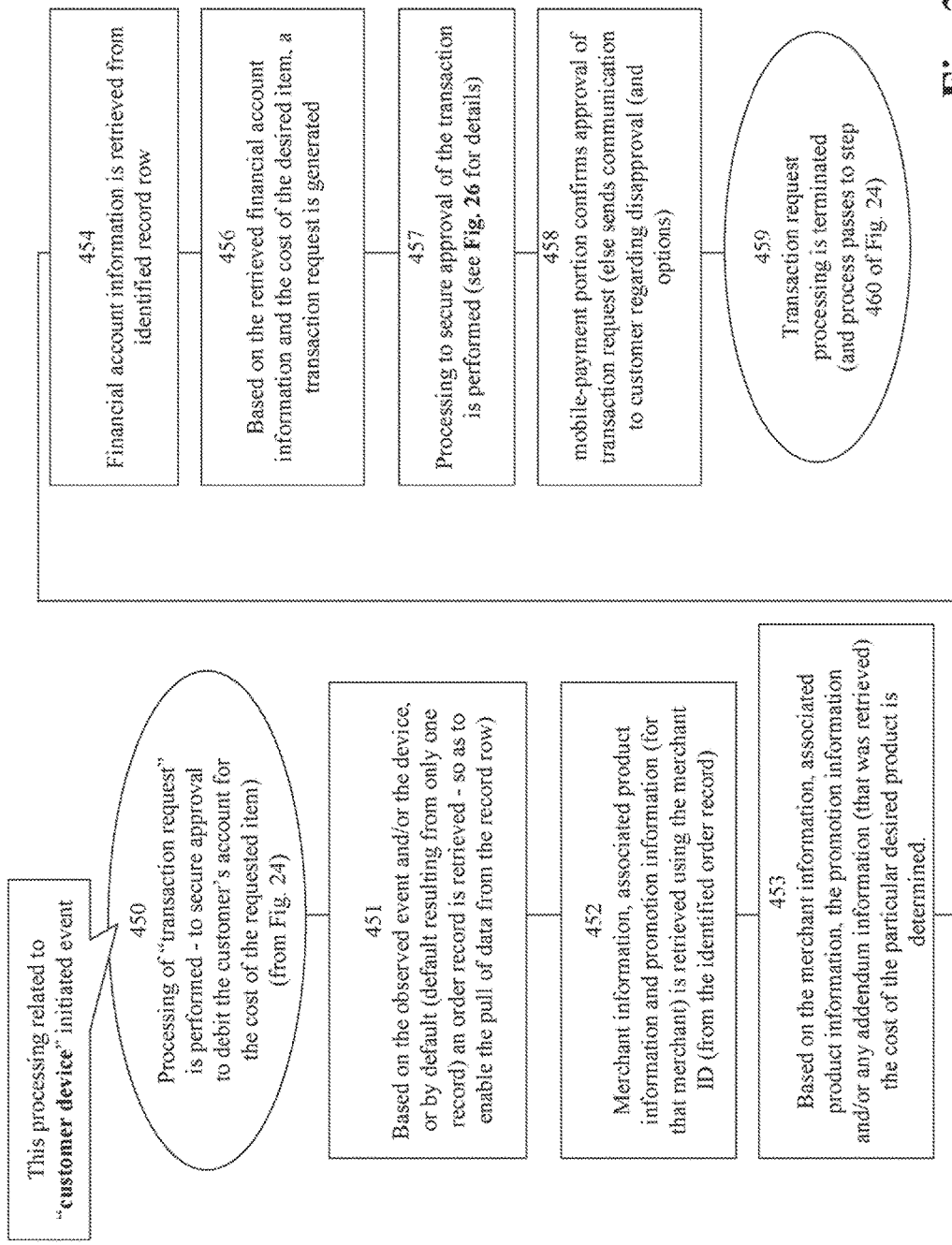
FIG. 25 is a flowchart showing in further detail the processing of the transaction request is performed to secure approval to debit the customer's account for the cost of the requested item in accordance with one embodiment of the invention.

FIG. 25 is a flowchart showing in further detail the processing of the transaction request is performed to secure approval to debit the customer's account for the cost of the requested item, of FIG. 24 as described above.

As shown in FIG. 25, after the process starts in step 450, the process passes to step 451. In step 451, the system retrieves a particular "order record" 255 for the customer. That is, based on the observed event, the particular device that the customer has used, other information and/or by default, i.e. there is only one order record in the customer mobile-payment record, an order record is retrieved. Accordingly, in step 451, the system maps to the order-record, pulls the data from the particular order record, or in some other way provides access to the data in the particular order record of the customer mobile-payment record. After step 451 of FIG. 25, the process passes to step 452. In step 452, the merchant information, associated product information, as well as any promotion information or targeted add information, for example, is retrieved using the merchant ID from the identified order record.

After step 452, the process passes to step 453. In step 453, based on the merchant information, the associated product information, as well as any promotion information, and any additional information that was retrieved, the cost of the particular desired item is determined. Then, in step 454, the financial account information is retrieved from the identified record row. Then, in step 456, based on the retrieved financial account information and the cost of the desired item, a transaction request is generated.

Then, in step 457, processing is performed to secure approval of the transaction. That is, for example, the mobile-payment processing portion 200 communicates with an authorization entity to determine if the transaction is approved. After step 457 of FIG. 25, the process passes to step 458. In step 458, the MP processing portion 200 confirms approval of the transaction request. Otherwise, if the transaction request is not approved for the customer, the authorization entity and/or the mobile-payment processing portion may communicate such disposition of the customer's account to the customer. Such communication may provide alternative options to the customer, such as entering a different payment account number. After step 458, the process passes to step 459. In step 459, the transaction request processing is terminated and the process passes to step 460 of FIG. 24.

Figure 26:
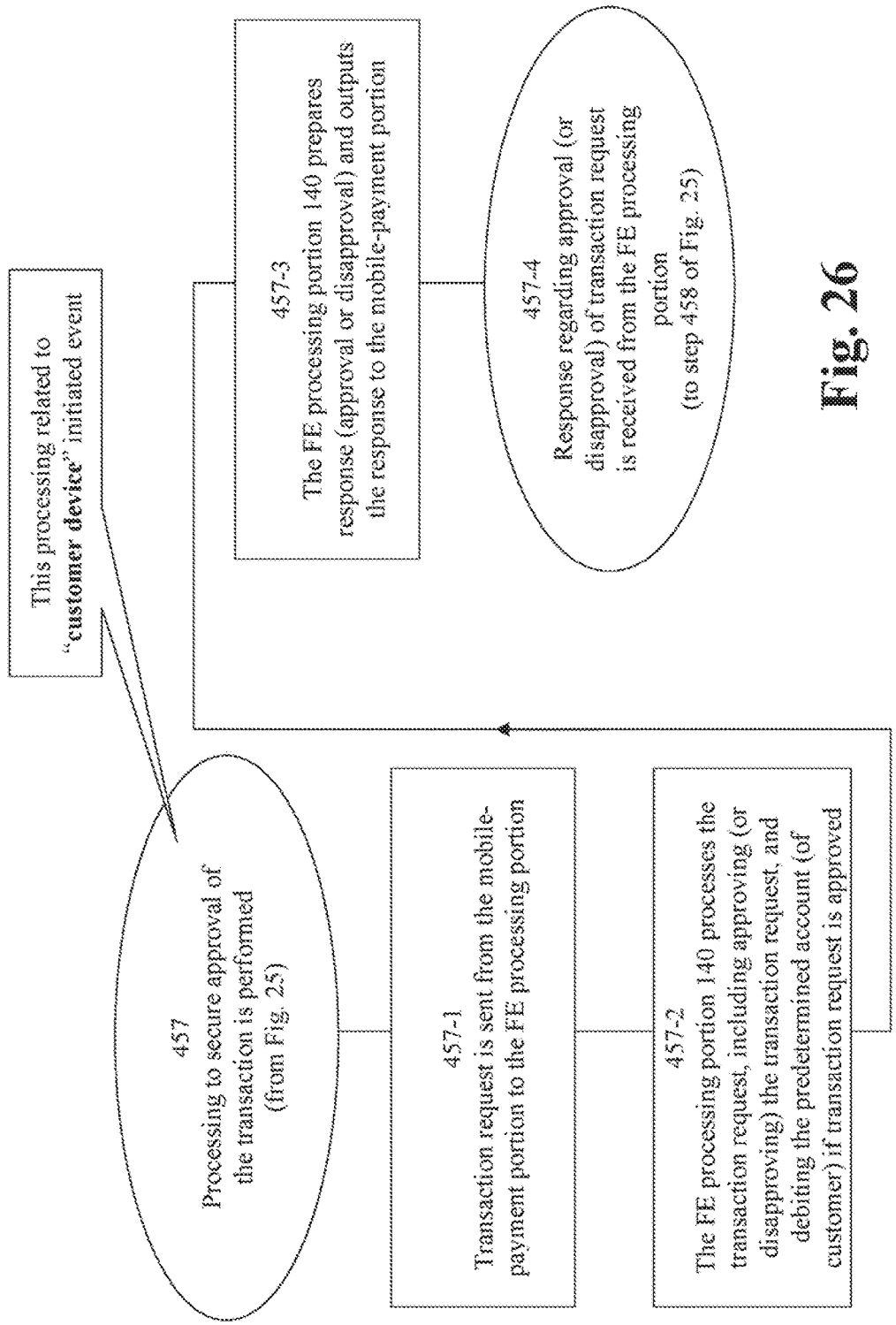
FIG. 26 is a flowchart showing details of processing to secure approval of the requested transaction, in accordance with one embodiment of the invention.

FIG. 26 is a flowchart showing details of step 457 (of FIG. 25) in which processing is performed to secure approval of the requested transaction, in accordance with one embodiment of the invention. After starting in step 457, the process passes to step 457-1 in which the transaction request is sent from the mobile-payment portion to the financial entity processing portion. Then, in step 457-2, the financial entity processing portion 140 processes the transaction request, including approving (or disapproving) the transaction request, and debiting the predetermined account (of the customer) if the transaction request is approved In step 457-3, the financial entity processing portion 140 prepares a response (approval or disapproval) and outputs the response to the mobile-payment portion. Then, in step 457-4, the response, approval or disapproval, is received from the financial entity processing portion 140 by the MP processing portion 200. The process then returns to step 458 of FIG. 25.

Figure 27:
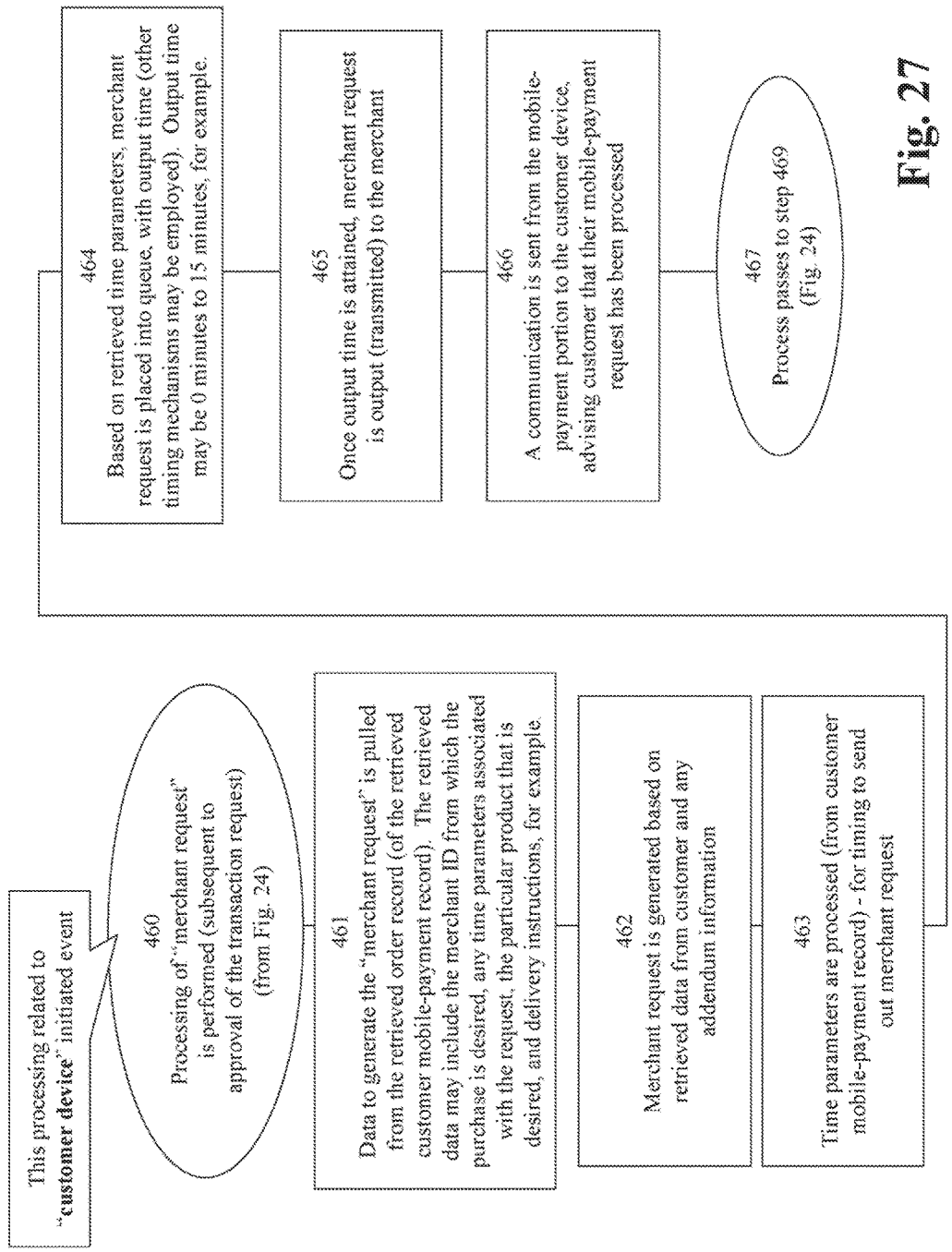
FIG. 27 is a flowchart showing in further, detail processing of the merchant request in accordance with one embodiment of the invention.

FIG. 27 is a flowchart showing in further detail the processing of the merchant request is performed step 460 from FIG. 24, i.e. subsequent to approval of the transaction request. The process of FIG. 27 starts in step 460, and passes to step 461.

In step 461, data to generate the merchant request is pulled from the retrieved order record 255 of the retrieved customer mobile-payment account. The retrieved data may include the merchant ID from which the purchase is desired, any time parameters associated with the request, the particular product that is desired, delivery instructions, as well as any other information. After step 461, the process passes to step 462. In step 462, the merchant request is generated based on the retrieved data from the order record 255 and any addendum information i.e. any information the customer entered in manually, for example. Then, in step 463, time parameters set forth in the order record are processed. That is, these time parameters reflect the timing in which the merchant request is to be sent out. Then, in step 464, based on the retrieved time parameters, the merchant request is placed into queue with an output time. For example, the output time may be 0 minutes, i.e. immediately, or 15 minutes, for example. It is appreciated that various other timing mechanisms may be utilized. For example, if the time parameters are such that the merchant request should be immediately forwarded to the designated merchant, then no placement into queue is desired. After step 464, the process passes to step 465.

In step 465, once the output time is attained for the merchant request that is in queue, the merchant request is output i.e. transmitted to the merchant. Then, in step 466, a communication is sent from the mobile-payment portion to the customer device. This communication may include various information and in particular advises the customer that their mobile-payment request has been processed. Then, in step 467, the process passes to step 469 of FIG. 24.

Figure 28:
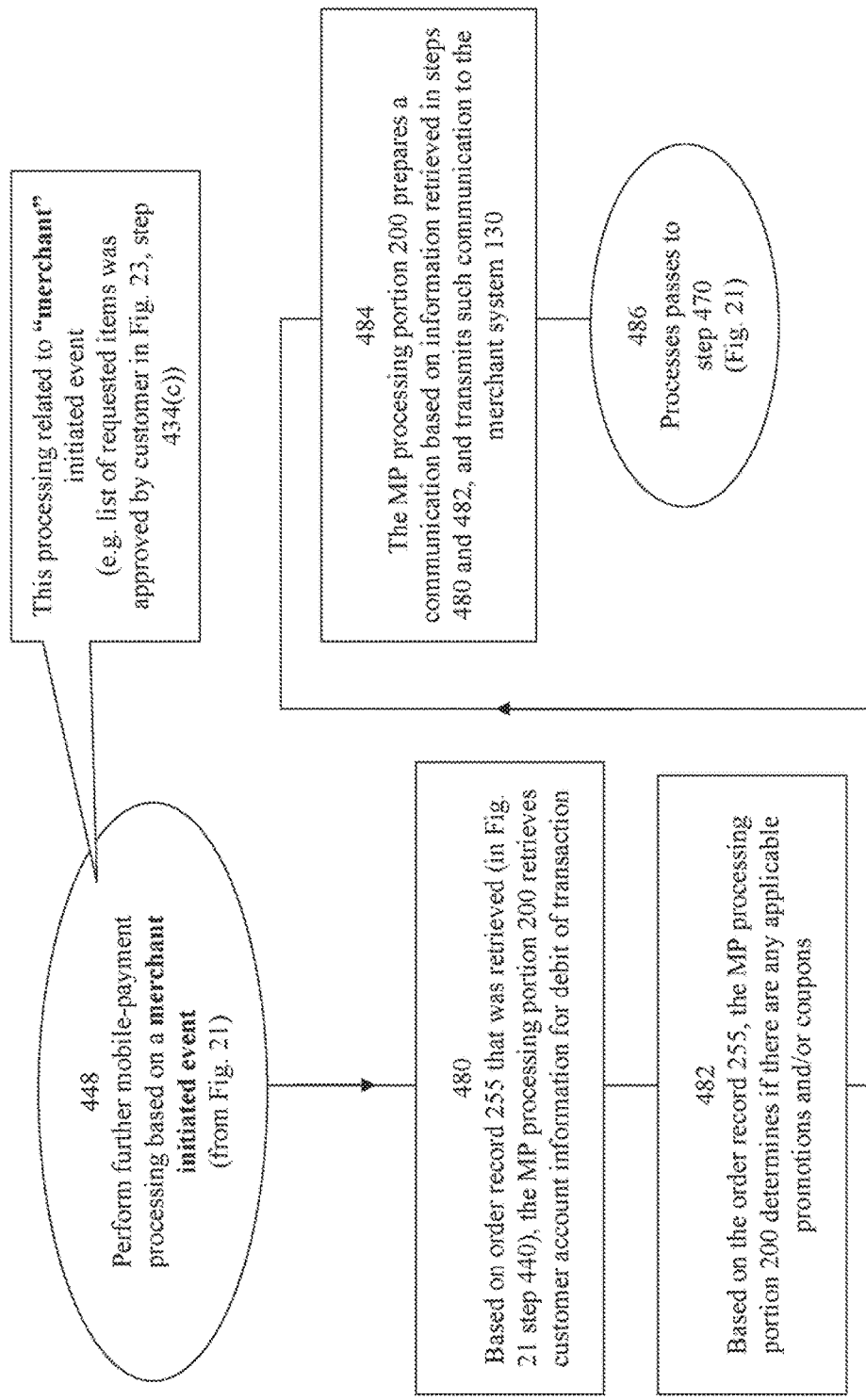
FIG. 28 is a flowchart showing details of further mobile-payment processing based on a merchant initiated event in accordance with one embodiment of the invention.

FIG. 28 is a flowchart showing the MP processing portion 200 performs further mobile-payment processing based on a "merchant initiated event," in accordance with one embodiment of the invention. As reflected in FIG. 28, the scenario shown in FIG. 28 includes that the list of requested items was previously approved by the customer as a result of the prior processing in FIG. 23, step 434(*c*).

After starting in step 448, the process of FIG. 28 passes to step 480.

In step 480, based on the order record 255 that was retrieved (in FIG. 21, step 438), the MP processing portion 200 retrieves customer account information for debit of the transaction. Then, in step 482, based on the order record 255, the MP processing, portion 200 determines if there are any applicable promotions and/or coupons that might be applied to a requested item. If there is, the MP processing portion 200 attaches such information to the communication (to be forwarded to the merchant). After step 482, the process passes to step 484.

Regarding step 482, promotions and/or coupons may come from a variety of sources including the merchant, financial entities that are involved in the transaction, and/or some other third party. Promotions and coupons may be made available based on a wide variety of criteria as desired.

In step 484, the MP processing portion 200 prepares a communication based on information retrieved in steps 480 and 482. The MP processing portion 200 then transmits such communication to the merchant system 130.

After step 484 of FIG. 28, the process passes to step 486. In step 486, the process passes to step 470 of FIG. 21.

Figure 29:
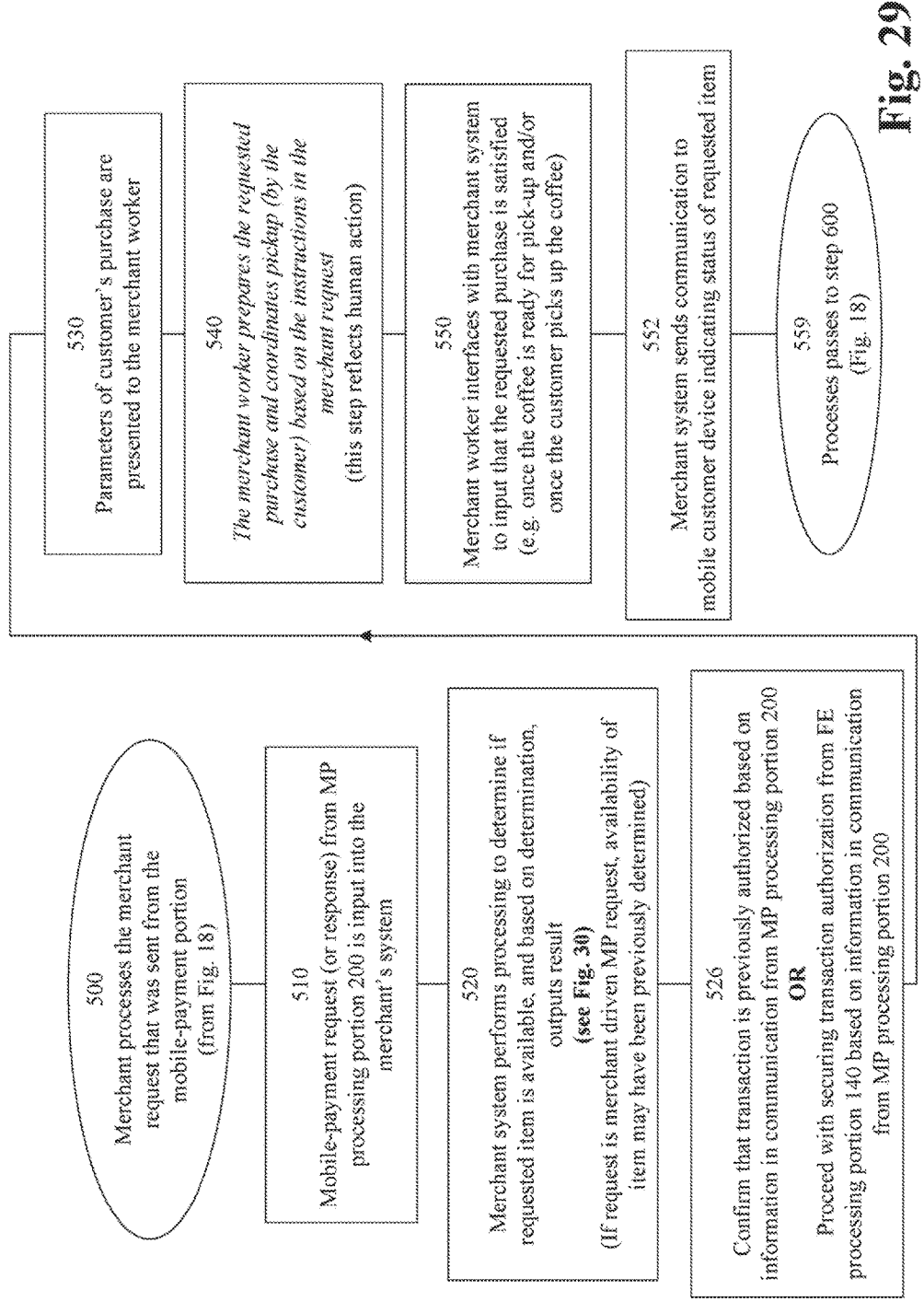
FIG. 29 is a flowchart showing in further detail the merchant processes the merchant request that was sent from the mobile-payment portion In accordance with one embodiment of the invention.

FIG. 29 is a flowchart showing in further detail the step 500 of FIG. 18, i.e., merchant processes the merchant request that was sent from the mobile-payment portion. That is, step 500 reflects the processing that is performed at the merchant, after that merchant receives a merchant request (or an approval) from the mobile-payment processing portion.

Figure 30:
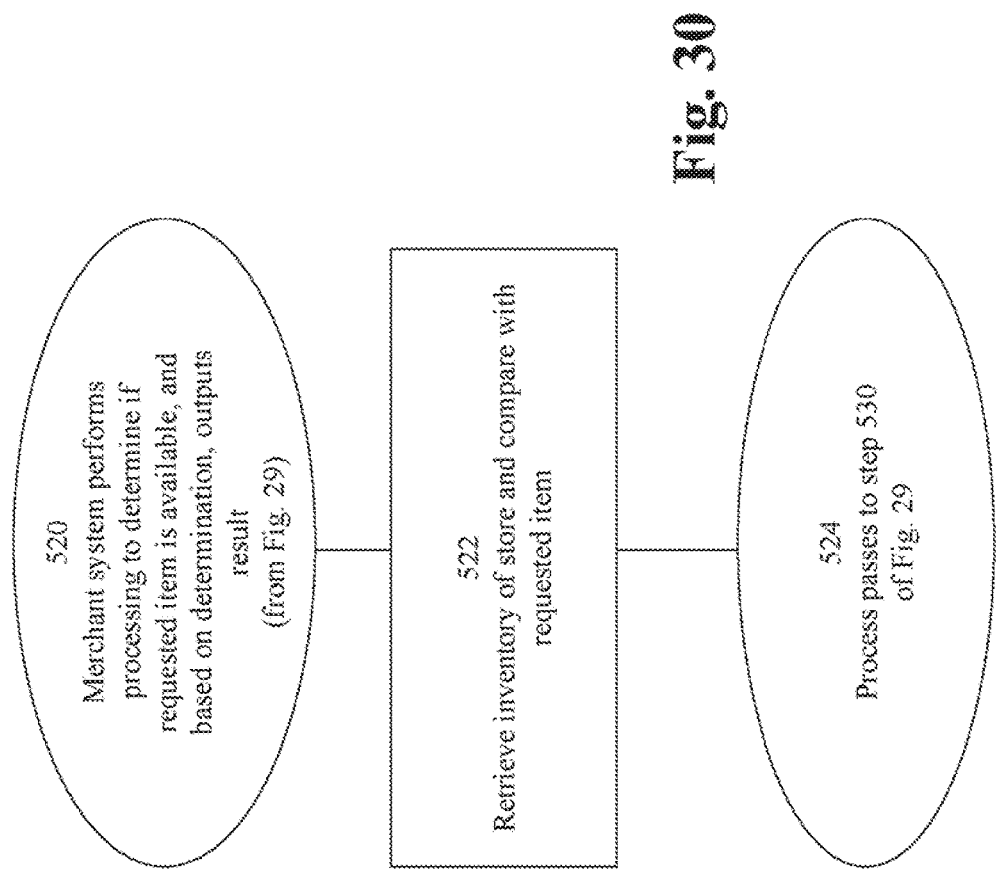
FIG. 30 is a flowchart showing in further detail the merchant worker determines if the requested item is available in accordance with one embodiment of the invention.

After step 500 of FIG. 29, the process passes to step 510. In step 510, the mobile-payment request, i.e. the merchant request, is input into the merchant system. Then, in step 520, the merchant system performs processing to determine if the requested item is available. Based on that determination, an output may be generated in the form of a communication to the customer device 120. FIG. 30, described below, shows further detail of such communication.

As reflected in step 520, if the particular request being processed is a merchant initiated, i.e., merchant driven, request, then the availability of the requested item may have been previously determined, and thus the processing of FIG. 30 would not be invoked.

After step 520 of FIG. 29, the process passes to step 526. In step 526, the merchant system 130 confirms that the transaction is previously authorized based on information in communication from the MP processing portion 200, OR, the merchant system 130 proceeds with securing transaction authorization from the financial entity processing portion 140 based on information in the communication from the MP processing portion 200.

After step 526 of FIG. 29, the process passes to step 530. In step 530, the parameters of the customer's purchase are presented to the merchant worker. Then, in step 540, the merchant worker prepares the requested purchase and coordinates the pickup of the purchase (by the customer) based on the instructions that the worker sees in the merchant request. After step 540, the process passes to step 550. In step 550, the merchant worker interfaces with the merchant system to input that the requested purchase is satisfied.

Accordingly, step 550, reflects that the requested purchase is satisfied, i.e., once the requested item is ready for pickup and/or once the customer picks up the requested item.

Then, the process of FIG. 29 passes to step 552. In step 552, the merchant system sends a communication to the mobile customer device 120 indicating the status of requested item, i.e., that the requested item is ready for pickup or to confirm that the customer has picked up the requested item and that the transaction is completed, for example.

Then, the process passes to step 559. In step 559, the process passes to step 600 of FIG. 18.

FIG. 30 is a flowchart showing in further detail step 520 in which the worker determines if the requested item is available. After the process starts in step 520, the process passes to step 522. In step 522, the processing retrieves the inventory of the merchant, and determines if the requested item may be satisfied. Then, the process passes to step 524, passes to step 530 of FIG. 29, and continues as described above.

As noted above, in accordance with embodiments of the invention, information may be captured, sorted and/or allocated in a variety of manners. In particular, transaction/receipt information may be captured, sorted and/or allocated. For example, in conjunction with dining at a mobile eligible restaurant, as described above, the MP processing portion 200 might associate the particular transaction with an expense number, which is in turn associated with a particular expense account. In some periodic manner, the customer may download all the transactions associated with each of his expense numbers, or use such aggregated information in some other manner, as desired. In general, there may be provided allocation, i.e., bucket allocation, of various information by either the customer MP processing portion, a participating merchant and/or a financial entity.

Such allocation may be performed utilizing the order record table 254 as shown in FIG. 9. That is, as described above, in accordance with one embodiment of the invention, each mobile-payment transaction is mapped into a particular order record 255, i.e., based on the particular customer, the customer device used, and/or the trigger event, for example. Accordingly, the particular order record 255 may be provided to contain data that indicates how to allocate the particular requested transaction.

As described above, the systems and methods of embodiments of the invention provide for a variety of functionality. Such functionally may relate to customer ordering and related processing, customer payment related processing, use of rules in payment scenarios, GPS and other location related processing.

Further, the invention may include, for example, the use of coupons (including URL and decay processing associated with the location/securement and life of coupons respectively), the sharing of information (e.g. tell your friends you're at the local coffee house), use of photo/imaging technology, various authentication processing (including two key authentication and biometric authentication such as fingerprinting and eye scan), offer matching, and integration of multiple customer devices. The order record 255, associated with a particular requested transaction (of a customer), may be utilized to provide such features.

For example, a coupon may be associated with a particular customer using the mapping capability of the order record table 254. A particular coupon may be presented to the customer for use by that customer. Alternatively, the customer might transfer the coupon to another customer for their use, i.e., via the two customer devices talking with each other, for example. Further, a customer may be a member of what might be characterized as a "coupon consortium." As a member, the customer might be presented with coupons based on criteria, e.g. using a rule set, as desired. Members of the consortium may contribute coupons and/or coupon value to the pool. The customers may use coupons as they are available and/or as they are earned by the particular customer, for example.

In accordance with a further embodiment of the invention, the mobile-payment system 100 implements a coupon system, in conjunction with a particular merchant, in which if a given number of people are participating in an event, e.g. at a bar, then a price reduction will be granted. For example, a price redaction of 10% might be provided if 10 or more people participate in a transaction using the mobile-payment system 100. In general, the mobile-payment system 100 may utilize a wide variety of coupon related functionality such as any of the features described in U.S. application Ser. No. 12/559,756 filed Sep. 15, 2009 titled "SYSTEMS AND METHODS FOR COUPON SEARCHING CARDS" which is incorporated by reference herein in its entirety.

For example, in accordance with one embodiment of the invention, the order record 255 (that the MP processing portion 200 maps to for a particular transaction) may include indicia indicating that certain entities should be alerted to such requested transaction. Illustratively, the e-mail addresses of two friends of the customer may be associated with a retrieved order record 255—such that when that order record 255 is retrieved, the two friends are e-mailed. Various other information may be associated with respective order records 255, and used to enhance the customer experience.

In general, the mobile-payment system 100, and in particular the MP processing portion 200, may be integrated with other systems including what might be characterized as "social network sites (SNSs)" such as TWITTER, LINKEDIN and FACEBOOK, for example. More specifically, processing performed by the mobile-payment system 100, including the events associated with such processing, may be communicated to such SNSs as desired. For example, in accordance with one embodiment of the invention, upon the MP processing portion 200 observing a certain event, the MP processing portion 200 will communicate attributes of the observed event to an SNS in some predetermined manner. Such may be performed using the customer record table 252—and mapping an "observed event" to communications that are to be performed in conjunction with such observed event. Such processing may utilize the customer record table 252, trigger events, and/or a rule set, for example. In one illustrative scenario, as a customer approaches her local STARBUCKS—an order of a venti vanilla latte is generated and sent to such merchant, as described herein. In conjunction with sending such order, an e-mail goes out to the customer's designated friends. At such time, the friends might join the customer, if the friends are available. Various related processing may be provided.

Figure 31:
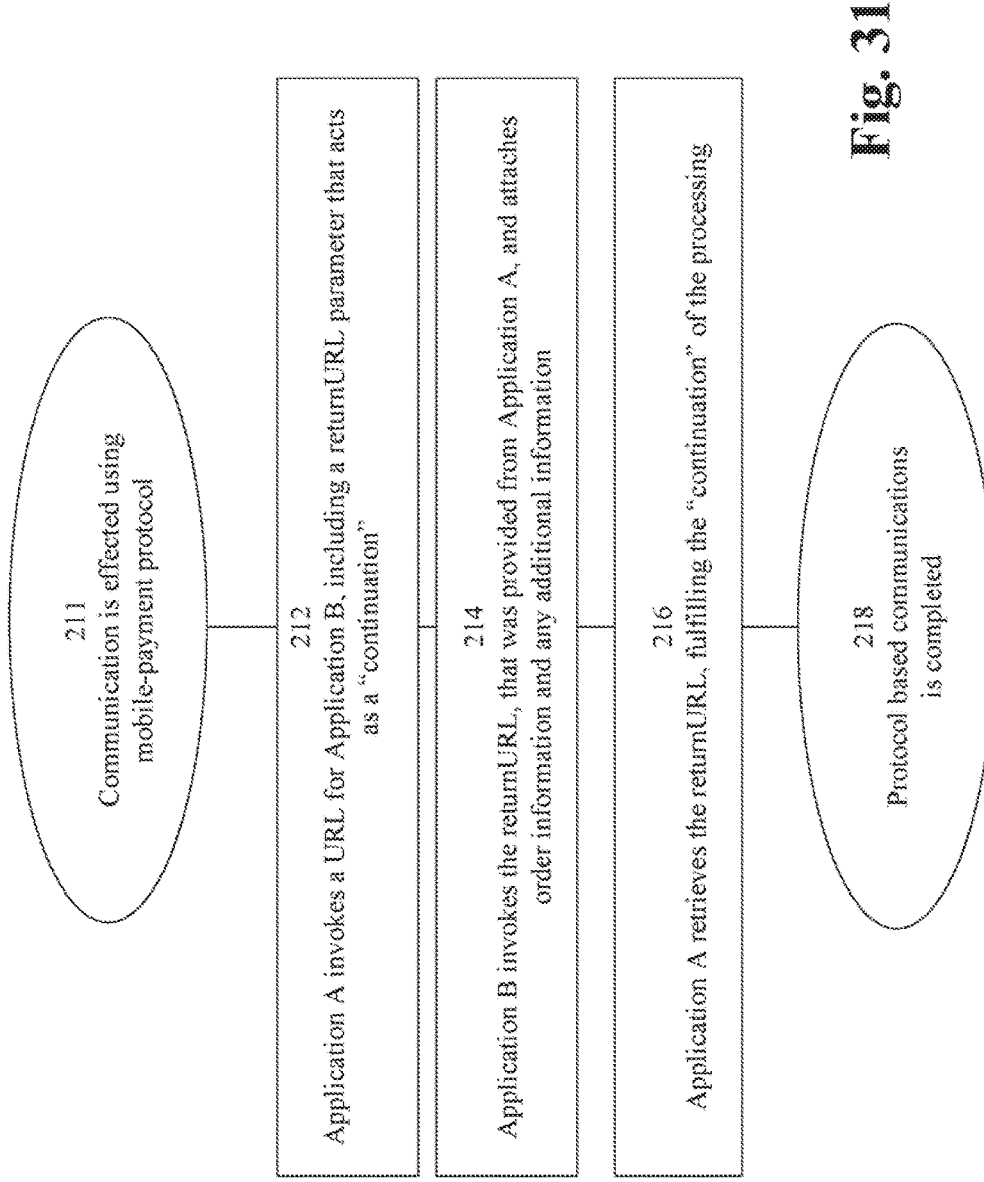
FIG. 31 is a flowchart showing a protocol, i.e., what might be characterized as a myorder protocol, or alternatively a mobile-payment protocol, used in the processing as described herein, in accordance with one embodiment of the invention.

FIG. 31 is a flowchart showing a protocol, i.e., what might be characterized as a myorder protocol, or alternatively a mobile-payment protocol, used in the processing as described herein, in accordance with one embodiment of the invention. That is FIG. 31 sets forth a protocol which may be utilized in the various communications as described herein in conjunction with the mobile-payment processing.

In summary, the protocol may be characterized as "go somewhere; do something; come back." The various systems and processing, and associated communications, as described herein may be provided with and/or utilize such protocol so as to provide a richer and more automated platform.

After the protocol is initiated in step 211 of FIG. 31, the processing passes to step 212. As shown in step 212, a first application, i.e., application A, invokes a URL for a second application, i.e., Application B, including a return URL parameter that acts as a "continuation". To explain further, in accordance with one embodiment of the invention, when a customer (using the protocol) taps "Coffee Thru Mobile-payment" in a SmartPhone (or other mobile customer device), application A crafts a URL (for the Mobile-payment processing). The customer can specify various parameters, and application A will reflect such on the URL query string, i.e., and fill in the appropriate values on the query string to reflect such selected parameters.

Application A, as described, may be constituted by the mobile-payment (MP) processing portion 200, with application B constituted by the merchant system 130. For example, the communication portion 210 and/or merchant request generation portion 230 in the MP processing portion 200 may effect the protocol related processing as described herein.

The calling application (application A) also includes a return URL parameter so that application B knows how to come back when the processing is done. The return URL contains all the information the calling application (application A) needs to continue the progression of processing between application A and application B. In one case the URL sent by application A may include a simple beverage_id parameter, i.e., so as to associate the communications to a comment id. However, the URL sent from the application A (to application B) may also include complex "continuation" information encoded in the URL, i.e., so as to dictate further action effected upon receipt of the URL by application B, i.e., such as delivery instructions. A URL from application A to application B might be constituted by, for example, the URL: →mobile-payment://order/1.0.0/?orderNumber=123&returnURL=CoffeePlaceurl%3A%2F%3Fbeverage_id%3D123

As shown in FIG. 31, step 214 reflects that when Application B is done performing the dictated processing (as dictated by the URL from application A), Application B invokes the return URL, that was provided from Application A, and attaches any additional information, e.g. such as information generated from the processing performed by application B and information regarding whether the order was completed. In other words, application B prepares the return URL (and associated information) for retrieval by the customer's application A.

Accordingly, when the customer taps "Return to Coffee-Place" as presented by application A on the customer's device, application A invokes the return URL of the request, which includes the additional return parameters that indicate whether the order was completed as well as any other information generated by application B. In accordance with one embodiment of the invention, the return parameters are prefixed with an appropriate prefix, i.e., to avoid collisions.

The return URL might be constituted by, for example, the URL: →CoffeePlace-url://?beverage_id=123&sbux_responseType=completed Accordingly, in step 216 of FIG. 31, Application A retrieves the return URL, restoring the "continuation" of the processing. When the CoffeePlace web page re-launches with the requested URL, the CoffeePlace web page loads the correct record using the beverage_id parameter, and further may store information about the transaction in the Notes field for that record.

The above protocol provides one approach that may be used in the communications between the MP processing portion 200 and the merchant system 130. In general, the above protocol may be used in conjunction with any of the communications or processing described herein, as desired.

In accordance with the various embodiments described herein, it is appreciated that payment accounts may be debited in combination. That is, multiple payment accounts may be debited for a particular transaction. For example, a gift card account might be debited, with the balance due being debited from a credit card account.

Figure 32:
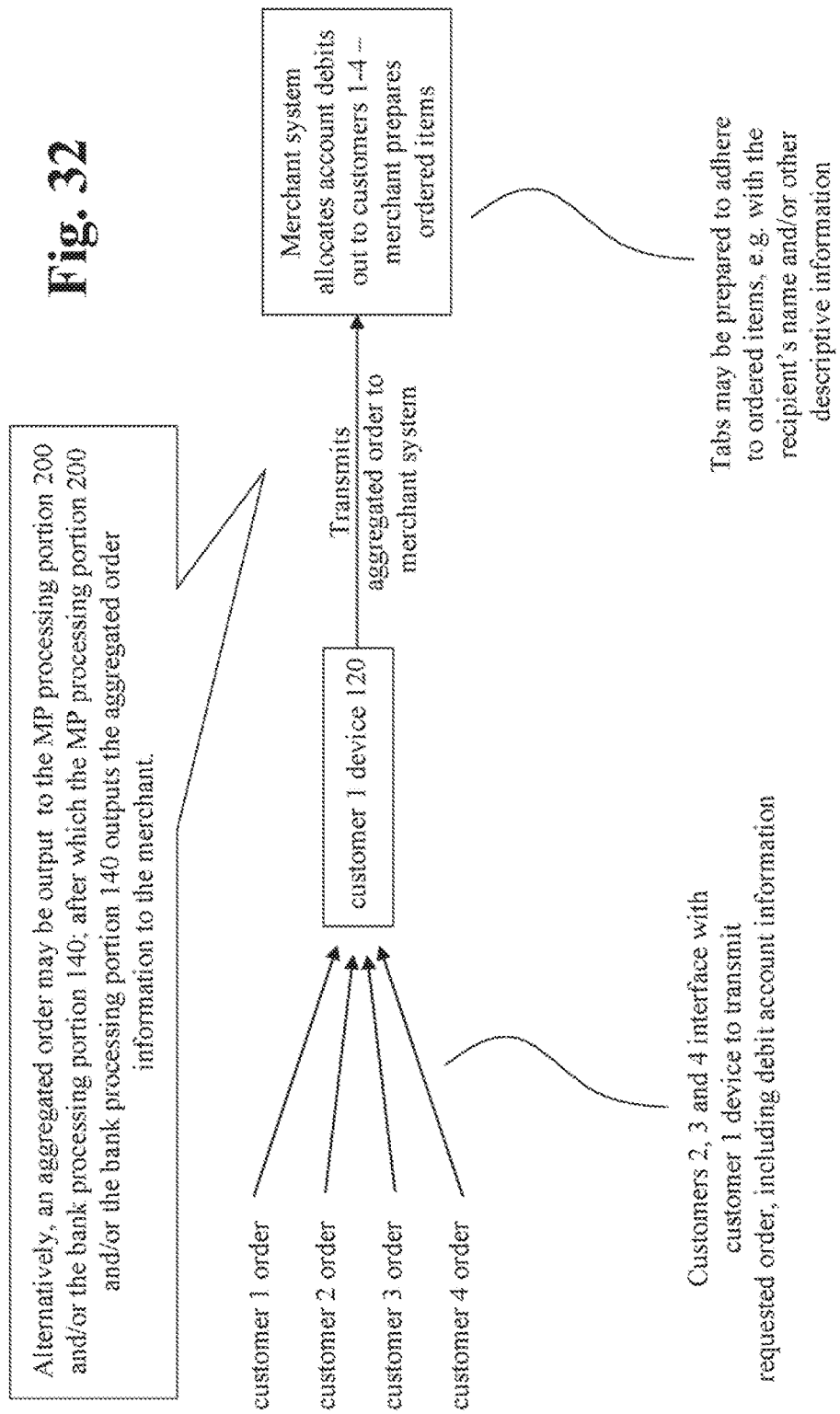
FIG. 32 is a diagram showing features of aggregation and allocation of customer orders, in accordance with one embodiment of the invention.

In accordance with some embodiments of the invention, and related to the "bar" environment processing as described above, the MP processing portion 200 may perform a variety of aggregation and allocation (i.e., divvying out) processing in conjunction with the various other features described herein. That is, in embodiments of the invention, functionality is provided to allocate and/or aggregate any of customer orders, payment of items, and delivery of items (including over the counter delivery), for example. FIG. 32 is a diagram showing features of such aggregation and allocation, in accordance with one embodiment of the invention.

As shown in FIG. 32, each of customers 2, 3 and 4 transmit a desired order to the customer device 120 of customer 1, i.e., the customer 1 device 120. This aggregation of orders by the customer 1 device 120 may be performed by the devices talking with each other in any suitable manner. For example, after customer 2 prepares their order on their device, customer 2 might flick their device toward the customer 1 device 120, so as to transmit their order to the customer 1 device 120, and in particular a MP processing portion 200 disposed in the customer device 120.

Thereafter, the MP processing portion 200, via the customer 1 device 120, transmits the aggregated order to the merchant system 130, i.e., upon customer 1 walking down the street and entering the local coffee house, for example. As to the transmission between the customer 1 device 120 and the merchant system 130, such may be effected in different manners. In accordance with one embodiment of the invention, the MP processing portion 200 in the customer 1 device 120 actually allocates out the respective orders prior to sending to the merchant system 130. However, in accordance with a different embodiment of the invention, the MP processing portion 200 in the customer 1 device 120 transmits all the orders to the merchant system 130 together. The later scenario may be desired if the customer 1, for example, is paying for everyone's ordered item.

Once the order is received by the merchant system 130, the merchant system 130 debits the designated account based on the processing as described above, for example. Further, the merchant system 130 outputs the orders to the merchant's workers for preparation of the requested items. In conjunction, the merchant system 130 might generate/print tabs to be affixed to the ordered items.

The processing shown in FIG. 32 illustrates that an aggregated order may be output from a customer device to the merchant. However, in other embodiments of the invention, an aggregated order may be output to an MP processing portion 200 and/or a bank processing portion 140, after which the MP processing portion 200 and/or the bank processing portion 140 outputs the aggregated order information to the merchant. Thus, the customer device might first interface with the MP processing portion 200 and/or the bank processing portion 140 after which the MP processing portion 200 and/or the customer device interfaces with the merchant system.

In accordance with embodiments of the invention, it is appreciated that orders may be aggregated in a wide variety of ways. As described herein, orders may be aggregated to pay funds and/or to receive funds in some allocated manner. In accordance with one embodiment of the invention, funds may be aggregated for purposes of administering a charitable contribution. The MP processing portion 200 may utilize the various features described herein to assist in such administering of a charitable contribution In accordance with further embodiments of the invention, various variations of the above processing may be performed. For example, the MP processing portion 200 may provide for the customer 1 device 120 to provide an order for two or more people, debit the customer 1 designated account, and print out tabs (to be affixed to the ordered items) that designate the recipient. Accordingly, a customer 1 may arrange, using the MP processing portion 200, for payment of a colleague's coffee in conjunction with the colleague picking up the paid-for coffee from the barista, i.e., since the tab that is attached to the colleague's coffee has the colleague's name and caricature in one illustrative example.

As described above, order information may be transferred from a first customer's device to a second customer's device. In accordance with one embodiment of the invention, such data may have a decay function attached thereto, i.e., the data will be erased by the MP processing portion 200 (on the customer 1 device) in a certain period of time, e.g. an hour. Relatedly, it is appreciated that such transferred data may well set forth the particulars of the order, i.e., such that it is the customer 1 device's job to simply transfer the order to the merchant system 130 in the particular aggregated or allocated manner designated.

In accordance with a further embodiment of the invention, the MP processing portion 200 may be provided with functionality to allocate out aggregated costs in various manners. For example, in a group setting (such as the bar scenario described above) such functionality might allow the customer to which the purchases are being aggregated to allocate costs based on items purchased by participates, based on the number of participates (i.e., split the tab evenly), based on who is still present, and/or based on seniority of persons present, for example.

In accordance with one embodiment of the invention, the systems and methods of embodiments may also provide a ghost customer. For example, a person dining in a group setting may not be provided with the technology to participate as described herein. In such scenario, the MP processing portion 200 may provide for a ghost customer. An allocation of amount owed or amount due may be allocated to tins customer by the processing portion 200. and then verbally communicated to the customer, for example.

It is appreciated that the processing as described herein may include, or be used with, processing to effect a transfer of funds between two or more persons. For example, a first customer may purchase an item for a second customer. Thereafter, the second customer may transfer fends from the second customer's account to the first customer's account. Any known processing may be used to effect such person to person processing. For example, the features described herein may be used in conjunction with the features described in U.S. patent application Ser. No. 11,833,709 (US 2008/0177659) filed Aug. 3, 2007 entitled "Systems and methods for providing financial processing in conjunction with instant messaging and other communications", which is incorporated by reference herein in its entirety.

It is appreciated that the features described herein may be used in conjunction with a wide variety of other technologies, including but not limited to technology as set forth in U.S. Pat. No. 7,392,222, issued Jun. 24, 2008 entitled "SYSTEM AND METHOD FOR PROVIDING PROMOTIONAL PRICING;" U.S. Utility application Ser. No. 10/909,407 filed Aug. 3, 2004 ; U.S. Utility application Ser. No. 12/561,876 filed Sep. 17, 2009 entitled "SYSTEM AND METHOD FOR PROVIDING BORROWING SCHEMES" . U.S. Utility application Ser. No. 12/372,510 filed Feb. 17, 2009 entitled "SYSTEM AND METHOD FOR PROVIDING BORROWING SCHEMES" ; U.S. Utility application Ser. No. 12/372,554 filed Feb. 17, 2009 entitled: "SYSTEM AND METHOD FOR PROVIDING BORROWING SCHEMES" ; U.S. Utility application Ser. No. 12/372,617 filed Feb. 17, 2000 entitled "SYSTEM AMD METHOD FOR PROVIDING BORROWING SCHEMES" ; U.S. Utility application Ser. No. 12/372,710 filed Feb. 17, 2009 entitled "SYSTEM AMD METHOD FOR PROVIDING BORROWING SCHEMES" ; U.S. Utility application Ser. No. 12/372,716 filed Feb. 17, 2009 entitled "SYSTEM AND METHOD FOR PROVIDING BORROWING SCHEMES" , as well as that described in U.S. Utility application Ser. No. 12/559,756 filed Sep. 15,2009 titled "SYSTEMS AND METHODS FOR COUPON SEARCHING CARDS"; and U.S. Pat. No. 7,702,538, issuing Apr. 20, 2010 entitled "SYSTEM AND METHOD FOR TRANSPONDER-ENABLED ACCOUNT TRANSACTIONS" , all of such which are incorporated by reference herein in their entirety.

The content of all references cited herein are incorporated by reference herein in their entirety.

Figures 36B, 36C:
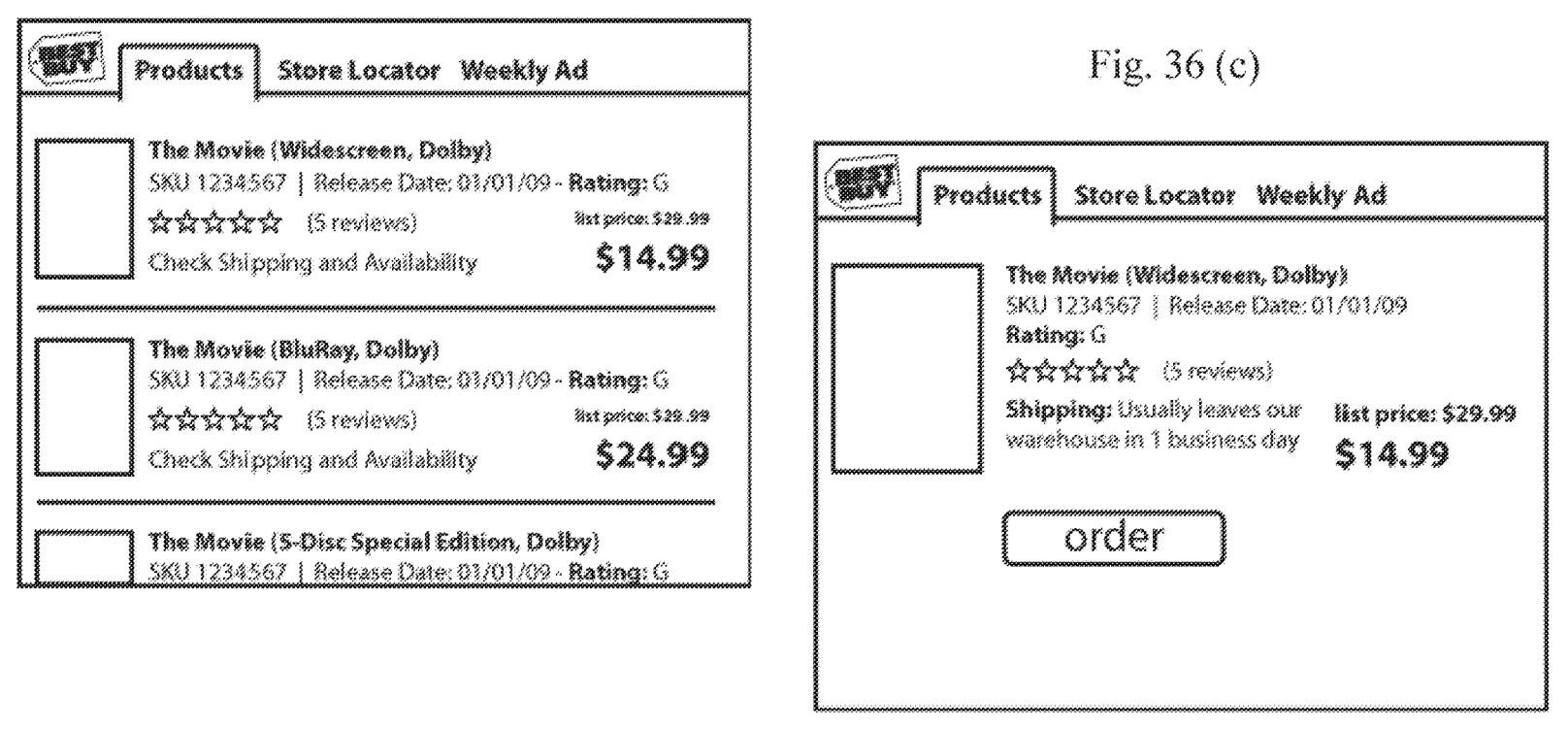

FIGS. 33-42 are figures showing various user scenarios in accordance with embodiments of the invention. The user scenarios may be performed using any of the processes and/or components described herein. Some of the user scenarios are described as utilizing particular technology, such as the iPhone by APPLE, other APPLE TECHNOLOGY, as well as technology of JPMORGAN CHASE, AT&T, VISA and MASTERCARD, for example. However, it is appreciated that a wide variety of other operating platforms and technologies may be used in implementation of the invention. Further, various of the user scenarios are described in the context of JPMorgan Chase (Chase) in particular. However, it is of course appreciated that any of a wide variety of financial entitles may instead utilize the features described herein. Various of the user scenarios are described in the context of using a particular card and/or other payment mechanism. However, it is of course appreciated that any of a wide variety of cards and/or payment mechanisms may instead be utilized in conjunction with the features described herein. As used in the user scenarios, the term "workspace" means account attributes and/or an account record or database containing such account attributes.

Figure 33A:
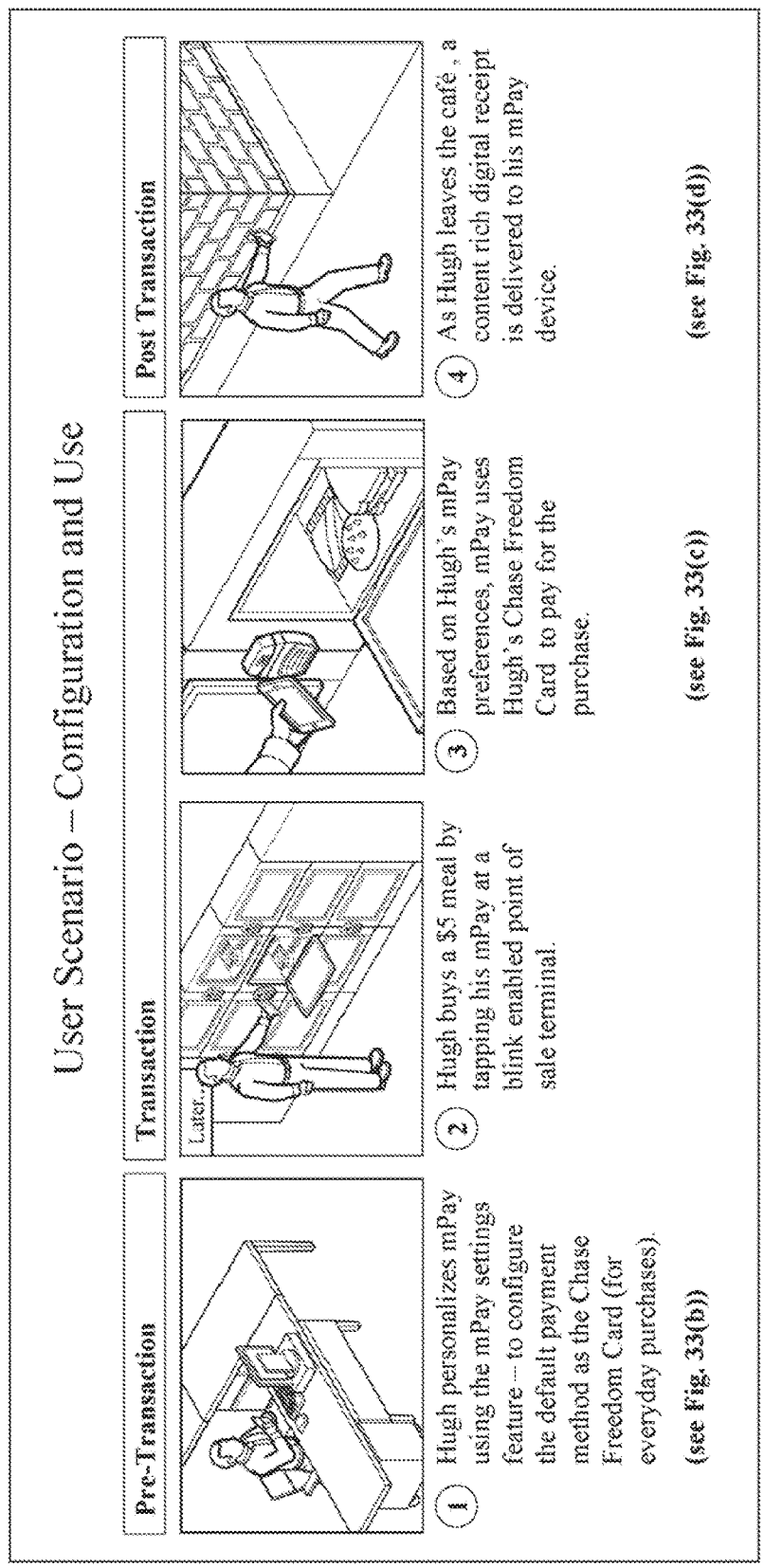
Figure 33B:
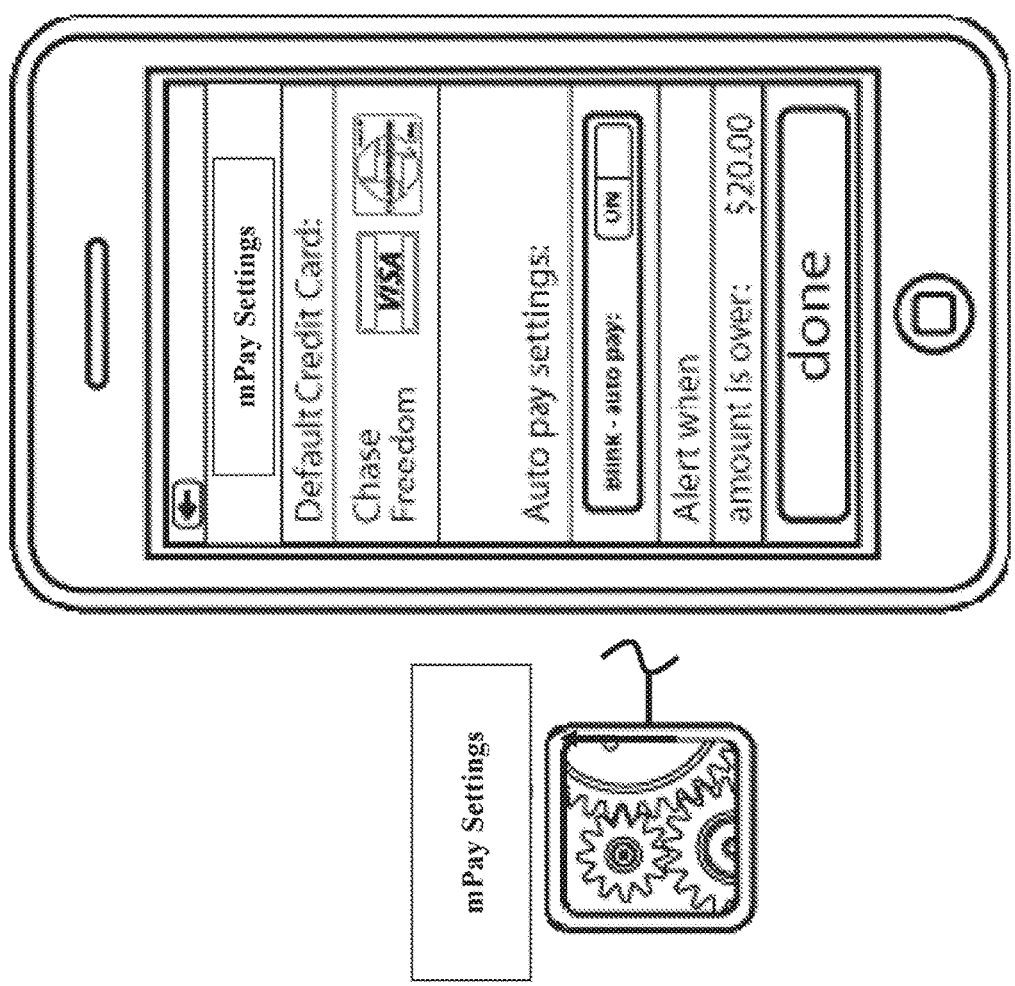

In particular, FIGS. 33(a)-33(f) are figures showing a user scenario in which a mobile-payment device is configured and used to perform mobile-pay (mPay) processing, in accordance with embodiments of the invention. Such mPay processing might further be characterized as iPay processing in that such is typically initiated by the customer, as described herein. In particular, FIG. 33(a) shows steps of the user scenario, showing aspects of configuration and use of a mobile-payment device, in accordance with one embodiment of the invention FIG. 33(b) is an illustrative user interface displayed in conjunction with the processing of step (1) of FIG. 33(a).

Figure 33D:
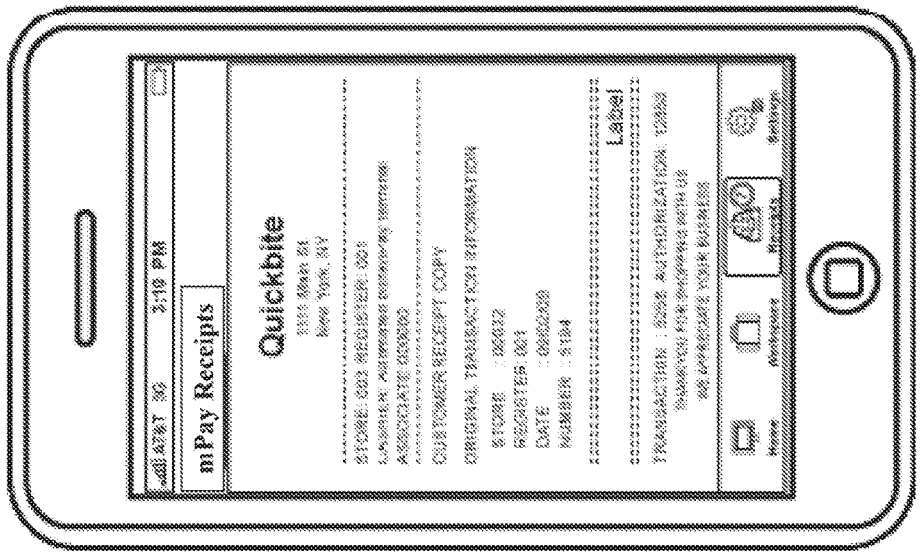
Figure 33C:
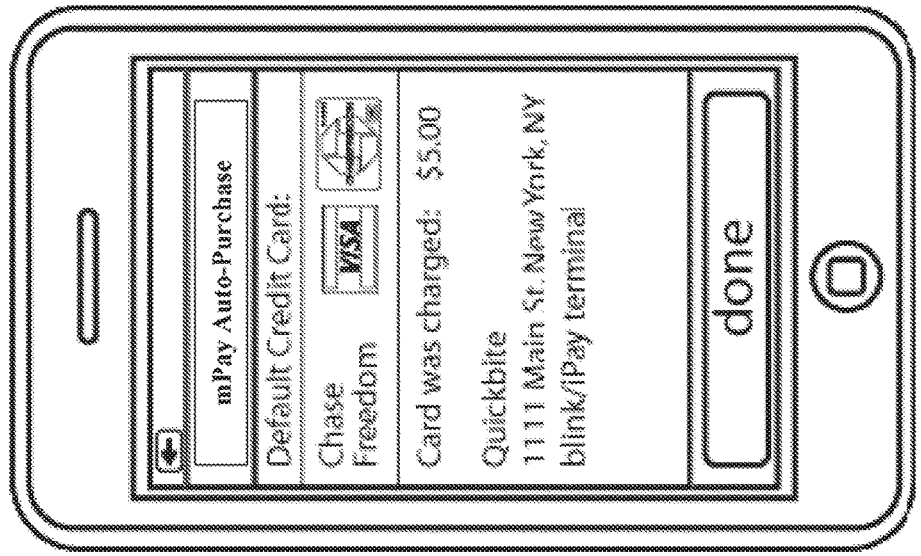
Figure 34:
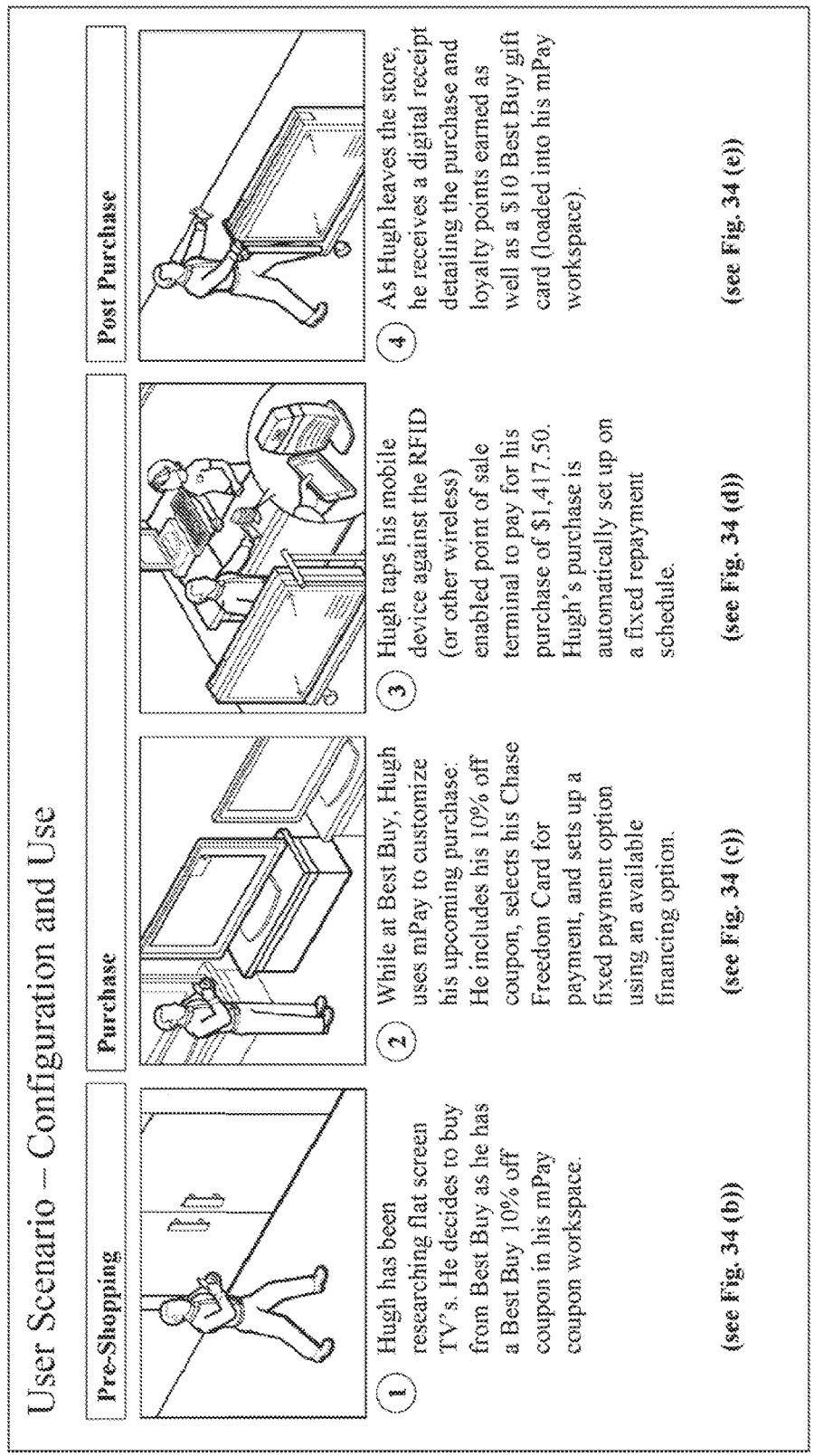
FIGS. 34(a)-34(g) are figures showing a further user scenario in which a mobile-payment device is configured and used, in accordance with one embodiment of the invention.
Figure 34:
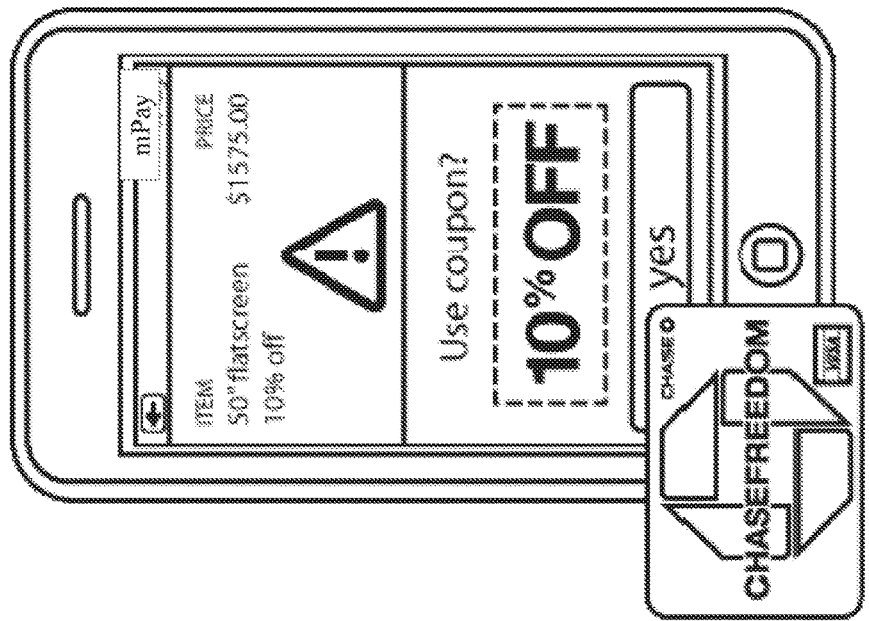
Figure 34:
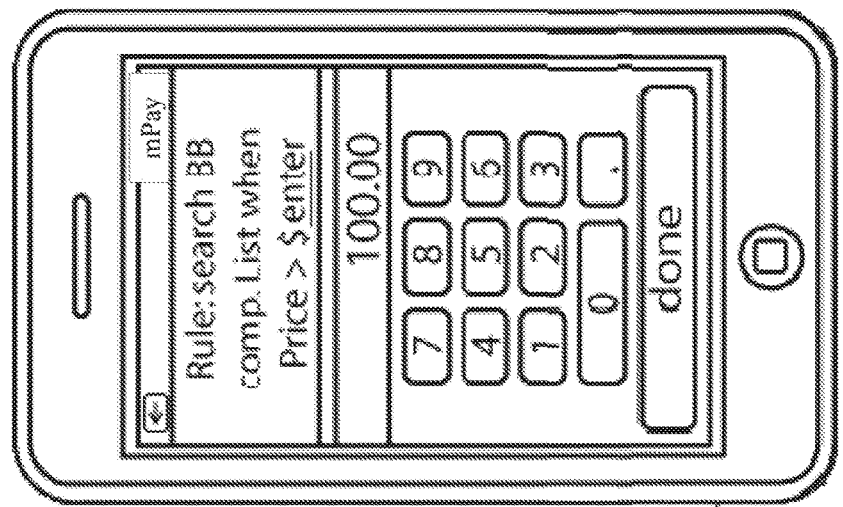
Figure 34:
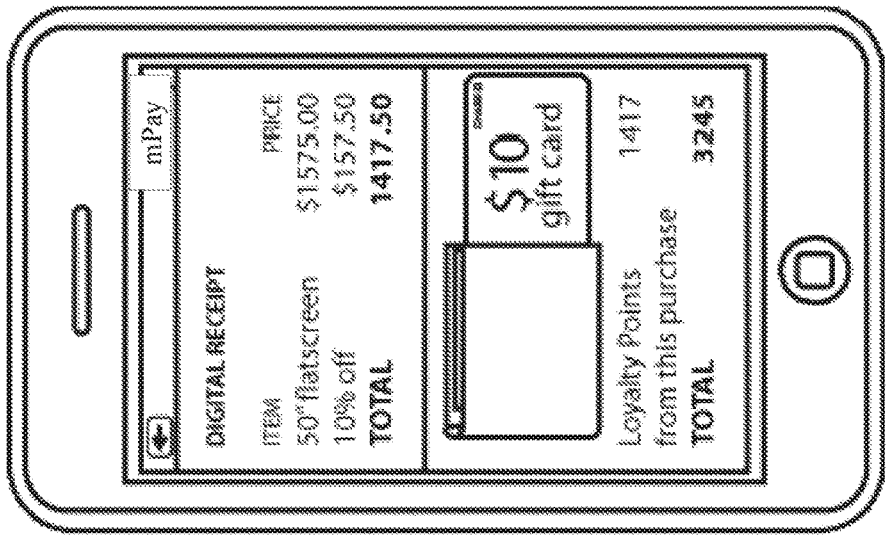
Figure 34:
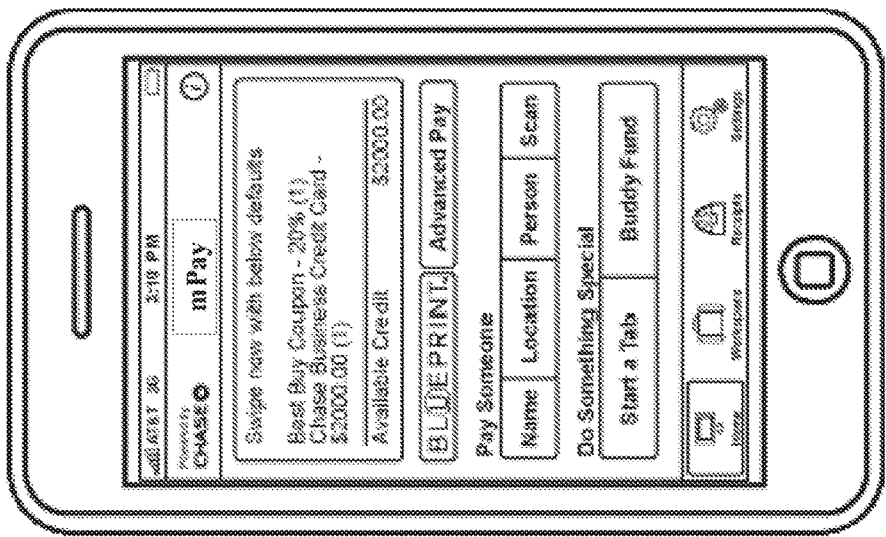
Figure 34:
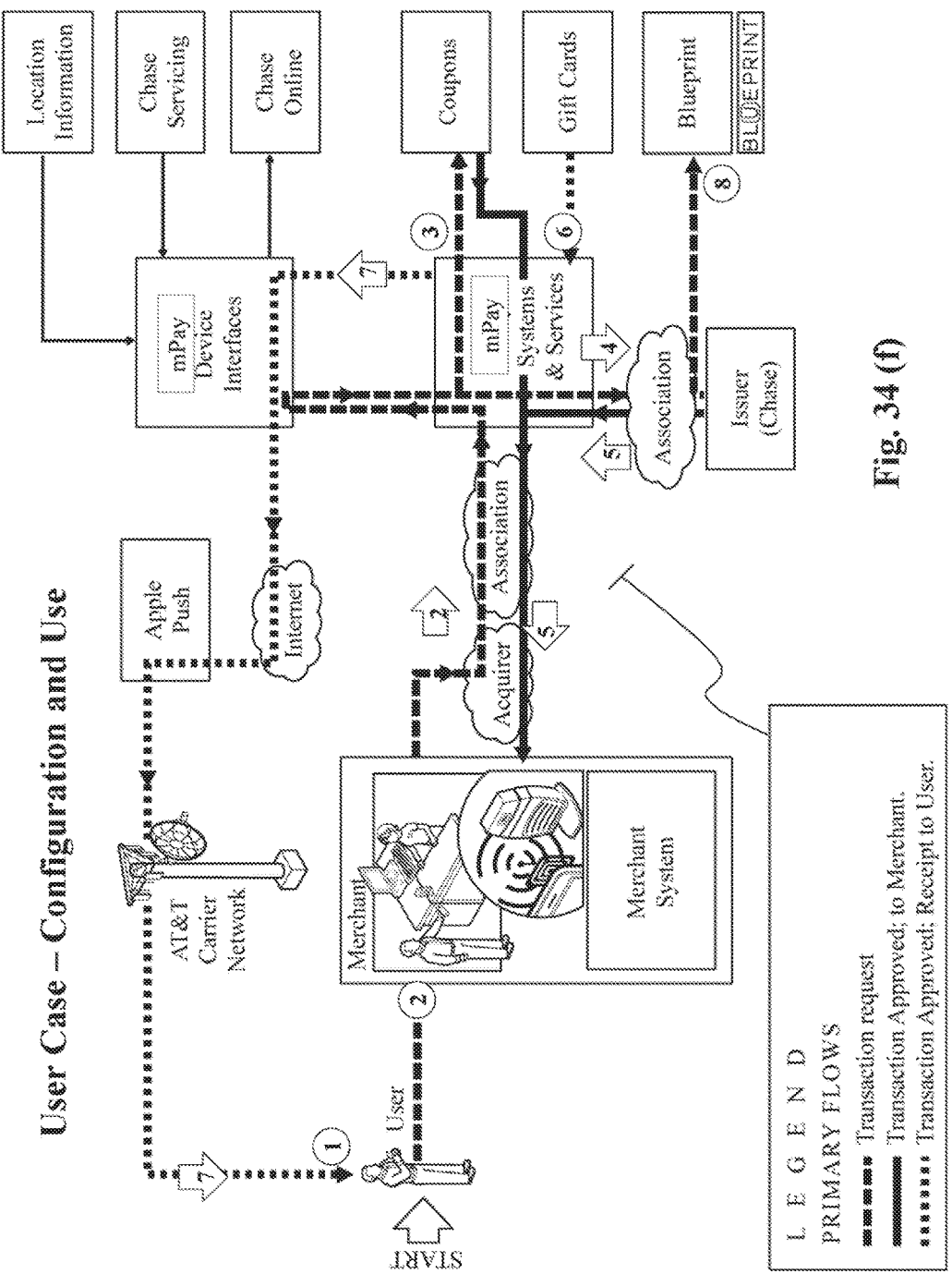

FIG. 33(c) is an illustrative user interface displayed in conjunction with the processing of step (3) of FIG. 33(a).

FIG. 33(d) is an illustrative user interface displayed in conjunction with the processing of step (4) of FIG. 33(a).

FIG. 33(e) is a flowchart showing aspects of the processing performed in the user scenario of FIG. 33(a), in accordance with one embodiment of the invention.

FIG. 33(f) is a diagram describing details of the respective steps of FIG. 33(e).

FIGS. 34(a)-34(g) are figures showing a further user scenario in which a mobile-payment device is configured and used, in accordance with one embodiment of the invention.

In particular, FIG. 34(a) shows steps of the user scenario, showing aspects of configuration and use of a mobile-payment device, in accordance with one embodiment of the invention FIG. 34(b) is an illustrative user interface displayed in conjunction with the processing of step (1) of FIG. 34(a).

FIG. 34(c) is an illustrative user interface displayed in conjunction with the processing of step (2) of FIG. 34(a).

FIG. 34(d) is an illustrative user interface displayed in conjunction with the processing of step (3) of FIG. 34(a).

FIG. 34(e) is an illustrative user interface displayed in conjunction with the processing of Step (4) of FIG. 34(a).

FIG. 34(f) is a flowchart showing aspects of the processing performed in the user scenario
of FIG. 34(a), in accordance with one embodiment of the invention.

FIG. 34(g) is a diagram describing details of the respective steps of FIG. 34(f).

FIGS. 35(a)-35(k) are FIGS. showing a further user scenario In which a mobile-payment device is used in location based ordering and payment, in accordance with one embodiment of the invention.

In particular, FIG. 35(a) shows steps of a "pre-transaction" phase of a user scenario, showing aspects of location based ordering and payment, in accordance with one embodiment of the invention.

FIG. 35(b) is an illustrative user interface displayed in conjunction with the processing of step (1) of FIG. 35(a).

FIG. 35(e) is an illustrative user interface displayed in conjunction with the processing of step (2) of FIG. 35(a).

Figure 35:
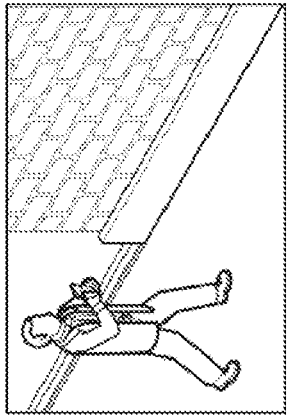
FIGS. 35(a)-35(k) are figures showing a further user scenario in which a mobile-payment device is used in location based ordering and payment, in accordance with one embodiment of the invention.
Figure 35D:
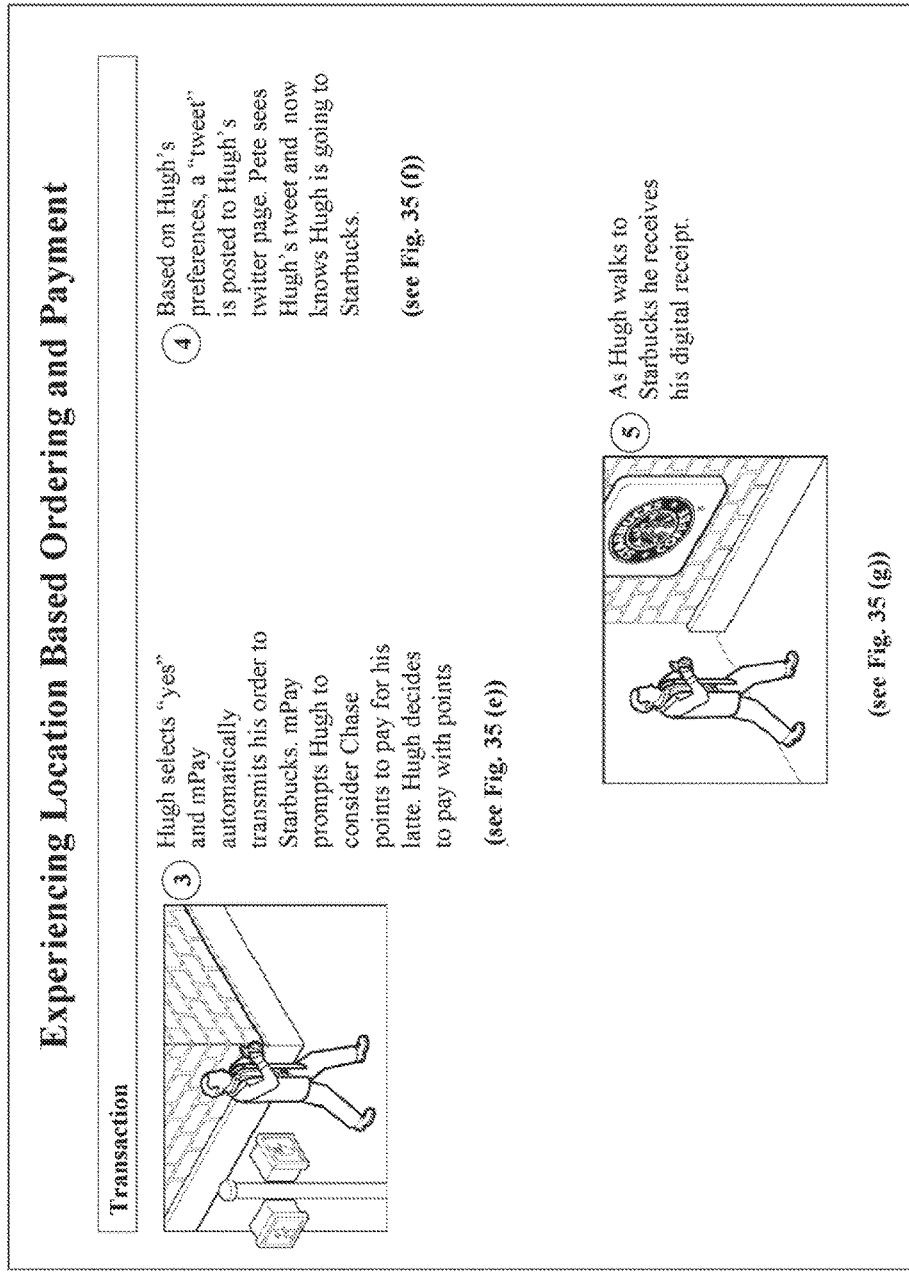
Figure 35:
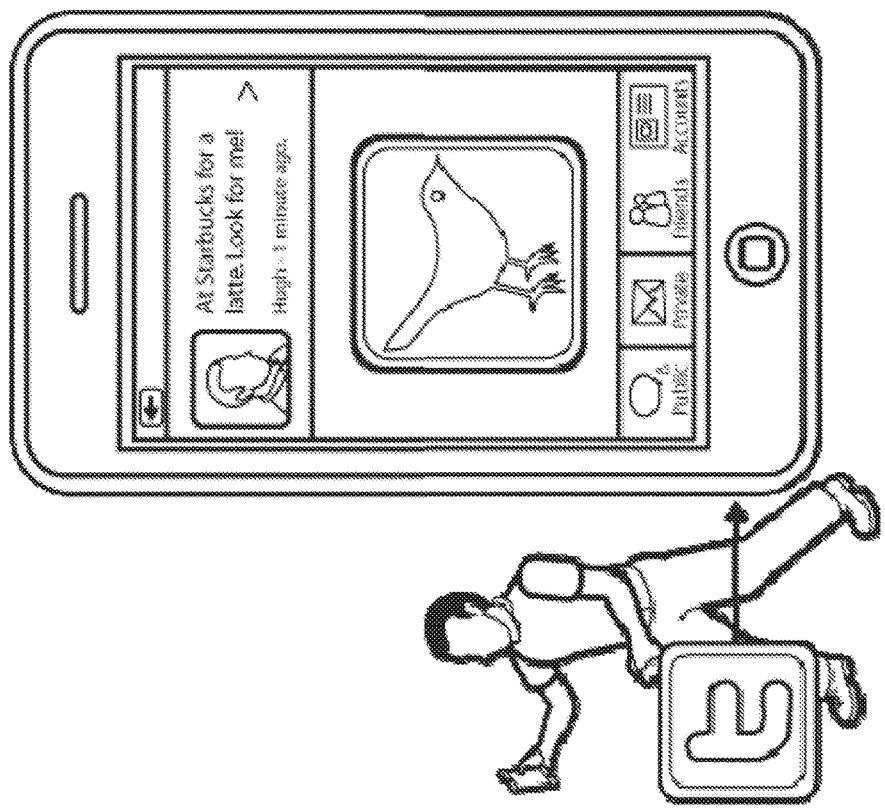
Figure 35:
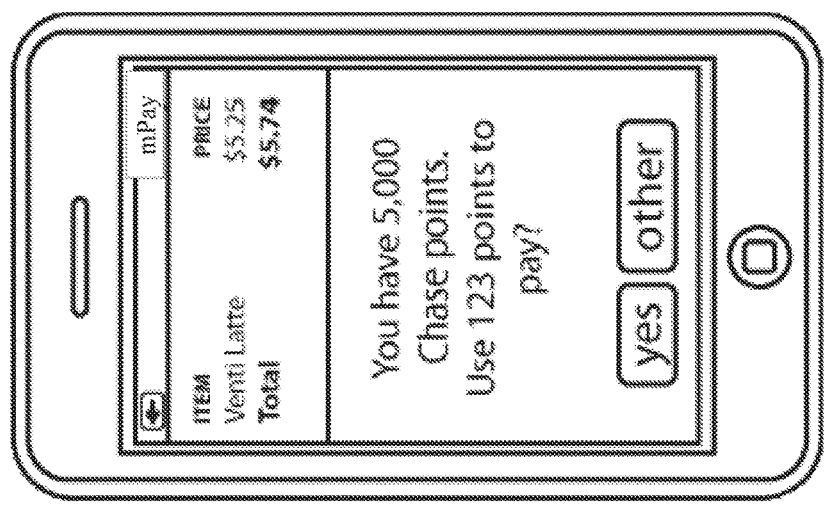
Figure 35:
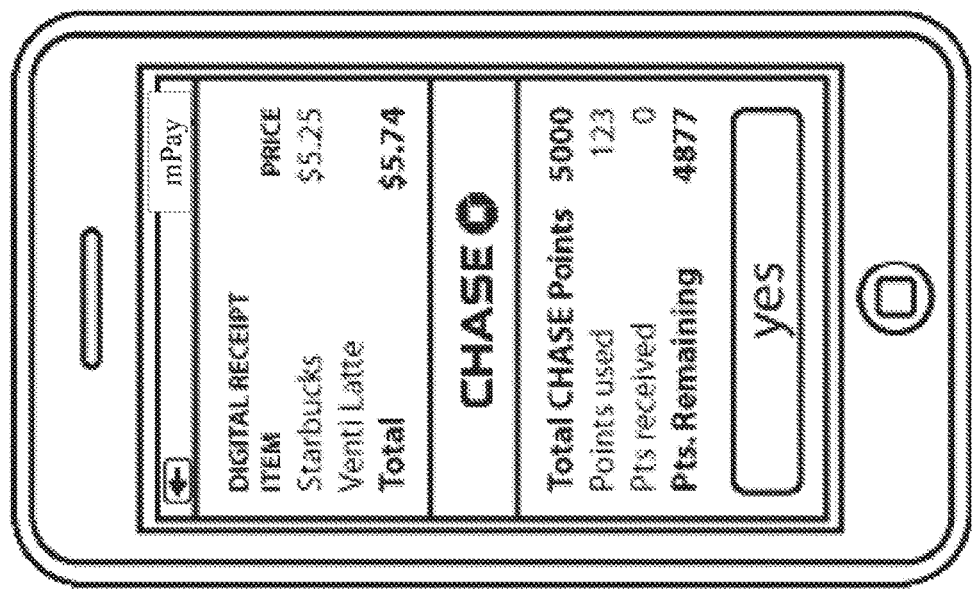
Figure 35:
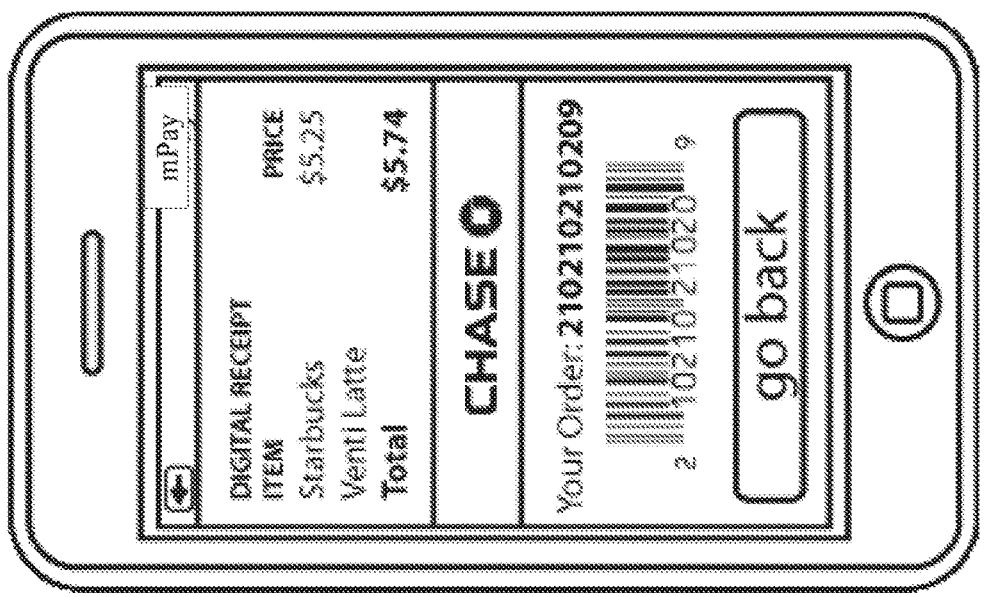
Figure 35:
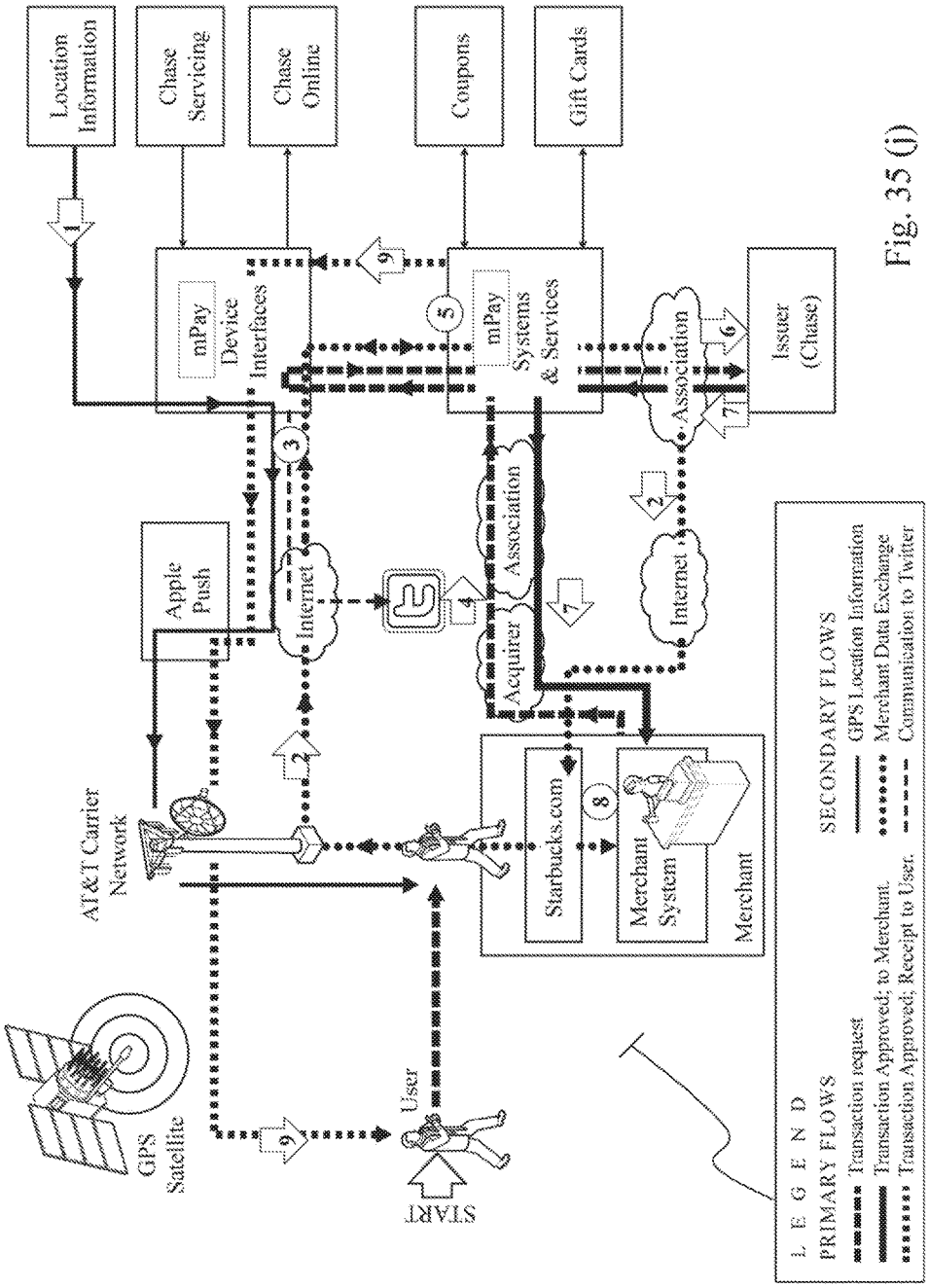
Figure 36:
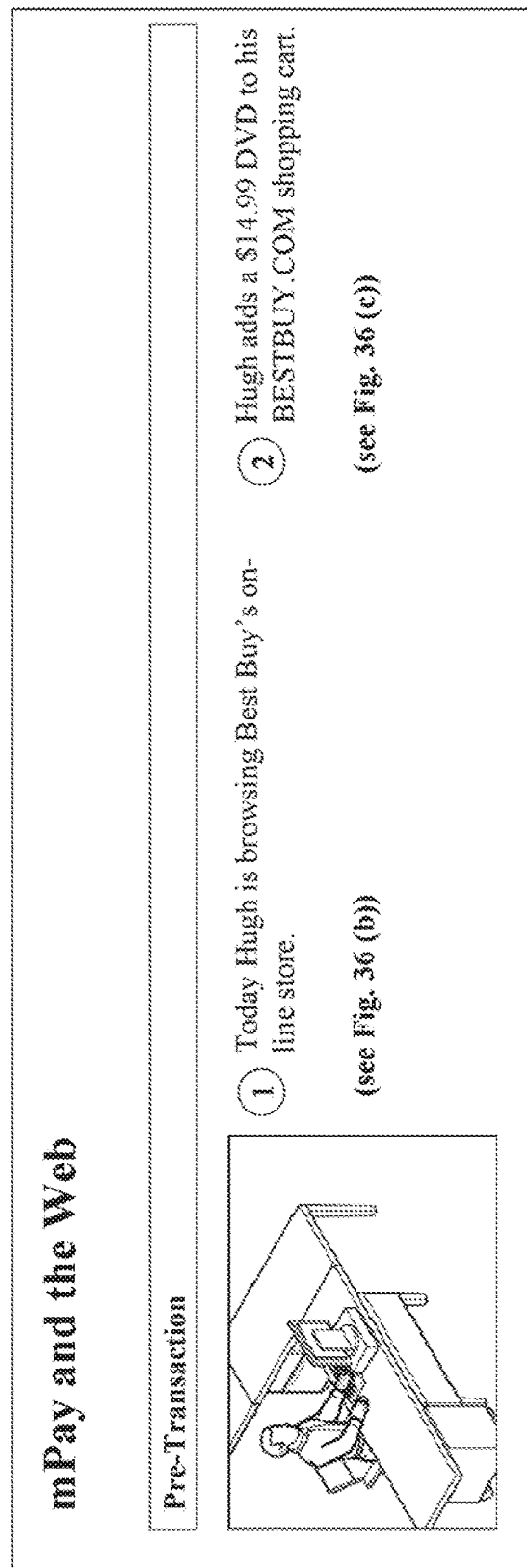
FIGS. 36(a)-36(k) are figures showing a further user scenario in which a mobile-payment device is used in web based ordering and payment, in accordance with one embodiment of the invention.
Figure 36:
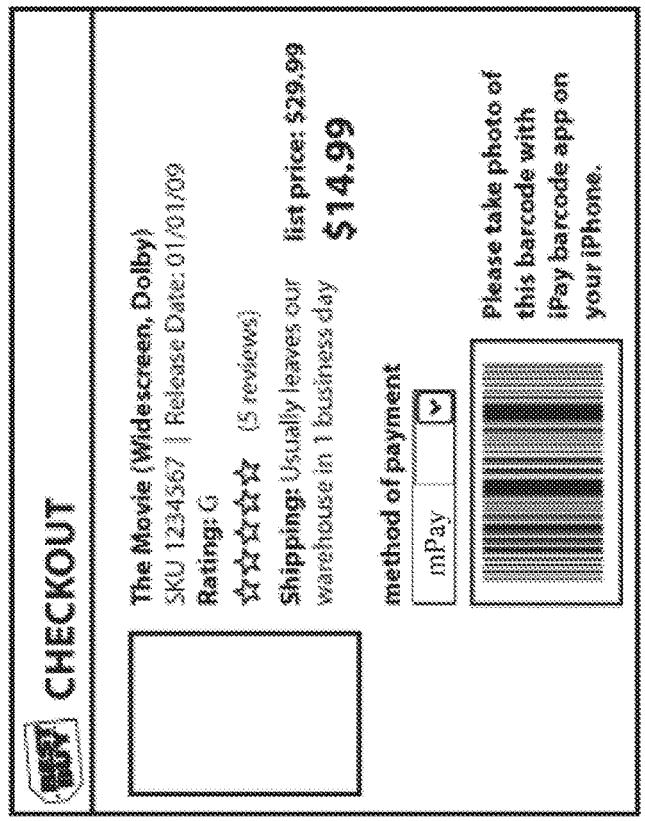
Figure 36:
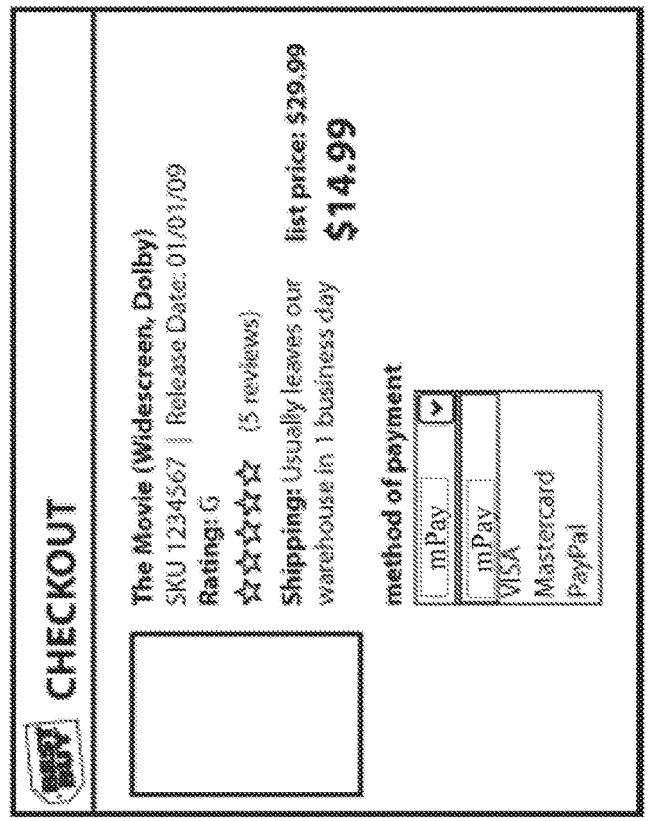
Figure 36:
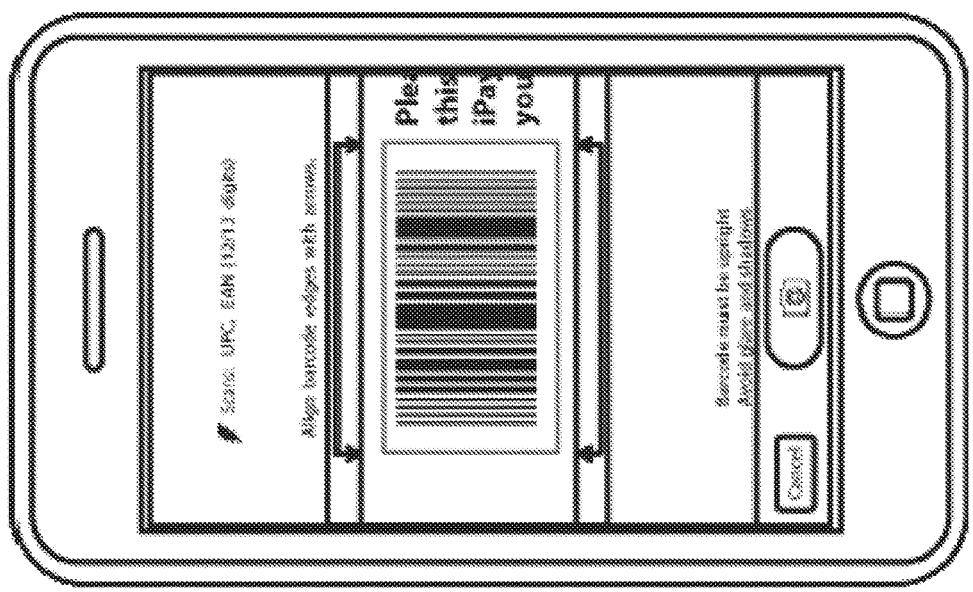
Figure 36:
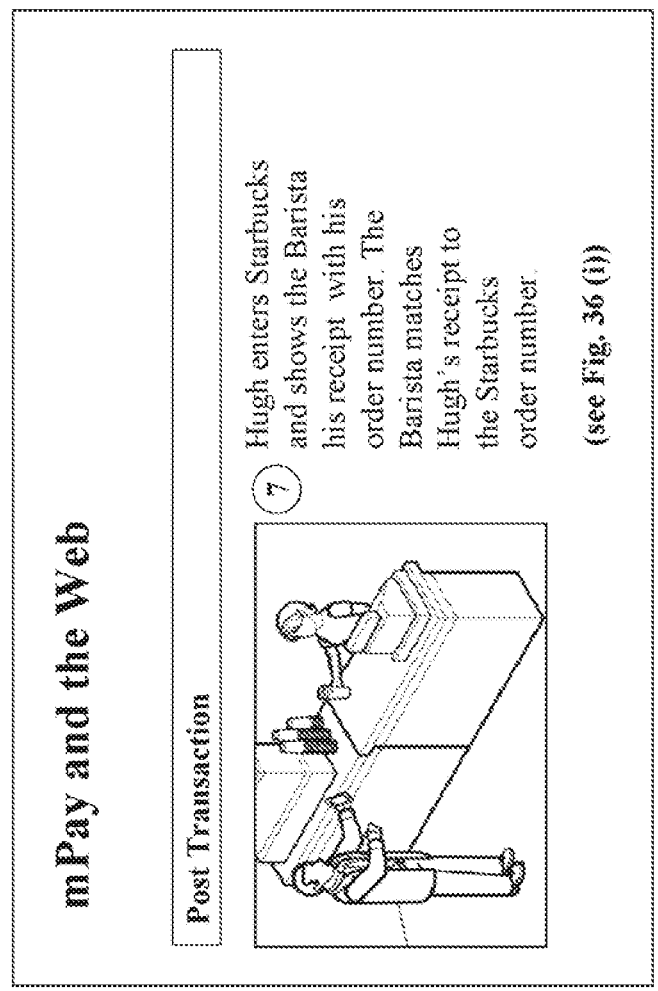
Figure 36:
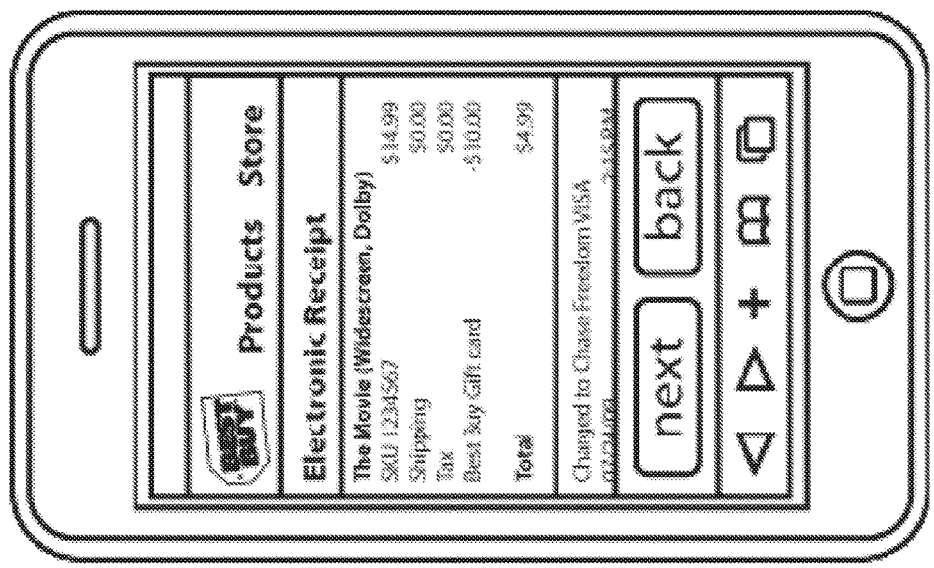
Figure 37:
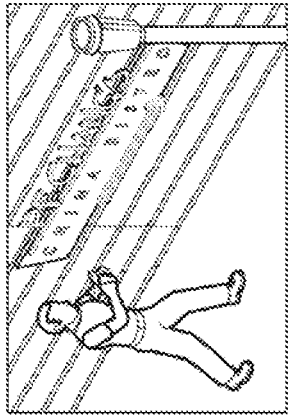
FIGS. 37(a)-37(k) are figures showing a further user scenario in which a mobile-patient device is used in restaurant ordering and payment, in accordance with one embodiment of the invention.
Figure 37:
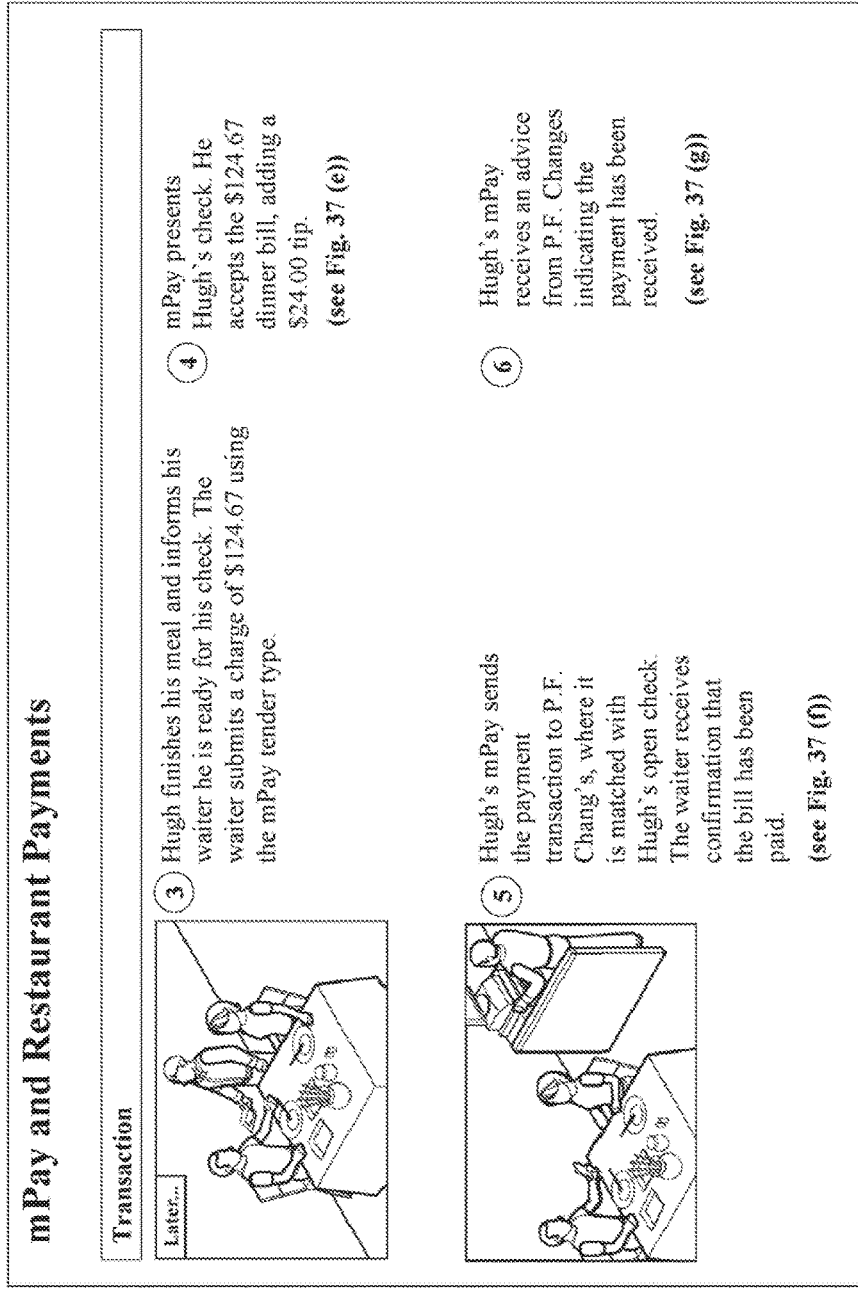
Figure 37:
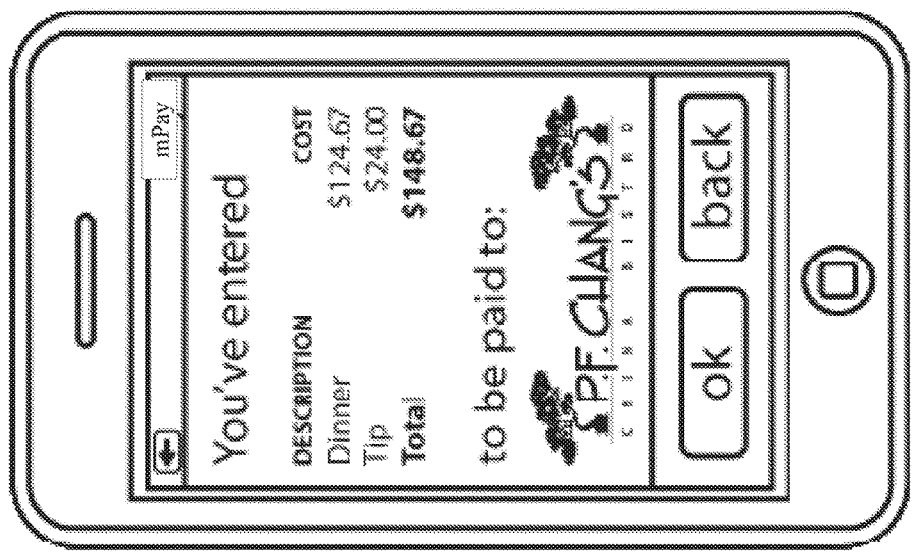
Figure 37:
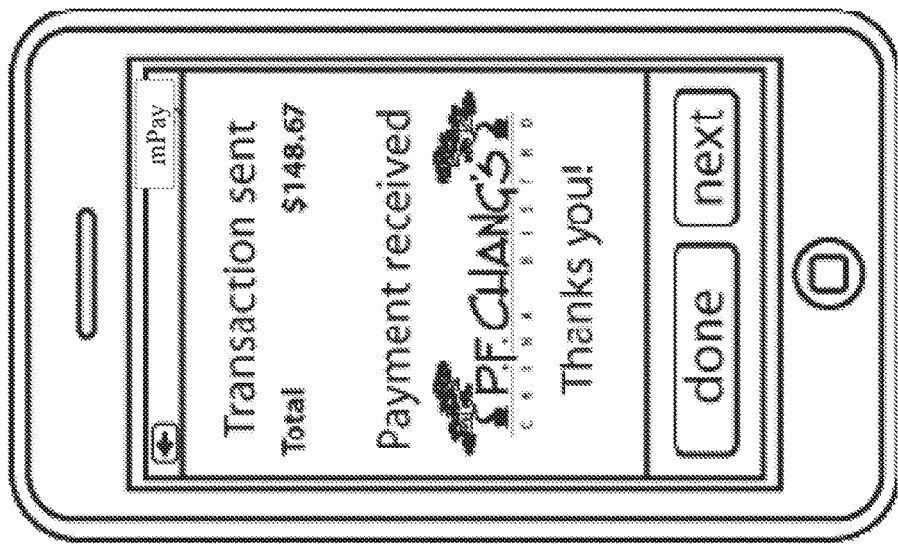
Figure 37:
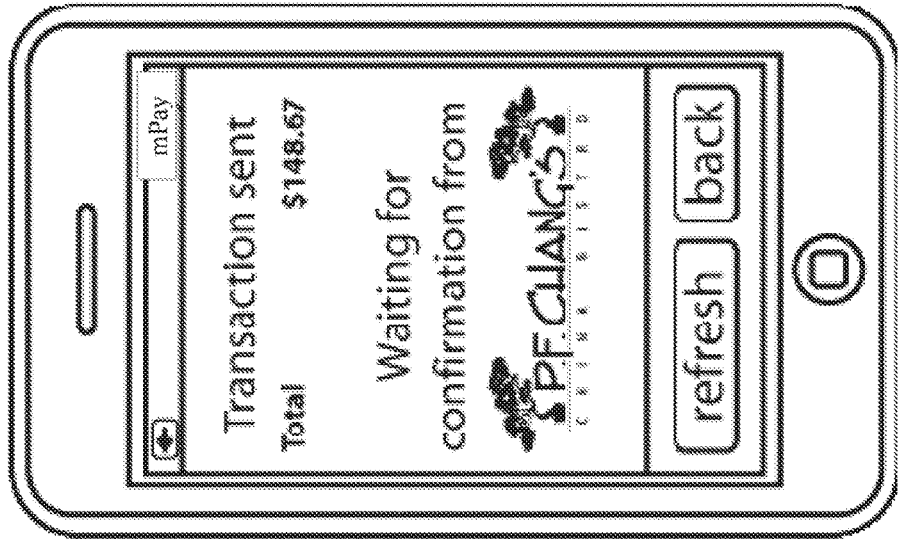
Figure 37:
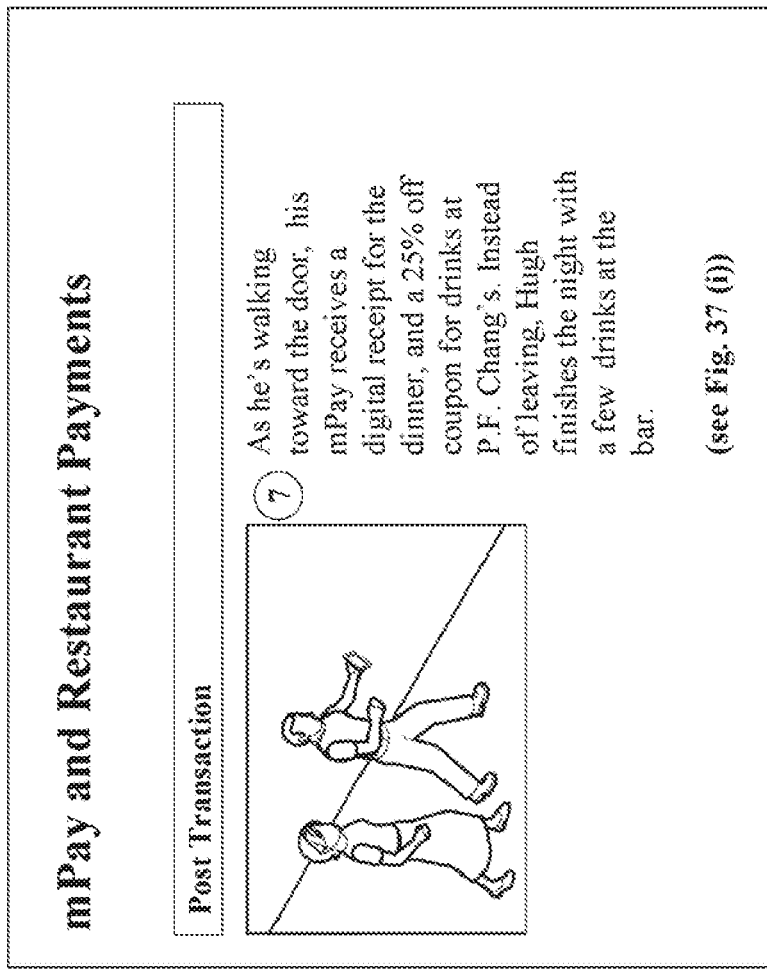
Figure 37:
Figure 37:
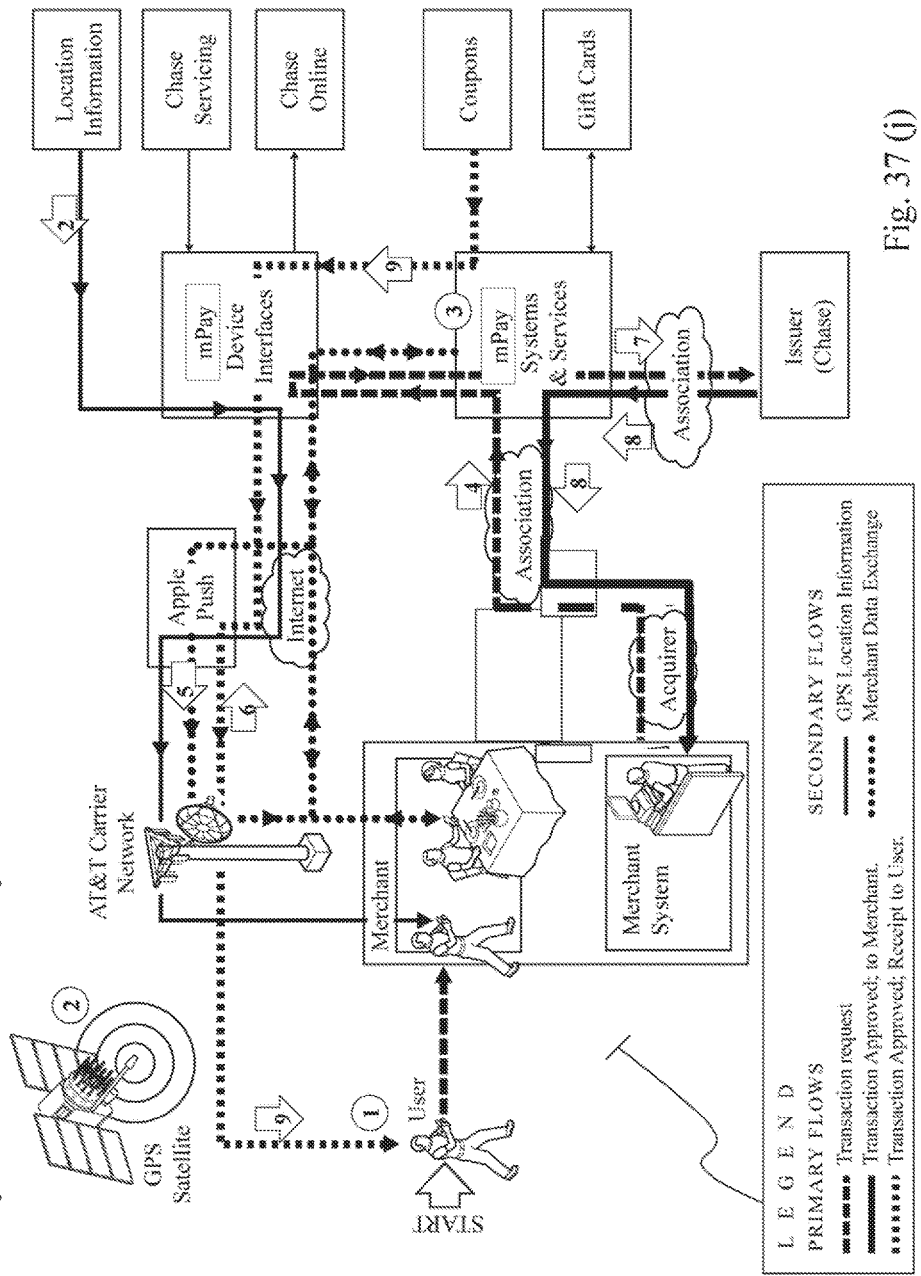
Figure 38:
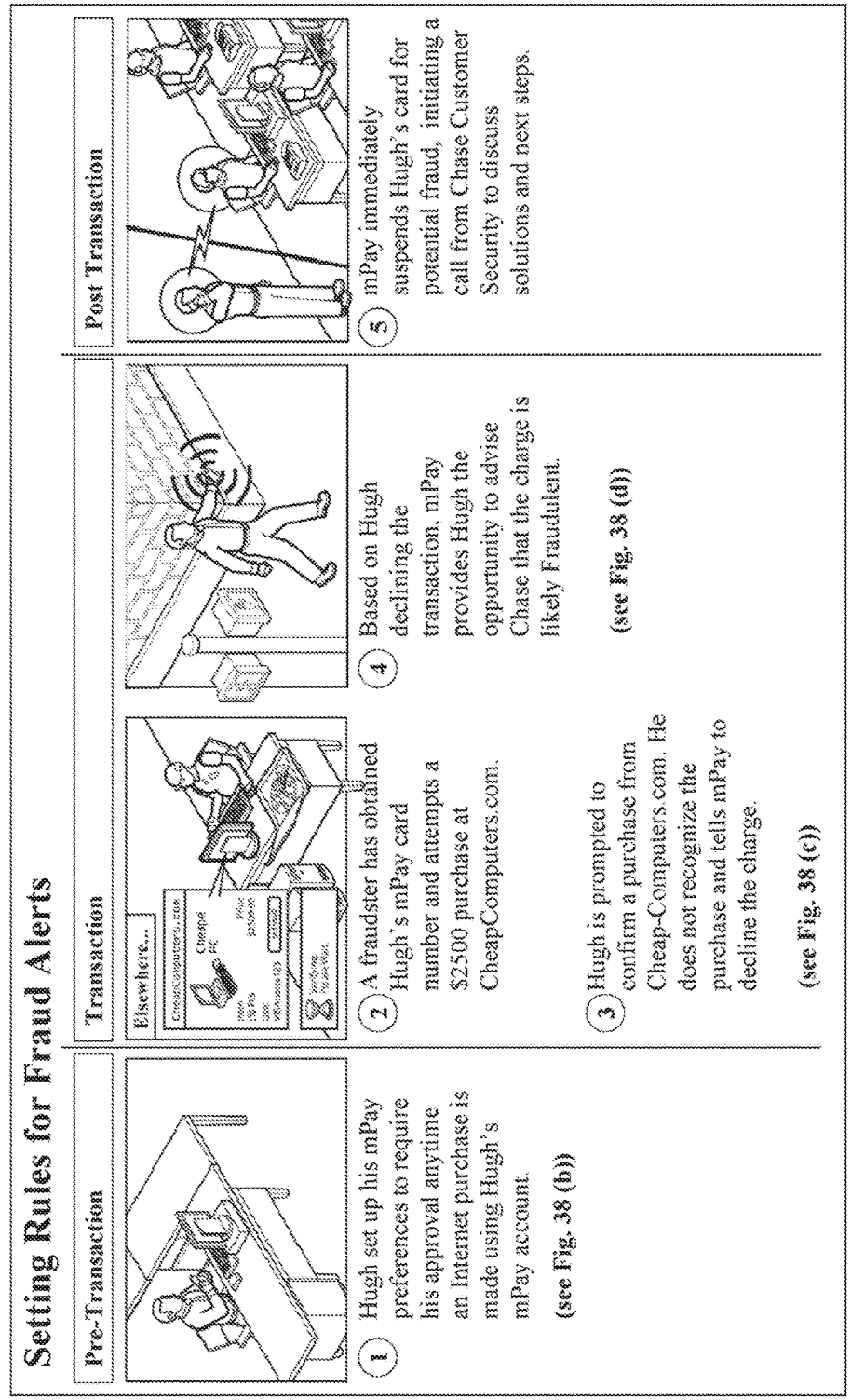
FIGS. 38(a)-38(f) are figures showing a further user scenario in which a mobile-payment device is used in setting rules and fraud alerts, in accordance with one embodiment of the invention.
Figure 38:
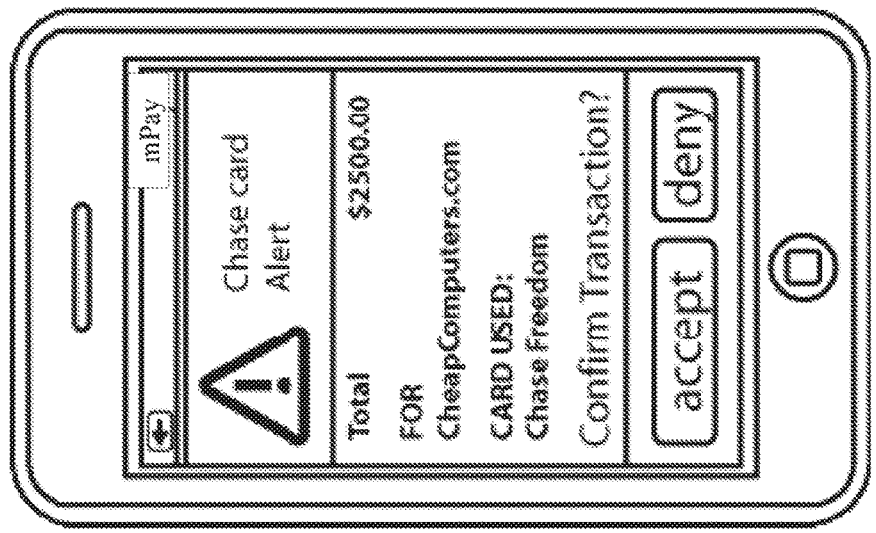
Figure 38:
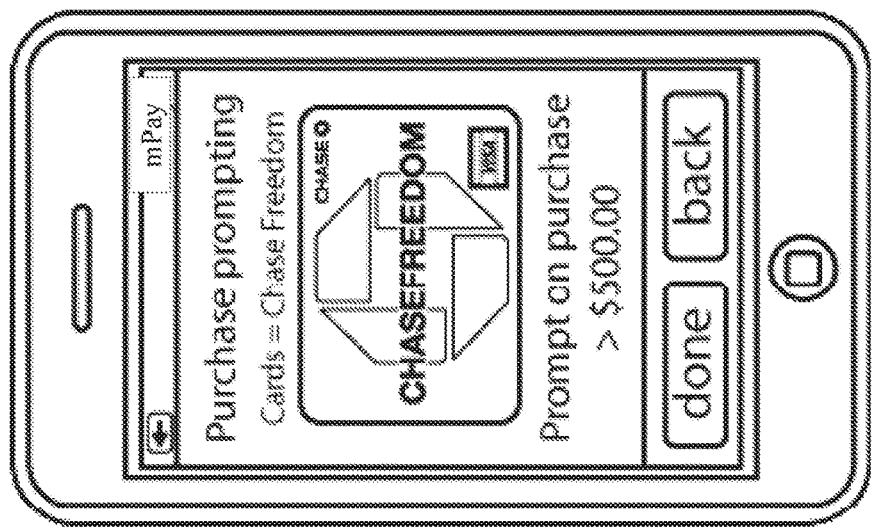
Figure 38:
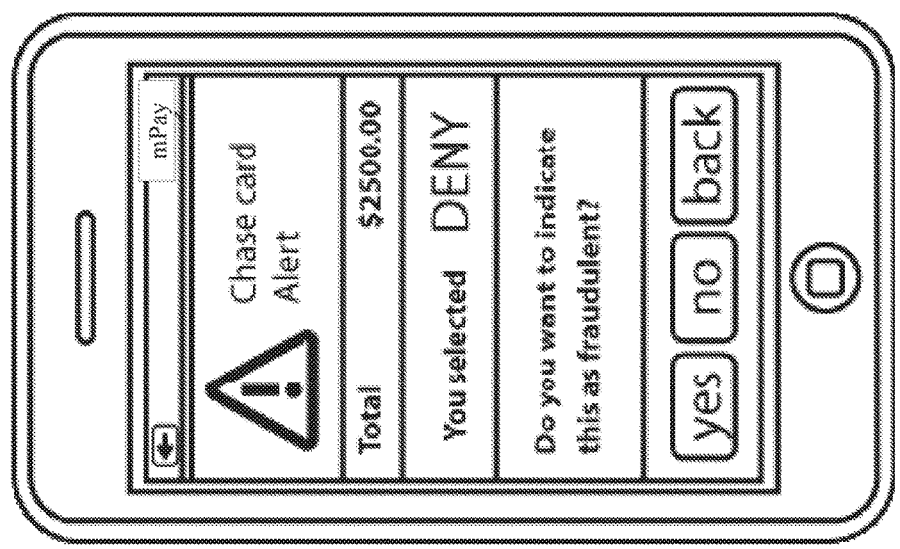
Figure 38:
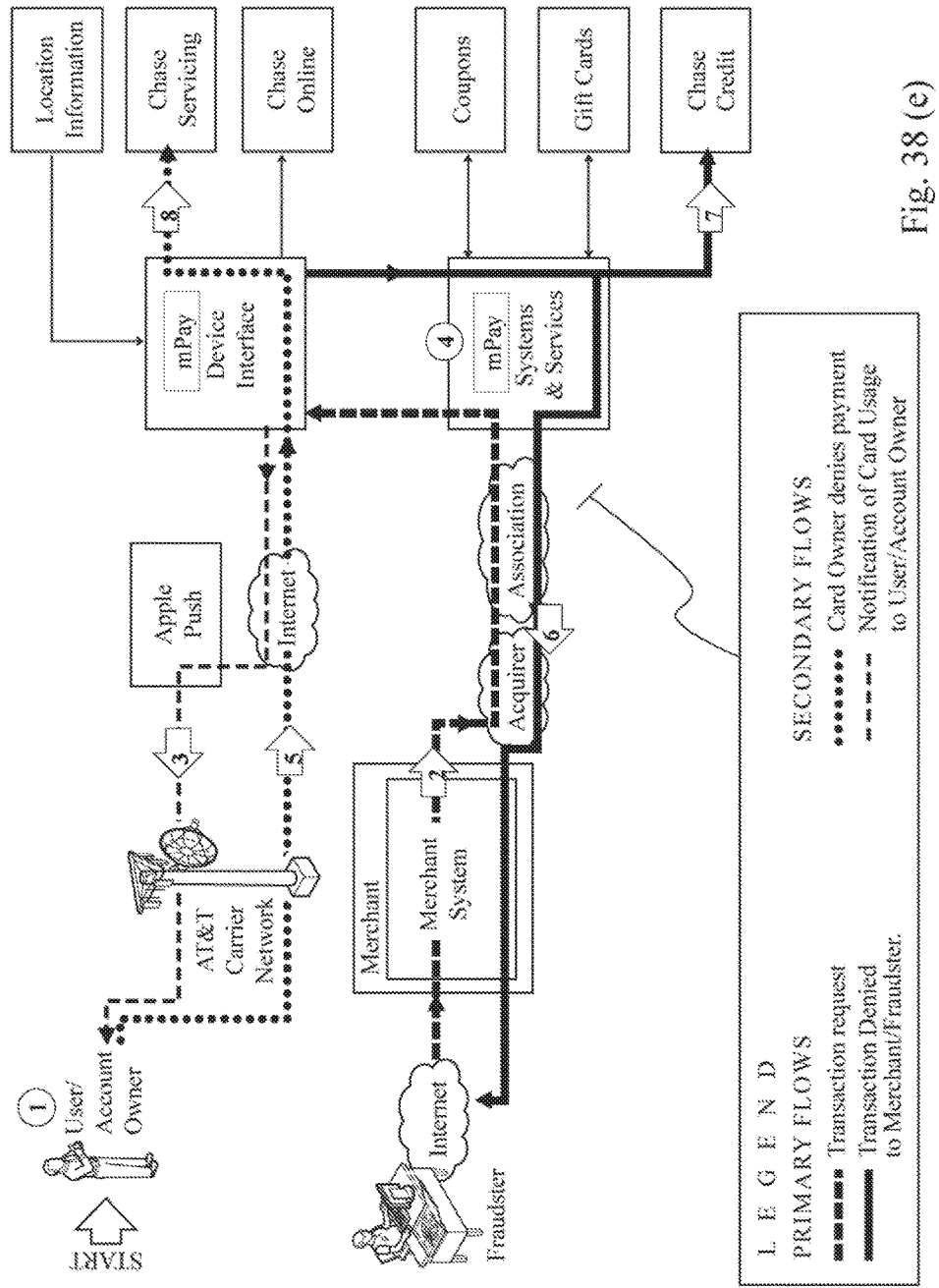
Figure 39:
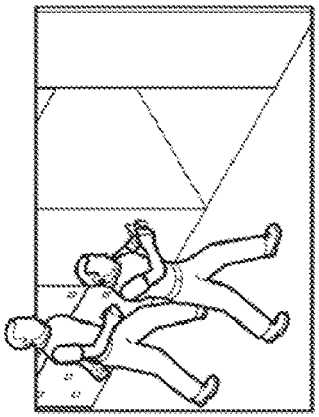
FIGS. 39(a)-39(k) are figures showing a former user scenario in which a mobile-payment device is used in open bar tab ordering and payment, in accordance with one embodiment of the invention.
Figure 39:
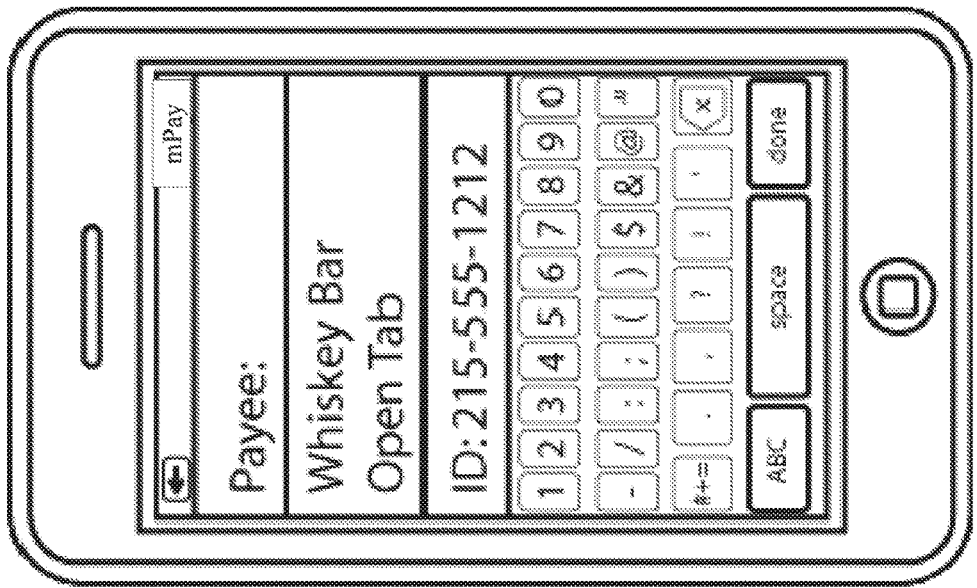
Figure 39:
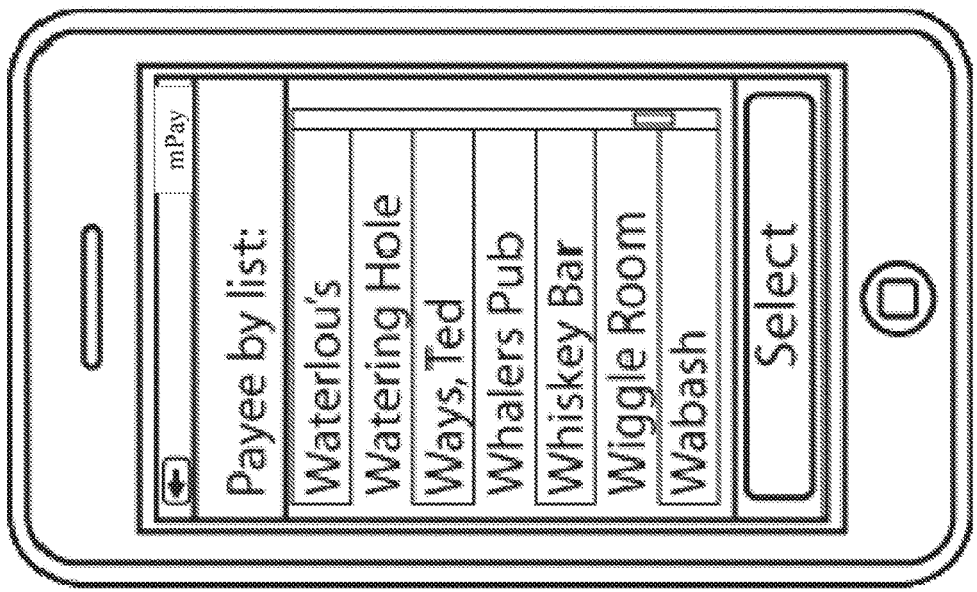
Figure 39:
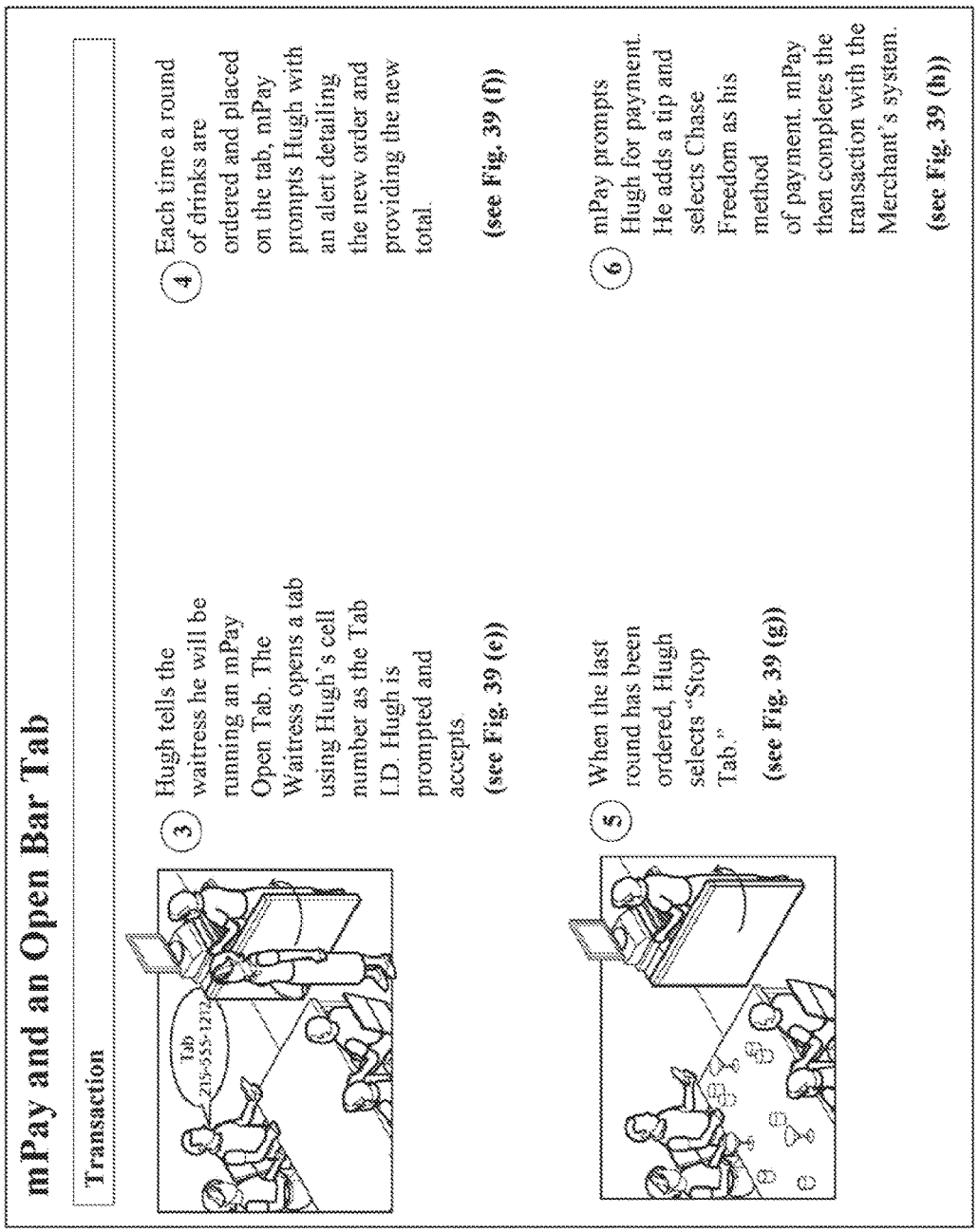
Figure 39:
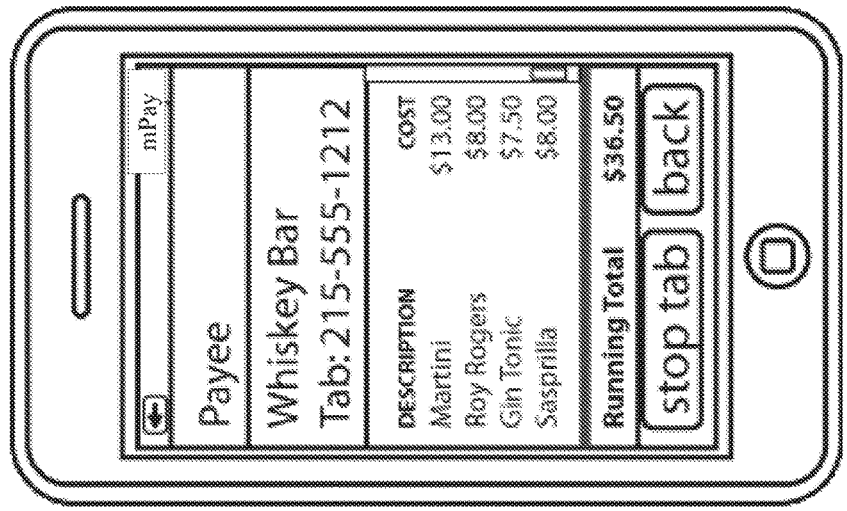
Figure 39:
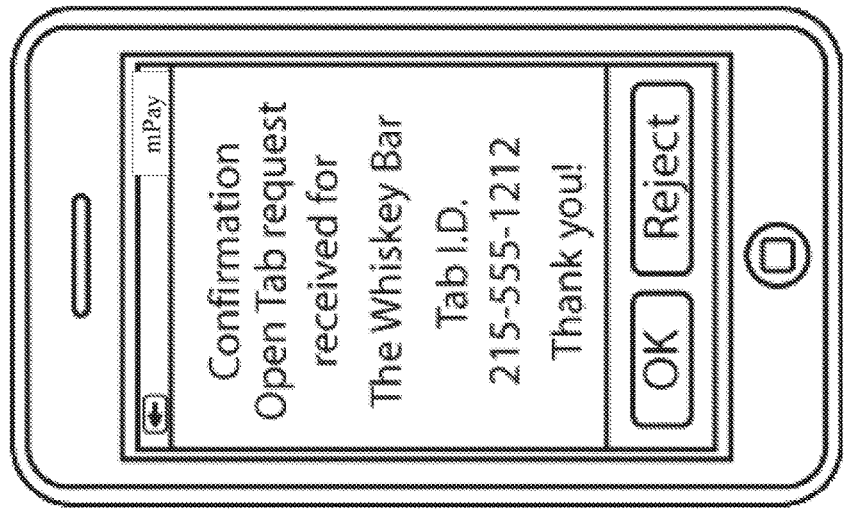
Figure 39:
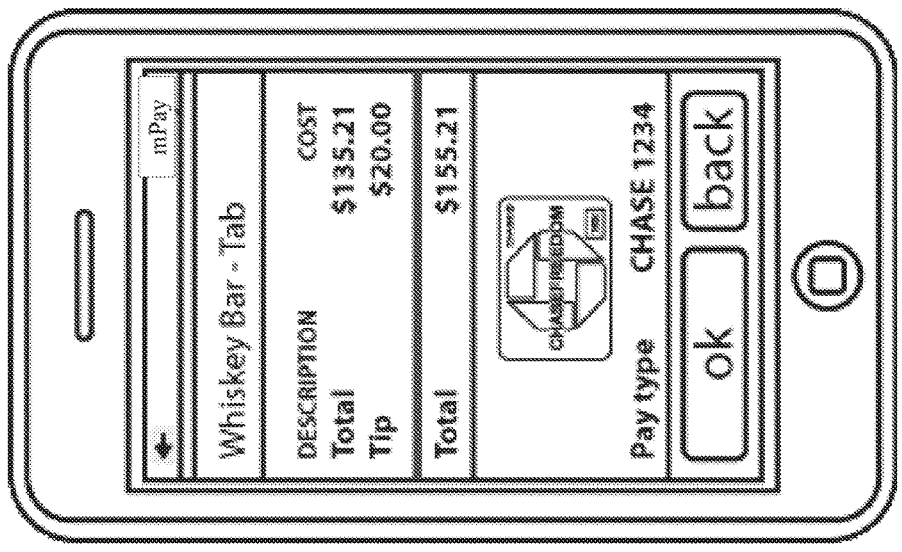
Figure 39:
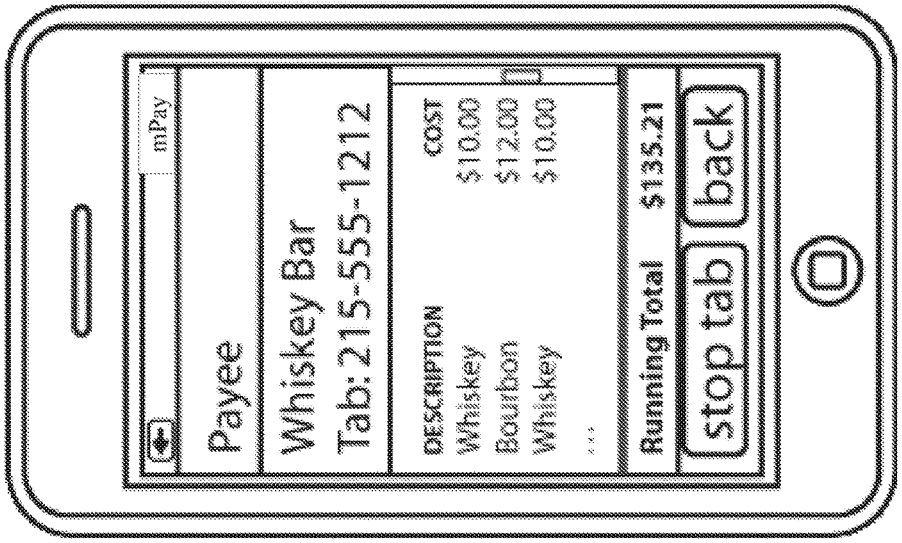
Figure 39:
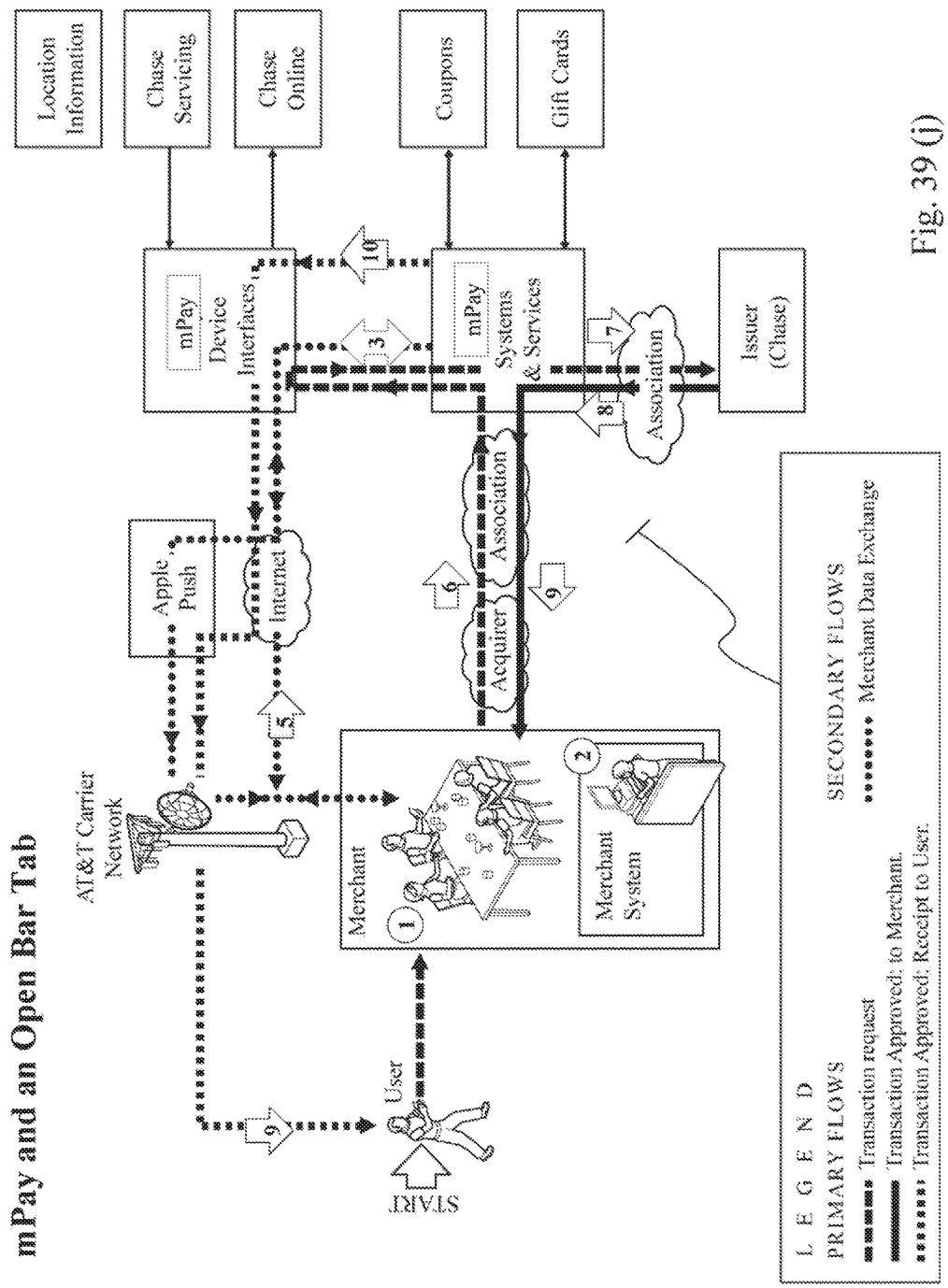
Figure 40:
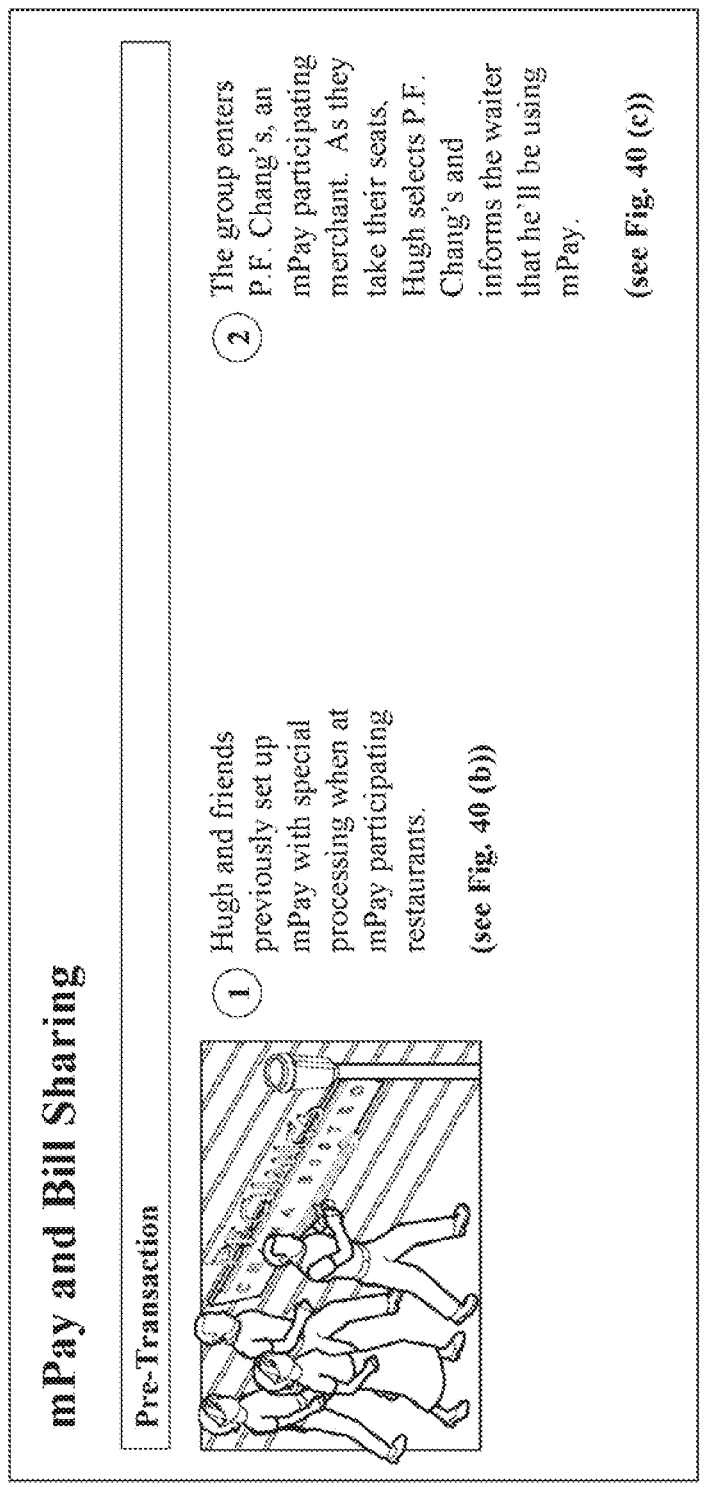
FIGS. 40(a)-40(l) are figures showing a further user scenario in which a mobile-payment device is used in bill sharing, in accordance with one embodiment of the invention.
Figure 40:
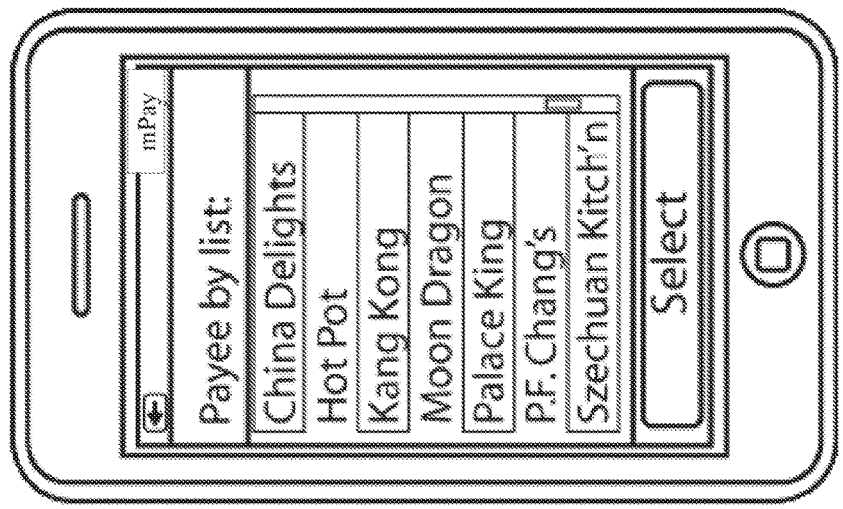
Figure 40:
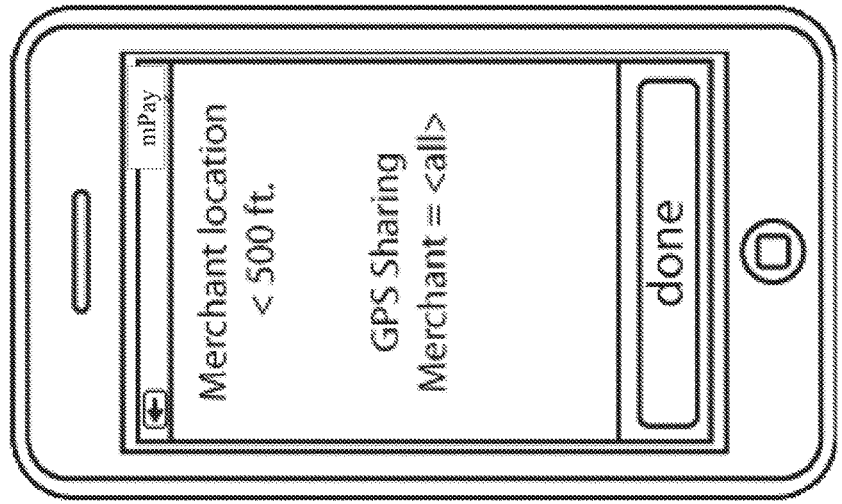
Figure 40:
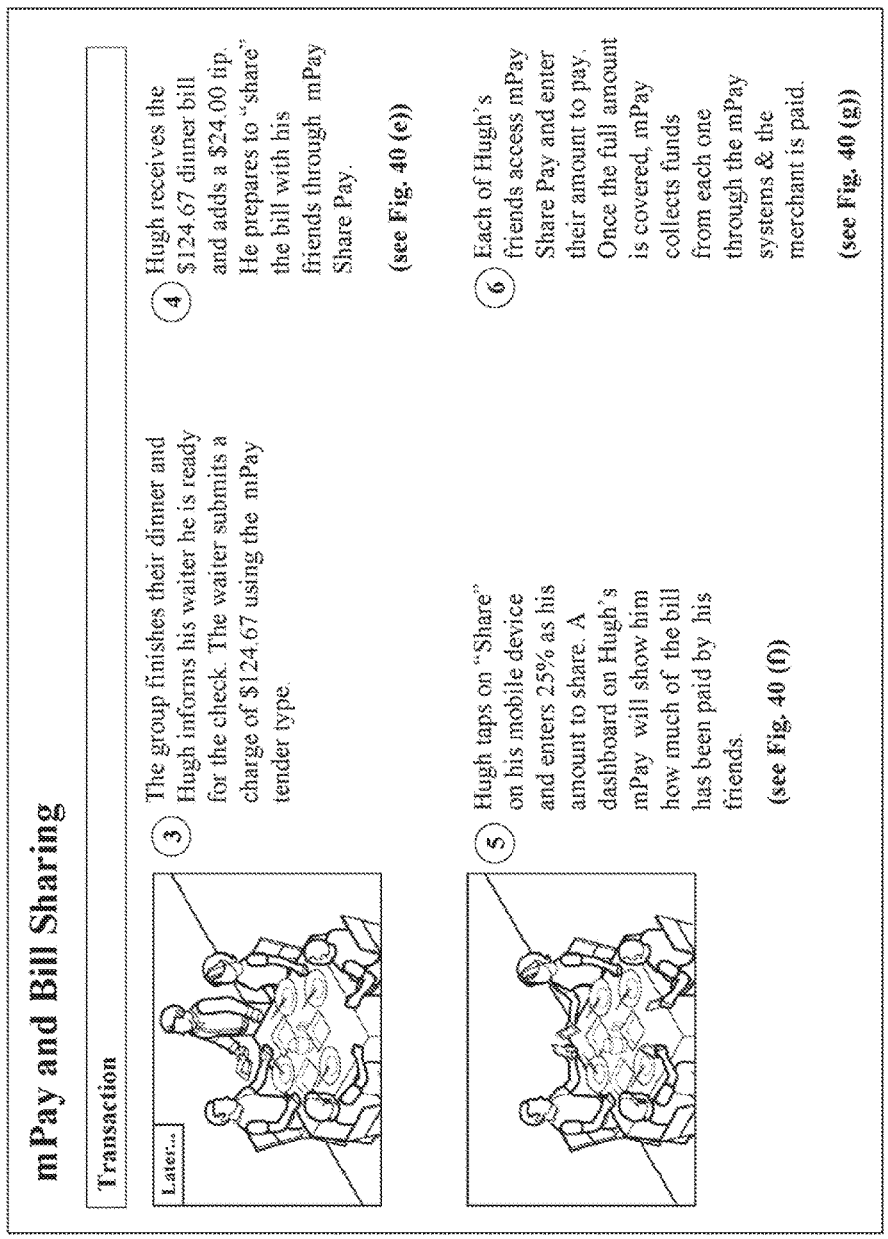
Figure 40:
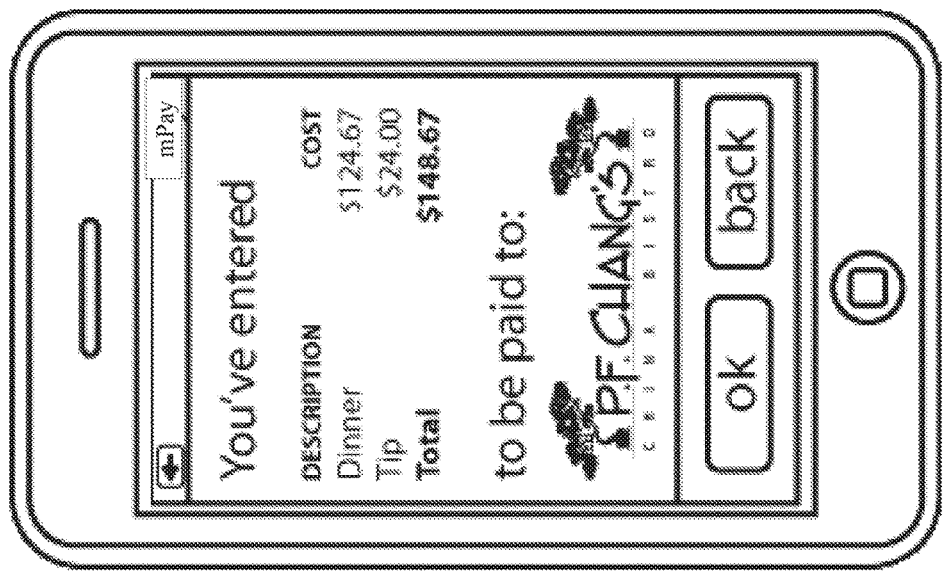
Figure 40:
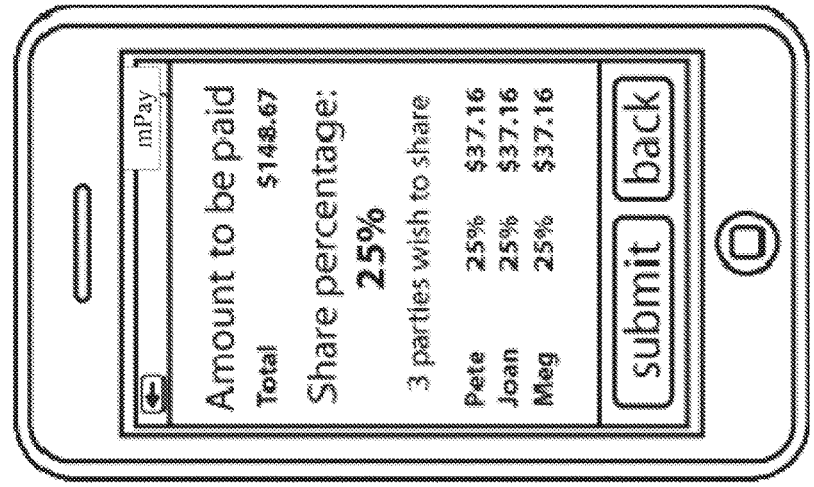
Figure 40:
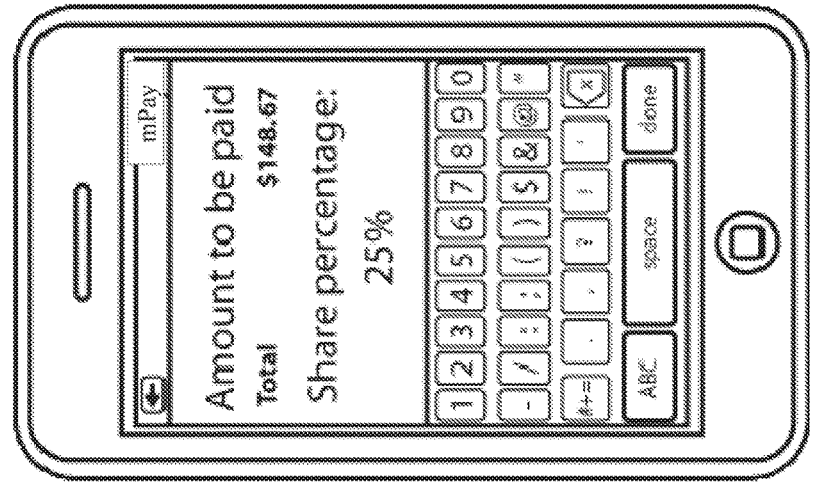
Figure 40:
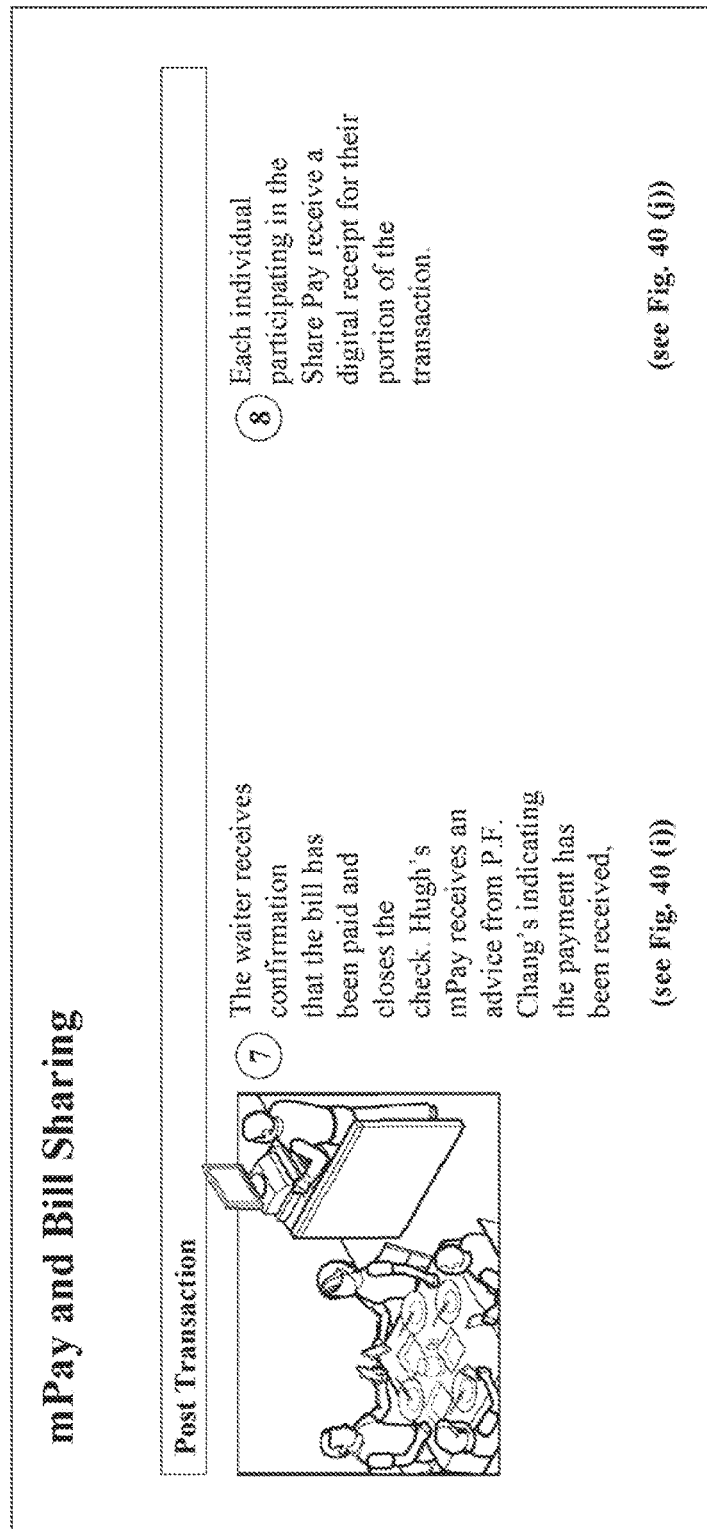
Figure 40:
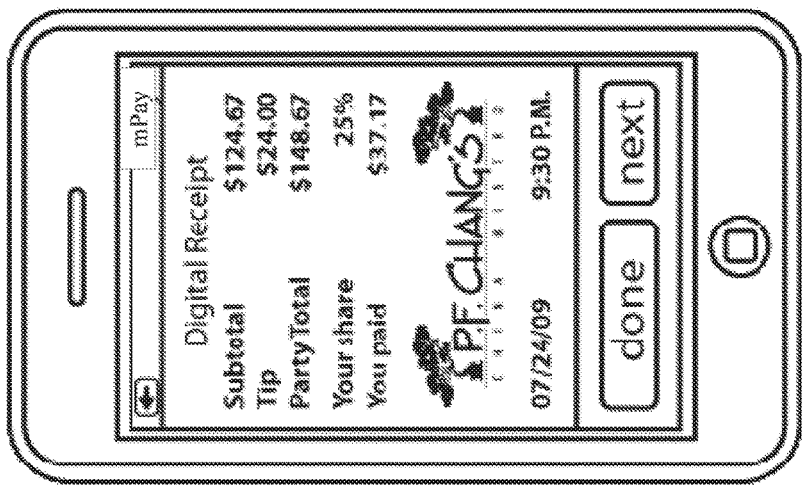
Figure 40:
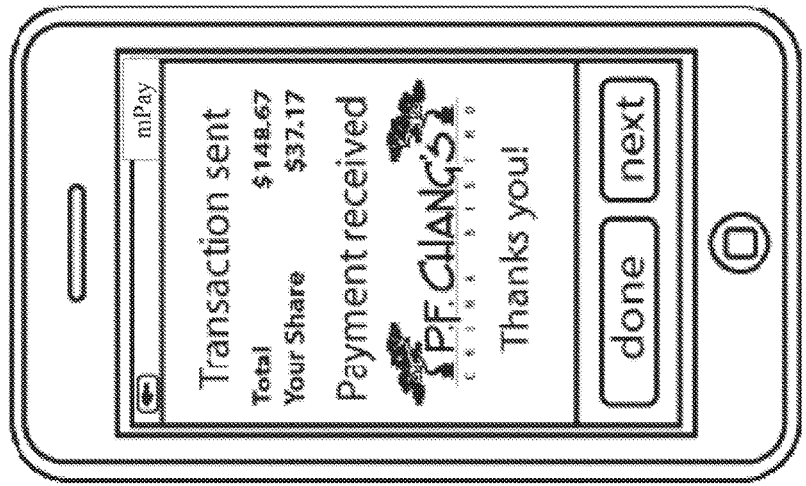
Figure 40:
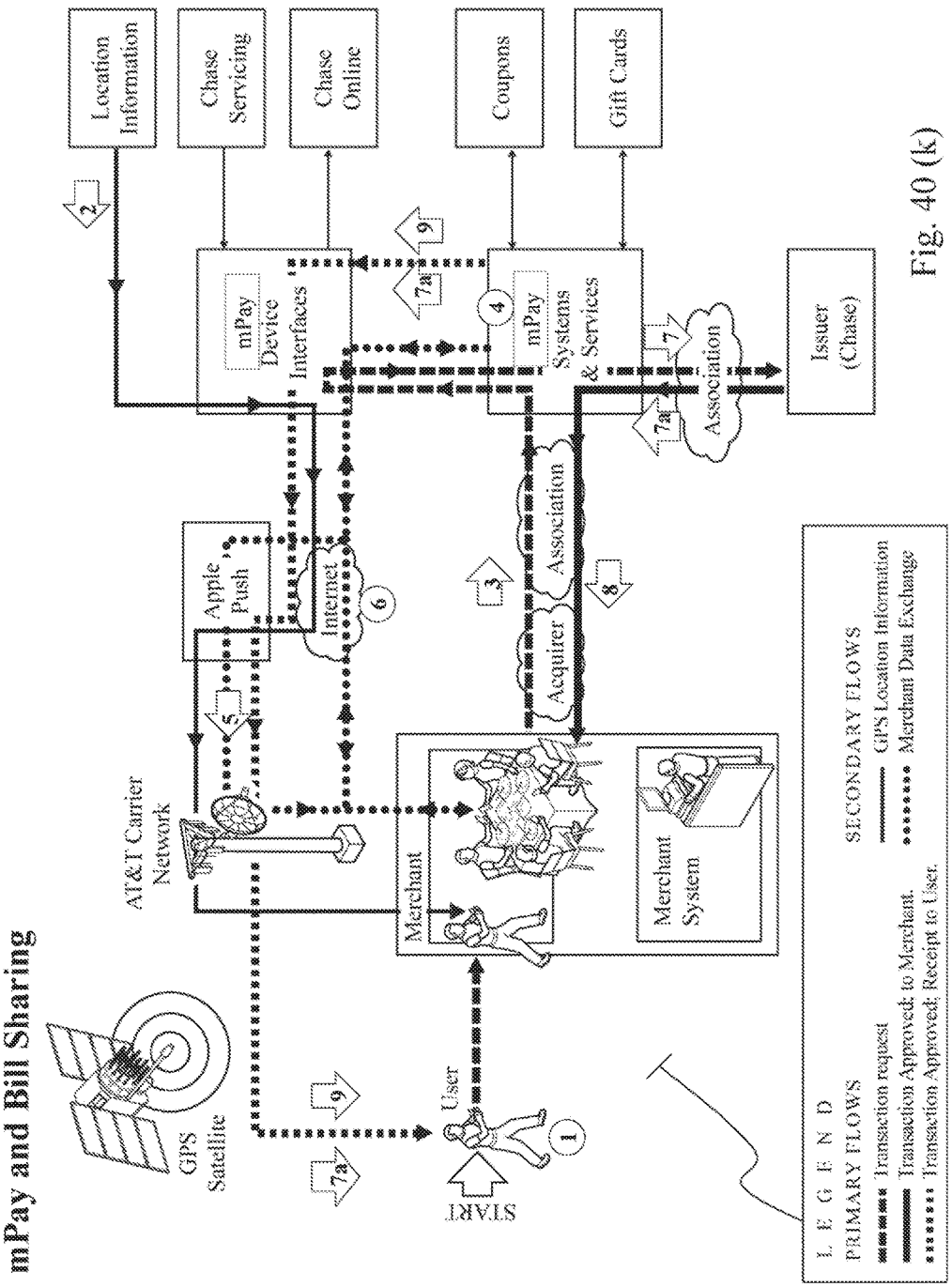

FIG. 35(d) shows steps of a "transaction" phase of a user scenario, showing aspects of location based ordering and payment, in accordance with one embodiment of the invention.

FIG. 35(e) is an illustrative user interface displayed in conjunction with the processing of step (3) of FIG. 35(d).

FIG. 35(f) is an illustrative user interface displayed in conjunction with the processing of step (4) of FIG. 35(d).

FIG. 35(g) is an illustrative user interface displayed in conjunction with the processing of step (5) of FIG. 35(d).

FIG. 35(h) shows steps of a "post-transaction" phase of a user scenario, showing aspects of location based ordering and payment, in accordance with one embodiment of the invention.

FIG. 35(i) is an illustrative user interlace displayed in conjunction with the processing of step (6) of FIG. 35(h).

FIG. 35(j) is a flowchart showing aspects of the processing performed in the user scenario of FIG. 35(a), in accordance with one embodiment of the invention.

FIG. 35(k) is a diagram describing details of the respective steps of FIG. 35(j).

FIGS. 36(a)-36(k) are figures showing a further user scenario in which a mobile-payment device is used in web based ordering and payment, in accordance with one embodiment of the invention.

In particular, FIG. 36(a) shows steps of a "pre-transaction" phase of a user scenario, showing aspects of web based ordering and payment, in accordance with one embodiment of the invention.

FIG. 36(b) is an illustrative user interface displayed in conjunction with the processing of step (1) of FIG. 36(a).

FIG. 36(c) is an illustrative user interface displayed in conjunction with the processing of step (2) of FIG. 36(a).

FIG. 36(d) shows steps of a "transaction" phase of a user scenario, showing aspects of web based ordering and payment, in accordance with one embodiment of the invention.

FIG. 36(e) is an illustrative user interface displayed in conjunction with the processing of step (3) of FIG. 36(d).

FIG. 36(f) is an illustrative user interface displayed in conjunction with the processing of step (4) of FIG. 36(d).

FIG. 36(g) is an illustrative user interface displayed in conjunction with the processing of Step (6) of FIG. 36(d).

FIG. 36(h) shows steps of a "post-transaction" phase of a user scenario, showing aspects of web based ordering and payment, in accordance with one embodiment of the invention.

FIG. 36(i) is an illustrative user interface displayed in conjunction with the processing of step (7) of FIG. 36(h).

FIG. 36(j) is a flowchart showing aspects of the processing performed in the user scenario of FIG. 36(a), in accordance with one embodiment of the invention.

FIG. 36(k) is a diagram describing details of the respective steps of FIG. 36(j).

FIGS. 37(a)-37(k) are figures showing a further user scenario in which a mobile-payment device is used in restaurant ordering and payment, in accordance with one embodiment of the invention.

In particular FIG. 37(a) shows steps of a "pre-transaction" phase of a user scenario, showing aspects of restaurant ordering and payment, in accordance with one embodiment of the invention.

FIG. 37(b) is an illustrative user interface displayed in conjunction with the processing of step (1) of FIG. 37(a).

FIG. 37(c) is an illustrative user interface displayed in conjunction with the processing of step (2) of FIG. 37(a).

FIG. 37(d) shows steps of a "transaction" phase of a user scenario, showing aspects of restaurant ordering and payment, in accordance with one embodiment of the invention.

FIG. 37(e) is an illustrative user interface displayed in conjunction with the processing of step (4) of FIG. 37(d).

FIG. 37(f) is an illustrative user interface displayed in conjunction with the processing of step (5) of FIG. 37(d).

FIG. 37(g) is an illustrative user interlace displayed in conjunction with the processing of step (6) of FIG. 37(d).

FIG. 37(h) shows steps of a "post-transaction" phase of a user scenario, showing aspects of restaurant ordering and payment, in accordance with one embodiment of the invention.

FIG. 37(i) is an illustrative user interface displayed in conjunction with the processing of step (7) of FIG. 37(h).

FIG. 37(j) is a flowchart showing aspects of the processing performed in the user scenario of FIG. 37(a), in accordance with one embodiment of the invention.

FIG. 37(k) is a diagram describing details of the respective steps of FIG. 37(j).

FIGS. 38(a)-38(f) are figures showing a further user scenario in which a mobile-payment device is used in setting rules and fraud alerts, in accordance with one embodiment of the invention.

In particular, FIG. 38(a) shows steps of a "pre-transaction" phase of a user scenario, showing aspects of setting rules and fraud alerts, in accordance with one embodiment of the invention.

FIG. 38(b) is an illustrative user interlace displayed in conjunction with the processing of step (1) of FIG. 38(a).

FIG. 38(c) is an illustrative user interface displayed in conjunction with the processing of step (3) of FIG. 38(a).

FIG. 38(d) is an illustrative user interface displayed in conjunction with the processing of step (4) of FIG. 38(a).

FIG. 38(e) is a flowchart showing aspects of the processing performed in the user scenario of FIG. 38(a), in accordance with one embodiment of the invention.

FIG. 38(f) is a diagram, describing details of the respective steps of FIG. 38(e).

FIGS. 39(a)-39(k) are figures showing a further user scenario in which a mobile-payment device is used in open bar tab ordering and payment, in accordance with one embodiment of the invention.

In particular, FIG. 39(a) shows steps of a "pre-transactions" phase of a user scenario, showing aspects of open bar tab ordering and payment, in accordance with one embodiment of the invention.

FIG. 39(b) is an illustrative user interface displayed in conjunction with the processing of step (1) of FIG. 39(a).

FIG. 39(c) is an illustrative user interface displayed in conjunction with the processing of step (2) of FIG. 39(a).

FIG. 39(d) shows steps of a "transaction" phase of a user scenario, showing aspects of open bar tab ordering and payment, in accordance, with one embodiment of the invention.

FIG. 39(e) is an illustrative user interface displayed in conjunction with the processing of step (3) of FIG. 39(d).

FIG. 39(f) is an illustrative user interface displayed in conjunction with the processing of step (4) of FIG. 39(d).

FIG. 39(g) is an illustrative user interface displayed in conjunction with the processing of step (5) of FIG. 39(d).

FIG. 39(h) is an illustrative user interface displayed in conjunction with the processing of step (6) of FIG. 39(d).

FIG. 39(i) shows steps of a "post-transaction" phase of a user scenario, showing aspects of open bar tab ordering and payment, in accordance with one embodiment of the invention.

FIG. 39(j) is a flowchart showing aspects of the processing performed in the user scenario of FIG. 39(a), in accordance with one embodiment of the invention.

FIG. 39(k) is a diagram describing details of the respective steps of FIG. 39(j).

FIGS. 40(a)-40(l) are figures showing a further user scenario in which a mobile-payment device is used in bill sharing, in accordance with one embodiment of the invention.

In particular, FIG. 40(a) shows steps of a "pre-transaction" phase of a user scenario, showing aspects of bill sharing, in accordance with one embodiment of the invention.

FIG. 40(b) is an illustrative user interface displayed in conjunction with the processing of step (1) of FIG. 40(a).

FIG. 40(c) is an illustrative user interface displayed in conjunction with the processing of step (2) of FIG. 40(a).

FIG. 40(d) shows steps of a "transaction" phase of a user scenario, showing aspects of bill sharing, in accordance with one embodiment of the invention.

FIG. 40(e) is an illustrative user interface displayed in conjunction with the processing of step (4) of FIG. 40(d).

FIG. 40(f) is an illustrative user interface displayed in conjunction with the processing of step (5) of FIG. 40(d).

FIG. 40(g) is an illustrative user interface displayed in conjunction with the processing of step (6) of FIG. 40(d).

FIG. 40(h) shows steps of a "post-transaction" phase of a user scenario, showing aspects of bill sharing, in accordance with one embodiment of the invention.

FIG. 40(i) is an illustrative user interface displayed in conjunction with the processing of step (7) of FIG. 40(h).

FIG. 40(j) is an illustrative user interface displayed in conjunction with the processing of step (8) of FIG. 40(h).

FIG. 40(k) is a flowchart showing aspects of the processing performed in the user scenario of FIG. 40(a), in accordance with one embodiment of the invention.

FIG. 40(l) is a diagram describing details of the respective steps of FIG. 40(k).

FIGS. 41(a)-41(i) are figures showing a further user scenario in which a mobile-payment device is used in performing person to person payment, in accordance with one embodiment of the invention. to particular. FIG. 41(a) shows steps of a "pre-transaction" phase of a user scenario, showing aspects of performing person to person payment, in accordance with one embodiment of the invention.

FIG. 41(b) is an illustrative user interface displayed in conjunction with the processing of step (1) of FIG. 41(a).

FIG. 41(c) shows steps of a "transaction" phase of a user scenario, showing aspects of performing person to person payment, in accordance with one embodiment of the invention.

FIG. 41(d) is an illustrative user interface displayed in conjunction with the processing of step (3) of FIG. 41(c).

FIG. 41(e) is an illustrative user interface displayed in conjunction with the processing of step (4) of FIG. 41(c).

FIG. 41(f) shows steps of a "post-transaction" phase of a user scenario, showing aspects of performing person to person payment, in accordance with one embodiment of the invention.

FIG. 41(g) is an illustrative user interface displayed in conjunction with the processing of step (6) of FIG. 41(f).

Figure 41:
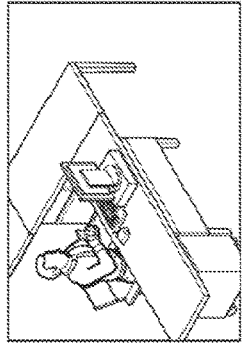
FIGS. 41(a)-41(i) are figures showing a further user scenario in which a mobile-payment device is used in performing person to person payment, in accordance with one embodiment of the invention.
Figure 41:
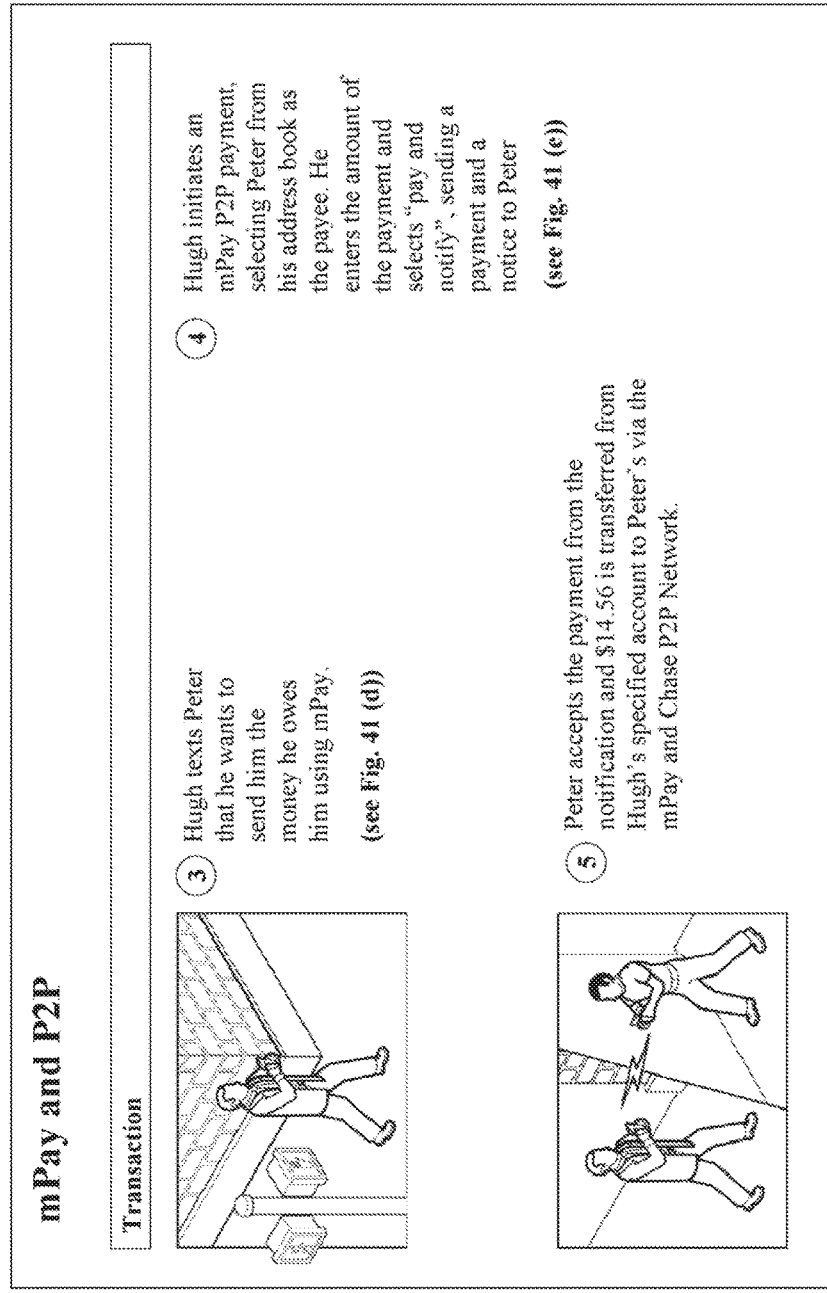
Figure 41:
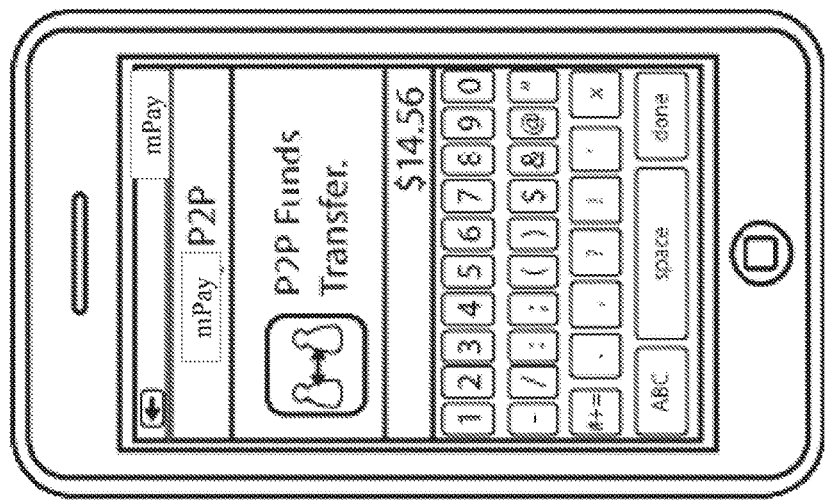
Figure 41:
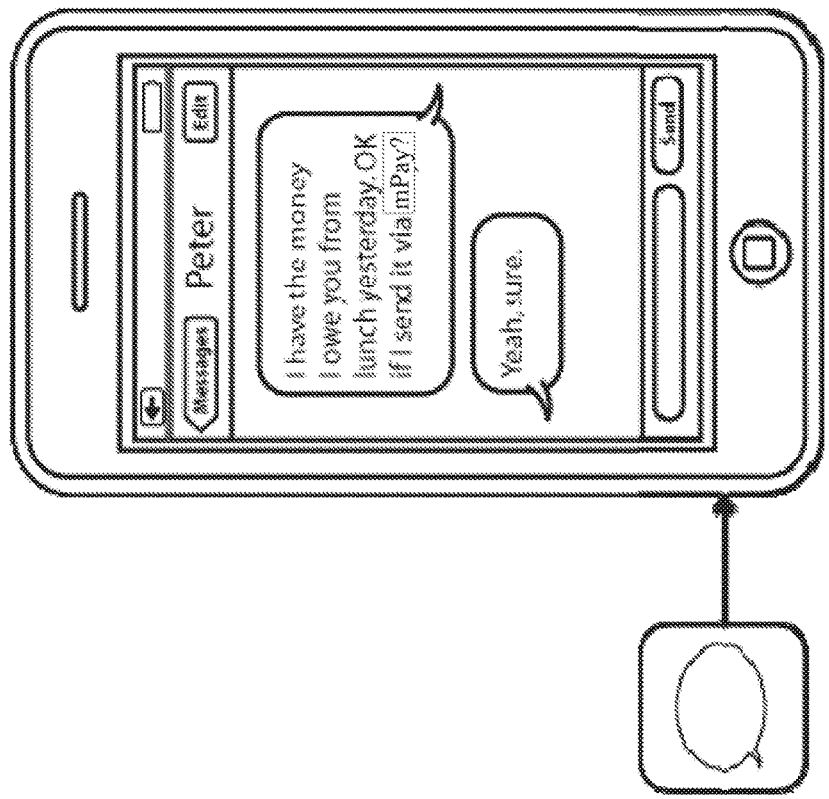
Figure 41:
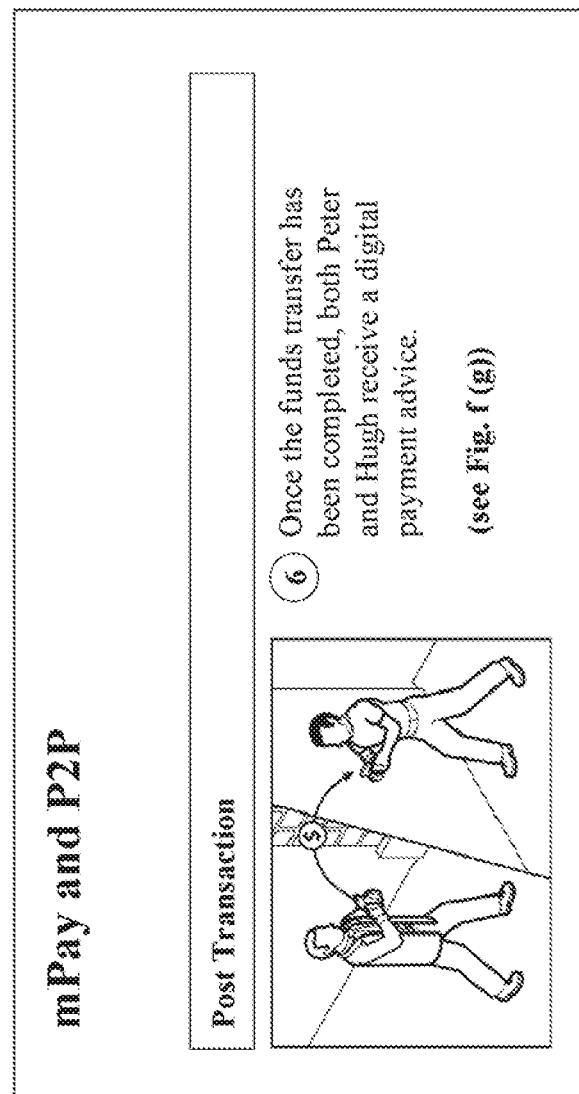
Figure 41:
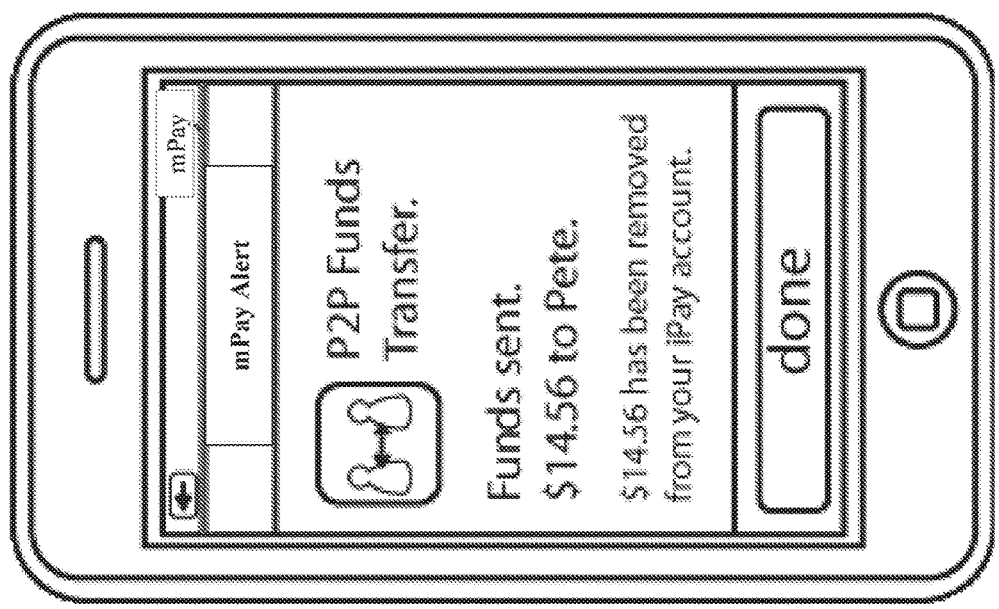
Figure 41H:
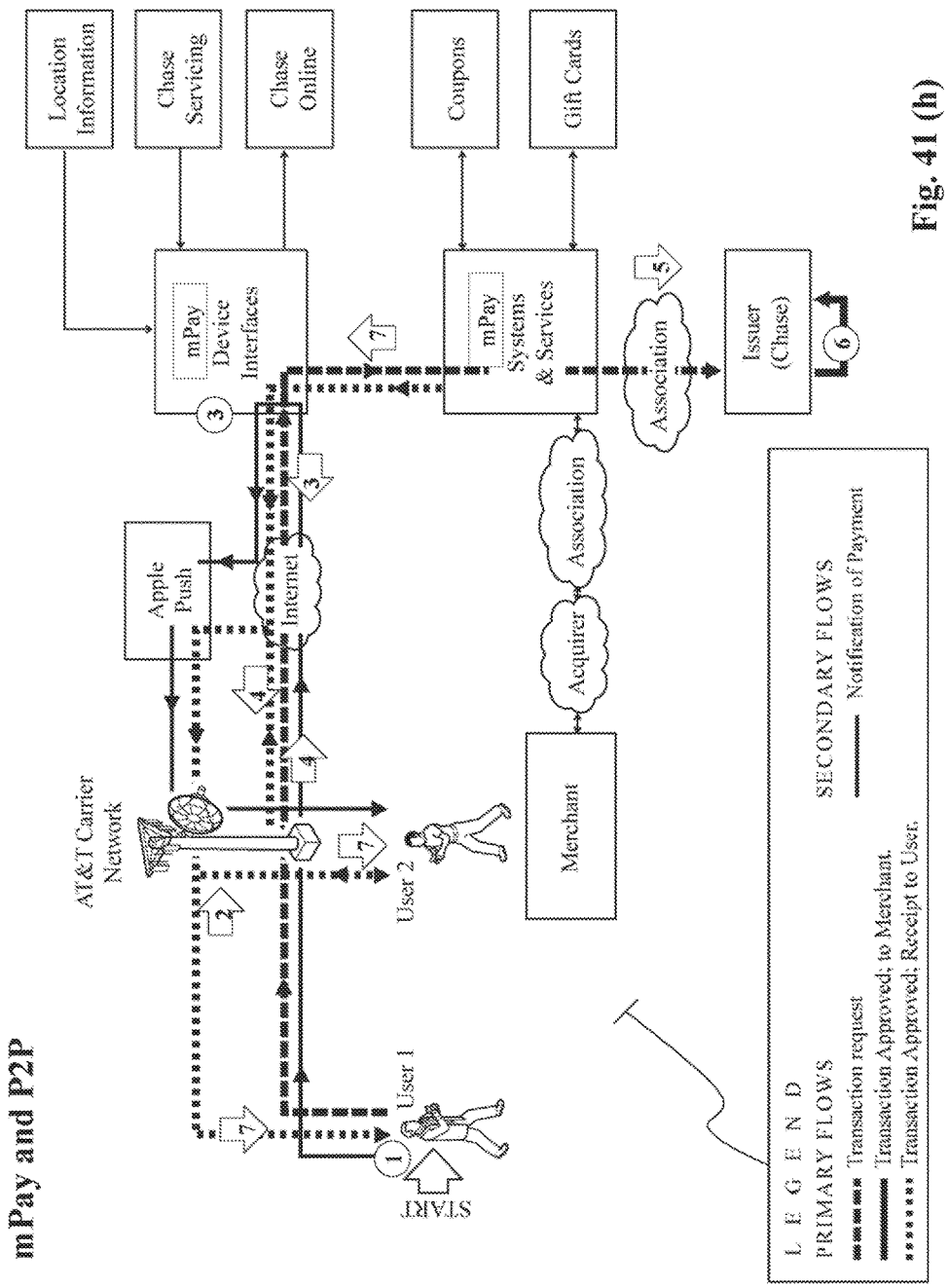
Figure 42:
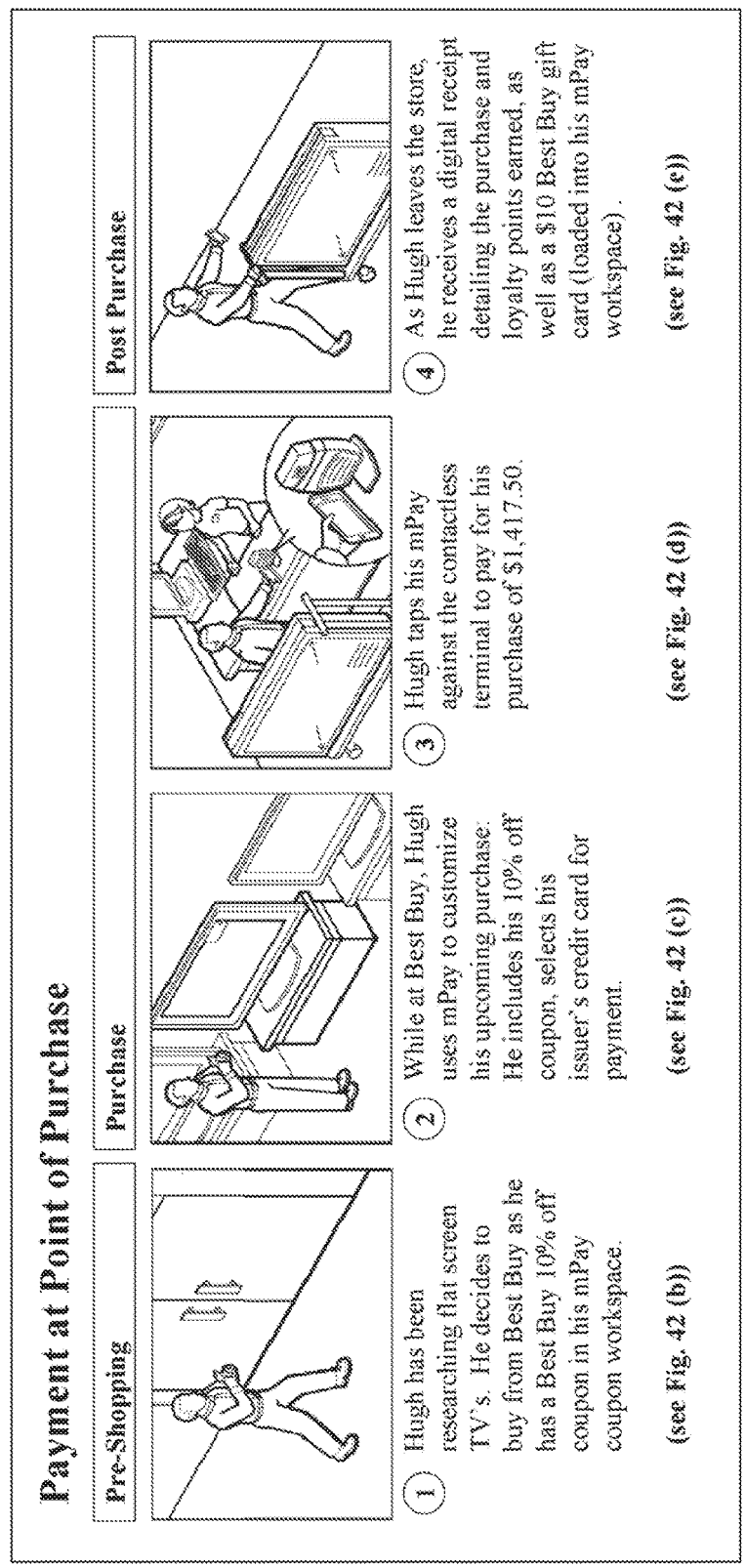
FIGS. 42(a)-42(g) are figures showing a further user scenario in which a mobile-payment device is used to perform payment at a point of purchase, in accordance with one embodiment of the invention.
Figure 42:
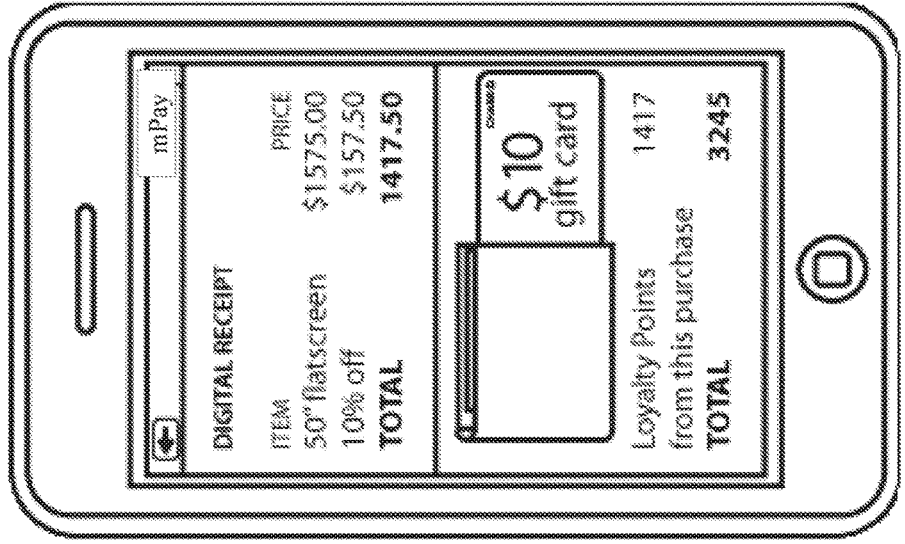
Figure 42:
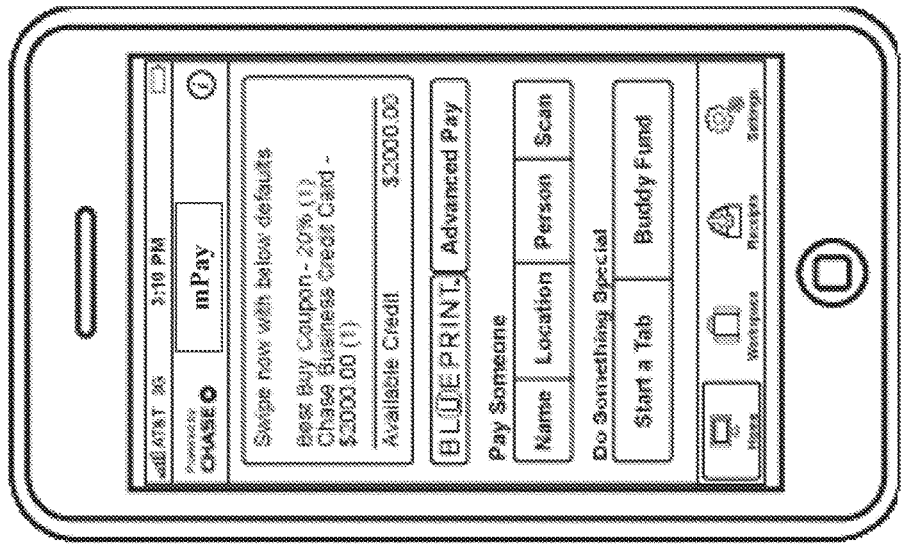

FIG. 41(h) is a flowchart showing aspects of the processing perforated in the user scenario of FIG. 41(a), in accordance with one embodiment of the invention.

FIG. 41(i) is a diagram describing details of the respective steps of FIG. 41(h).

FIGS. 42(a)-42(g) are figures showing a further user scenario in which a mobile-payment device is used to perform payment at a point of purchase, in accordance with one embodiment of the invention.

In particular, FIG. 42(a) shows steps of a user scenario, showing aspects of performing payment at a point of purchase, in accordance with one embodiment of the invention.

FIG. 42(b) is art-illustrative user interface displayed in conjunction with the processing of step (1) of FIG. 42(a).

FIG. 42(c) is an illustrative user interface displayed in conjunction with the processing of step (2) of FIG. 42(a).

FIG. 42(d) is an illustrative user interface displayed in conjunction with the processing of step (1) of FIG. 42(a).

FIG. 42(e) is an illustrative user interface displayed in conjunction with the processing of Step (2) of FIG. 42(a).

FIG. 42(f) is a flowchart showing aspects of the processing performed in the user scenario of FIG. 42(a), in accordance with one embodiment of the invention.

FIG. 42(g) is a diagram describing details of the respective steps of FIG. 42(f).

Hereinafter, general aspects of implementation of the systems and methods of the invention will be described.

As described herein, embodiments of the system of the invention and various processes of embodiments of the method of the invention are described. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, including any of the tasks described herein. Such a set of instructions for performing a particular task may be characterized as a program, software program, or simply software.

As noted herein, the processing machine executes the instructions that are stored In the memory or memories to process data. This processing of data may be in response to commands by a user or users of the processing machine, in response to previous processing, in response to a request by another processing machine and/or any other input, for example.

As noted herein, the processing machine used to implement the invention may be a general purpose computer. However, the processing machine described herein may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described herein, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain, further, processing as described herein is performed by various components and various memories. However, it is appreciated that the processing performed by two or more distinct components as described herein may, in accordance wild a further embodiment of the invention, be performed by a single component. Further, the processing performed by one distinct component as described herein may be performed by two or more distinct components. In a similar manner, the memory storage performed by two or more distinct memory portions as described herein may, in accordance with a further embodiment of the invention, be performed by a single memory portion. Further, the memory storage performed by one distinct memory portion as described herein may be performed by two or more memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example. As used herein, the term "talking" in reference to devices means that the devices are communicating with each other.

As described herein, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary codec machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different, programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described herein, the invention may illustratively be embodied in the form of a processing machine, including a computer or computer system, for example, that includes at least one memory. It is to be appreciated that the set of instructions, i.e., the software for example, that enables the computer operating system to perform the operations described herein may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface-may be in the form of a command, a selection of data, or some other input, for example.

As discussed herein, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well, as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A computer implemented method for fulfilling a request of a customer for a requested item to be purchased from a merchant, the method including:
    receiving, by a merchant processor, a merchant request from a customer device, the merchant request comprising order information and customer financial entity account information;
    displaying, by the merchant processor, at least a portion of the merchant request so as to allow the merchant to fulfill the request of the customer, the request of the customer constituting a transaction comprising;
        observing an observed event by the customer device, wherein the observed event is associated with the performance of the customer device or the customer, the observing the observed event triggering the merchant request;
        mapping the observed event with a corresponding order record stored in a database within the customer device;
        retrieving the order record from the database, the order record including at least customer financial entity account information and ordering information for the customer request;
        generating the merchant request based on the order record, the merchant request that is generated including at least the ordering information and customer financial entity account information; and
        outputting the merchant request to the designated merchant processor;
    sending, by the merchant processor, an authorization request to a customer financial entity, the authorization request including the customary financial entity account information;
    receiving, by the merchant processor, an approval from the customer financial entity in response to the authorization request; and processing, by the merchant processor, the merchant request from the customer device.

2. The computer implemented method of claim 1, wherein the order record comprises the customer financial entity account information and the order information, the order information comprising details of the requested item to be purchased from the merchant.

3. The computer implemented method of claim 1, further comprising: receiving, by the merchant processor, an indication from the customer device that the transaction has been funded.

4. The computer implemented method of claim 1, further comprising: sending, by the merchant processor, an indication to the customer device that the requested item is being prepared or is ready for pickup.

5. The computer implemented method of claim 1, wherein the event observed by the customer device is constituted by satisfaction of trigger data, the satisfaction of the trigger data reflecting an input received at the customer device from the customer.

6. The computer implemented method of claim 5, wherein the event observed by the customer device, which satisfied the trigger data, is constituted by key strokes input from the customer.

7. The computer implemented method of claim 5, wherein the event observed by the customer device, which satisfied the trigger data, is constituted by a predetermined geographical location of the customer device.

8. The computer implemented method of claim 5, wherein the event observed by the customer device, which satisfied the trigger data, is constituted by a predetermined physical movement of the customer device.

9. The computer implemented method of claim 8, wherein the predetermined physical movement of the customer device is constituted by comparing a position of the customer device with respect to a merchant machine at a location of the merchant.

10. The computer implemented method of claim 1, further comprising: receiving, by the merchant processor, a depiction of the customer or of a vehicle used by the customer, wherein the depiction is textual, graphical, or pictorial.

11. The computer implemented method of claim 1, further comprising: sending, by the merchant processor, a confirmation request to the customer device to confirm the order information; and
receiving, by the merchant processor, a confirmation from the customer device indicative of a customer's desire to purchase the requested item from the merchant.

12. The computer implemented method of claim 1, wherein a prior order record is sent by the merchant to the customer device for storage in the database within the customer device before receiving the merchant request from the customer device.

13. The computer implemented method of claim 12, wherein the order record sent by the merchant to the customer device is associated with a promotion offered by the merchant.

14. The computer implemented method of claim 1, wherein the method is performed such that both the customer request is prepared and an associated financial transaction is completed prior to the merchant interfacing with the customer at a physical premise of the merchant.

15. A computer processing system that fulfills a customer request for a requested item to be purchased from a merchant, the computer processing system including:
at least one tangibly embodied processing portion that is configured to:
receive a merchant request from a customer device, the merchant request comprising order information and customer financial entity account information;
display at least a portion of the merchant request so as to allow the merchant to fulfill the request of the customer, the request of the customer constituting a transaction comprising;
observing an observed event by the customer device, wherein the observed event is associated with the performance of the customer device or the customer, the observing the oberved event triggering the merchant request;
mapping the observed event with a corresponding order record stored in a database within the customer device;
retrieving the order record from the database, the order record including at least customer financial entity account information and ordering information for the customer request;
generating the merchant request based on the order record, the merchant request that is generated including at least the ordering information and customer financial entity account information; and
outputting the merchant request to the designated merchant processor;
send, by the merchant processor, an authorization request to a customer financial entity, the authorization request including the customer financial entity account information;
receive, by the merchant processor, an approval from the customer financial entity in response to the authorization request; and
process, by the merchant processor, the merchant request from the customer device.

16. A non-transitory computer readable medium including code that fulfills a customer request for a requested item to be purchased from a merchant, the computer readable medium including:
a first portion that receives a merchant request from a customer device, the merchant request comprising order information and customer financial entity account information;
a second portion that receives an indication that the transaction has been funded;
a third portion that displays at least a portion of the merchant request so as to allow the merchant to fulfill the request of the customer, the request of the customer constituting a transaction comprising;
observing an observed event by the customer device, wherein the observed event is associated with the performance of the customer device or the customer, the observing the observed event triggering the merchant request;
mapping the observed event with a corresponding order record stored in a database within the customer device;
retrieving the order record from the database, the order record including at least customer financial entity account information and ordering information for the customer request;
generating the merchant request based on the order record, the merchant request that is generated including at least the ordering information and customer financial entity account information; and
outputting the merchant request to the designated merchant processor;

a fourth portion that sends an authorization request to a customer financial entity, the authorization request including the customer financial entity account information;
a fifth portion that receives an approval from the customer financial entity in response to the authorization request;
a sixth portion that processes the merchant request from the customer device; and
a seventh portion that sends an indication to the customer device that the requested item is being prepared or is ready for pickup.

* * * * *